(12) United States Patent
Novek

(10) Patent No.: US 11,629,686 B2
(45) Date of Patent: Apr. 18, 2023

(54) POWER GENERATION USING STORAGE RESERVOIRS AT DIFFERENT ELEVATIONS

(71) Applicant: INNOVATOR ENERGY, LLC, Houston, TX (US)

(72) Inventor: Ethan Novek, Houston, TX (US)

(73) Assignee: INNOVATOR ENERGY, LLC, Houston, TX (US)

( * ) Notice: Subject to any disclaimer, the term of this patent is extended or adjusted under 35 U.S.C. 154(b) by 0 days.

(21) Appl. No.: 17/678,739

(22) Filed: Feb. 23, 2022

(65) Prior Publication Data
US 2022/0178339 A1   Jun. 9, 2022

Related U.S. Application Data

(63) Continuation-in-part of application No. 17/665,472, filed on Feb. 4, 2022, which is a continuation-in-part of application No. PCT/US2021/041931, filed on Jul. 21, 2021, which is a continuation of application No. 17/214,100, filed on Mar. 26, 2021, now Pat. No. 11,286,898, application No. 17/678,739, which is a continuation of application No. 16/932,429, filed on Jul. 17, 2020, now Pat. No. 10,961,975.

(60) Provisional application No. 63/249,100, filed on Sep. 28, 2021, provisional application No. 63/272,760, filed on Oct. 28, 2021.

(51) Int. Cl.
F03B 13/06 (2006.01)
H02J 15/00 (2006.01)

(52) U.S. Cl.
CPC ........ *F03B 13/06* (2013.01); *F05B 2260/422* (2020.08); *H02J 15/003* (2013.01); *Y02E 60/16* (2013.01)

(58) Field of Classification Search
CPC ............... F03B 13/06; F05B 2260/422; F05B 2240/97; H02J 15/003; Y02E 60/16; F04F 13/00; F15B 3/00
See application file for complete search history.

(56) References Cited

U.S. PATENT DOCUMENTS

| 4,691,524 A * | 9/1987 | Holscher ................. F03B 13/00 60/398 |
| 5,476,056 A | 12/1995 | Tokunaga et al. |
| 7,743,609 B1 | 6/2010 | Brostmeyer |
| 10,562,511 B2 | 2/2020 | Novek |
| 10,737,677 B2 | 8/2020 | Novek |

(Continued)

FOREIGN PATENT DOCUMENTS

| CN | 101045566 A | 10/2007 |
| CN | 201761628 U | 3/2011 |

(Continued)

OTHER PUBLICATIONS

Extended European Search Report dated Feb. 18, 2022 for EP 19799610.1.

*Primary Examiner* — Mark A Laurenzi
*Assistant Examiner* — Xiaoting Hu
(74) *Attorney, Agent, or Firm* — Hunton Andrews Kurth LLP

(57) ABSTRACT

A system for generating power is disclosed. The system comprises a first storage reservoir for a first liquid fluid and a second storage reservoir for a second higher density fluid located at a lower elevation. Power is generated using a pump, a generator, and fluid displacement.

30 Claims, 76 Drawing Sheets

(56) References Cited

U.S. PATENT DOCUMENTS

| | | |
|---|---|---|
| 10,961,975 B2 | 3/2021 | Novek |
| 11,286,898 B2 | 3/2022 | Novek |
| 2003/0001291 A1 | 1/2003 | Stevens |
| 2012/0305411 A1 * | 12/2012 | Elazari-Volcani ... H02K 7/1823 206/0.6 |
| 2014/0091574 A1 | 4/2014 | Favy |
| 2017/0203822 A1 | 7/2017 | Schimmel |
| 2019/0344771 A1 | 11/2019 | Novek |

FOREIGN PATENT DOCUMENTS

| | | | | |
|---|---|---|---|---|
| CN | 107337289 A | 11/2017 | | |
| DE | 102010010701 A1 * | 9/2011 | ............... | E02B 9/00 |
| DE | 102010010701 A1 | 9/2011 | | |
| DE | 102011107835 A1 * | 1/2013 | ............... | E02B 9/06 |
| DE | 102011107835 A1 | 1/2013 | | |
| DE | 102015002654 A1 * | 12/2015 | ............... | F03B 13/06 |
| DE | 102015002654 A1 | 12/2015 | | |
| JP | 58178878 A * | 10/1983 | | |
| WO | 8000833 A1 | 5/1980 | | |
| WO | 20140186875 A1 | 11/2014 | | |
| WO | 2016187659 A1 | 12/2016 | | |
| WO | WO-2016187659 A1 * | 12/2016 | ............... | E02B 9/00 |
| WO | 2018138606 A1 | 8/2018 | | |

* cited by examiner

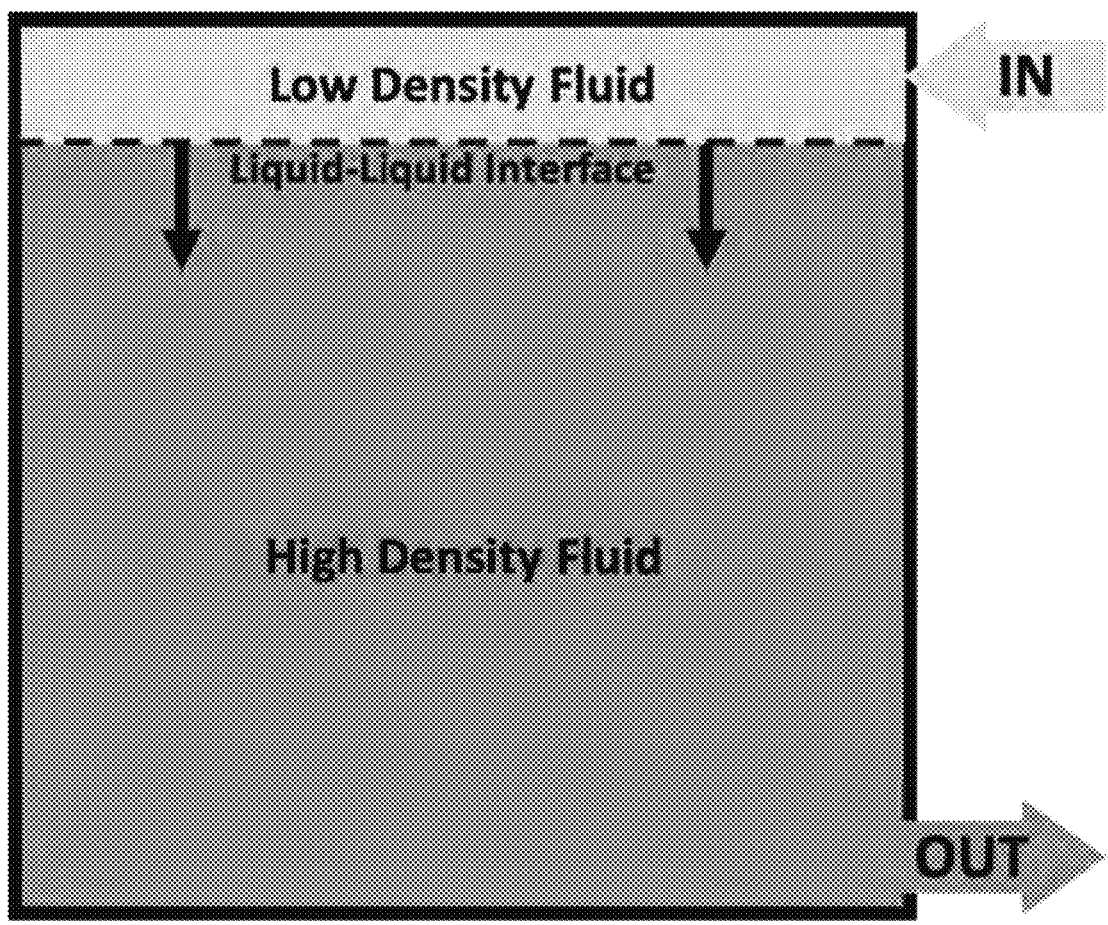
Figure 1 (Above)

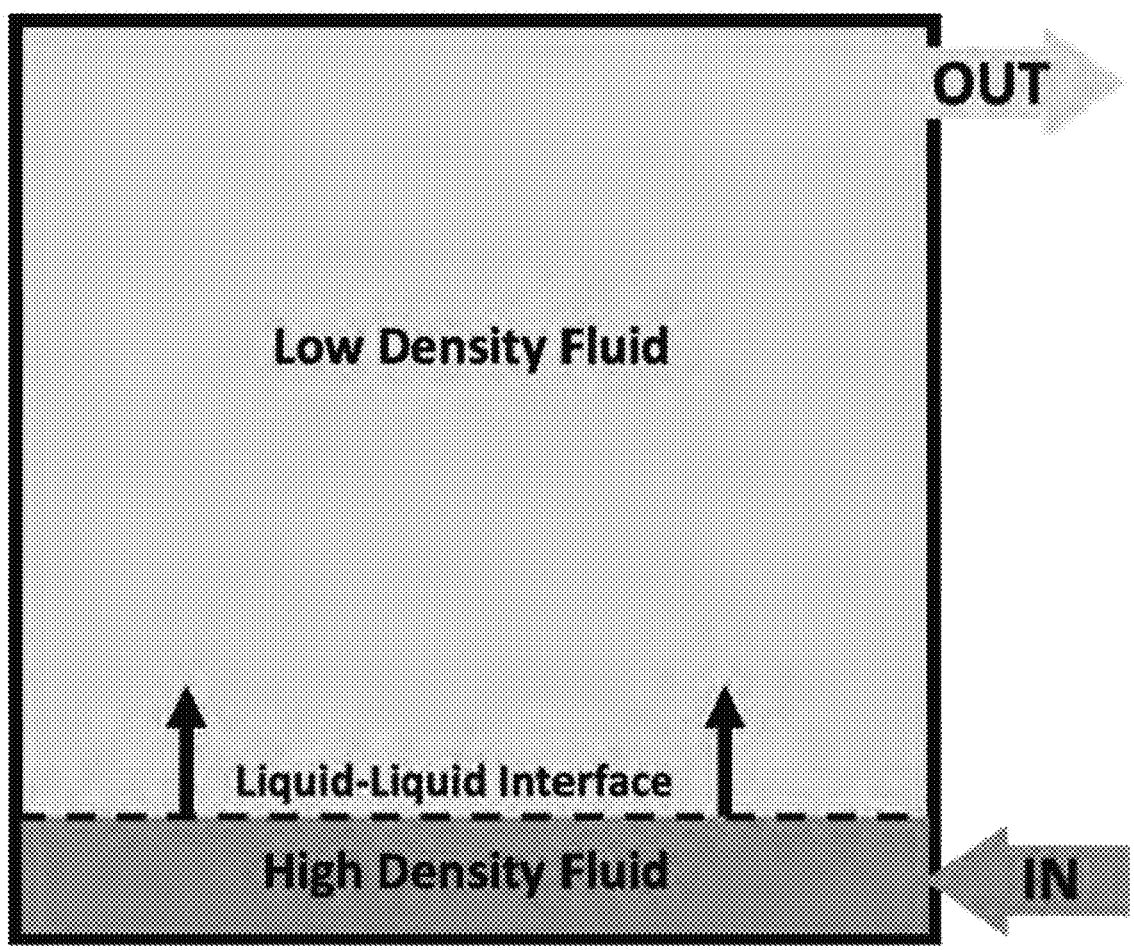
Figure 2 (Above)

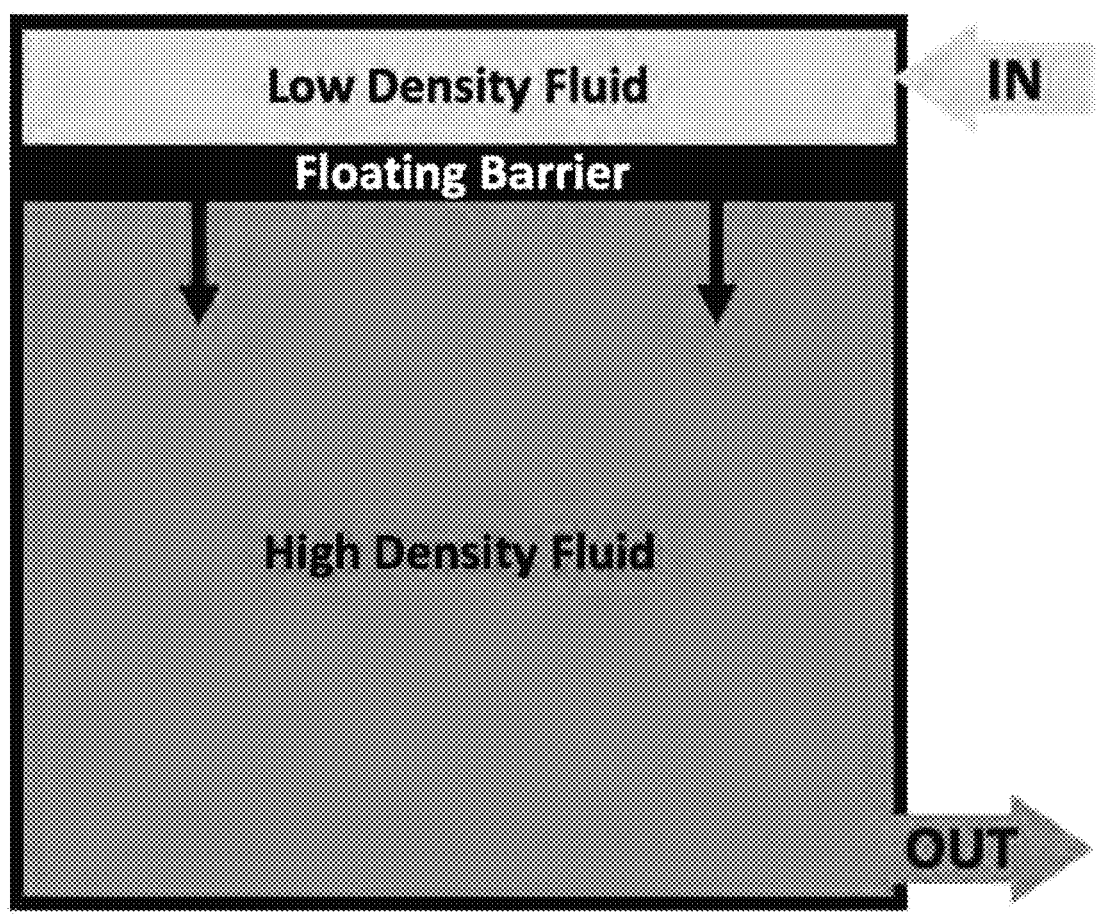
Figure 3 (Above)

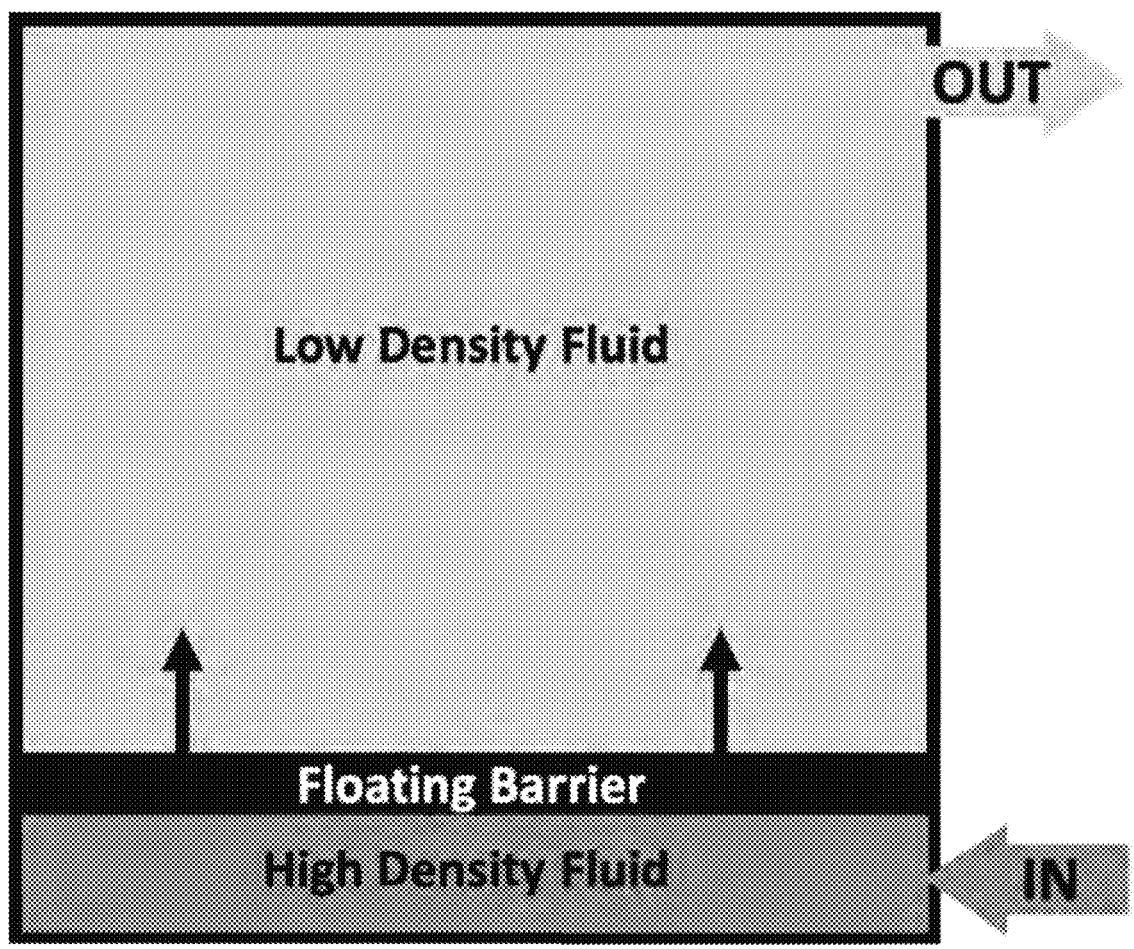
Figure 4 (Above)

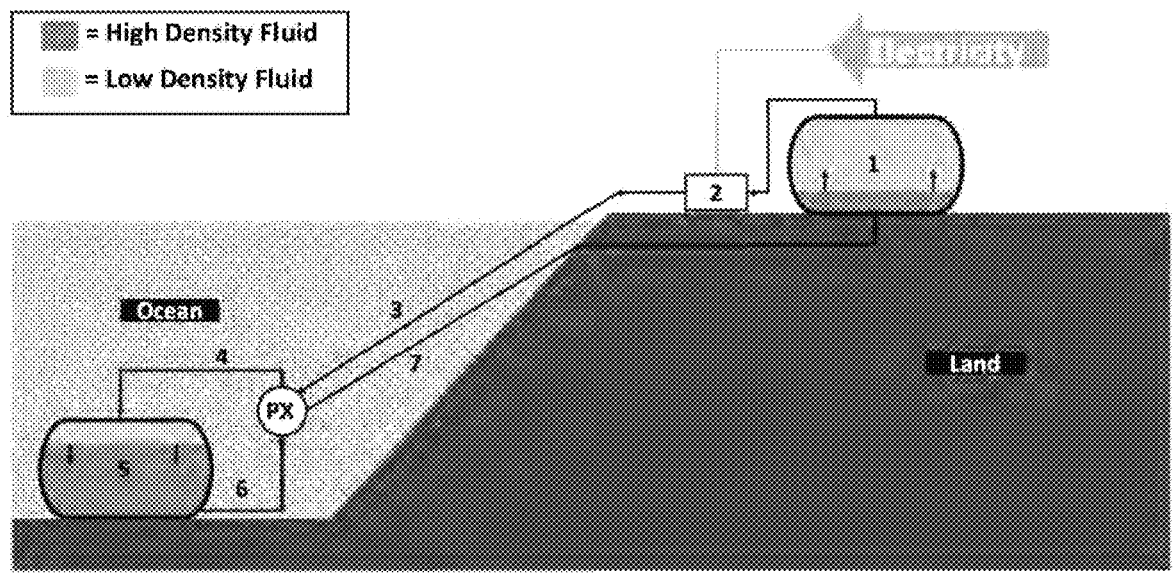
Figure 5 (Above)
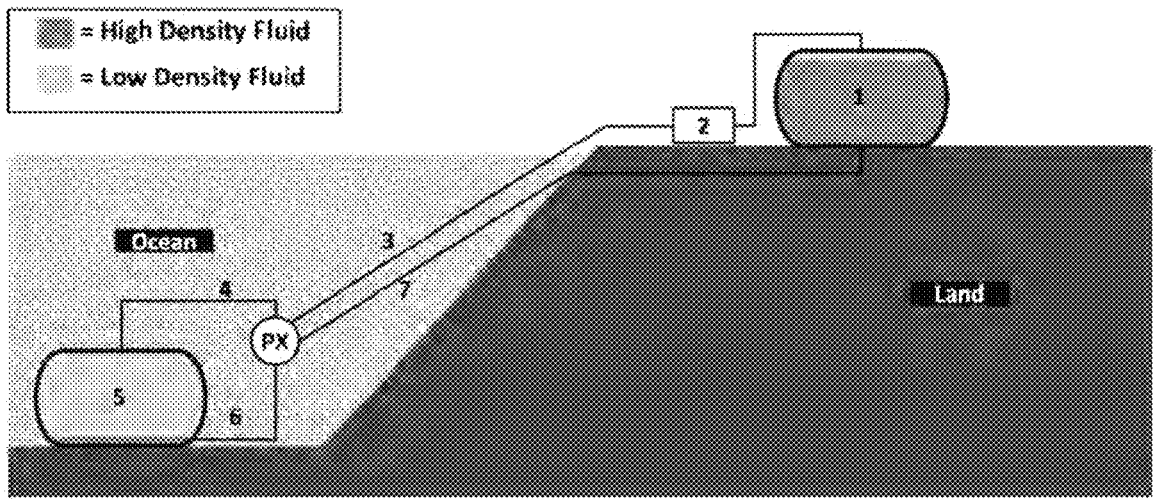
Figure 6 (Above)

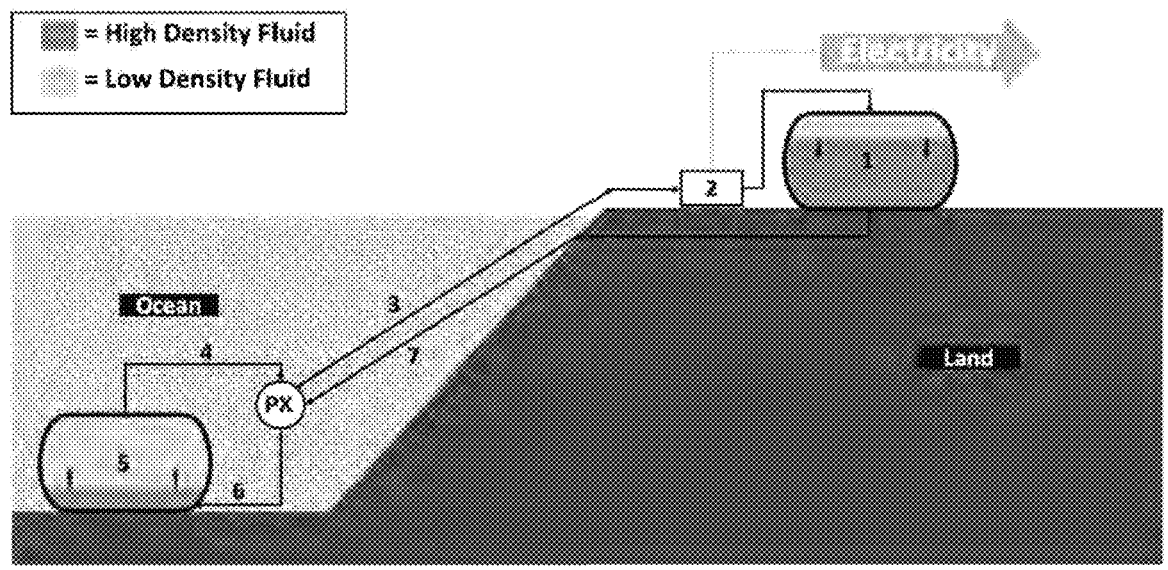
Figure 7 (Above)
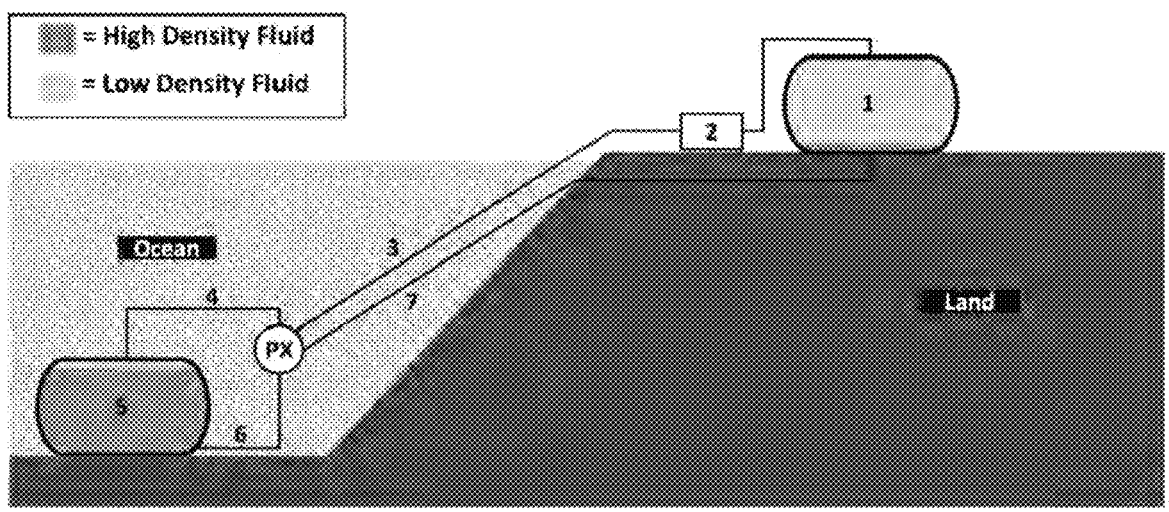
Figure 8 (Above)

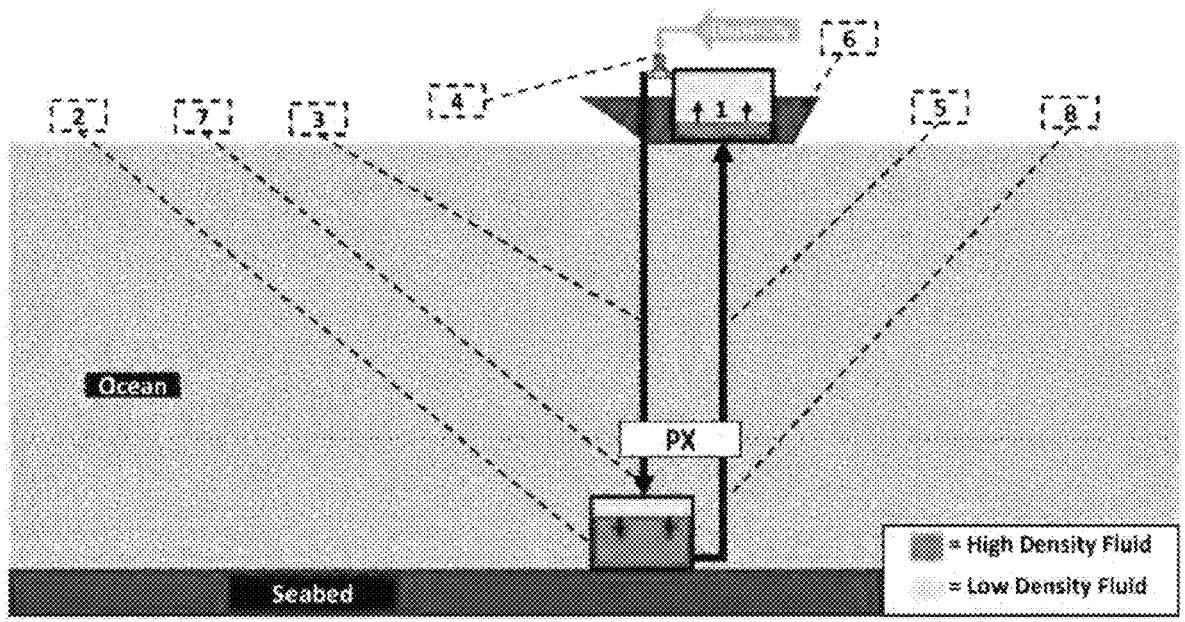
Figure 9 (Above)
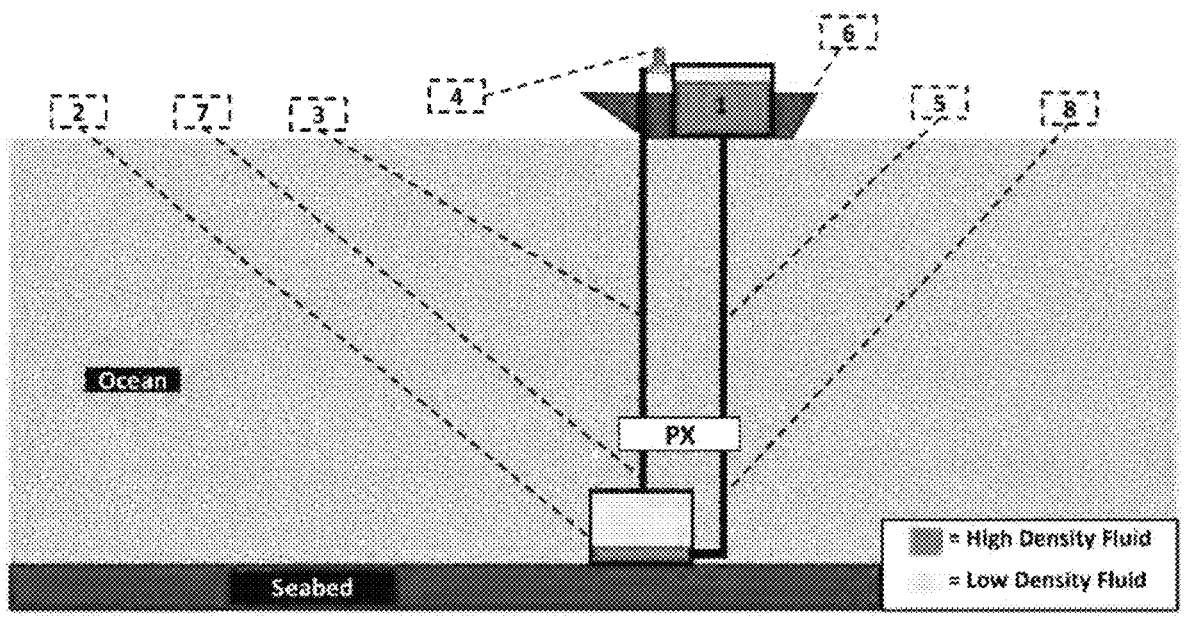
Figure 10 (Above)

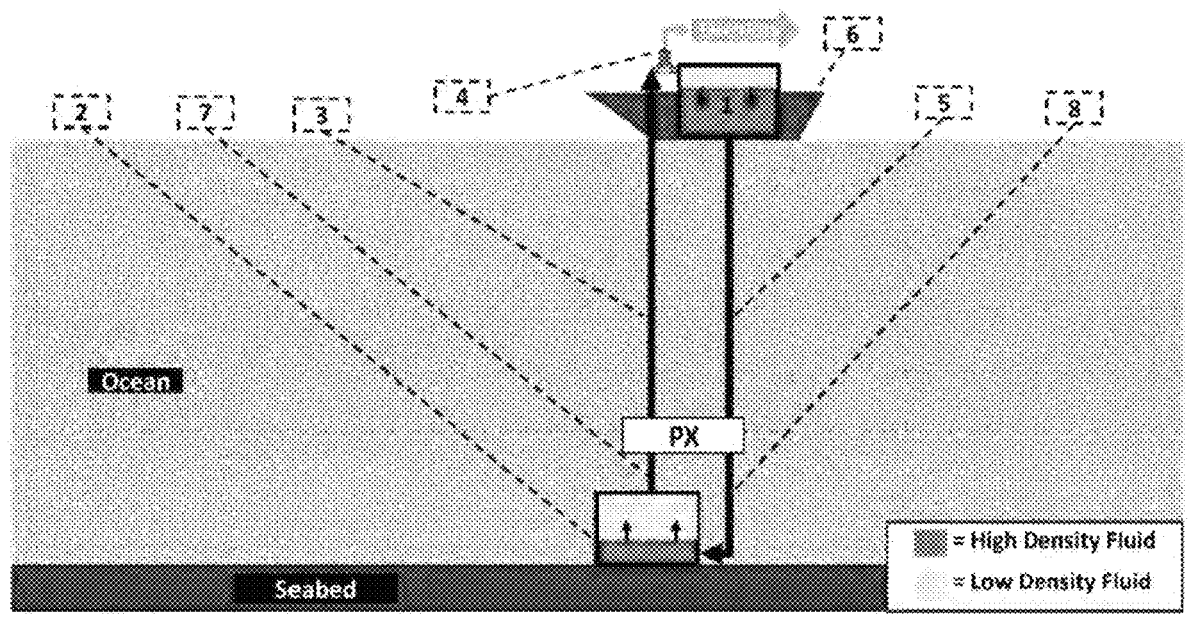
Figure 11 (Above)
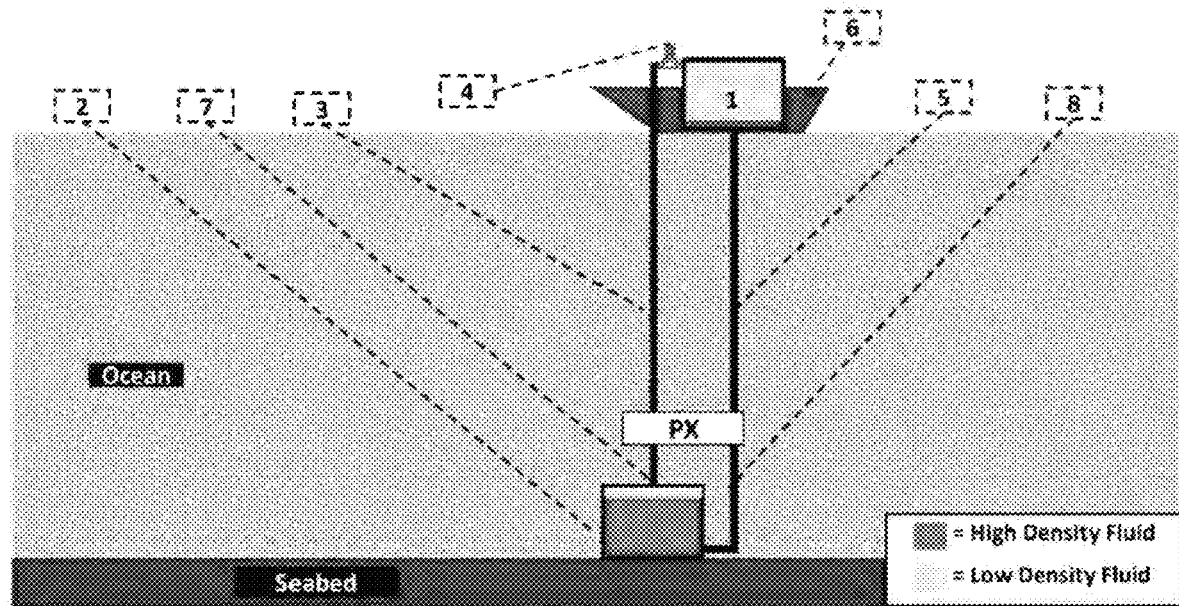
Figure 12 (Above)

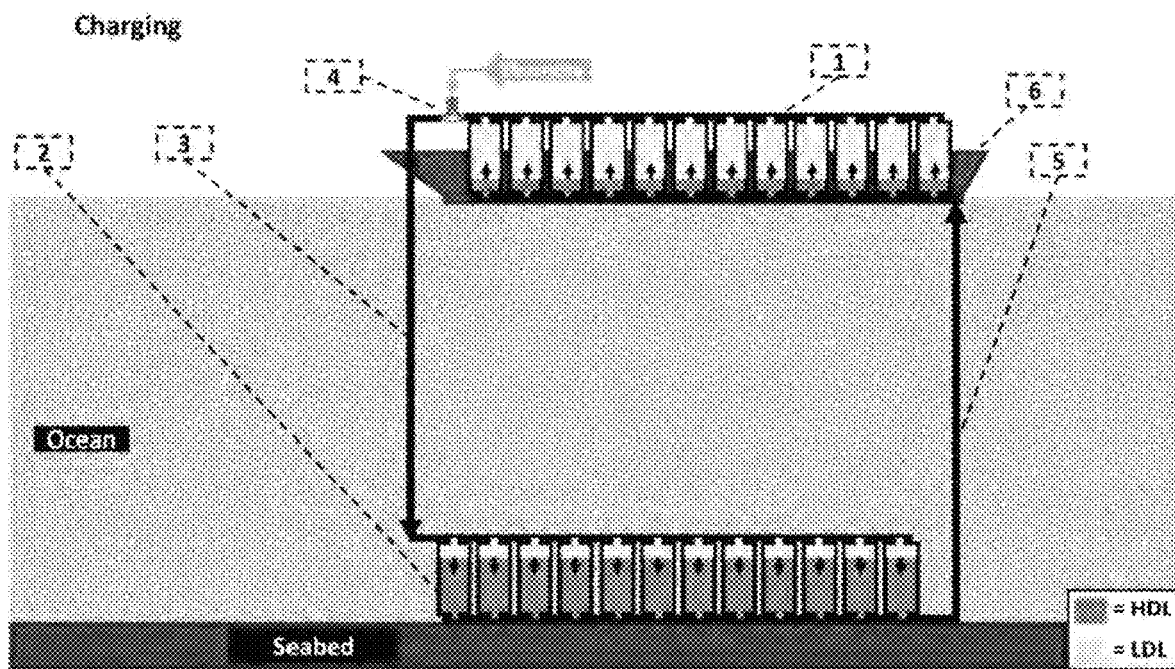
Figure 13 (Above)
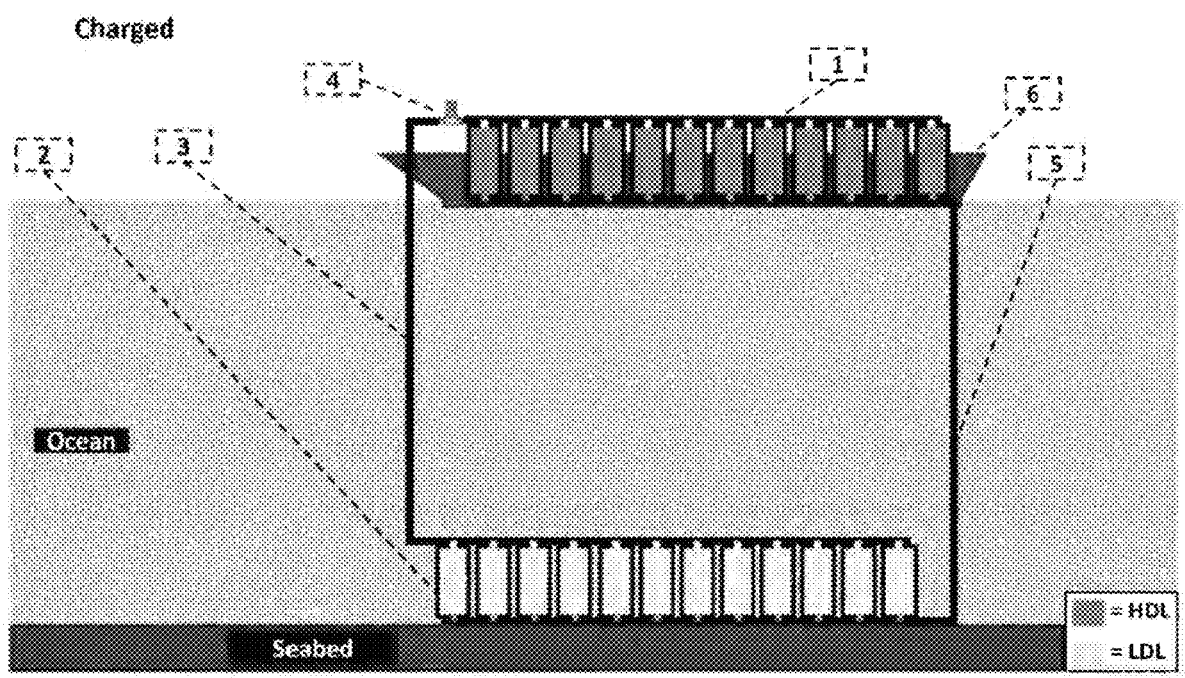
Figure 14 (Above)

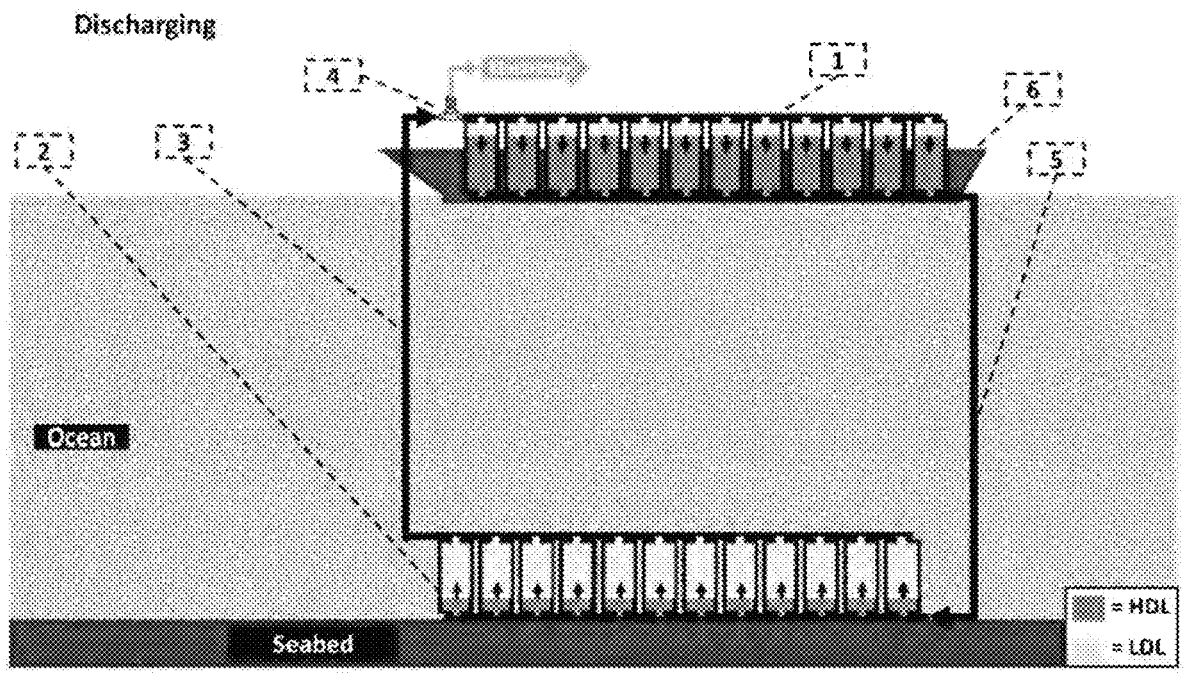
Figure 15 (Above)
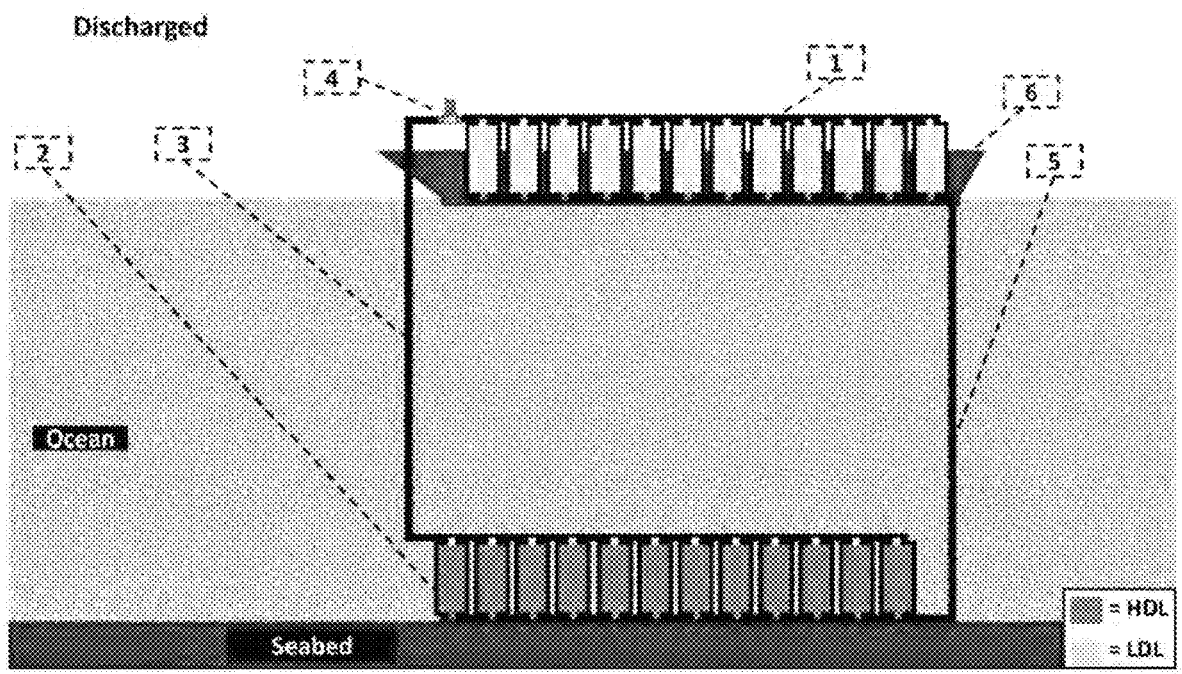
Figure 16 (Above)

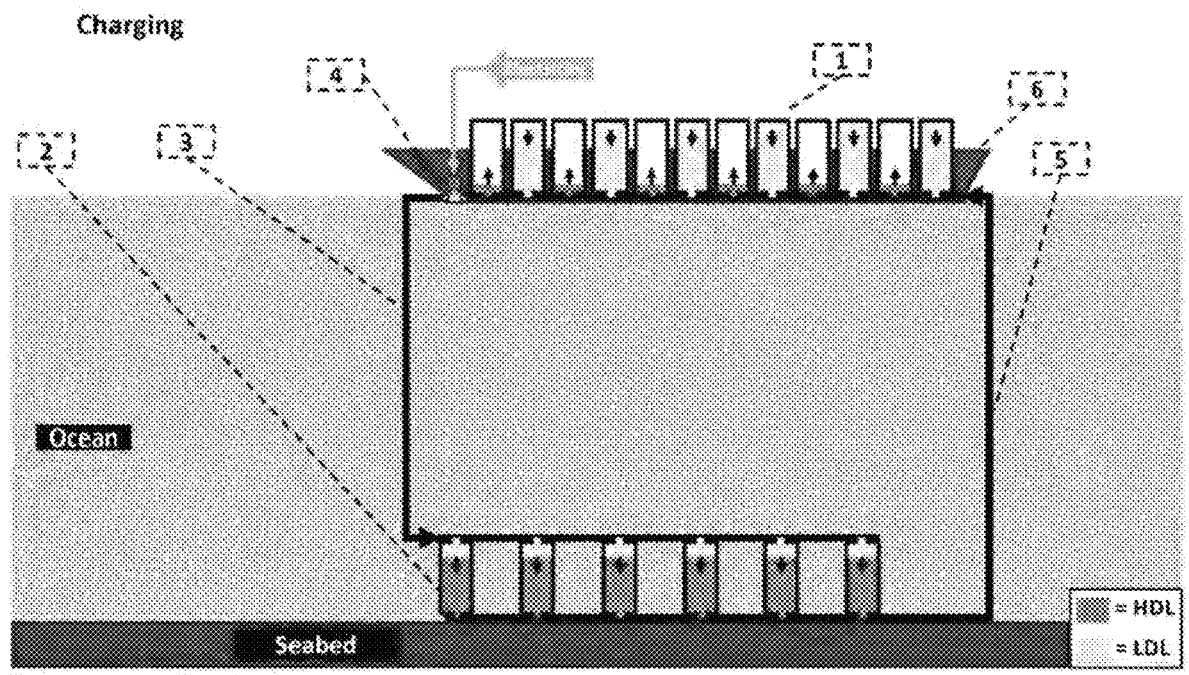
Figure 17 (Above)
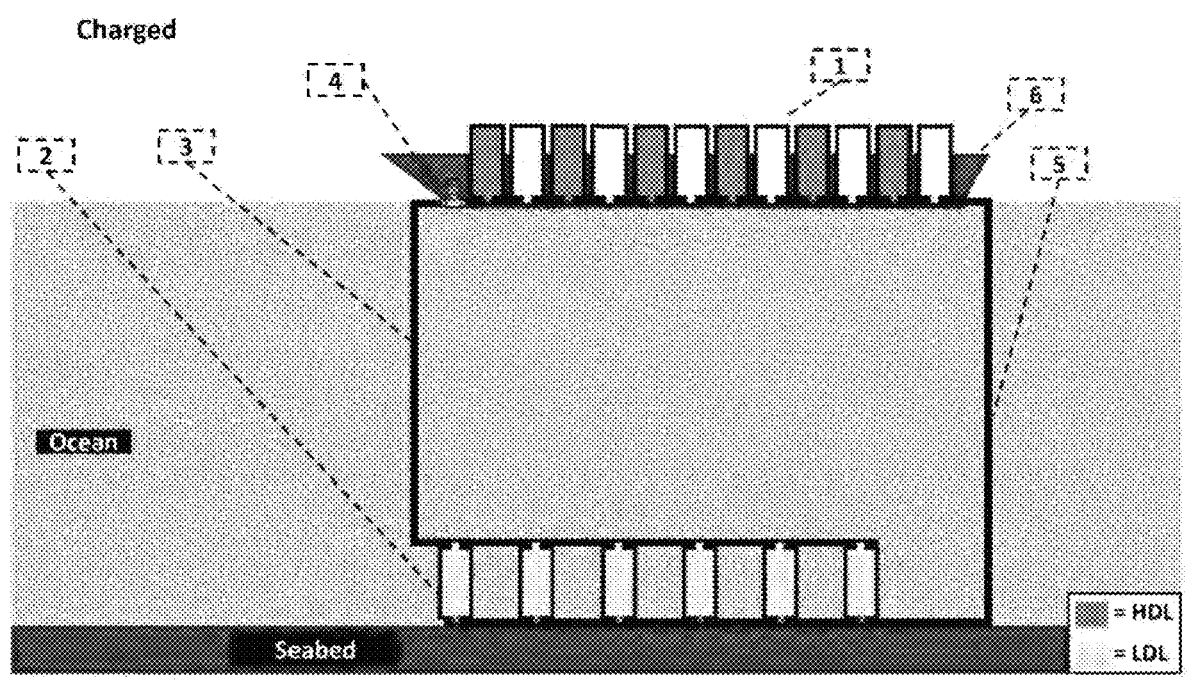
Figure 18 (Above)

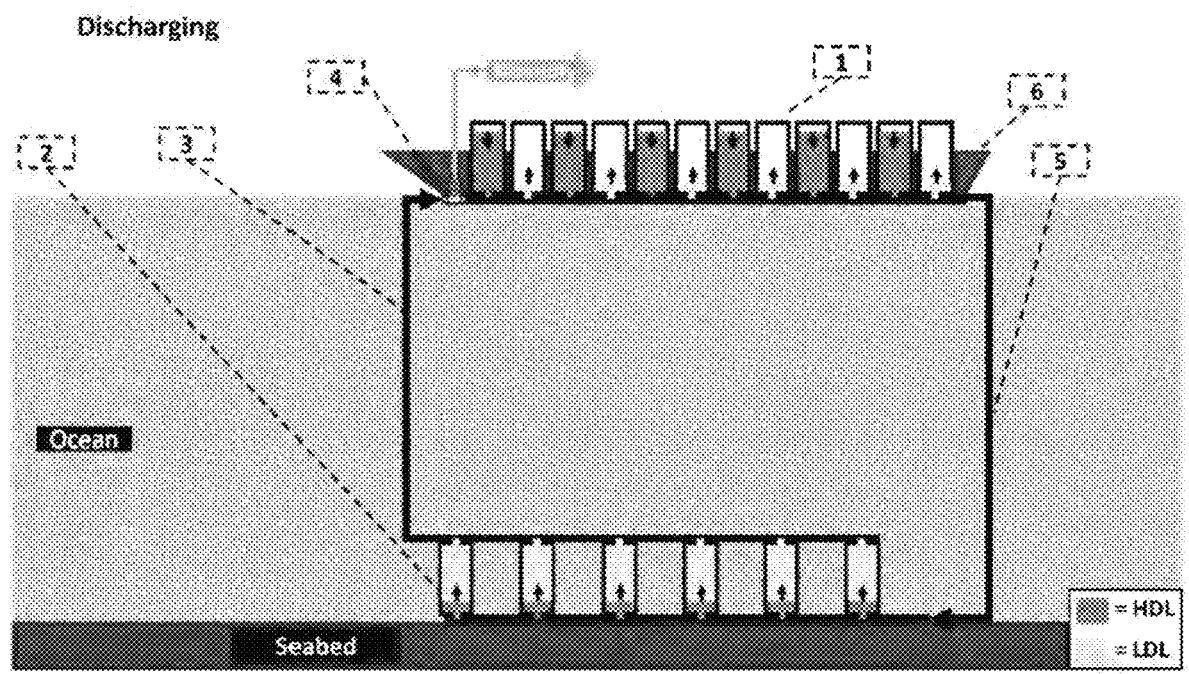
Figure 19 (Above)
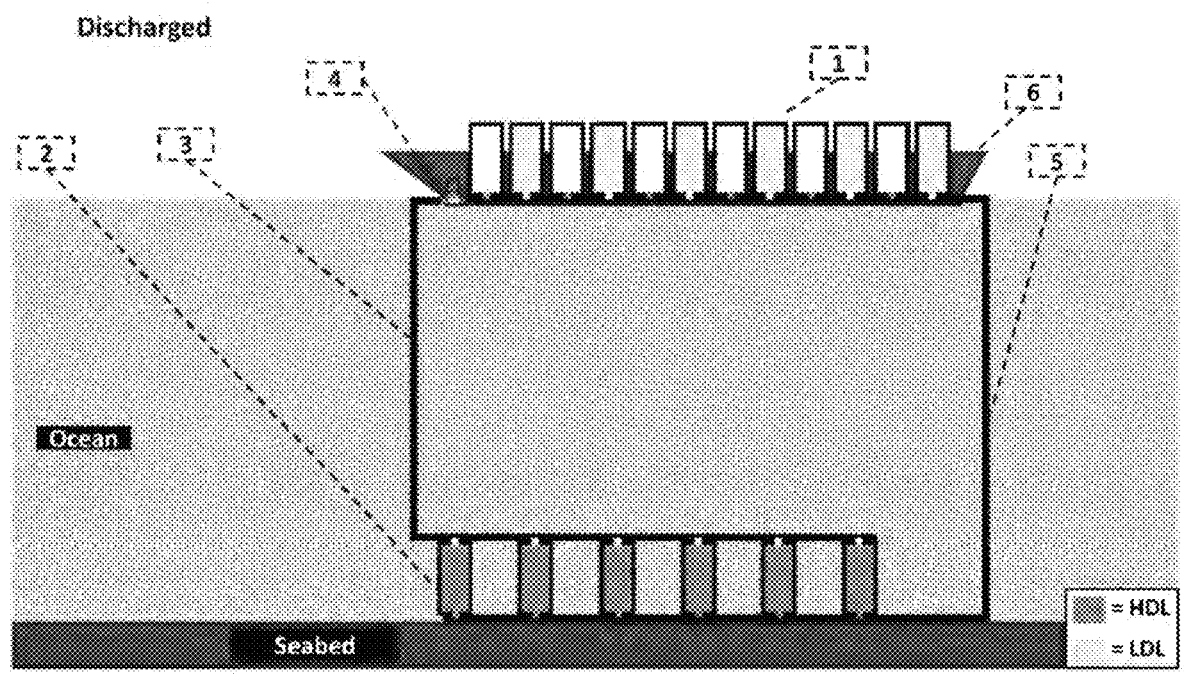
Figure 20 (Above)

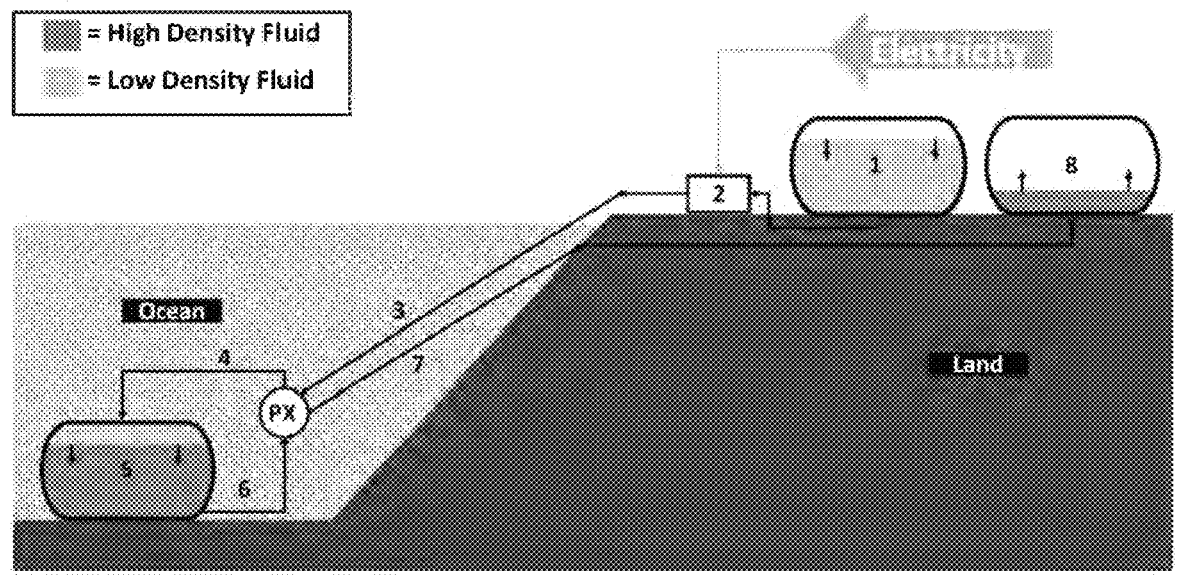
Figure 21 (Above)
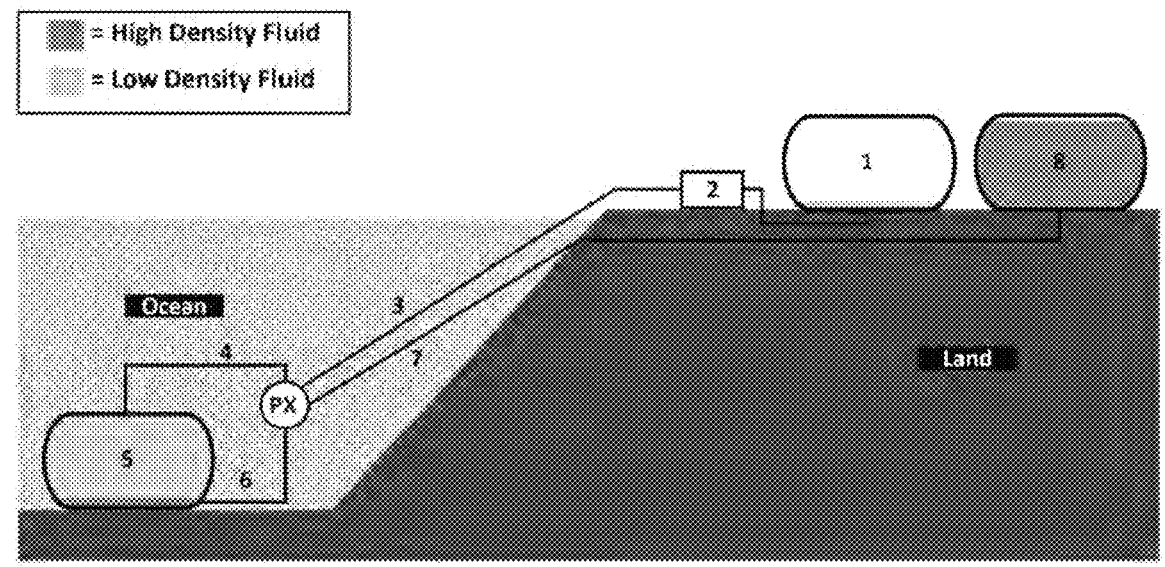
Figure 22 (Above)

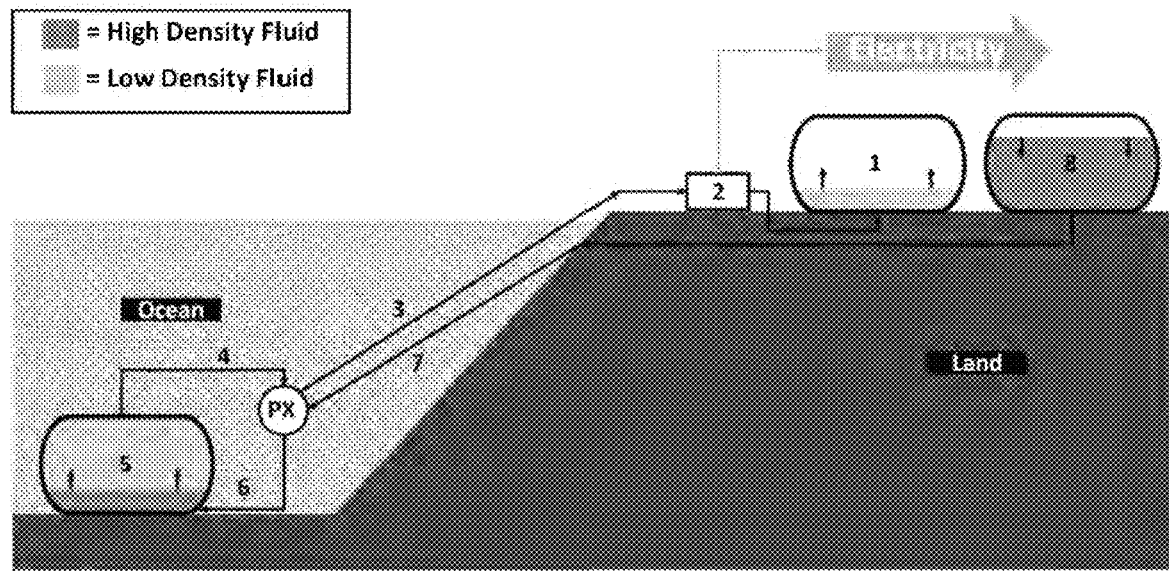
Figure 23 (Above)
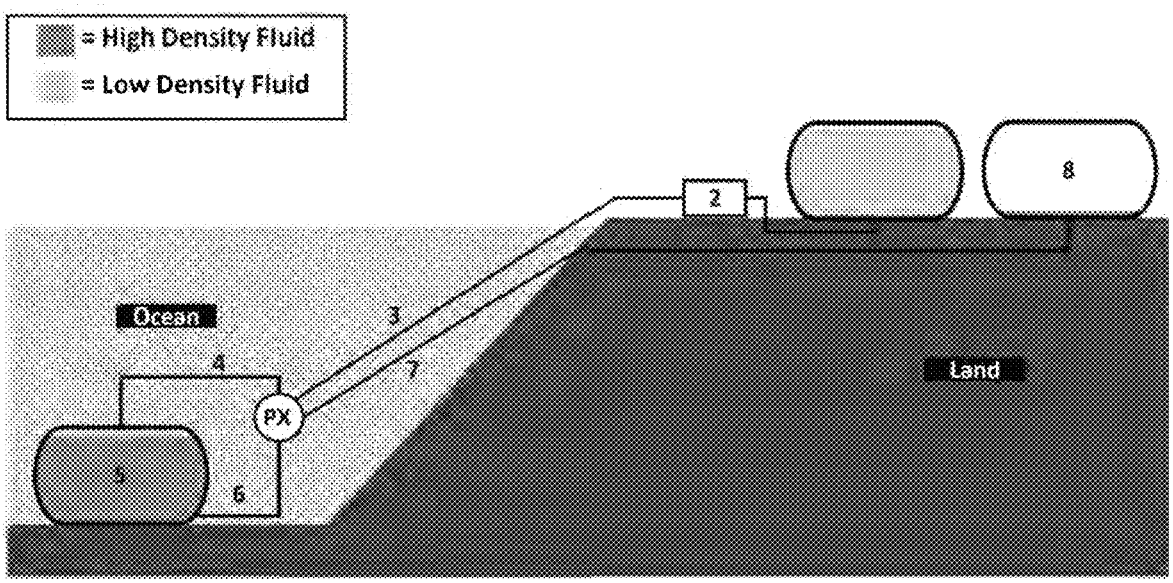
Figure 24 (Above)

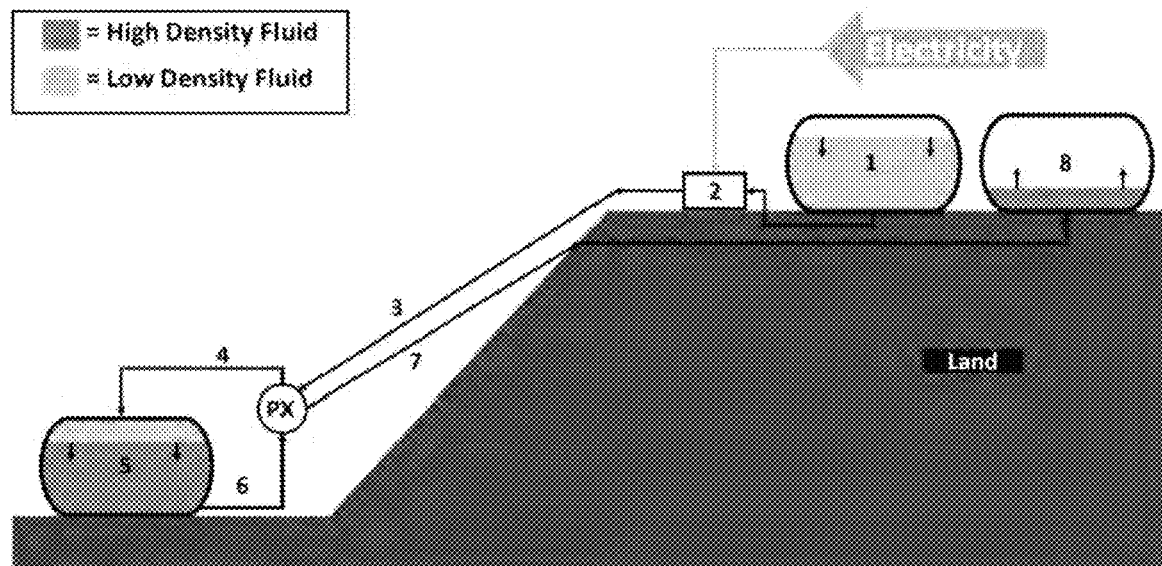
Figure 25 (Above)
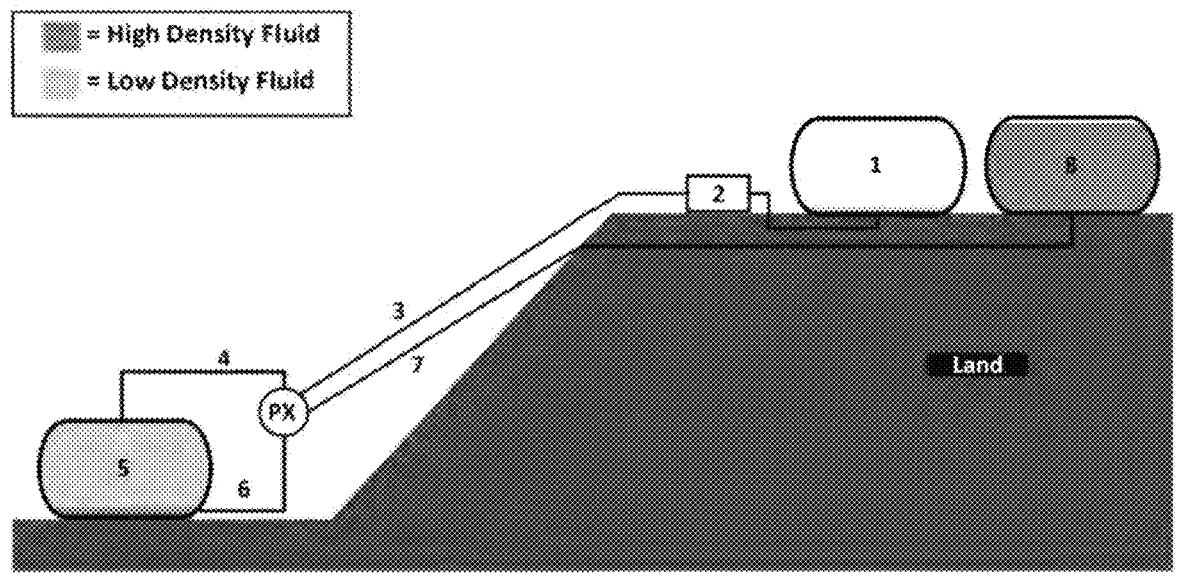
Figure 26 (Above)

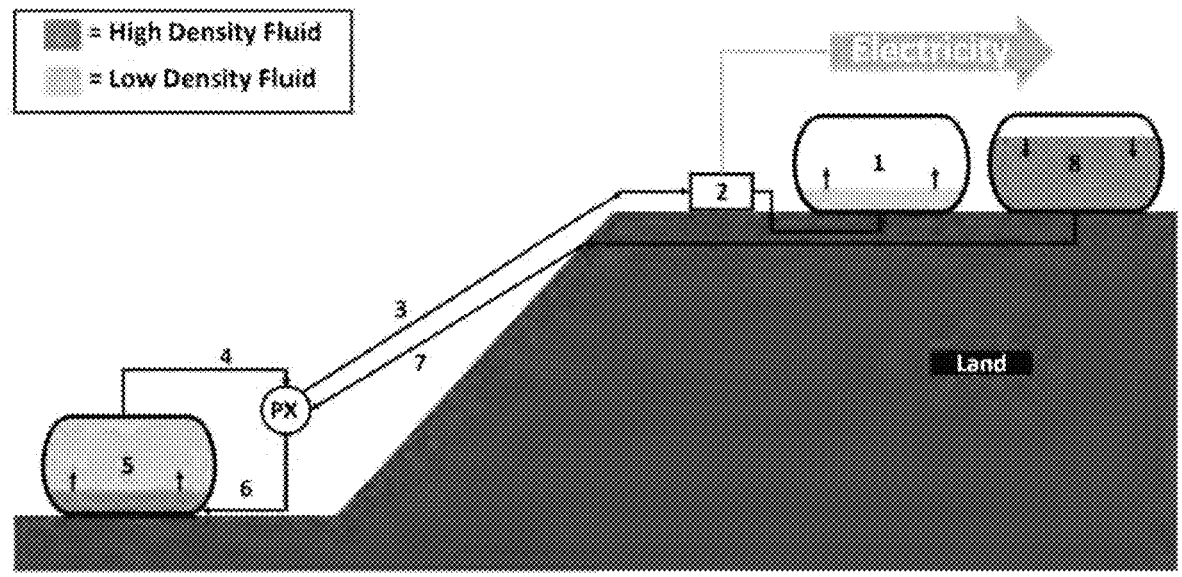
Figure 27 (Above)
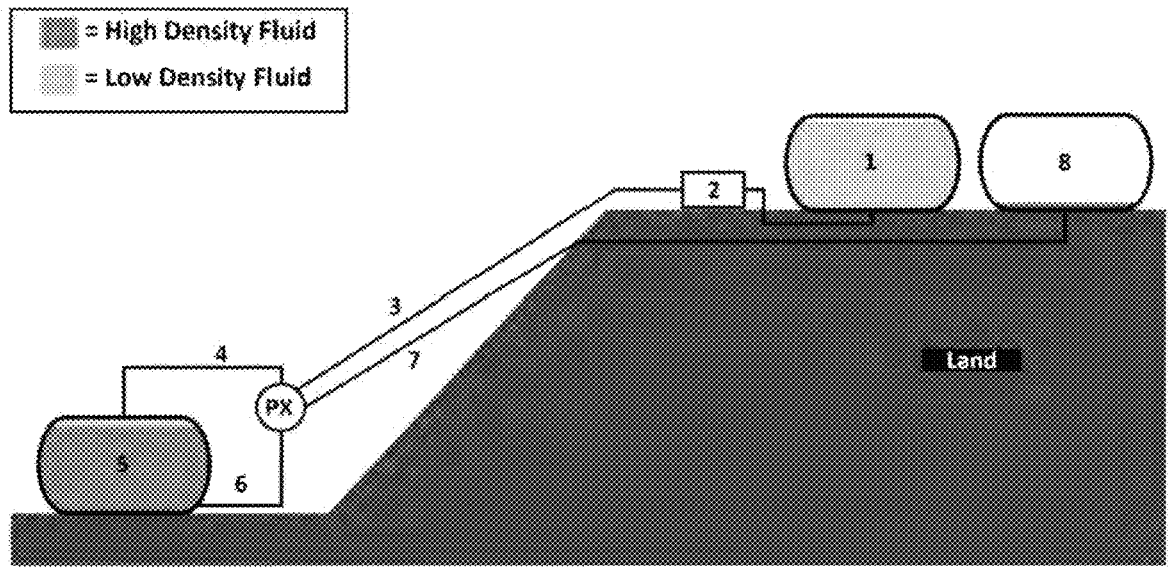
Figure 28 (Above)

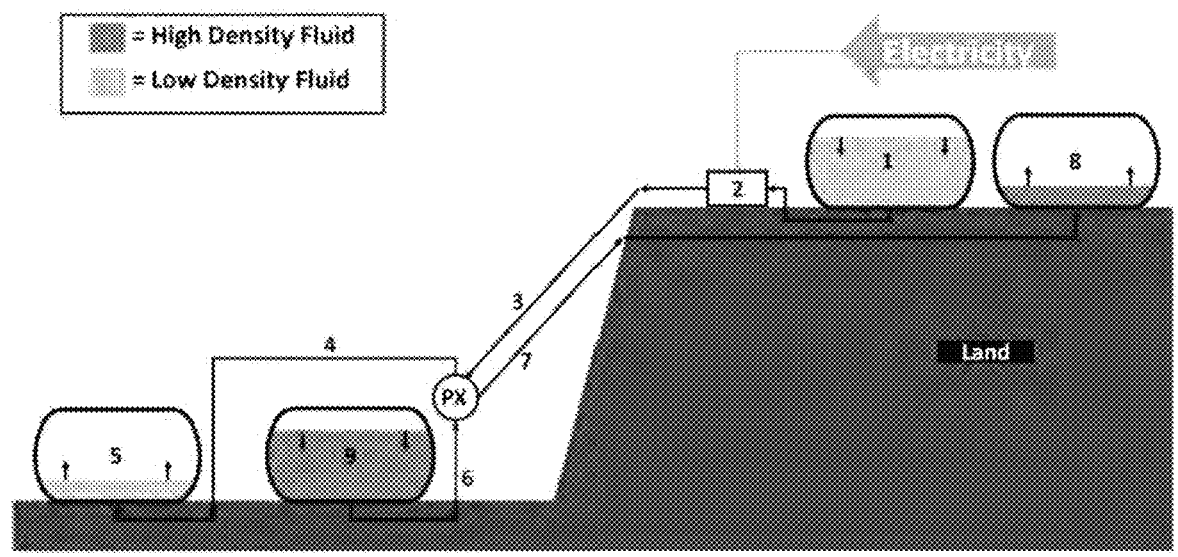
Figure 29 (Above)
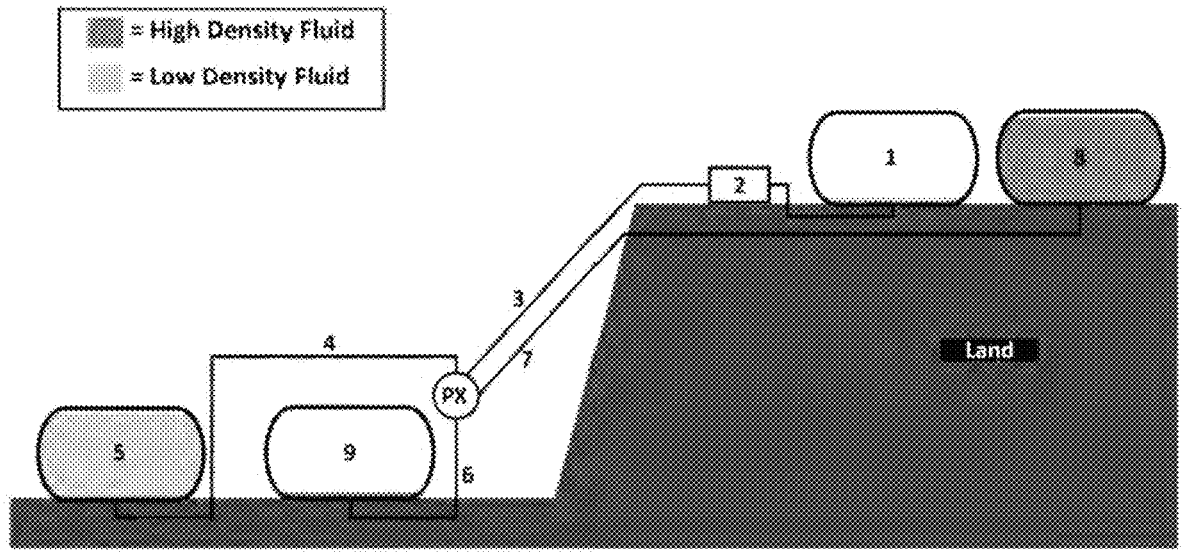
Figure 30 (Above)

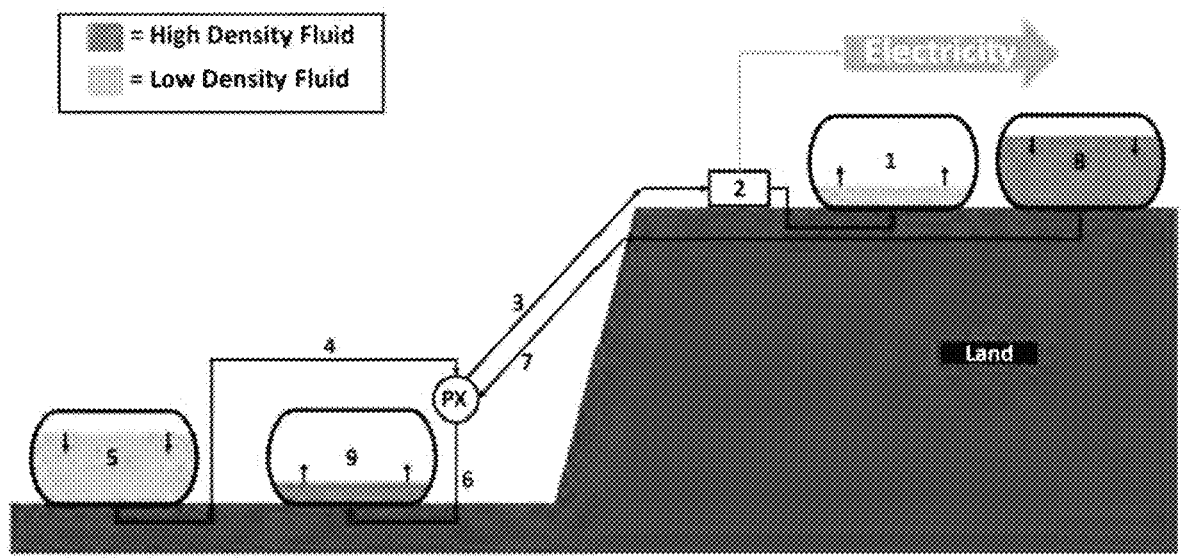
Figure 31 (Above)
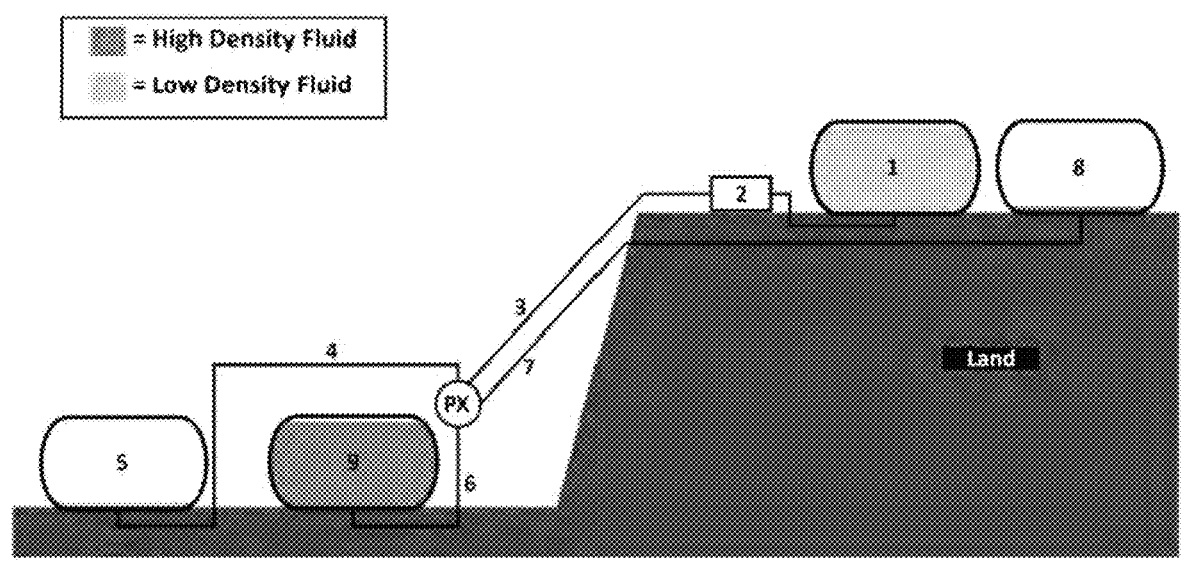
Figure 32 (Above)

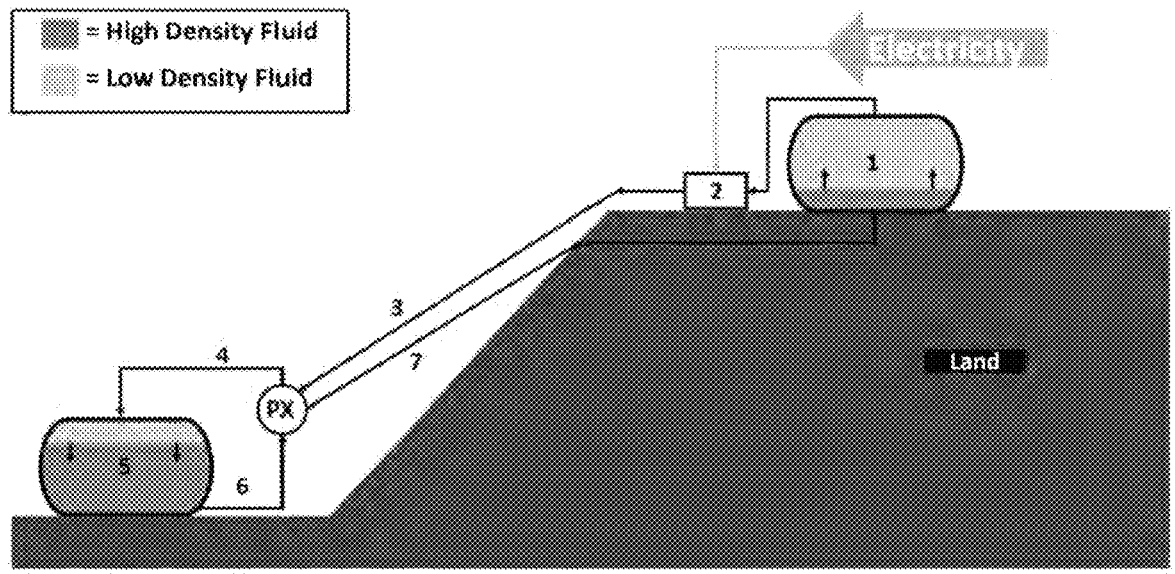
Figure 33 (Above)
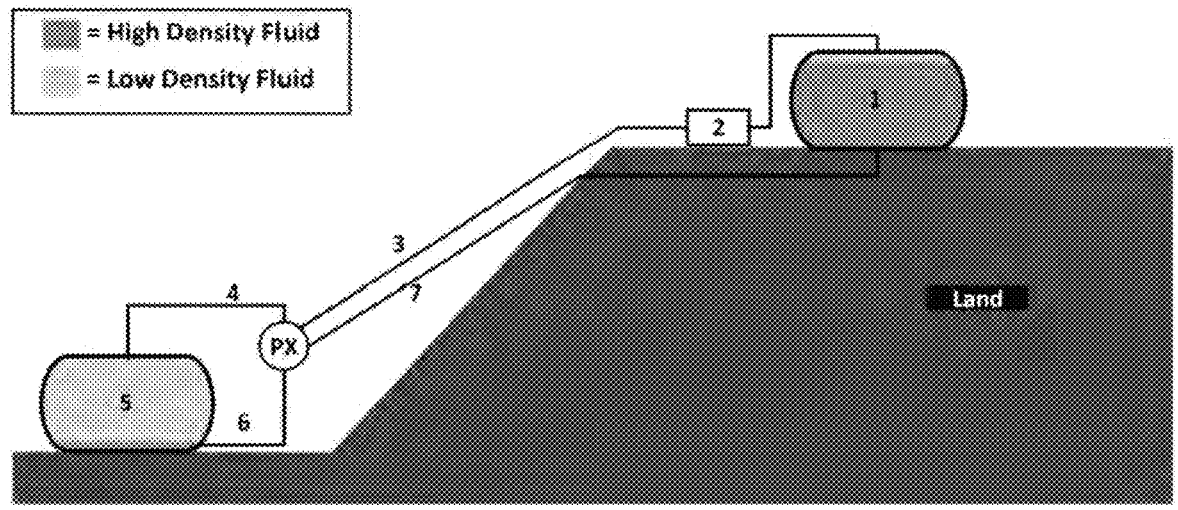
Figure 34 (Above)

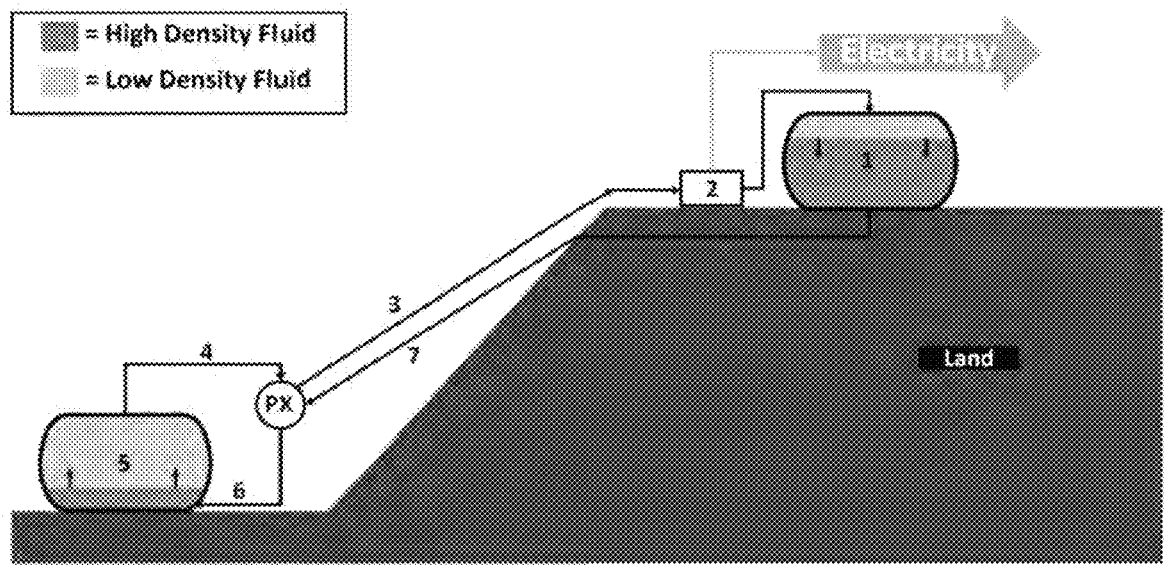
Figure 35 (Above)
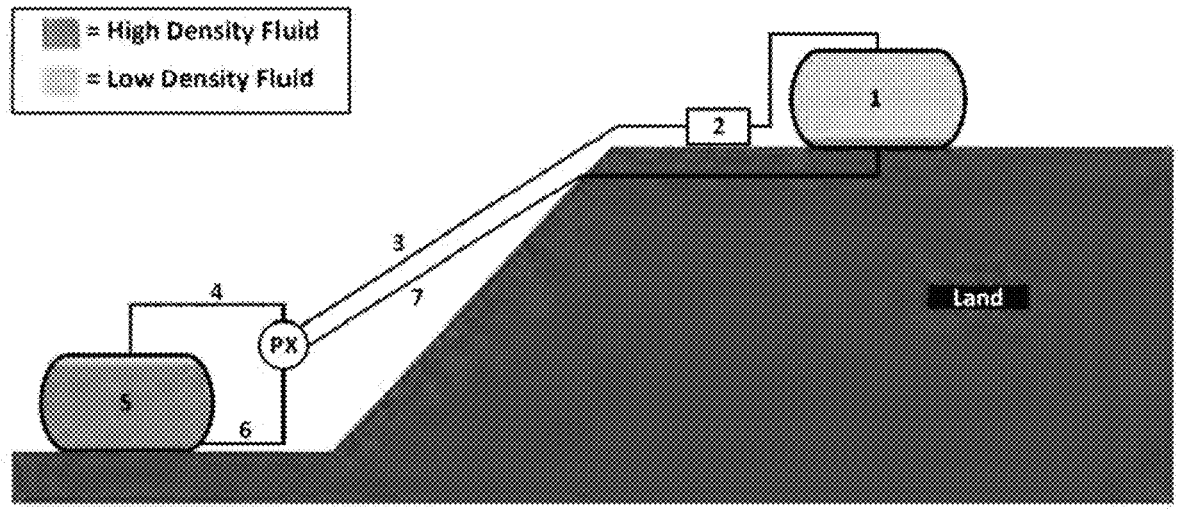
Figure 36 (Above)

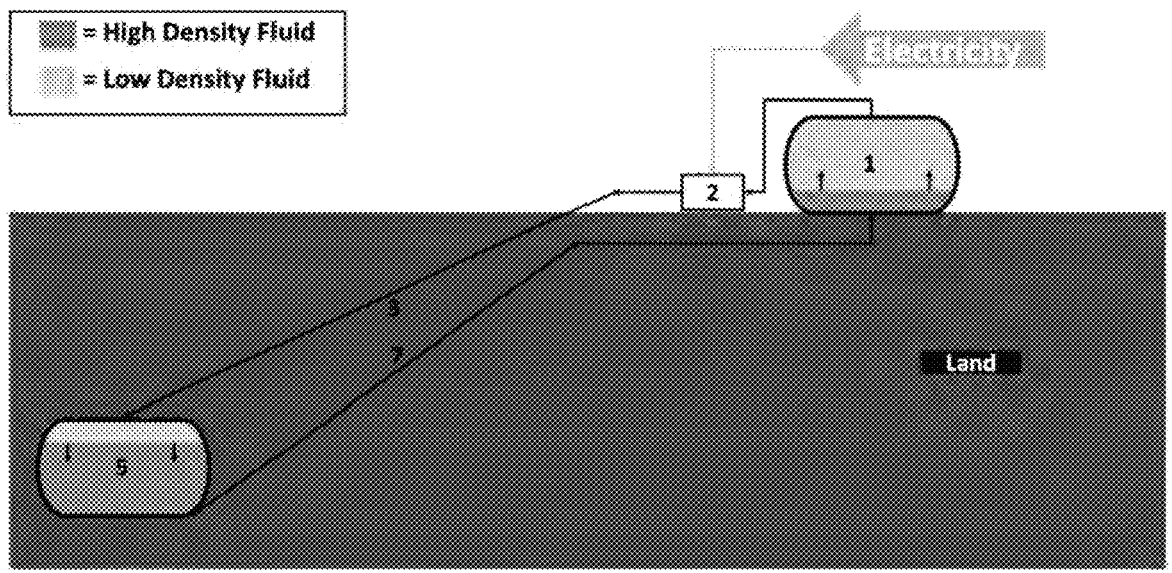
Figure 37 (Above)
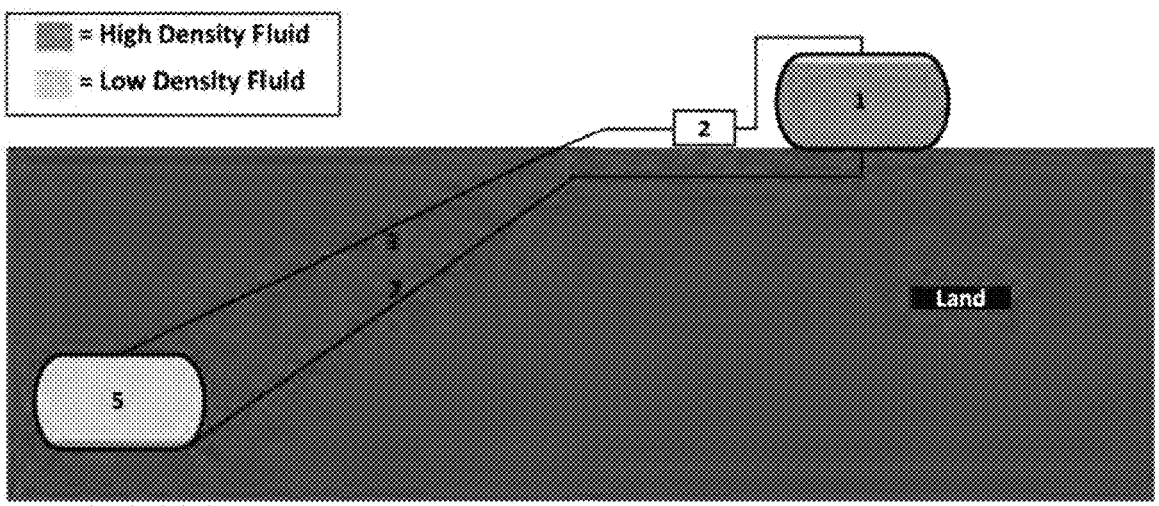
Figure 38 (Above)

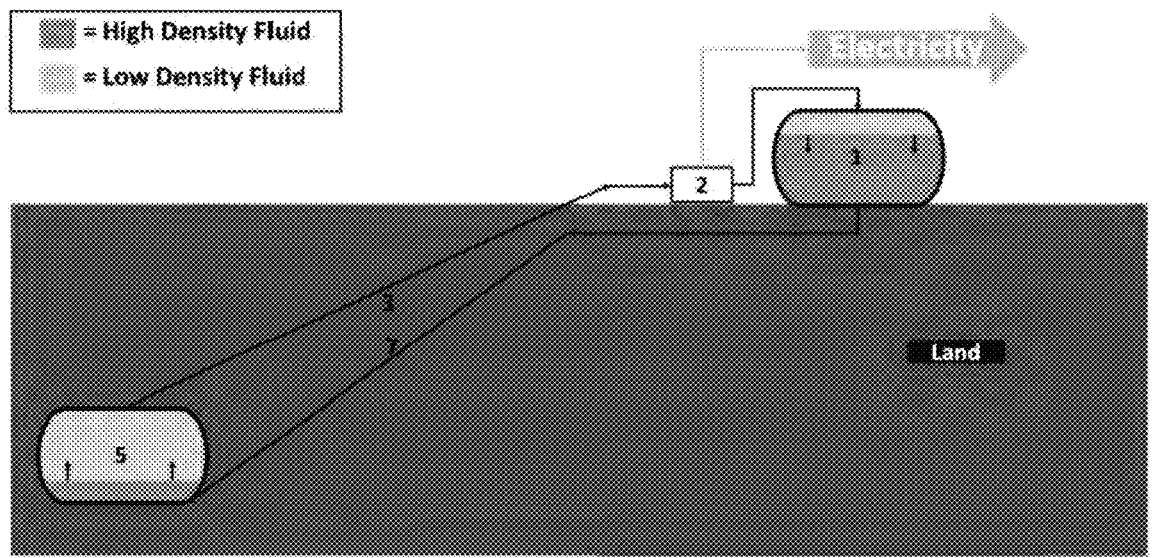
Figure 39 (Above)
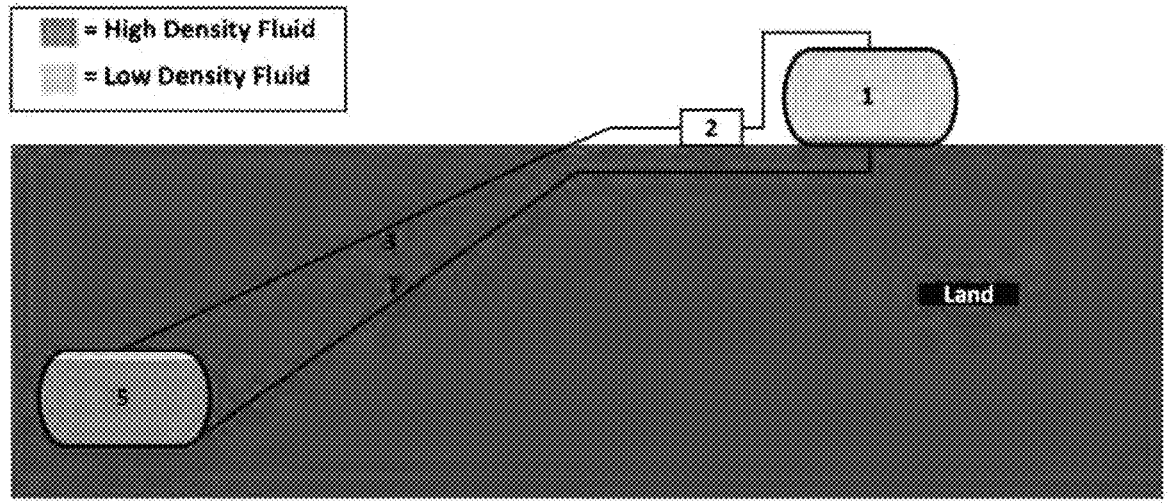
Figure 40 (Above)

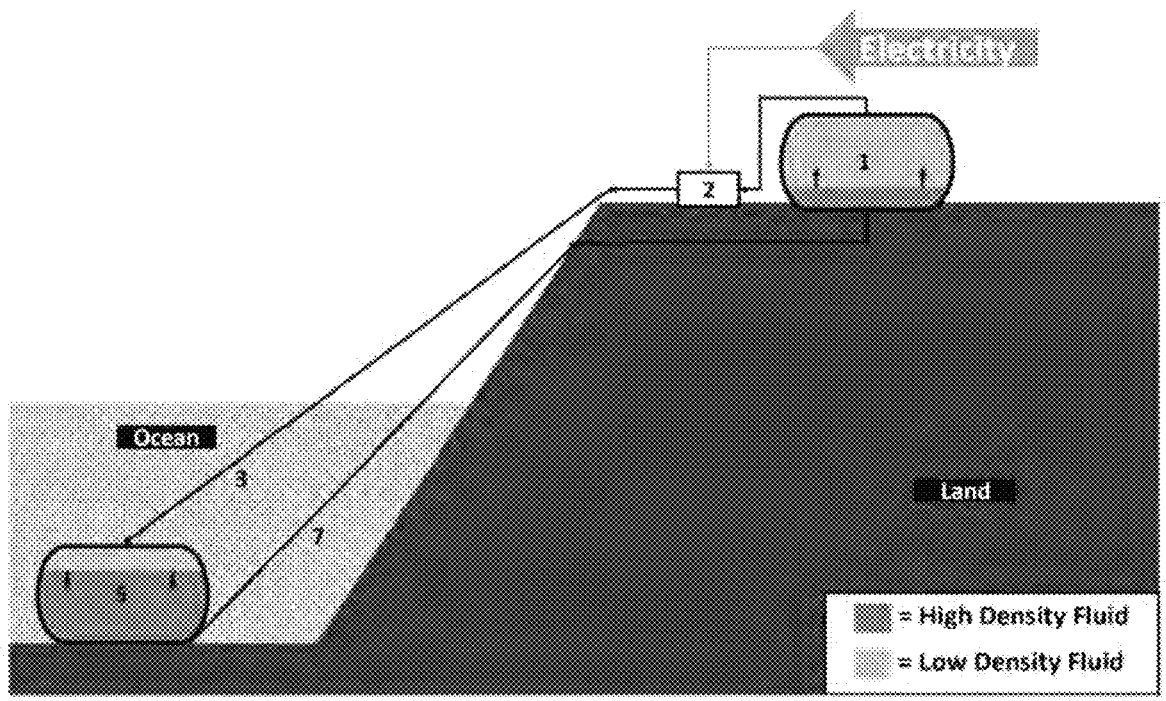
Figure 41 (Above)
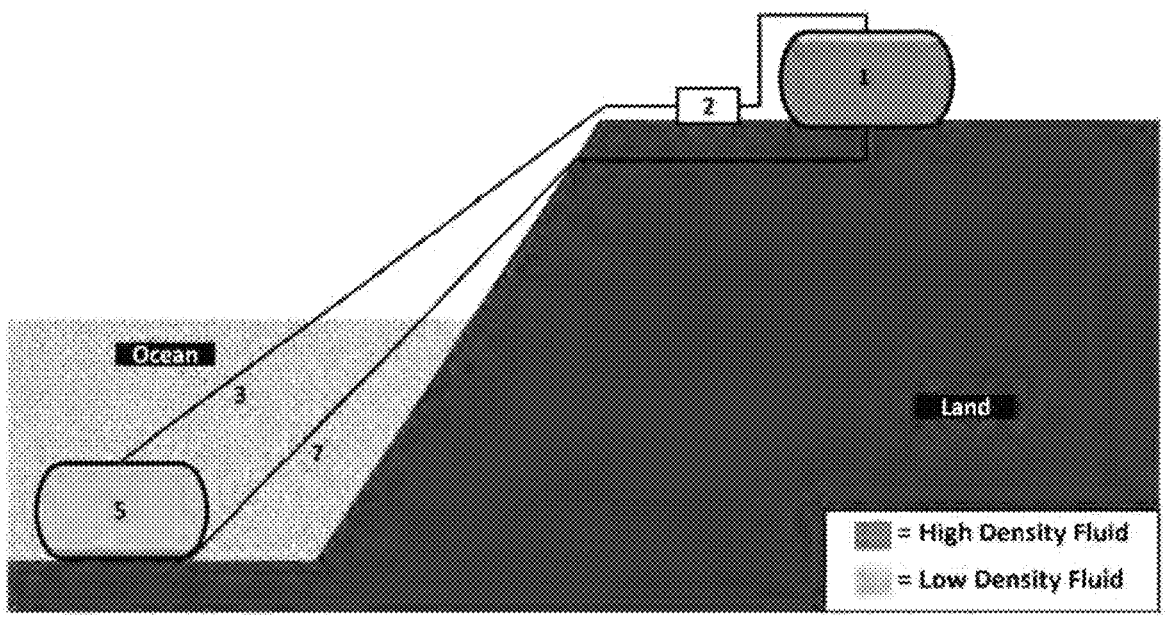
Figure 42 (Above)

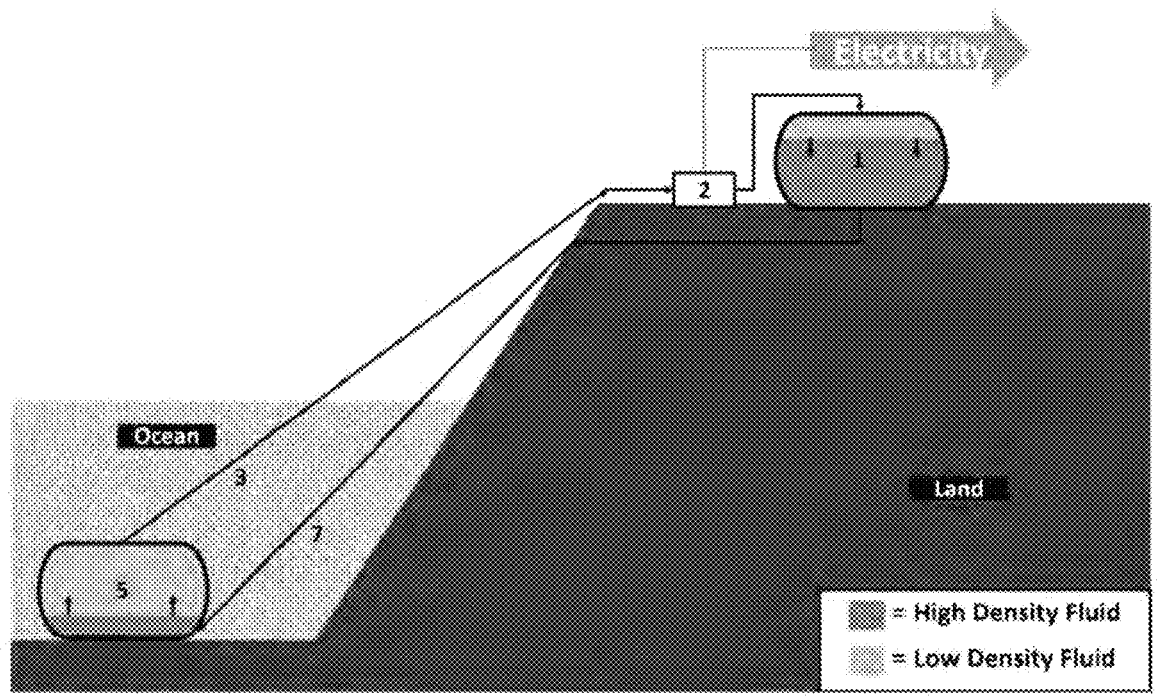
Figure 43 (Above)
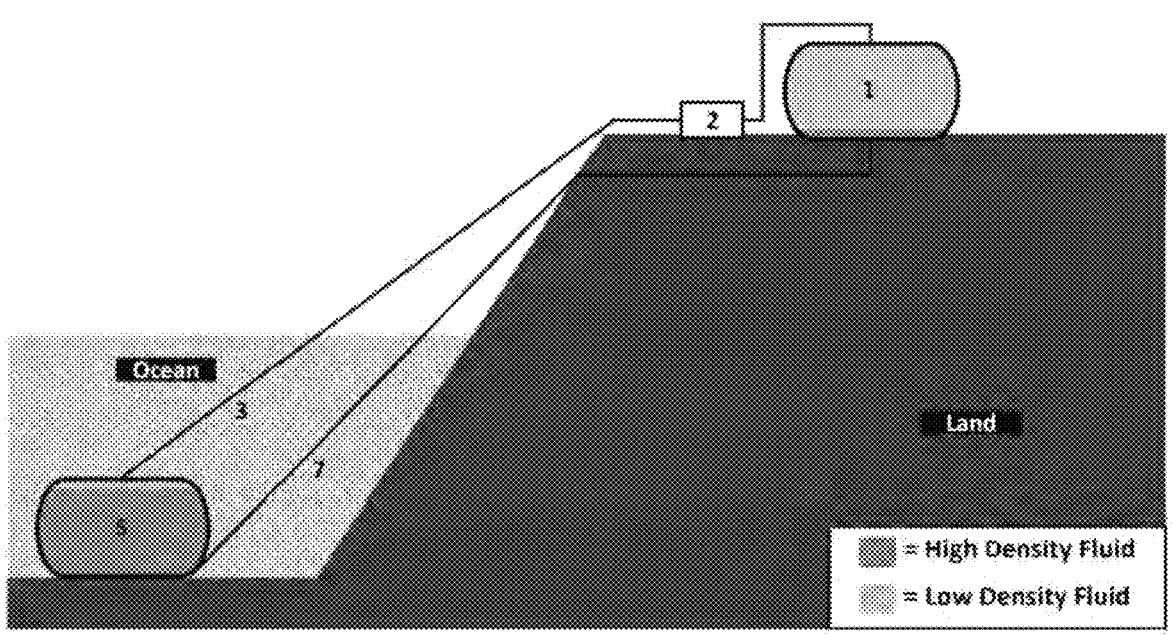
Figure 44 (Above)

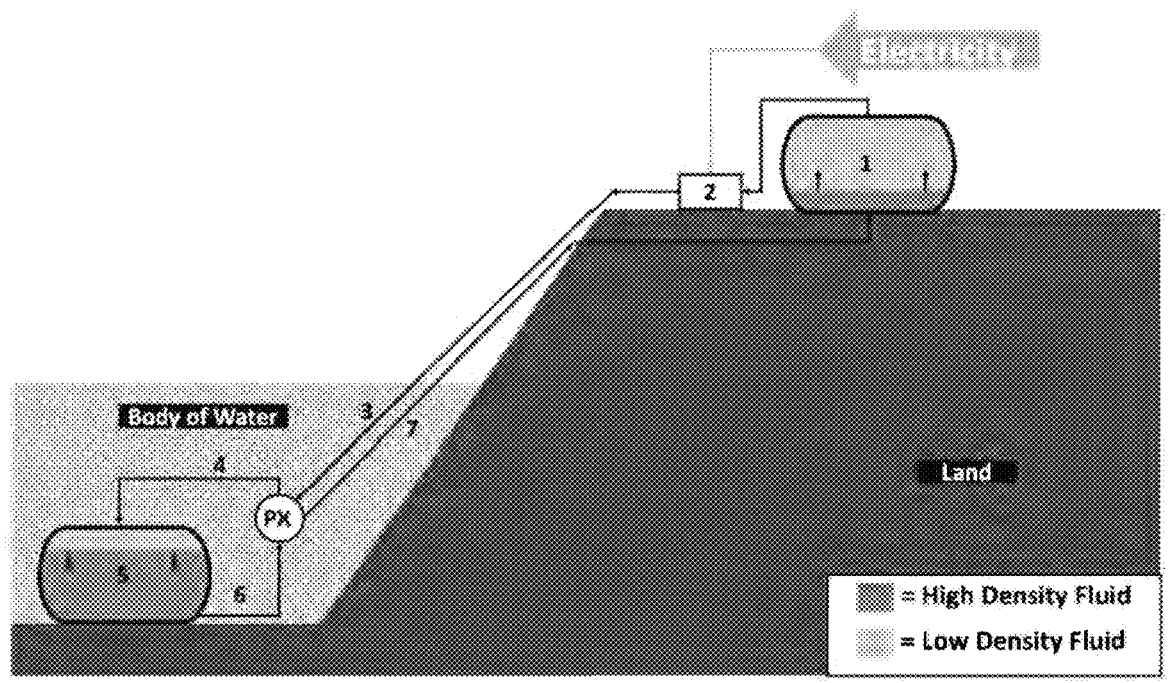
Figure 45 (Above)
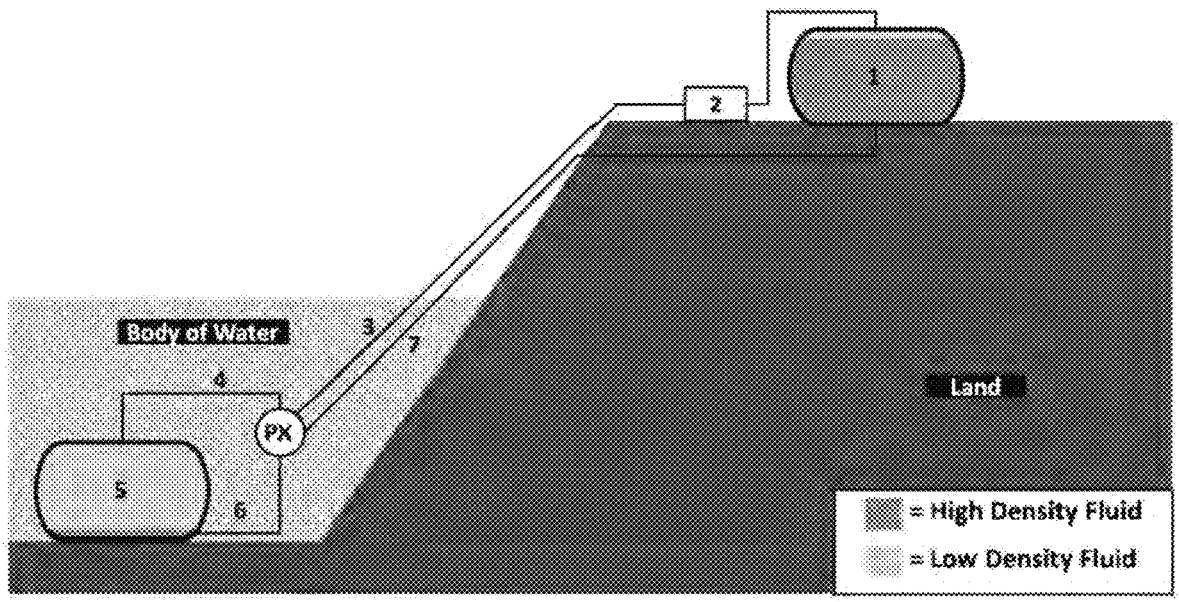
Figure 46 (Above)

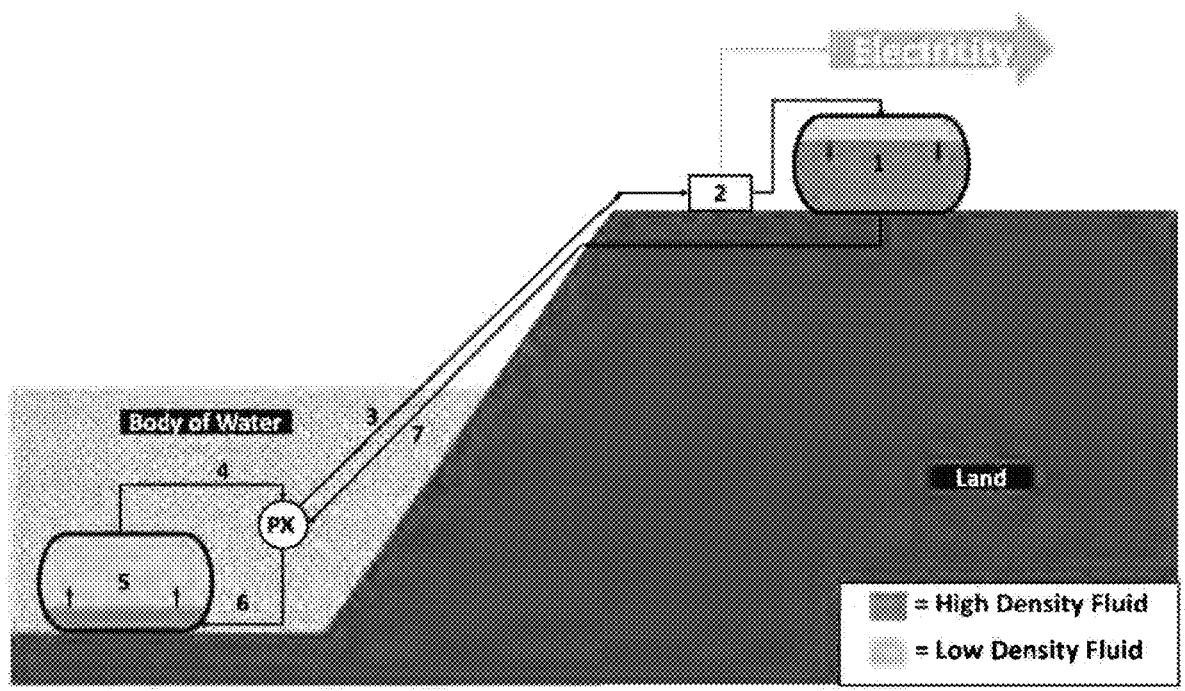
Figure 47 (Above)
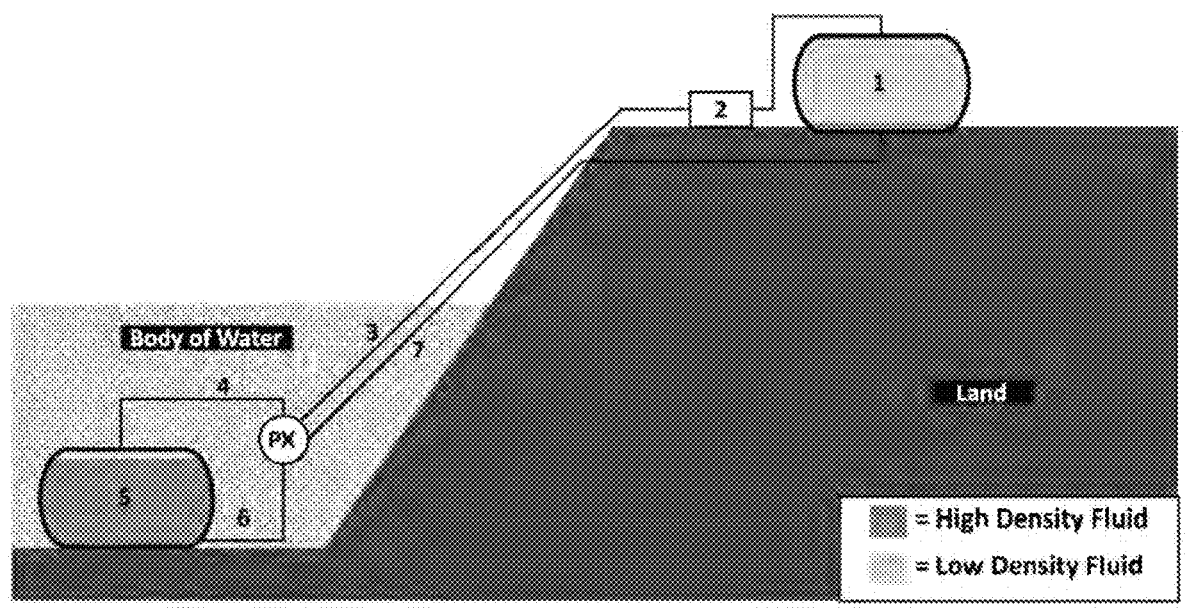
Figure 48 (Above)

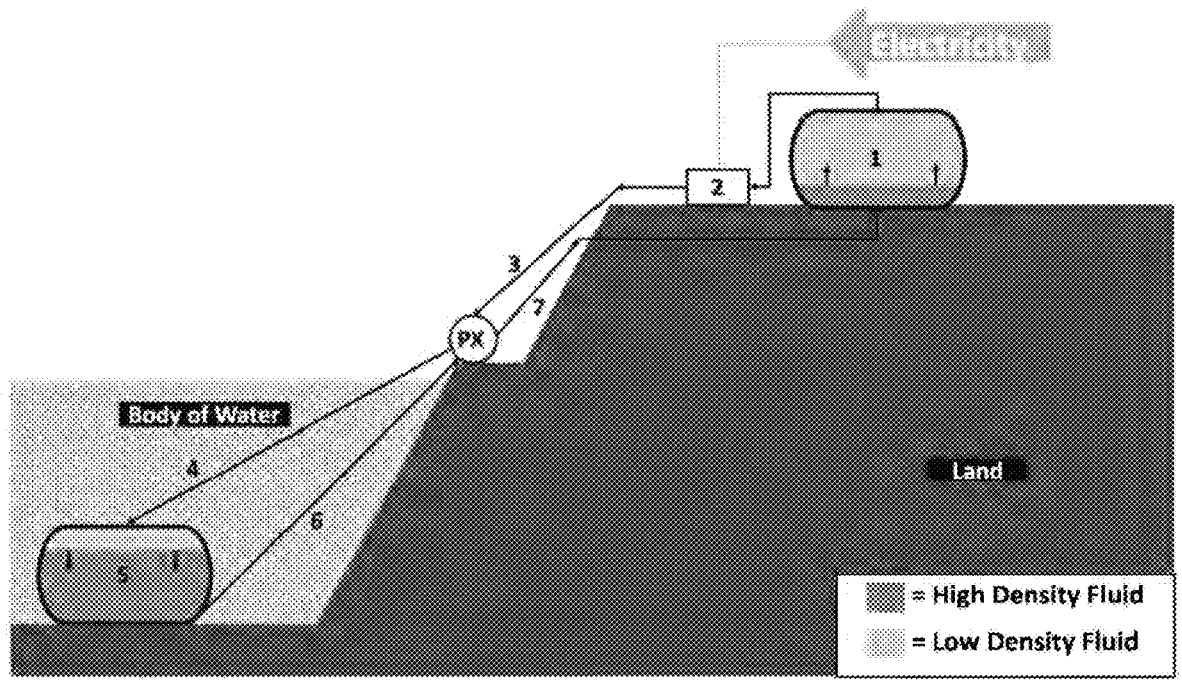
Figure 49 (Above)
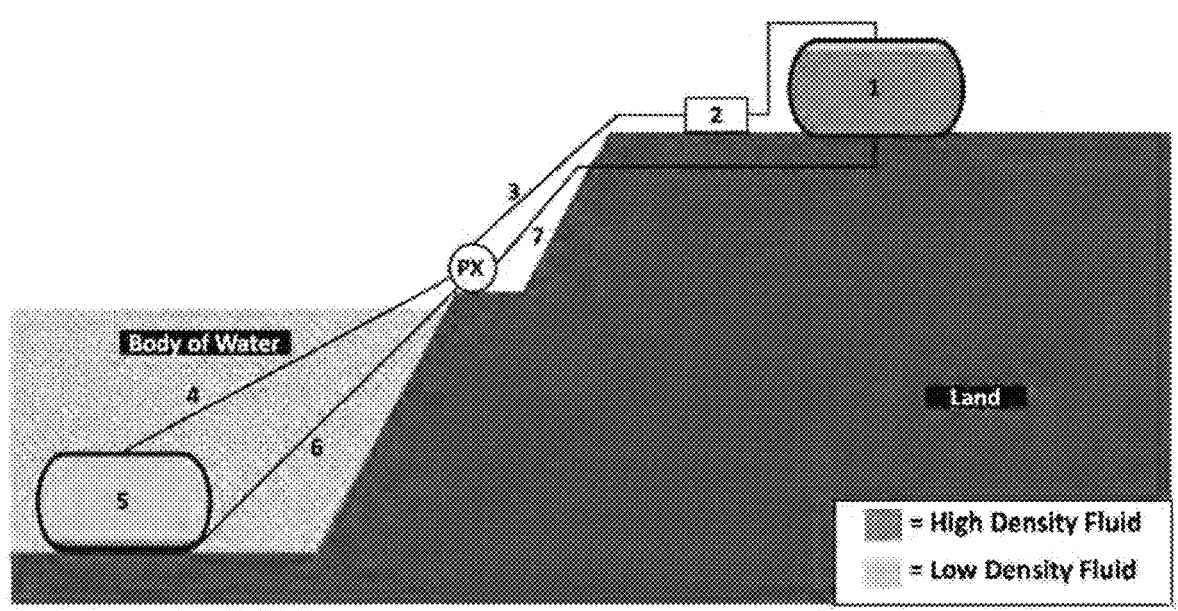
Figure 50 (Above)

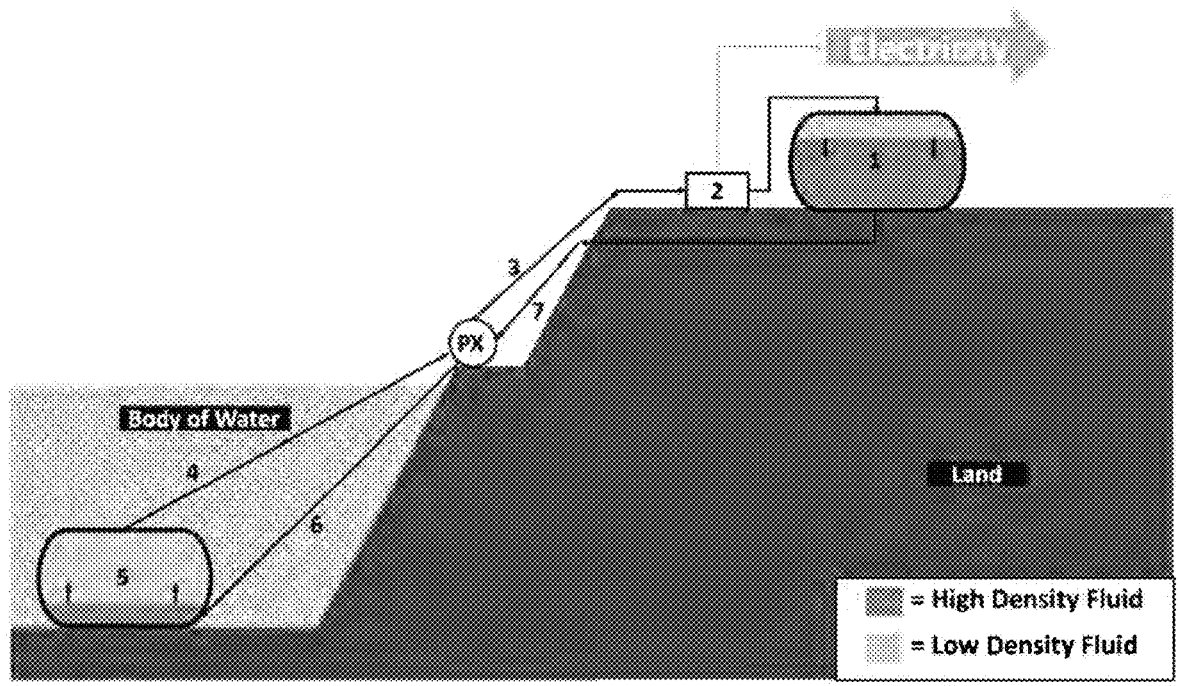
Figure 51 (Above)
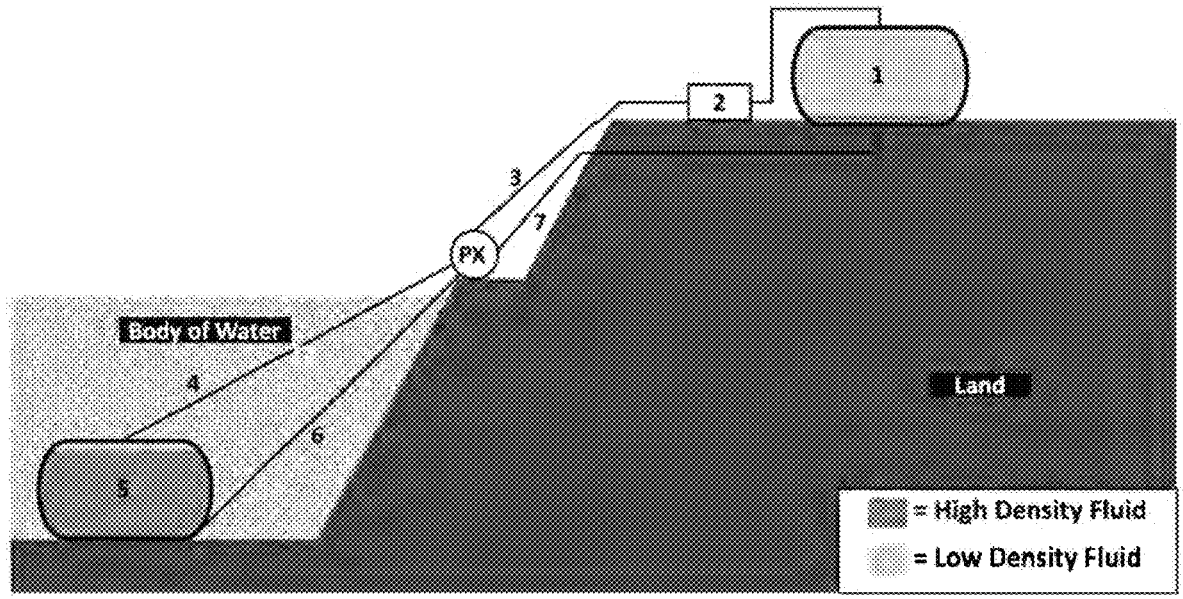
Figure 52 (Above)

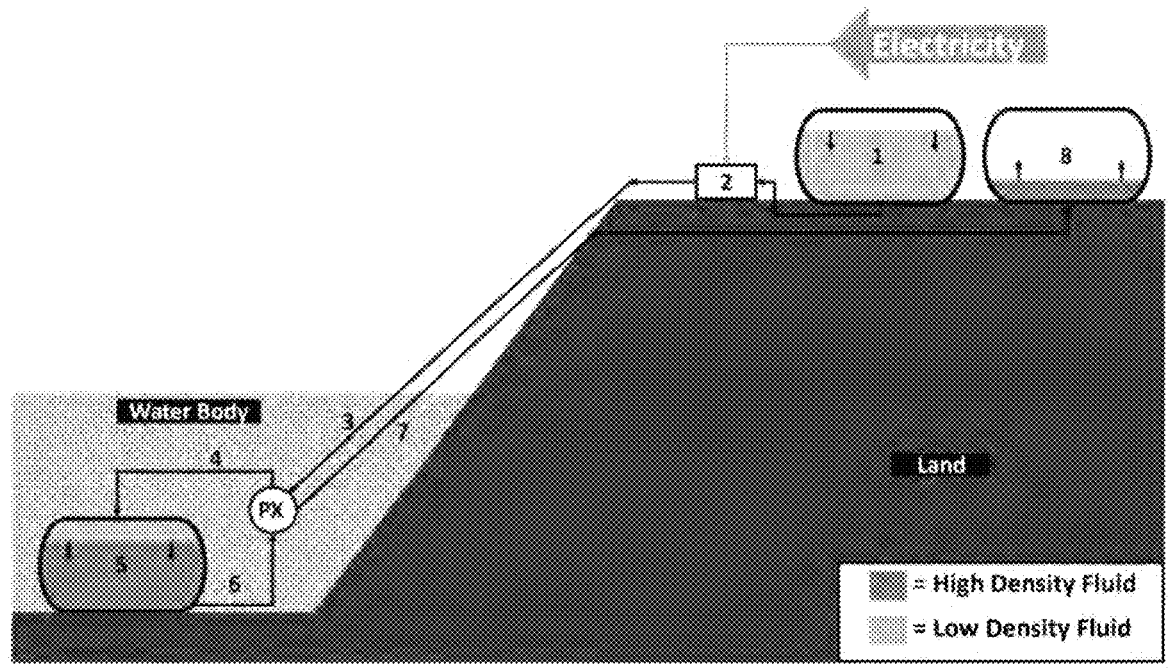
Figure 53 (Above)
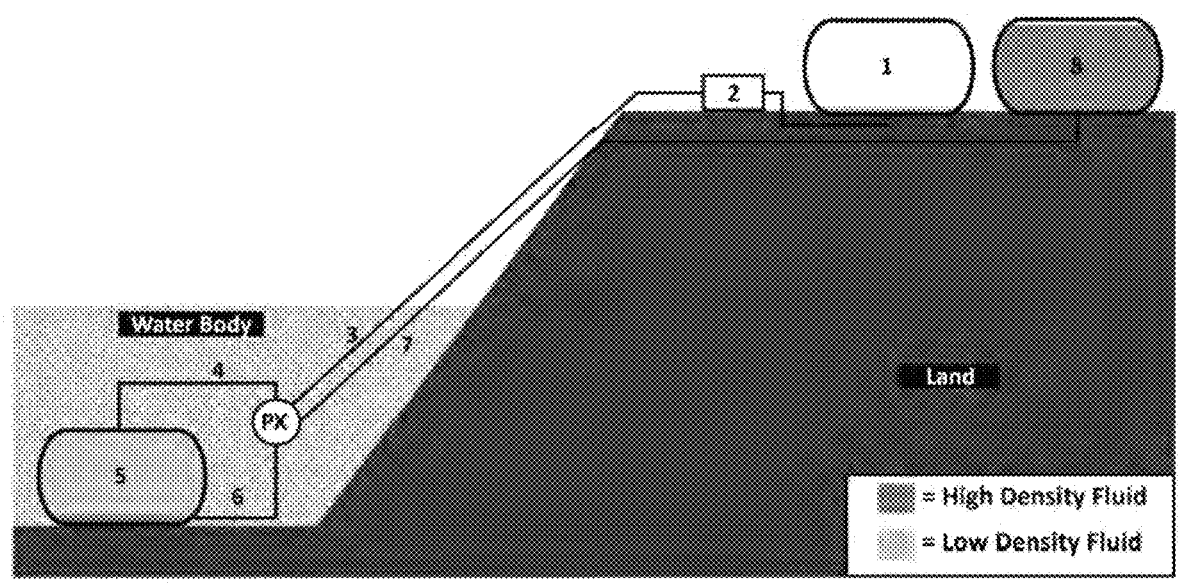
Figure 54 (Above)

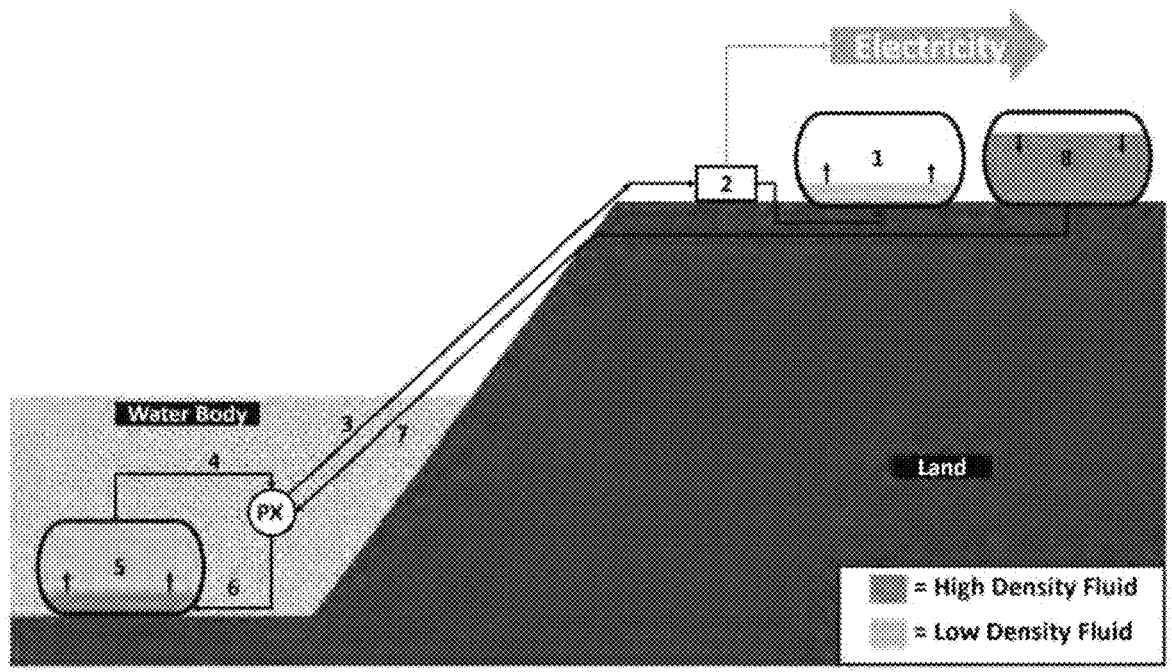
Figure 55 (Above)
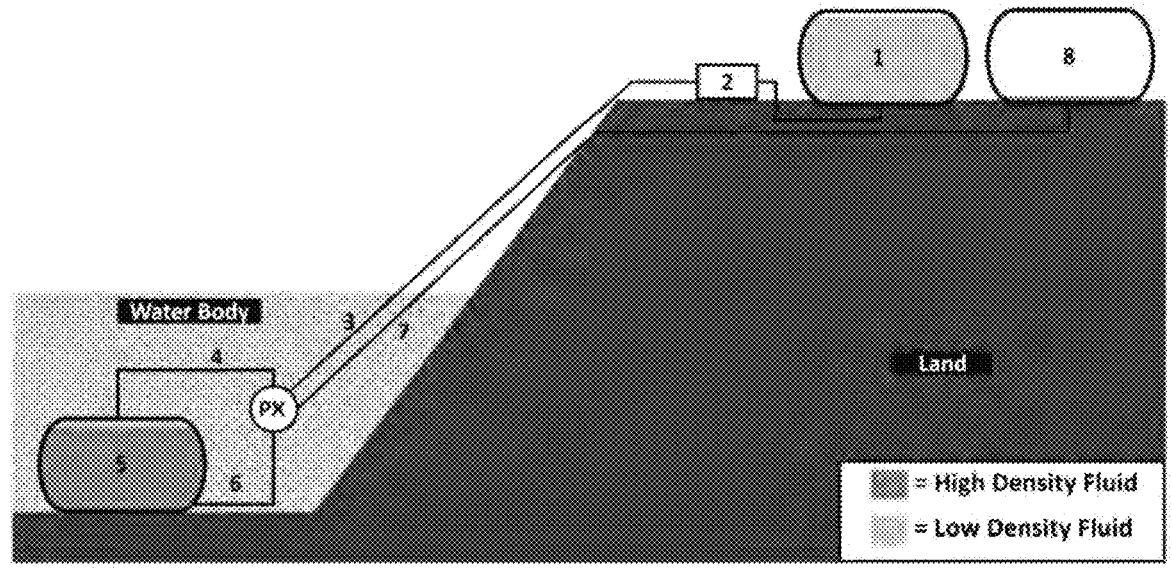
Figure 56 (Above)

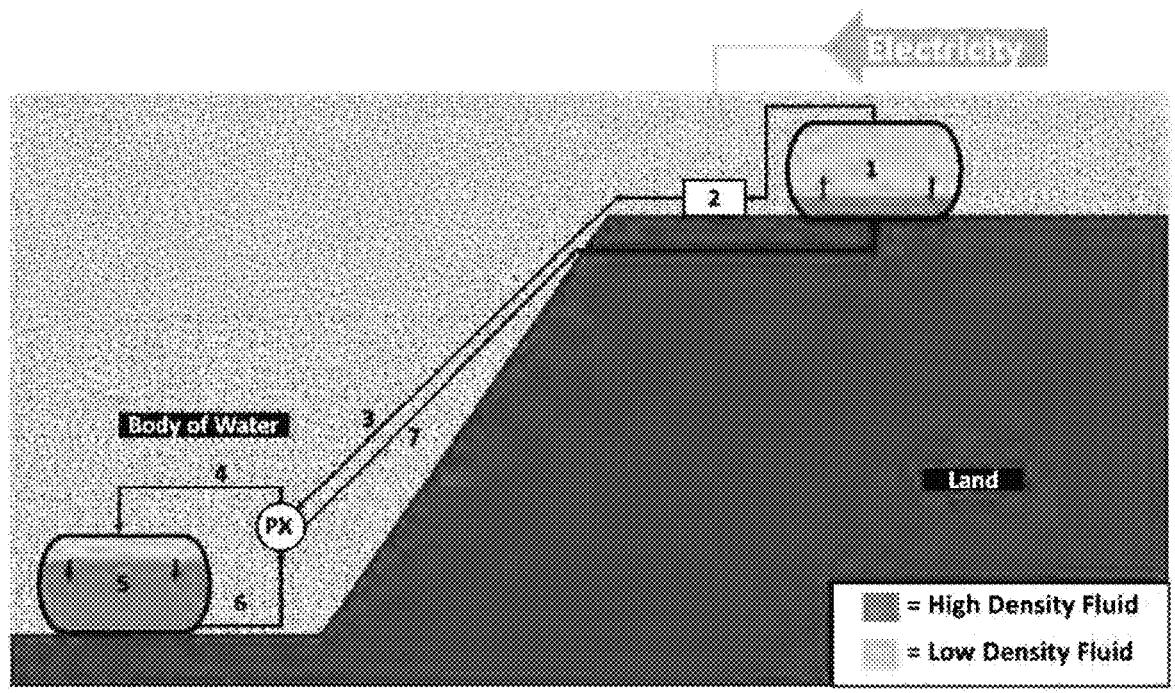
Figure 57 (Above)
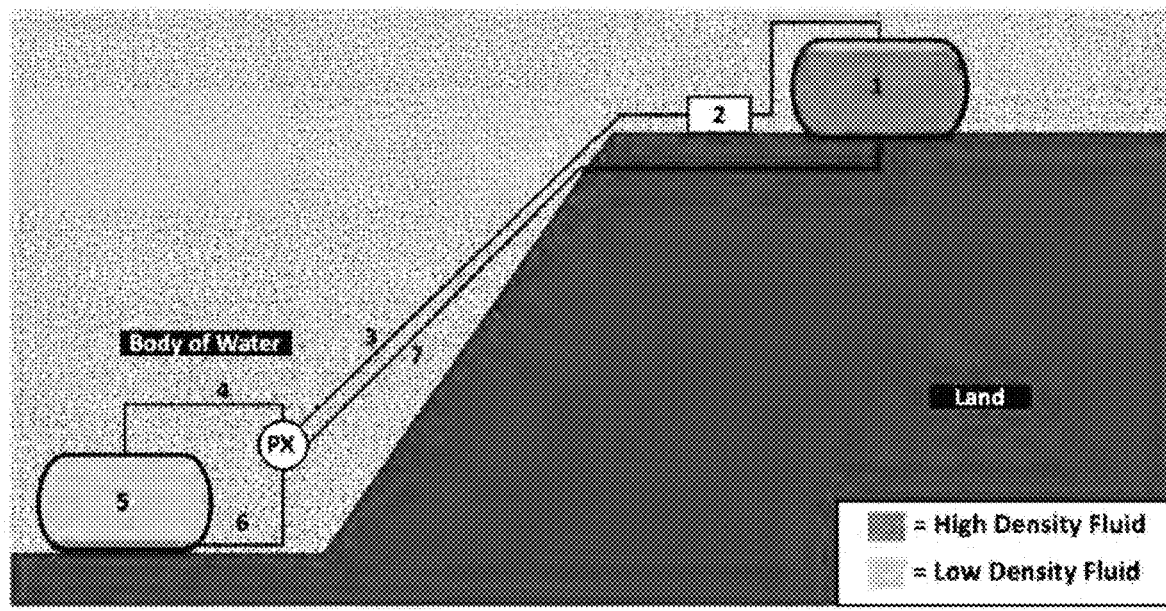
Figure 58 (Above)

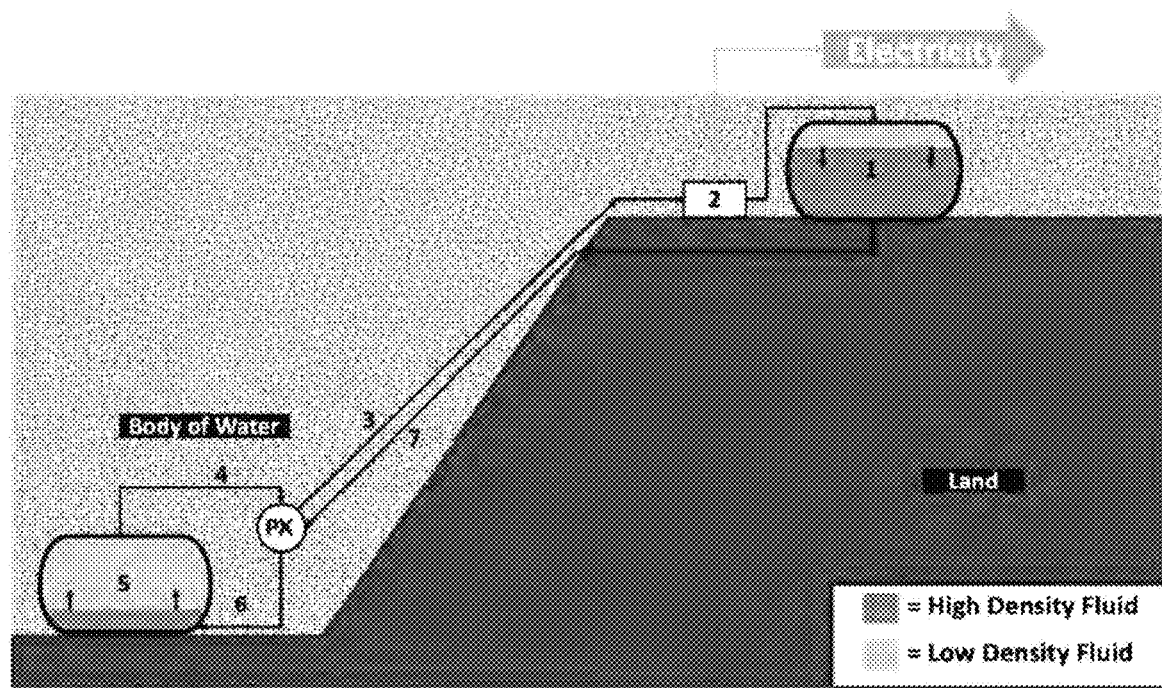
Figure 59 (Above)
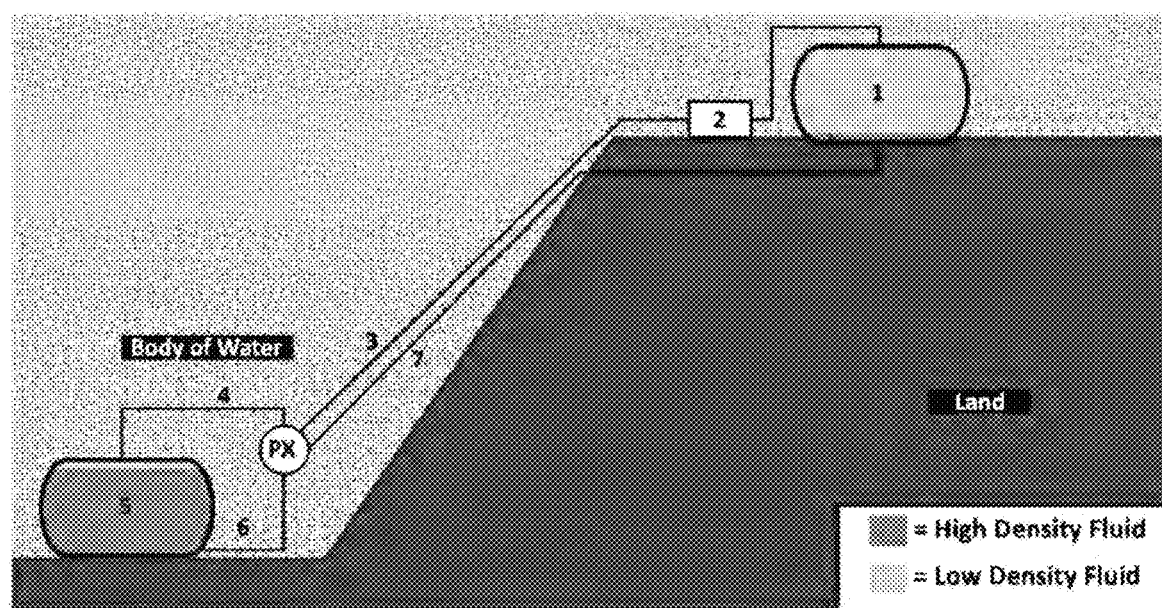
Figure 60 (Above)

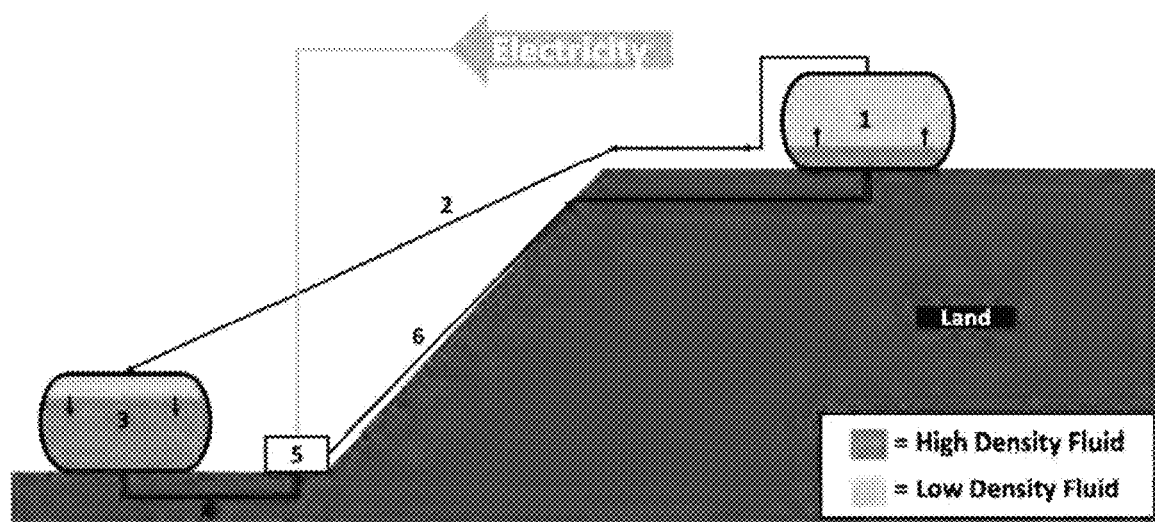
Figure 61 (Above)
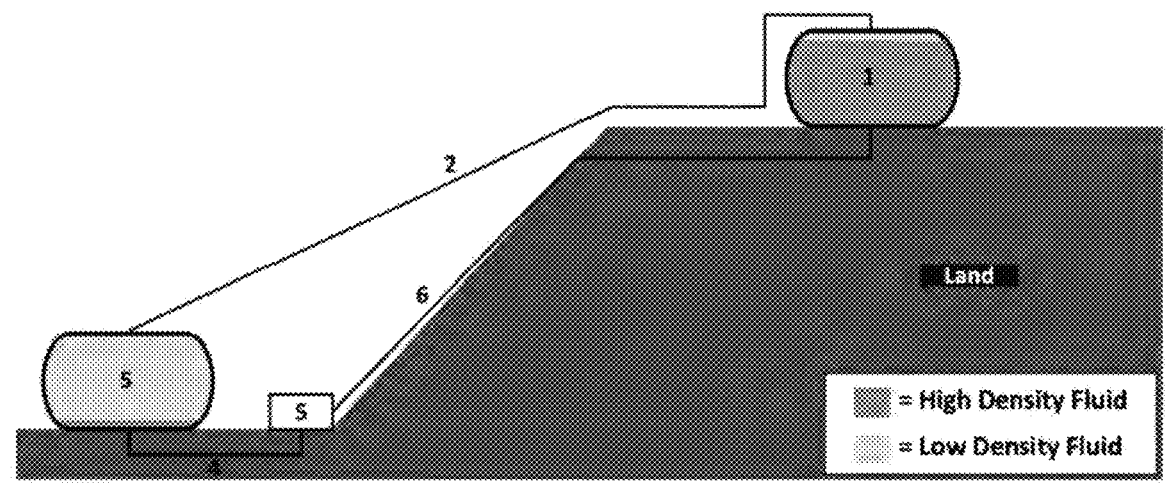
Figure 62 (Above)

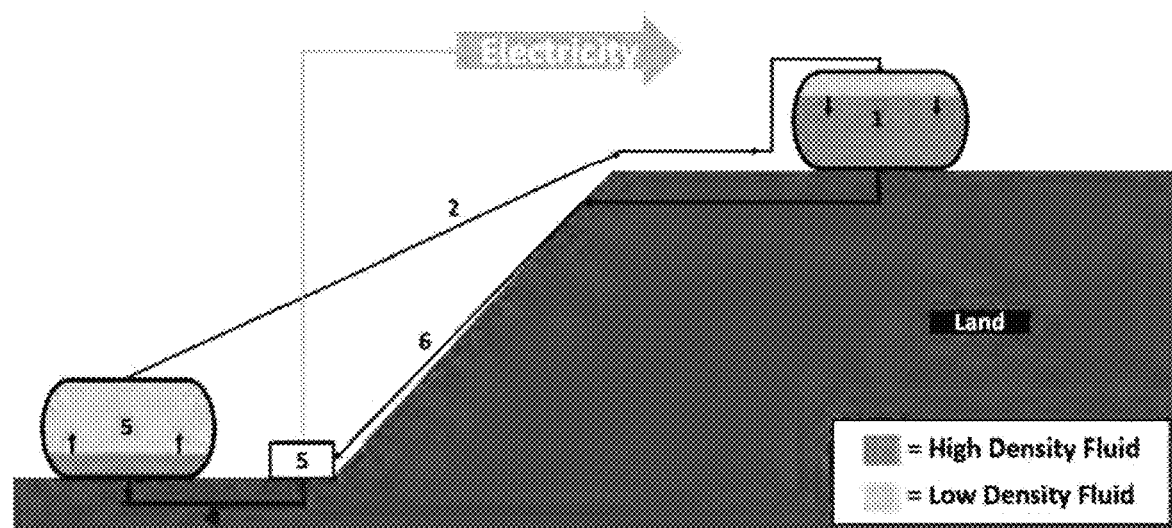
Figure 63 (Above)
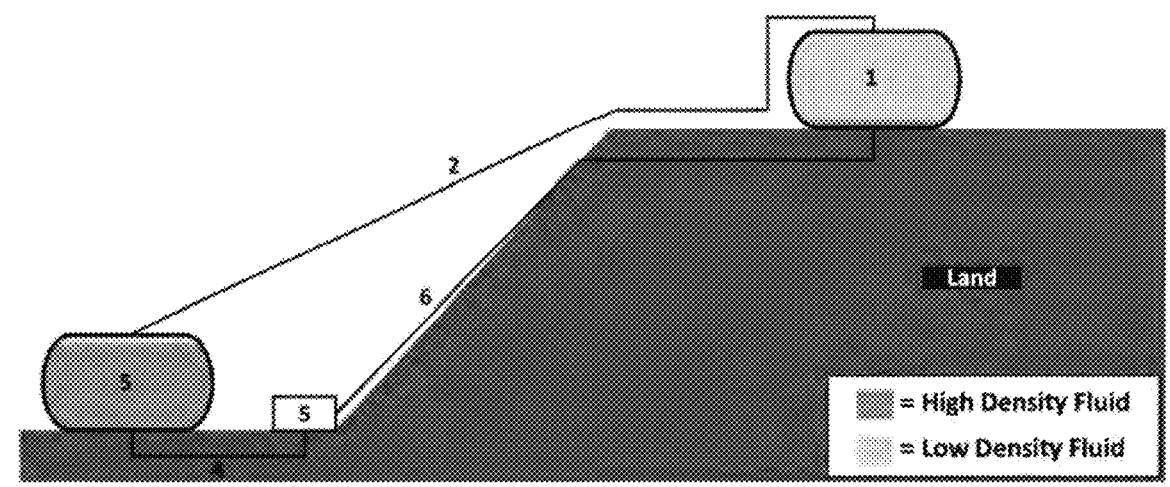
Figure 64 (Above)

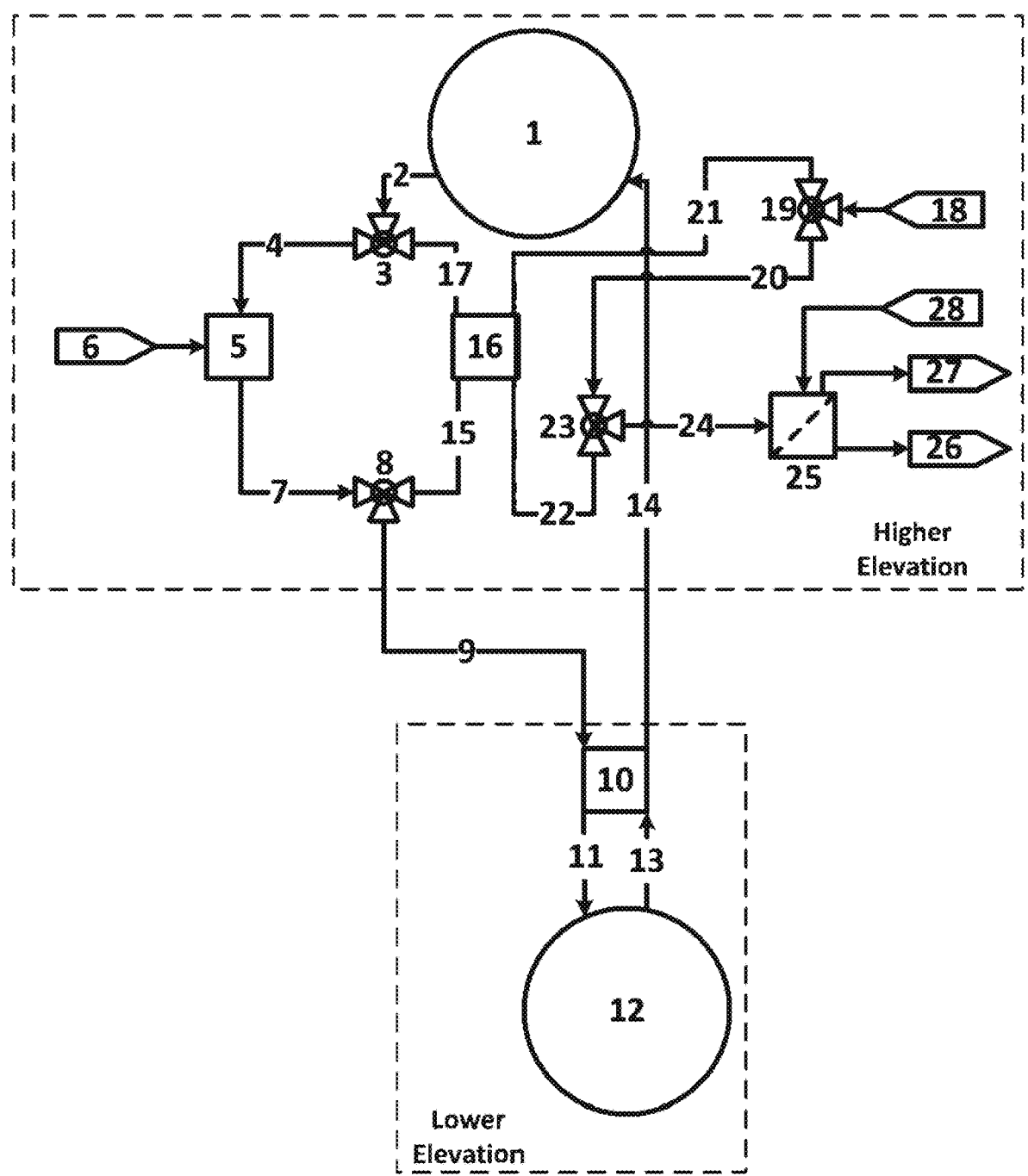
Figure 65 (Above)

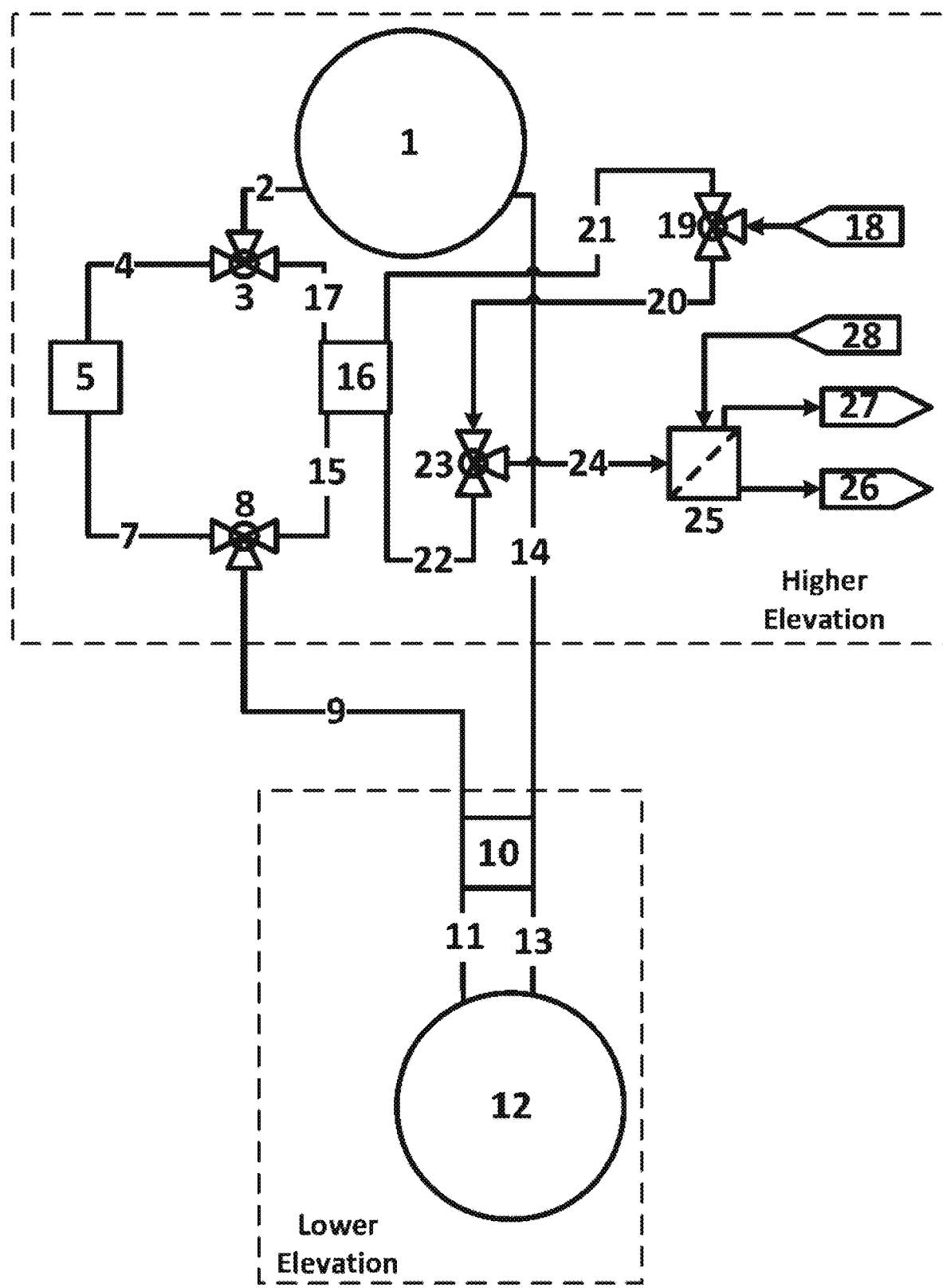
Figure 66 (Above)

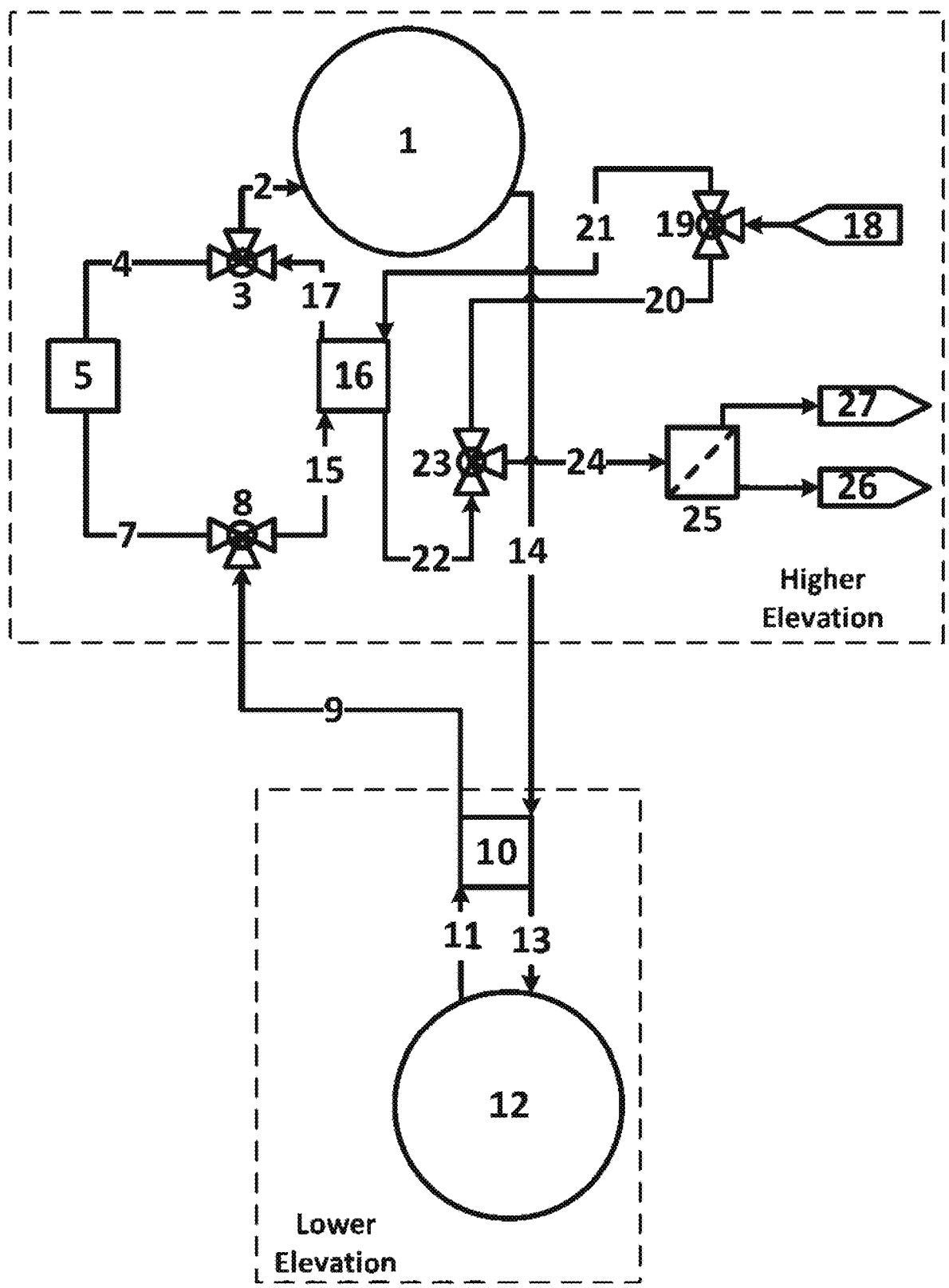
Figure 67 (Above)

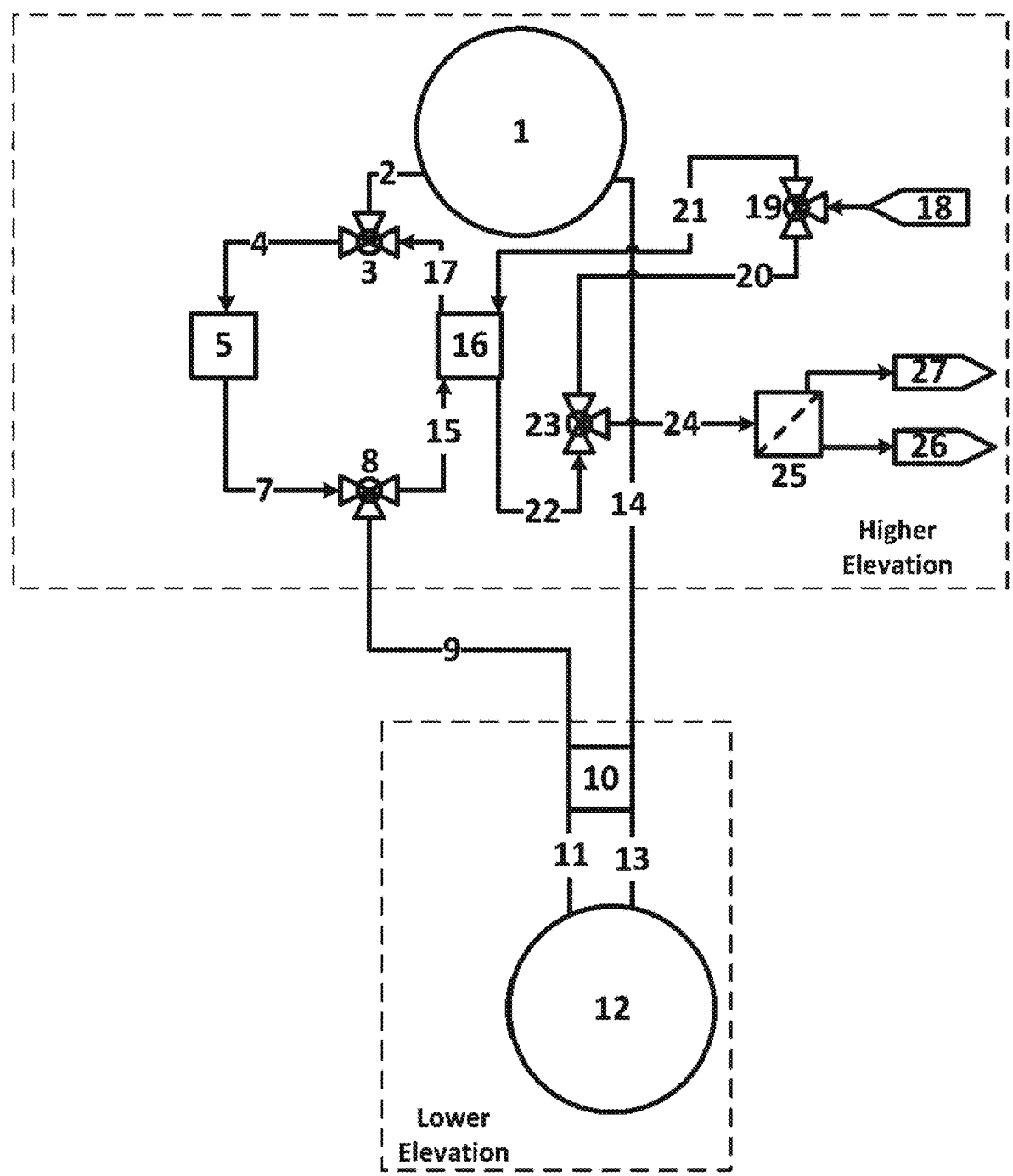
Figure 68 (Above)

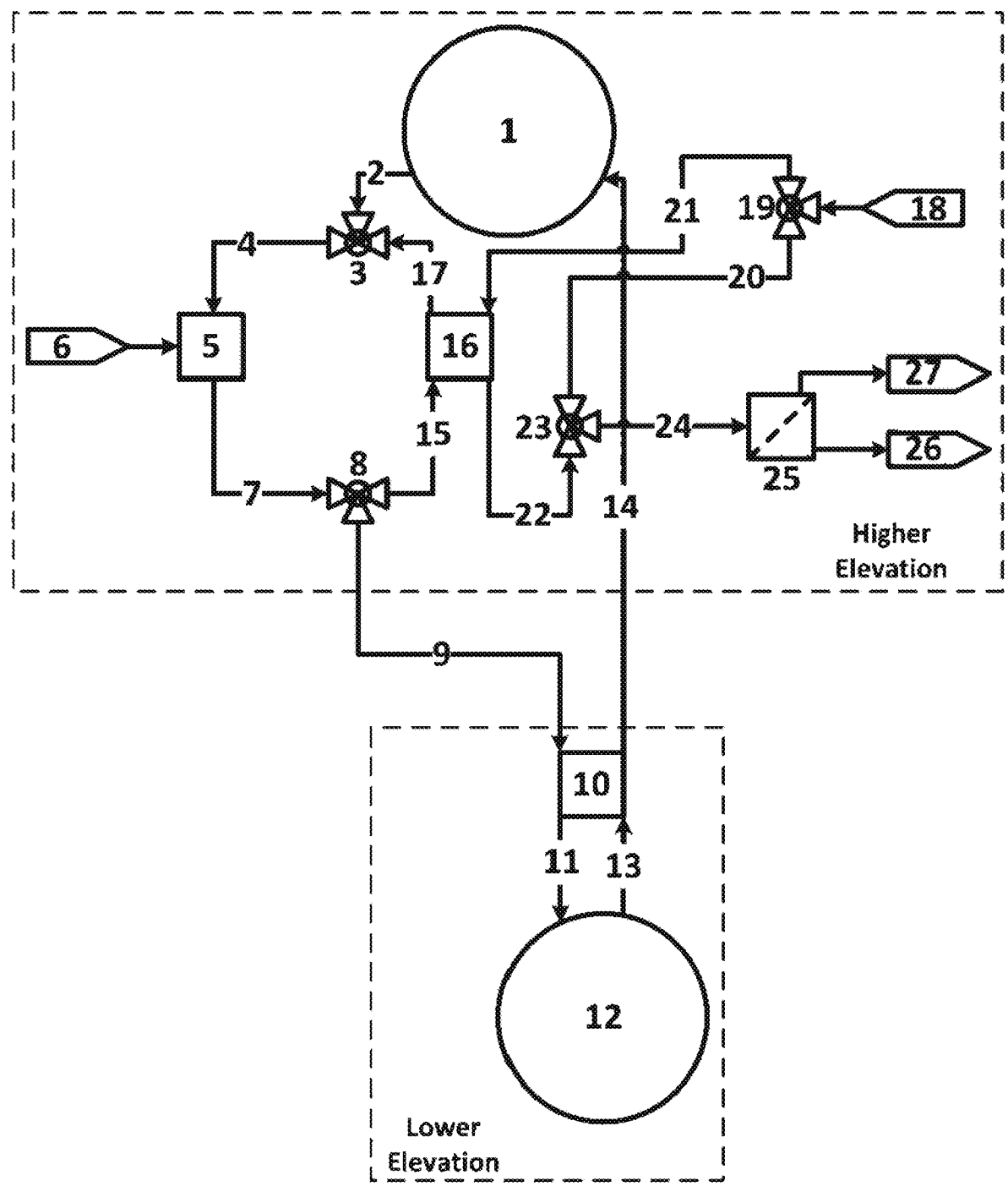
Figure 69 (Above)

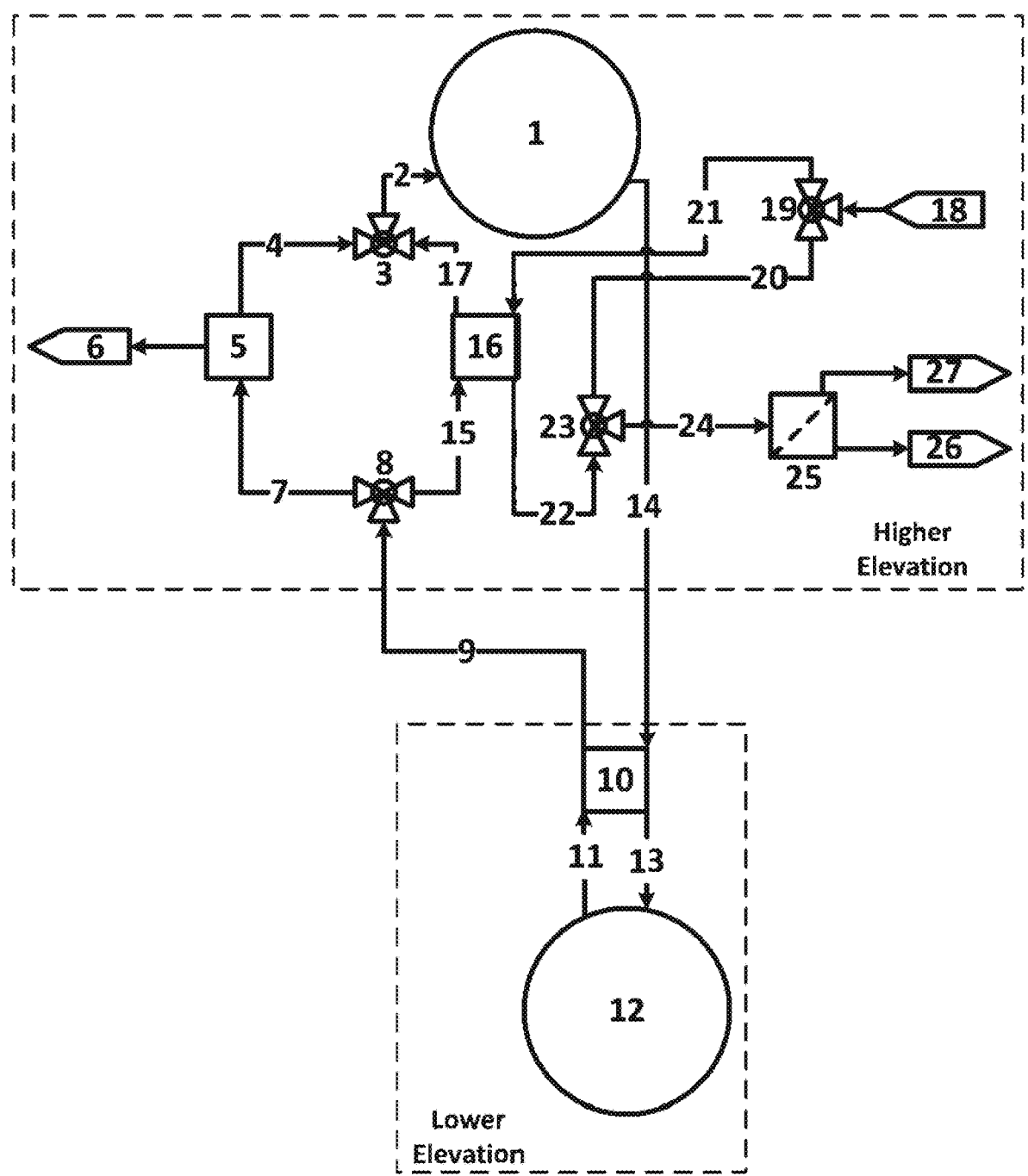
Figure 70 (Above)

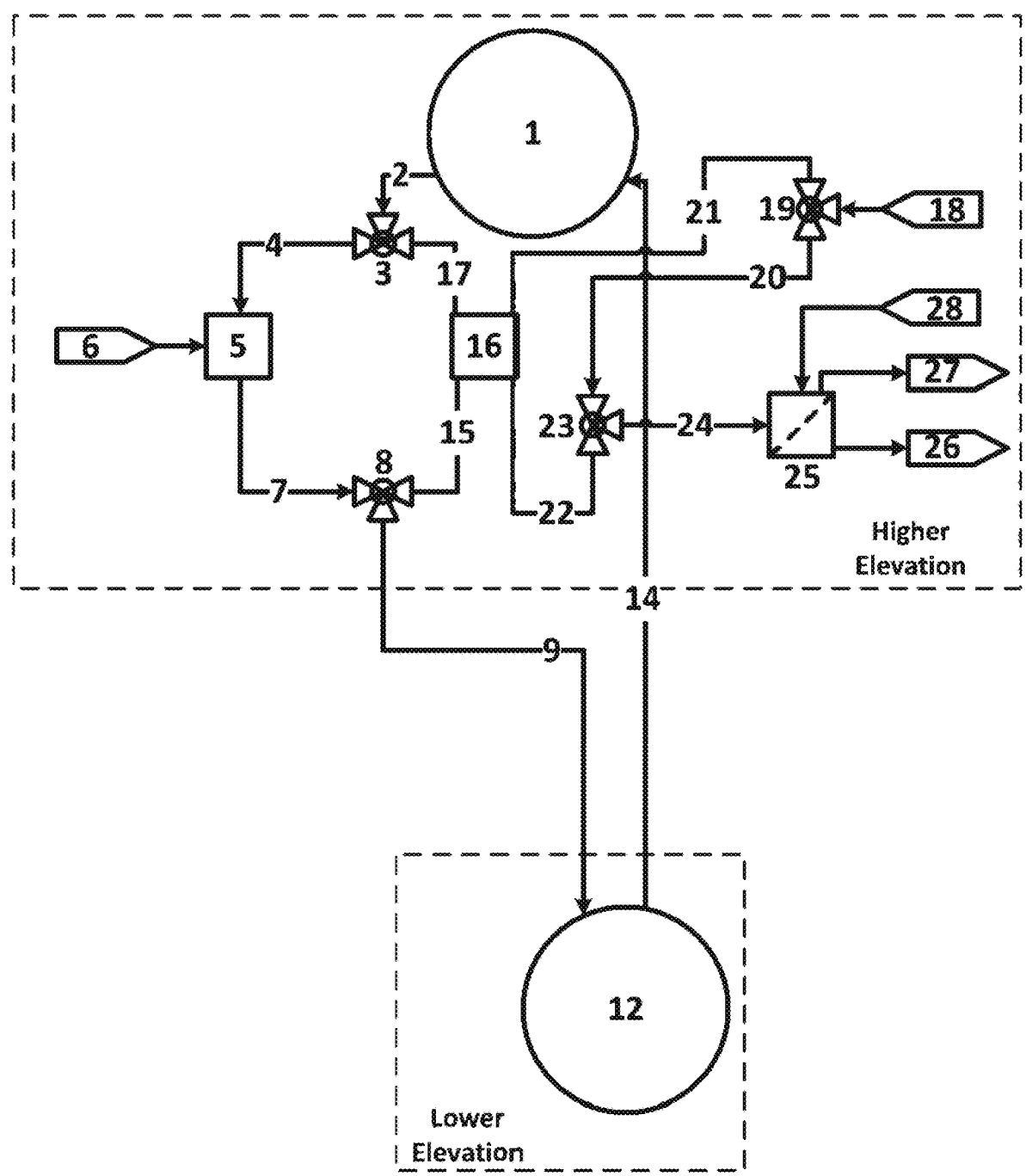
Figure 71 (Above)

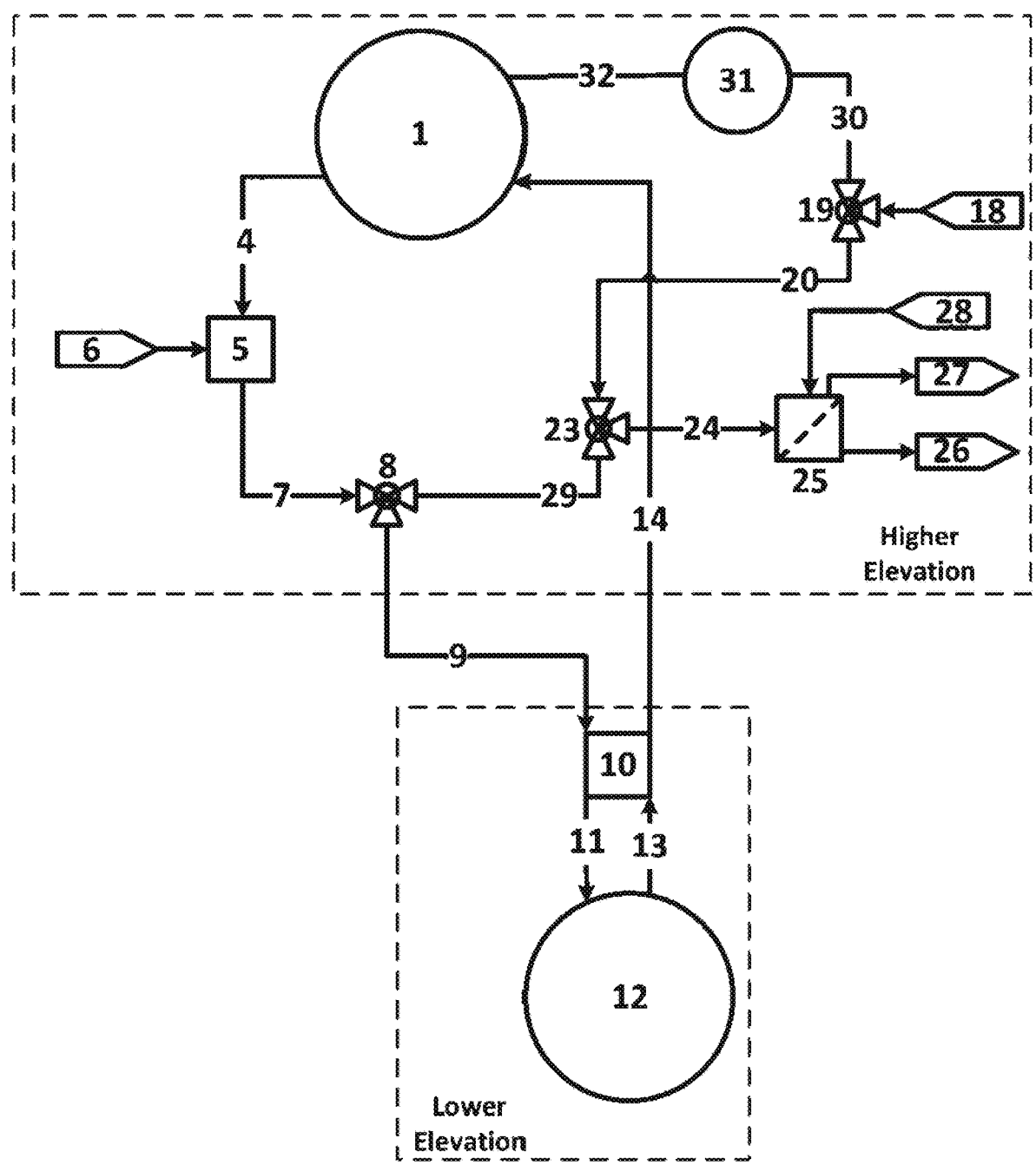
Figure 72 (Above)

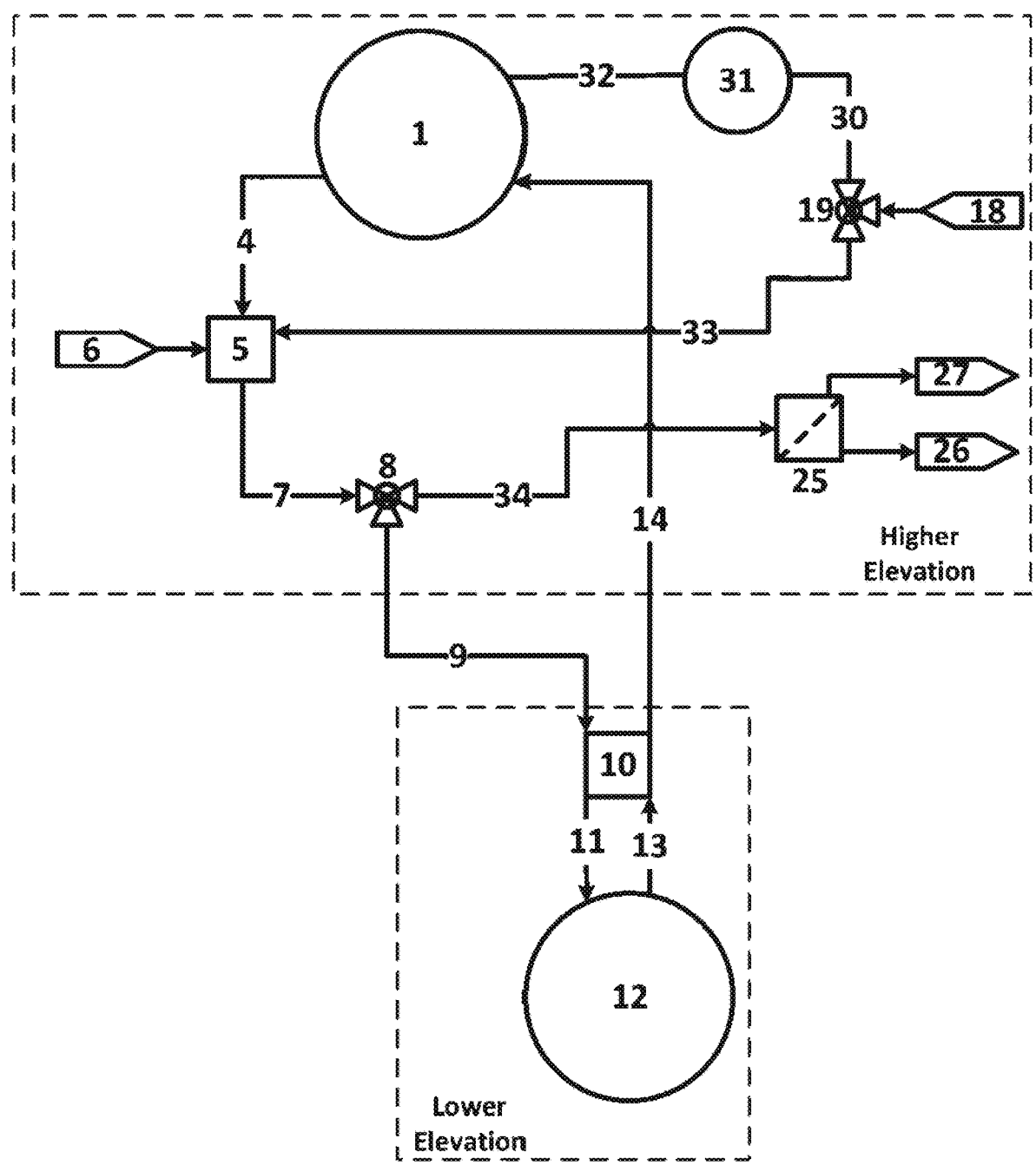
Figure 73 (Above)

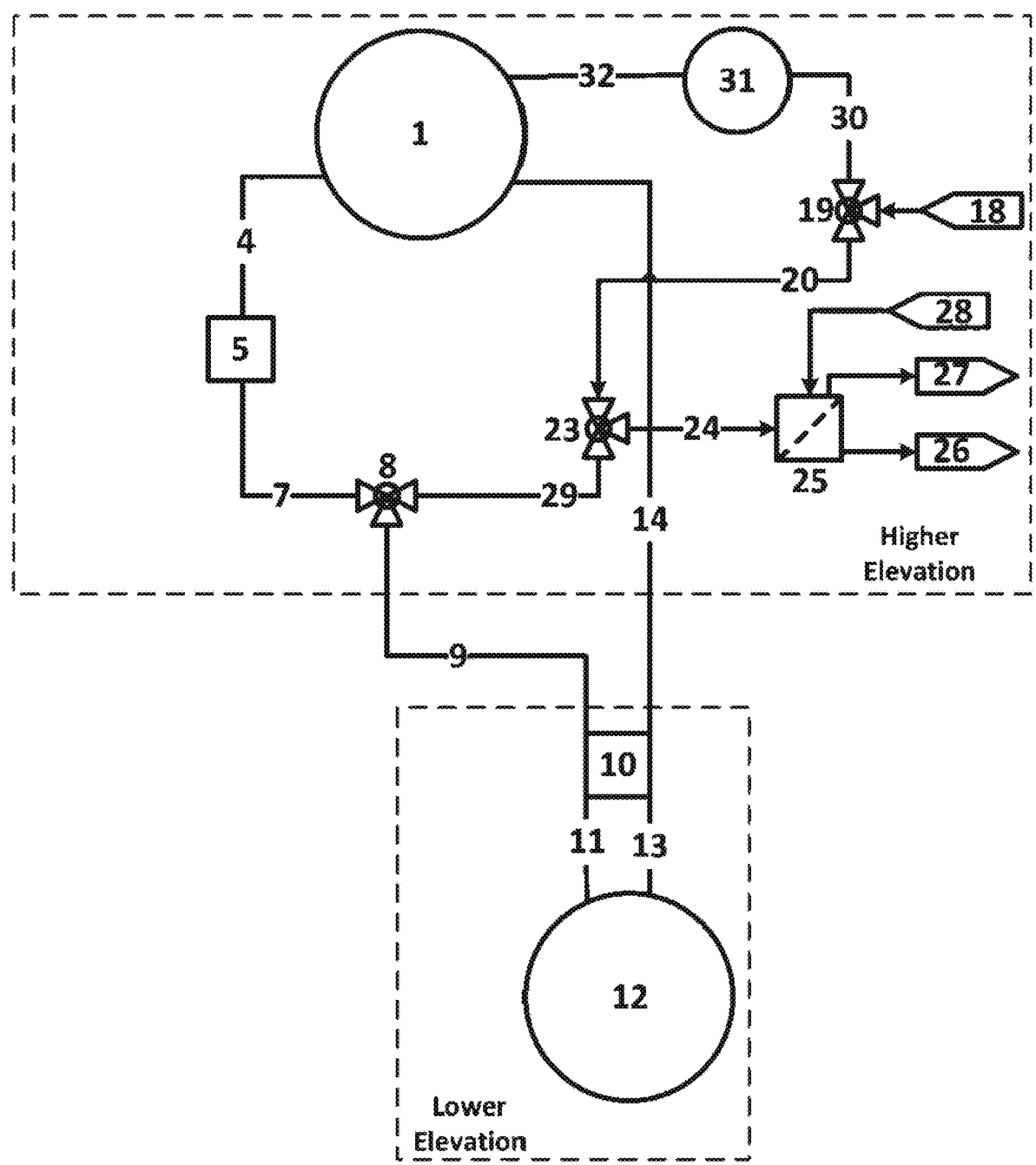
Figure 74 (Above)

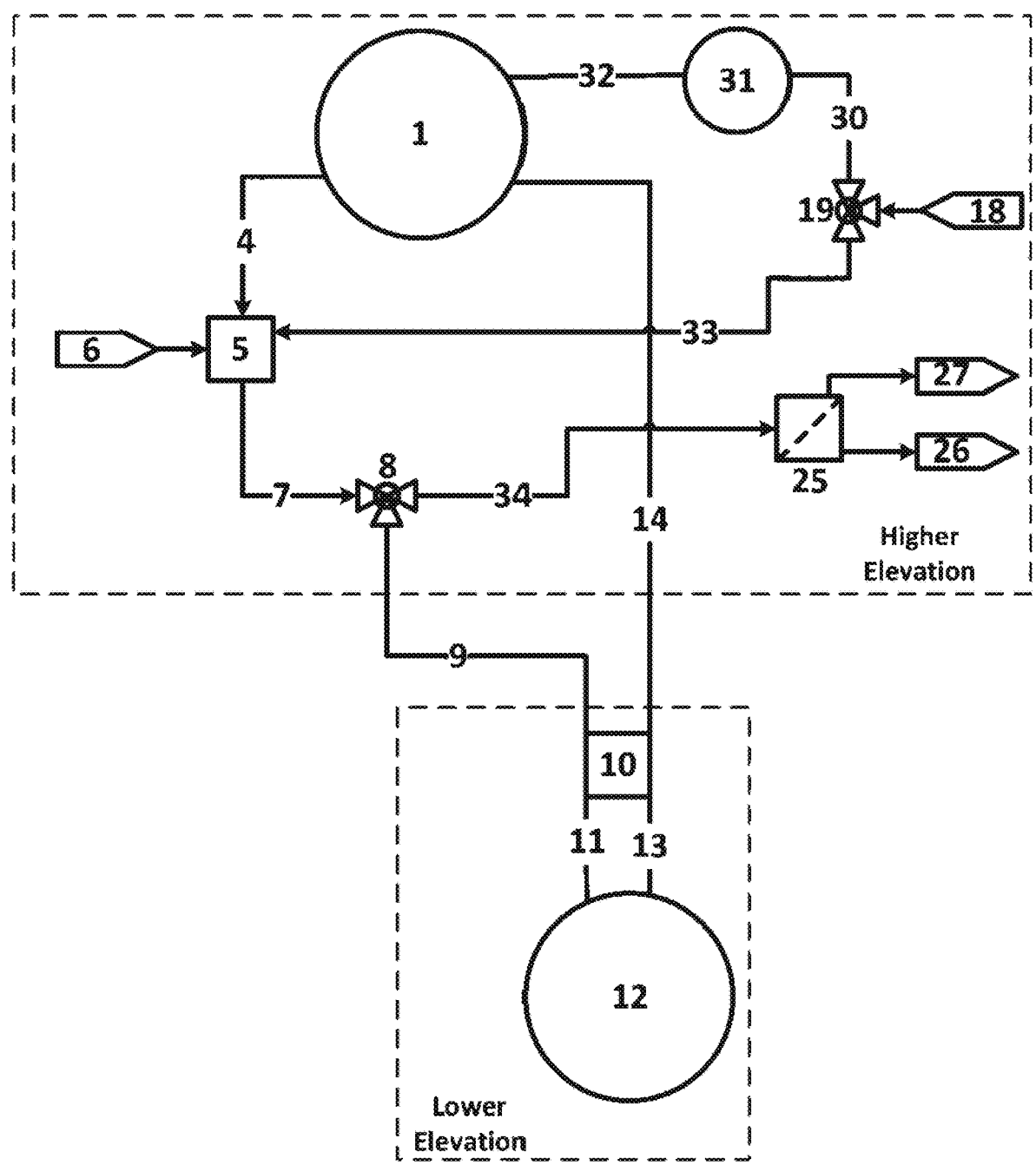
Figure 75 (Above)

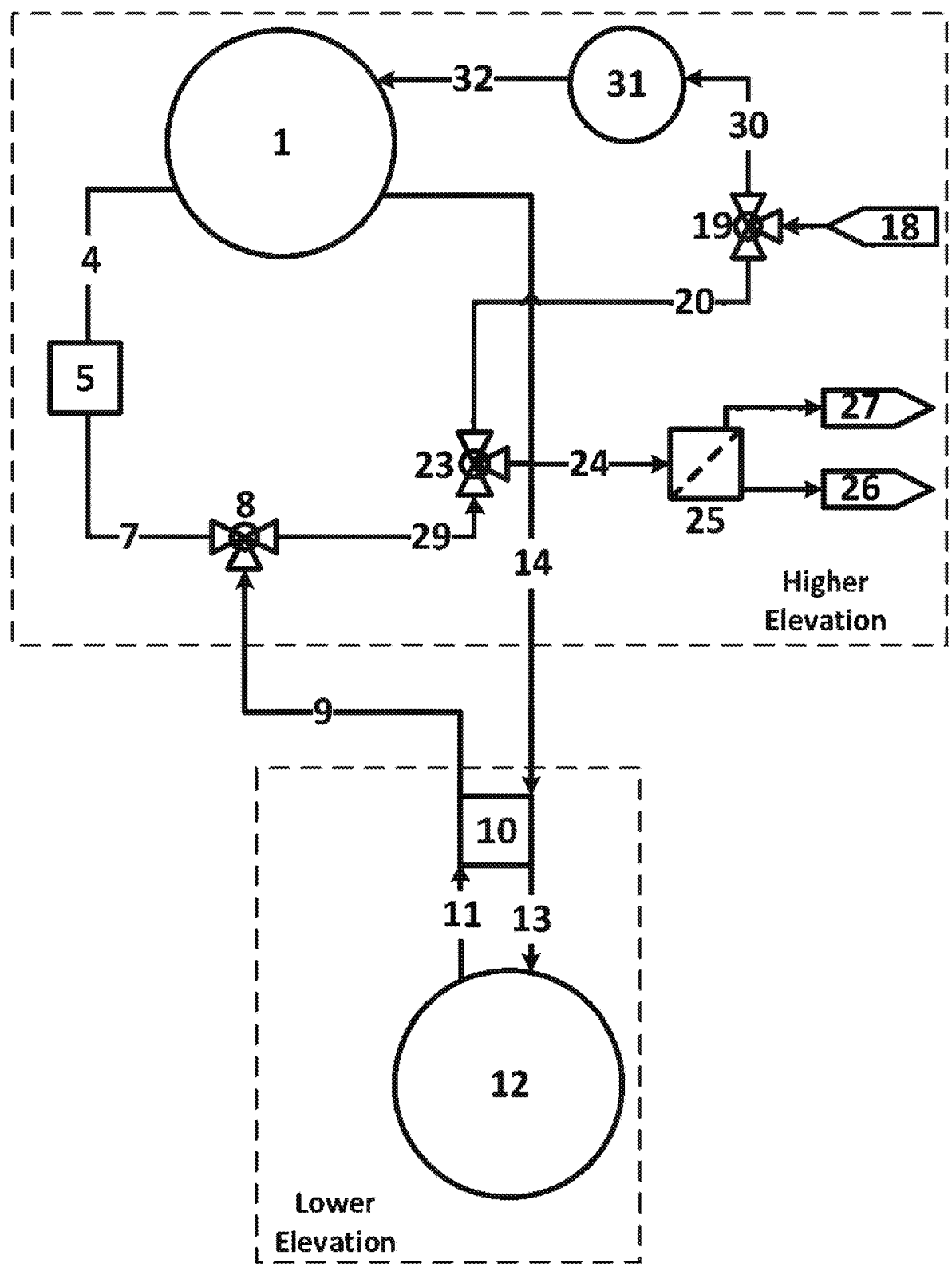
Figure 76 (Above)

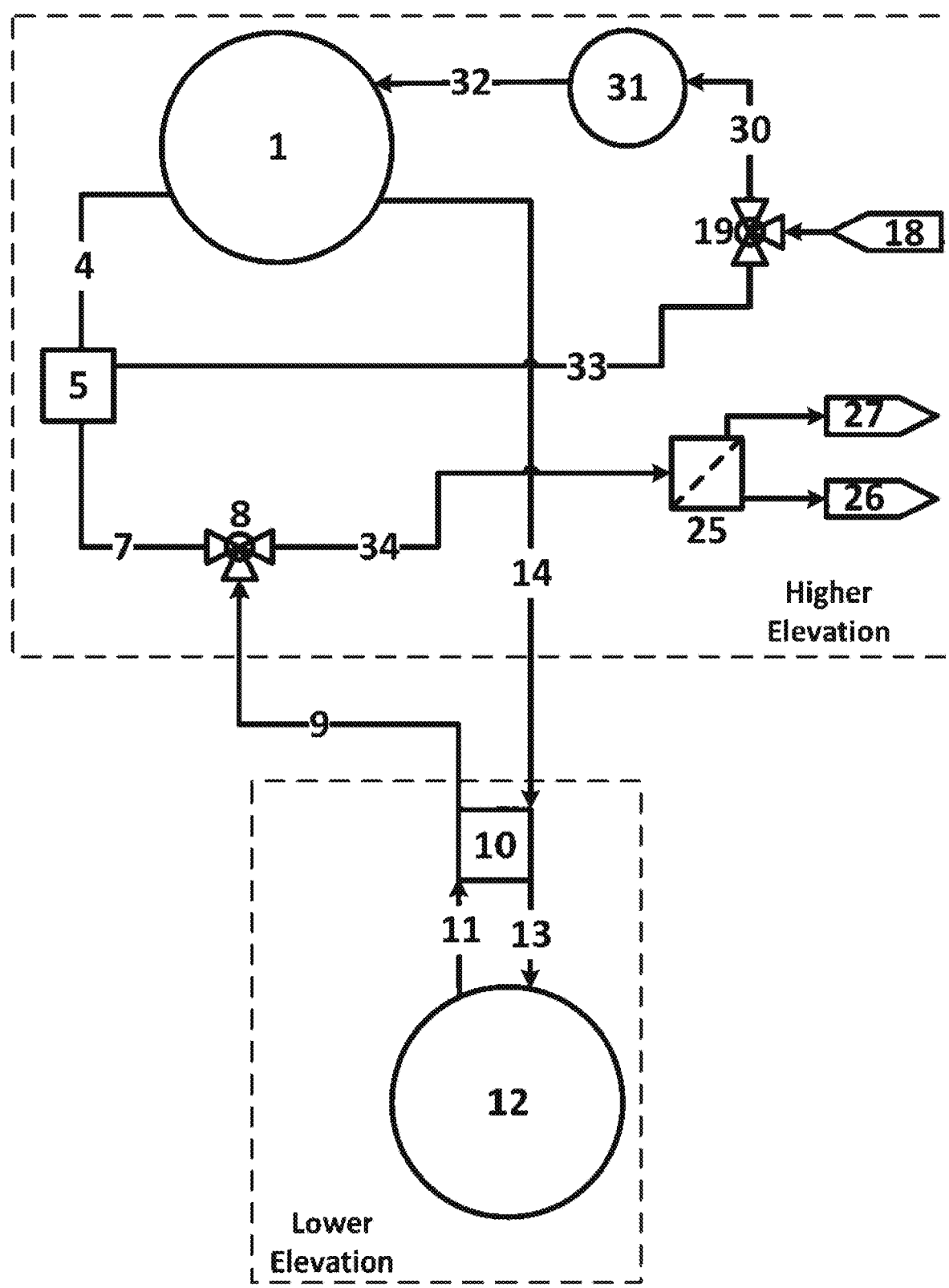
Figure 77 (Above)

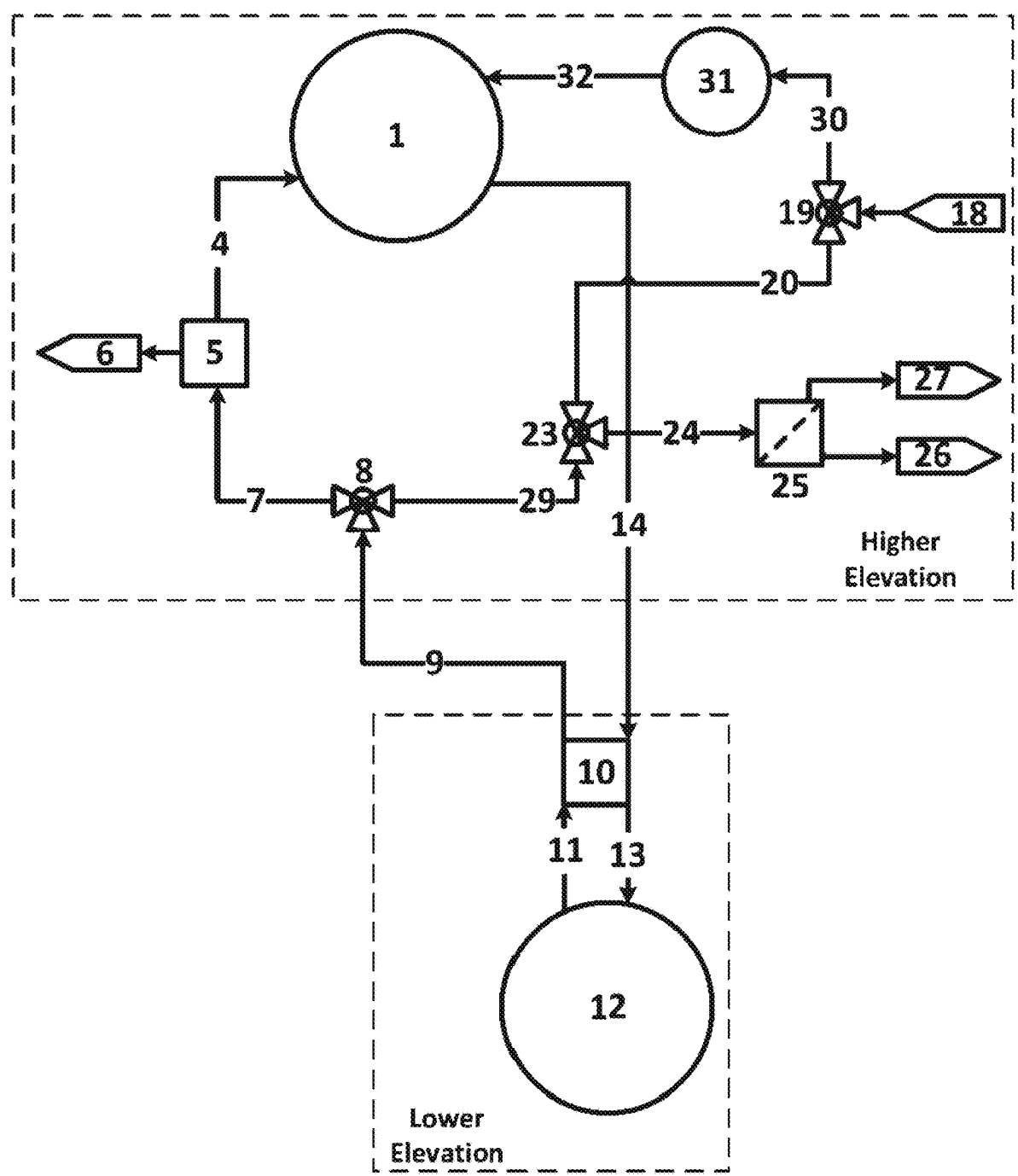
Figure 78 (Above)

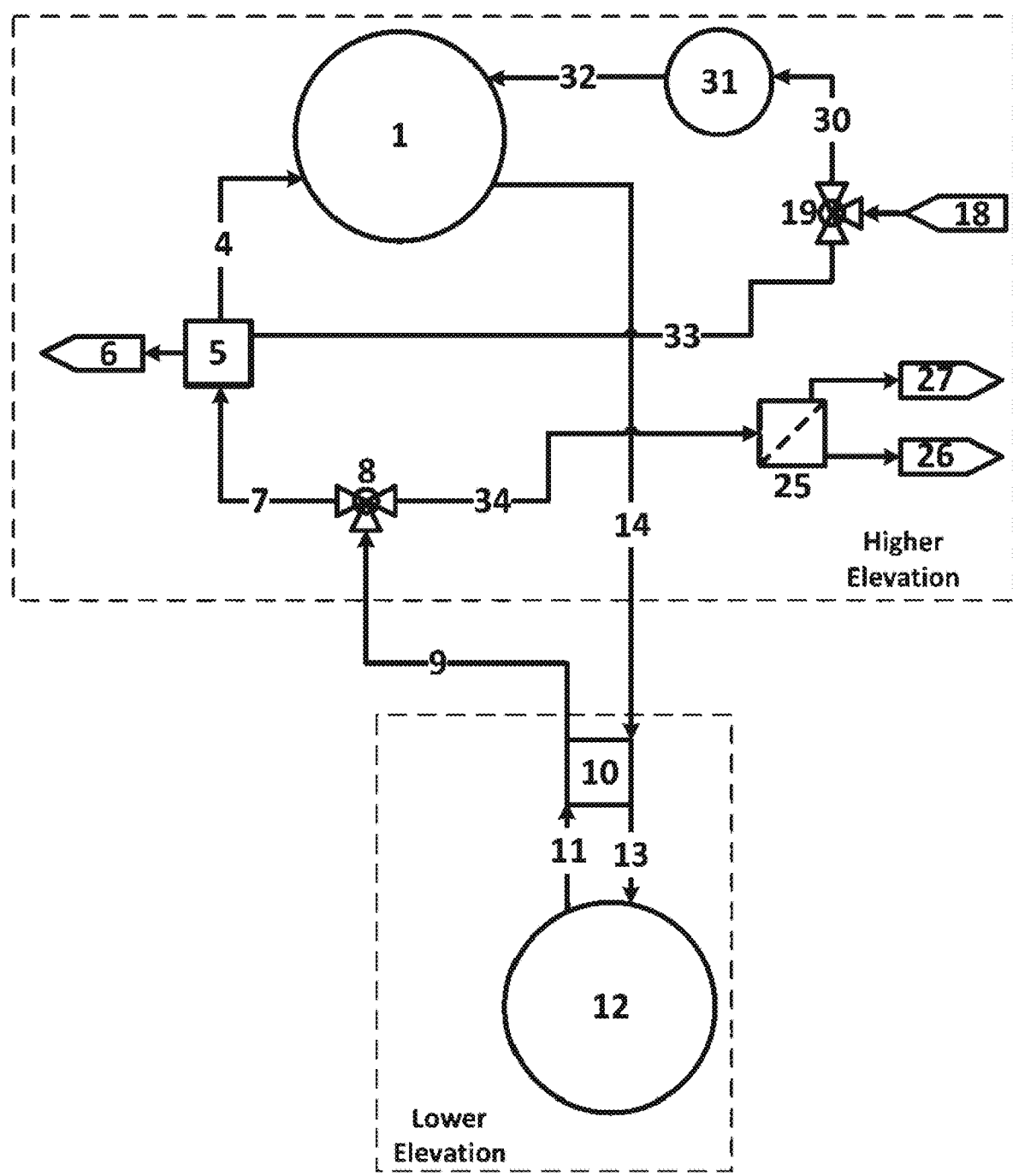
Figure 79 (Above)

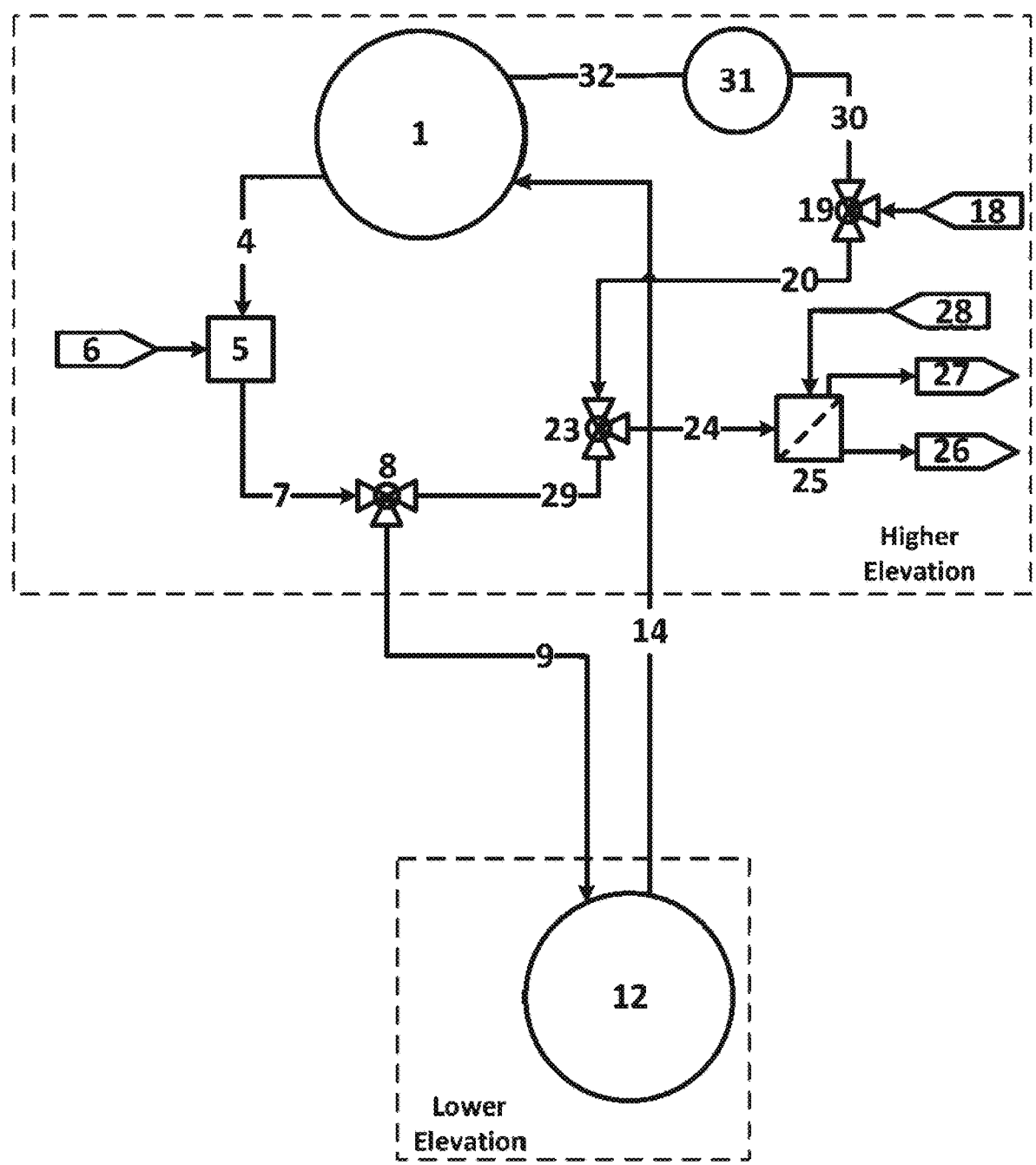
Figure 80 (Above)

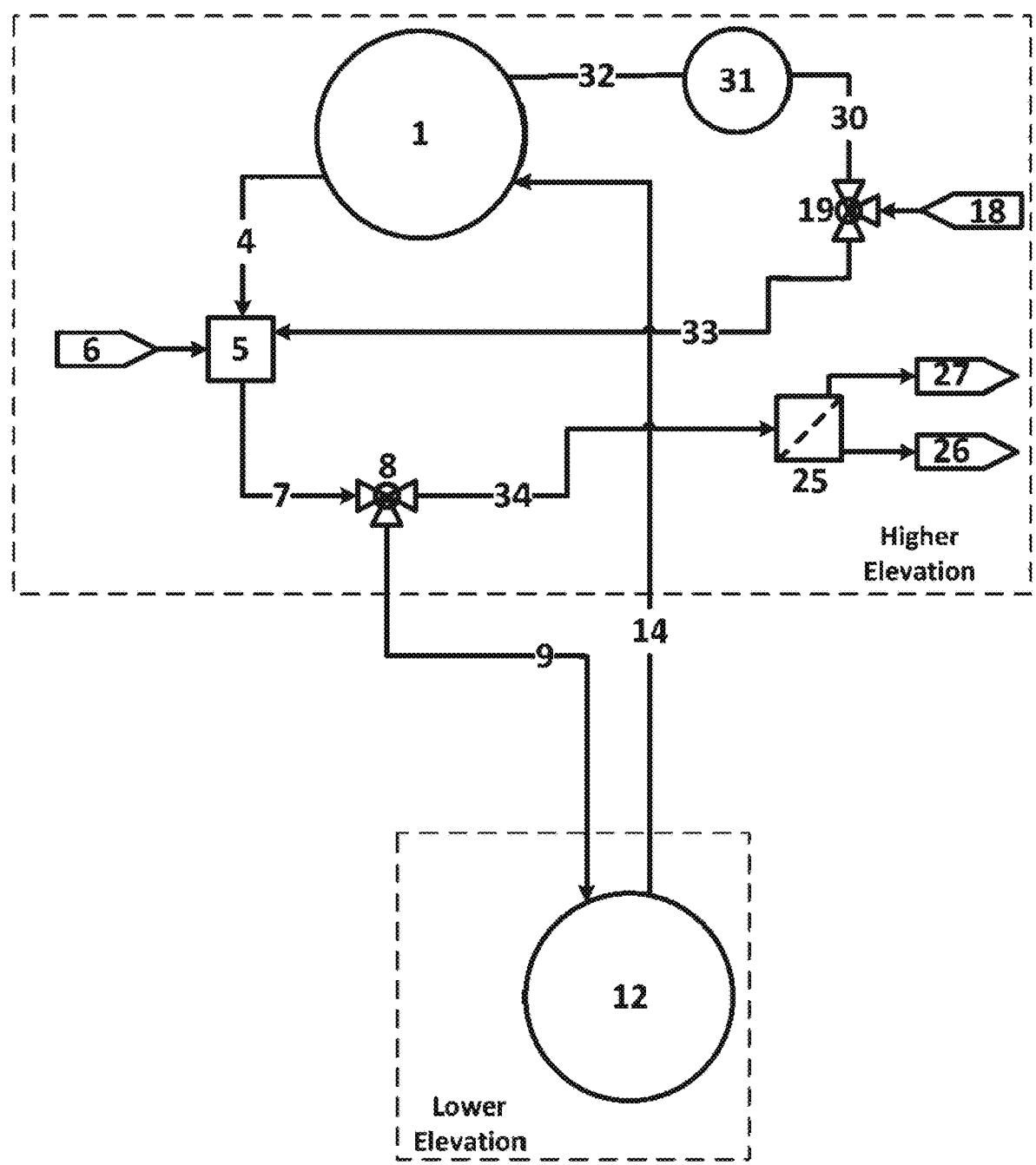
Figure 81 (Above)

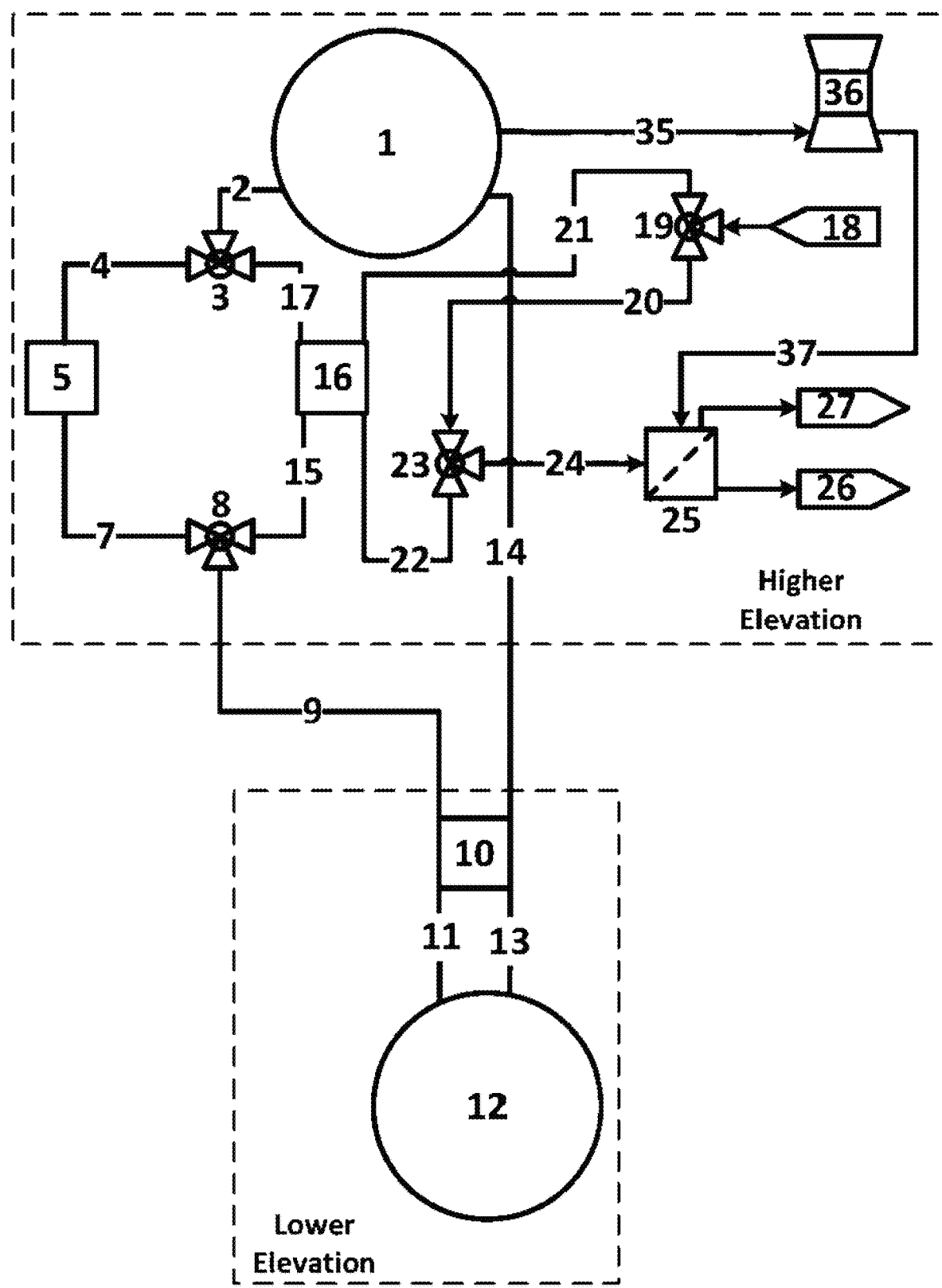
Figure 82 (Above)

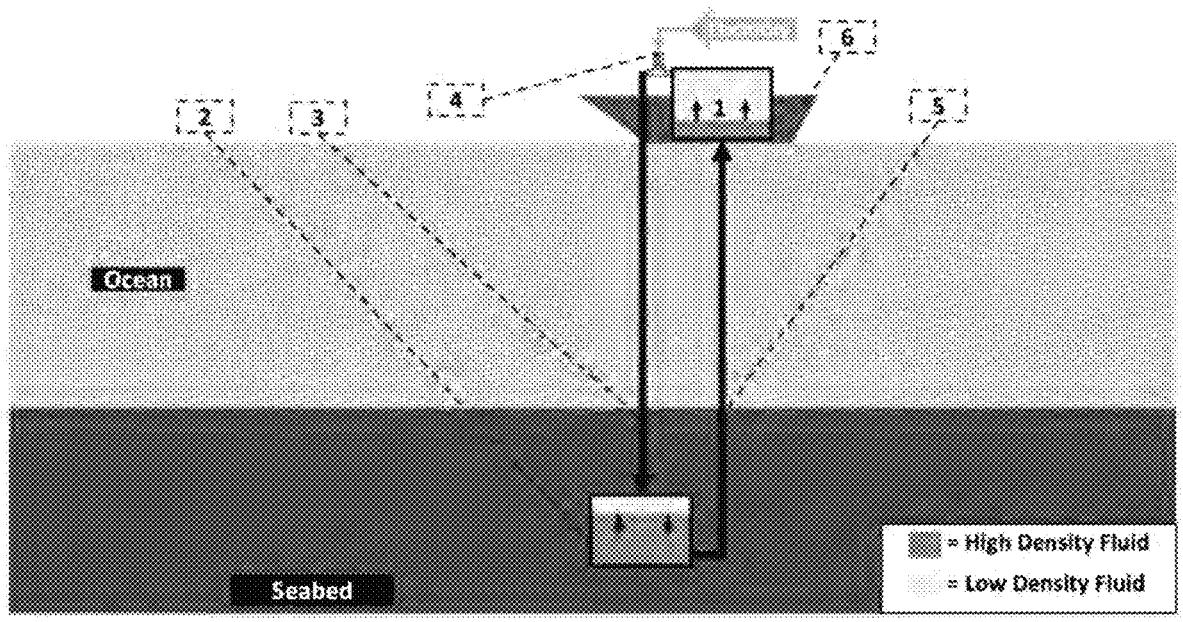
Figure 83 (Above)
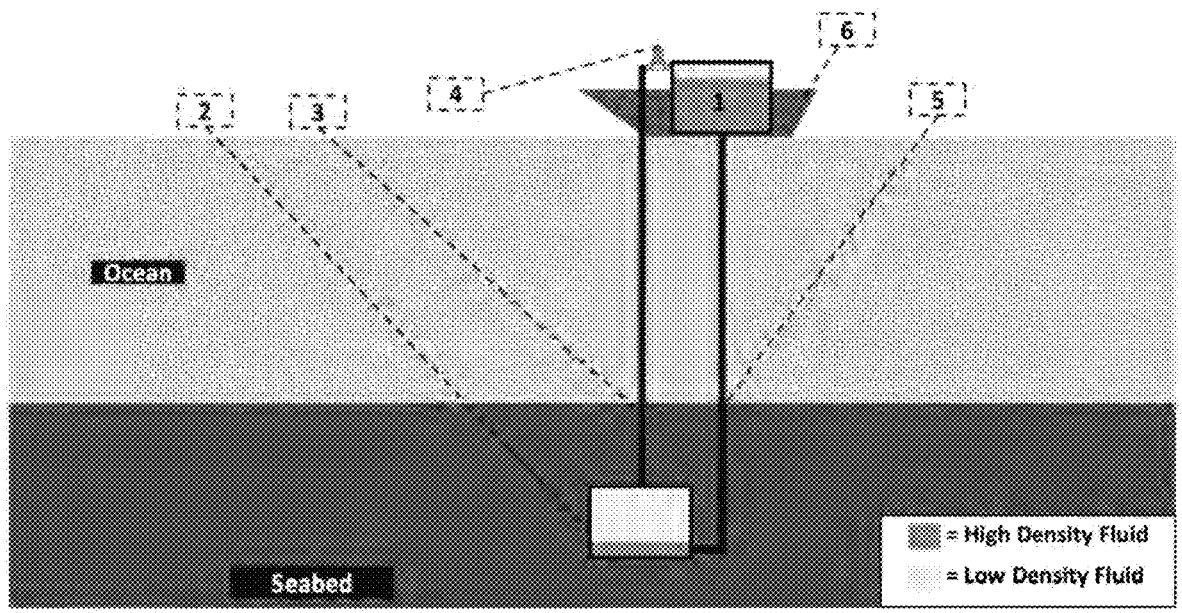
Figure 84 (Above)

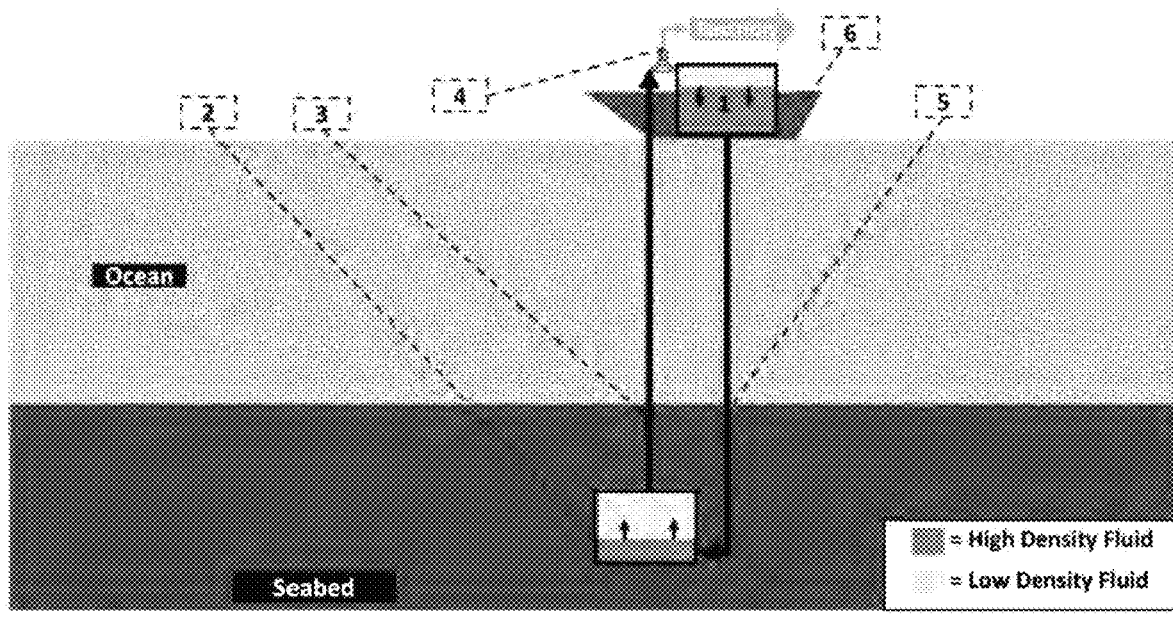
Figure 85 (Above)
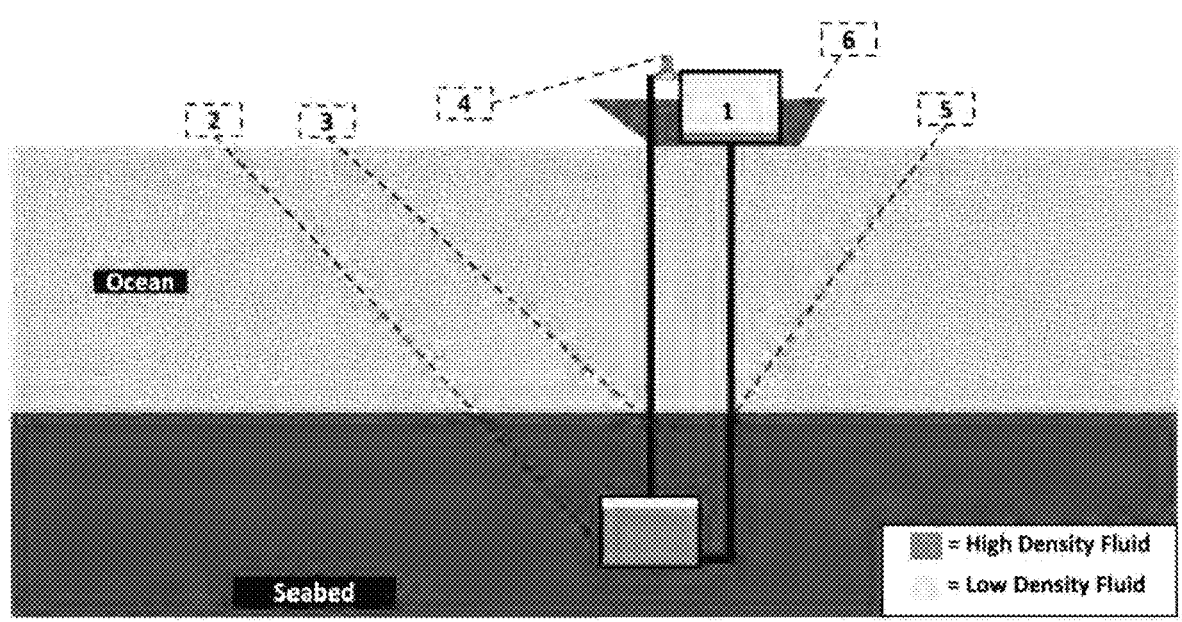
Figure 86 (Above)

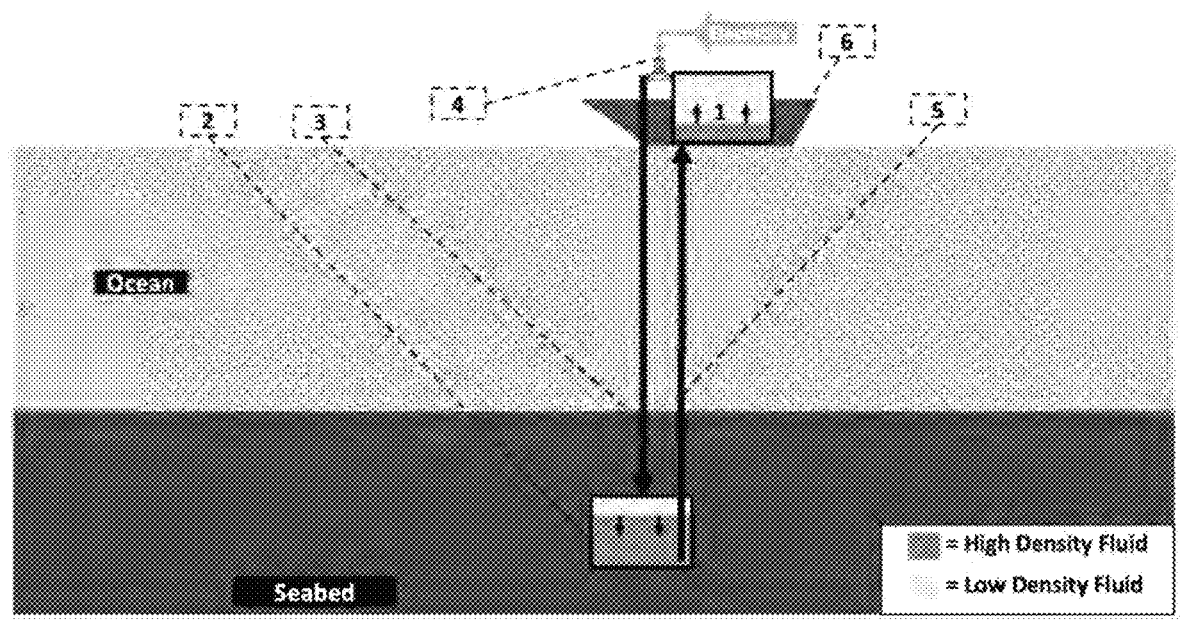
Figure 87 (Above)
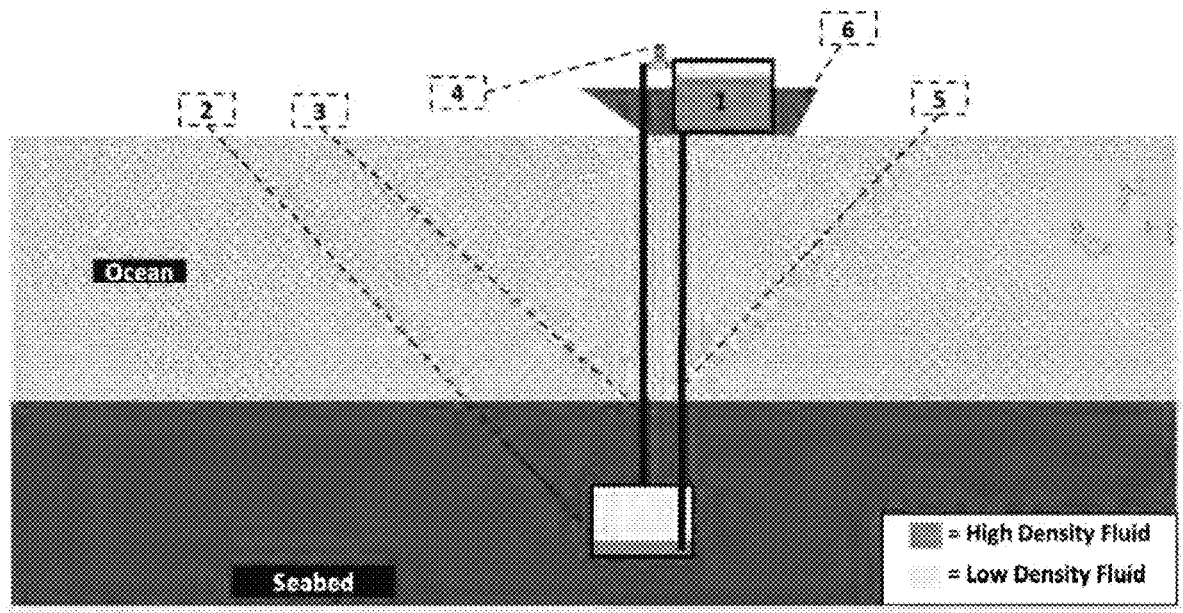
Figure 88 (Above)

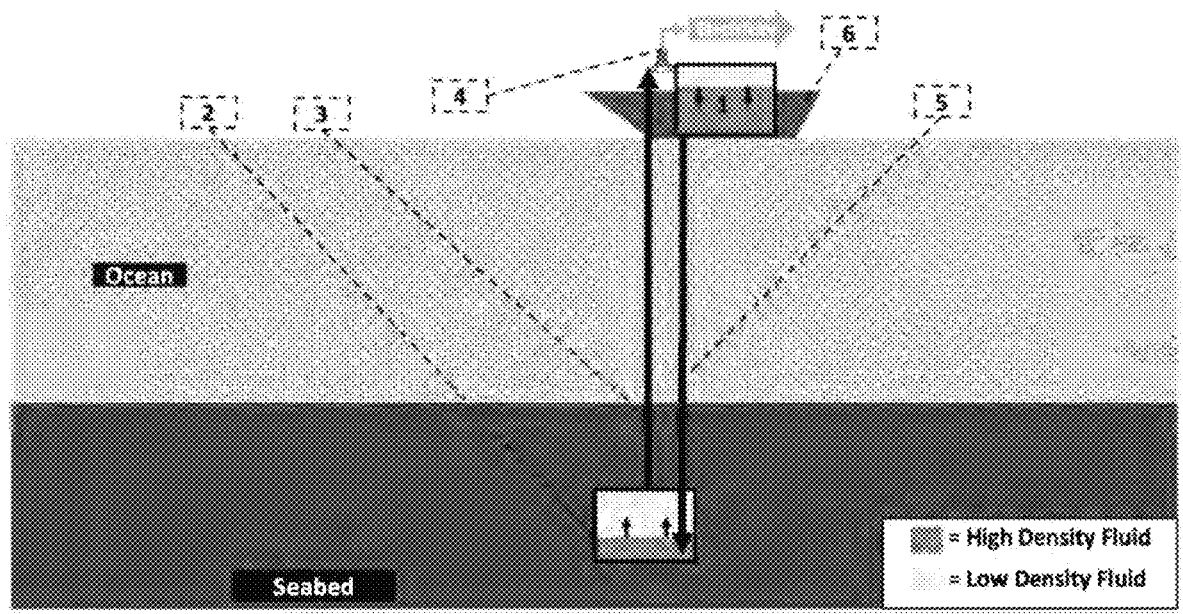
Figure 89 (Above)
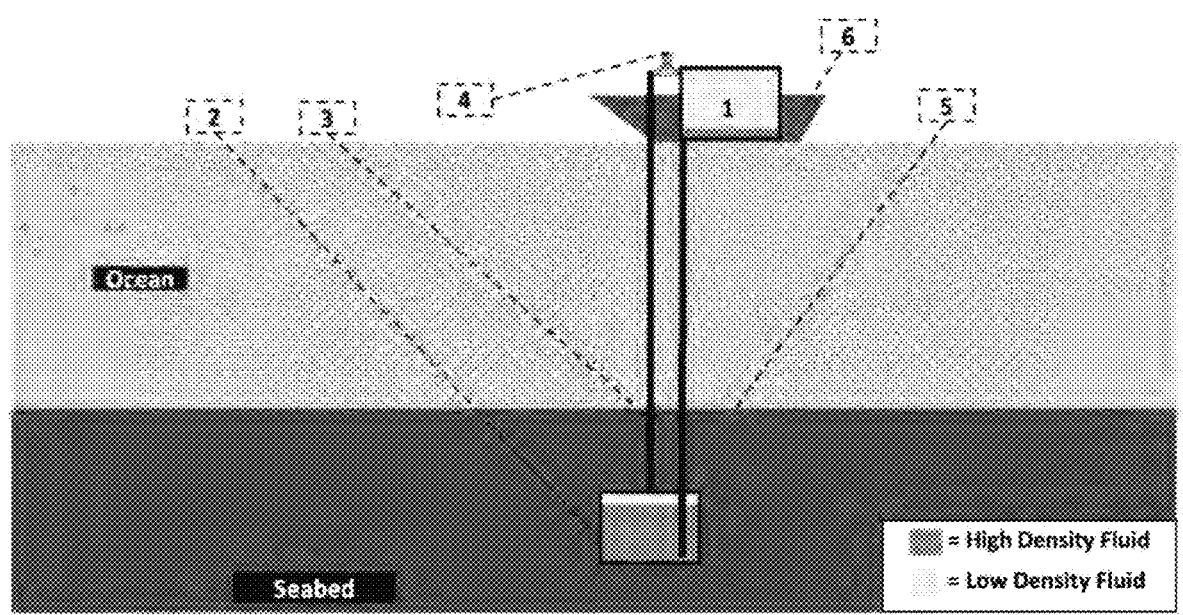
Figure 90 (Above)

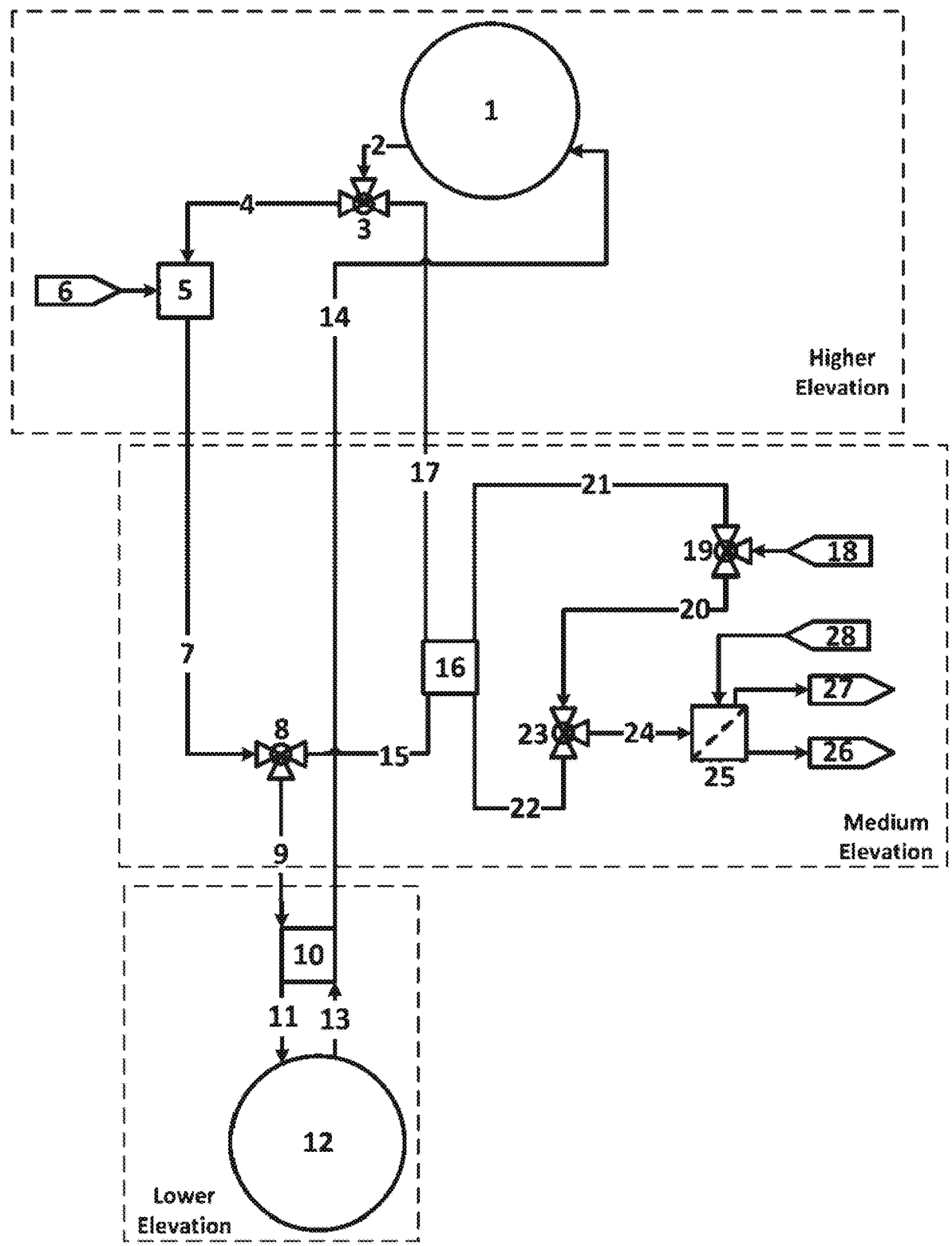
Figure 91 (Above)

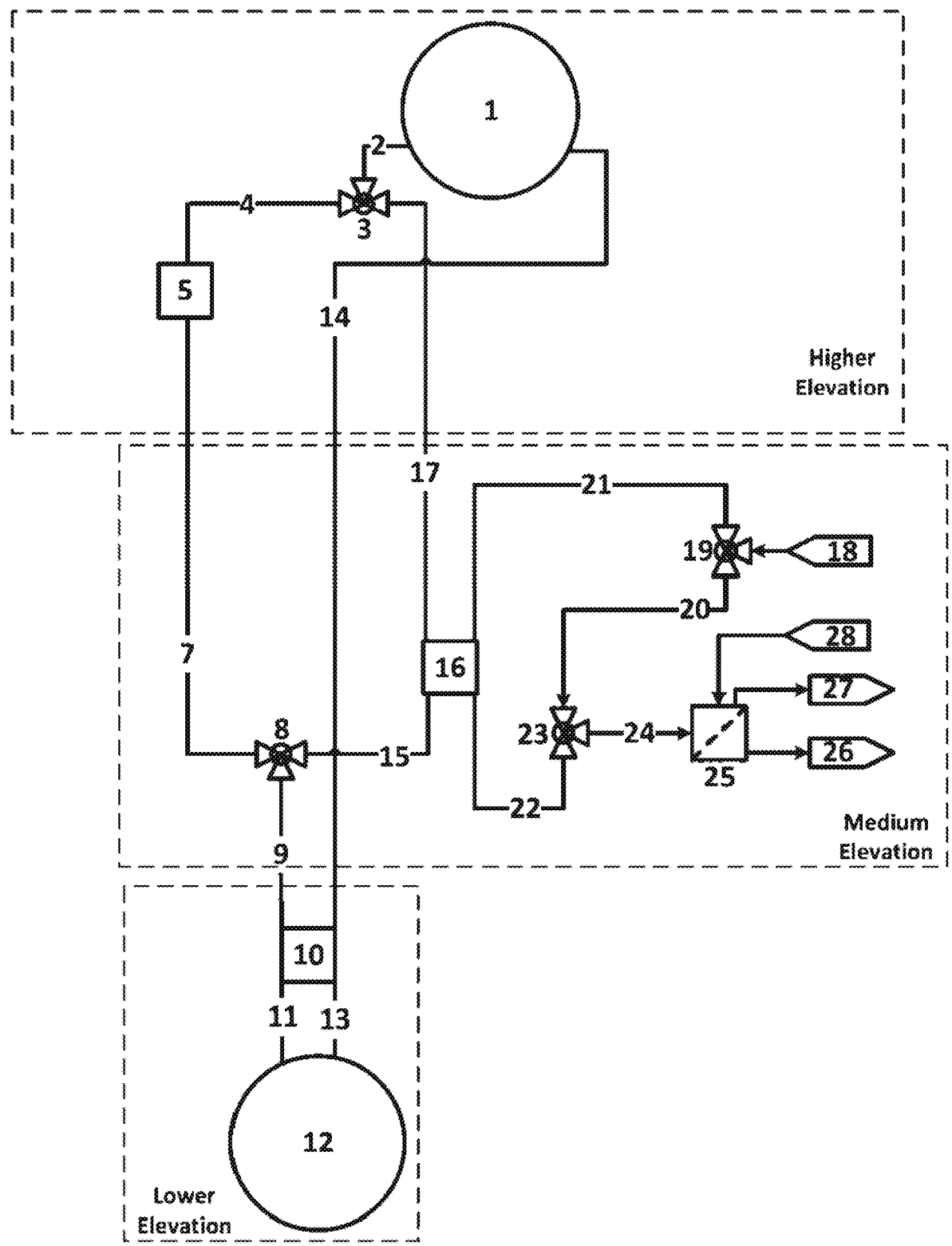
Figure 92 (Above)

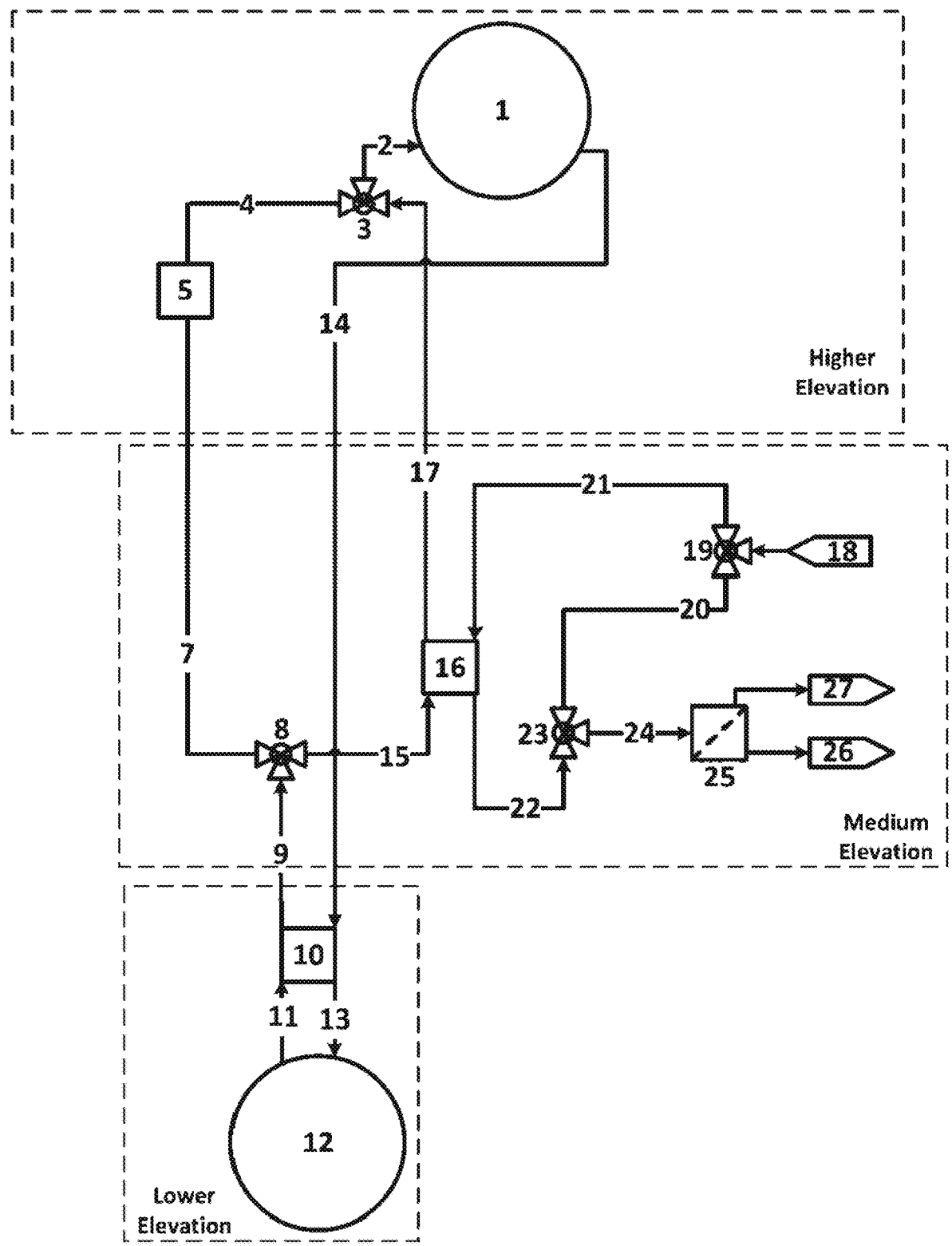
Figure 93 (Above)

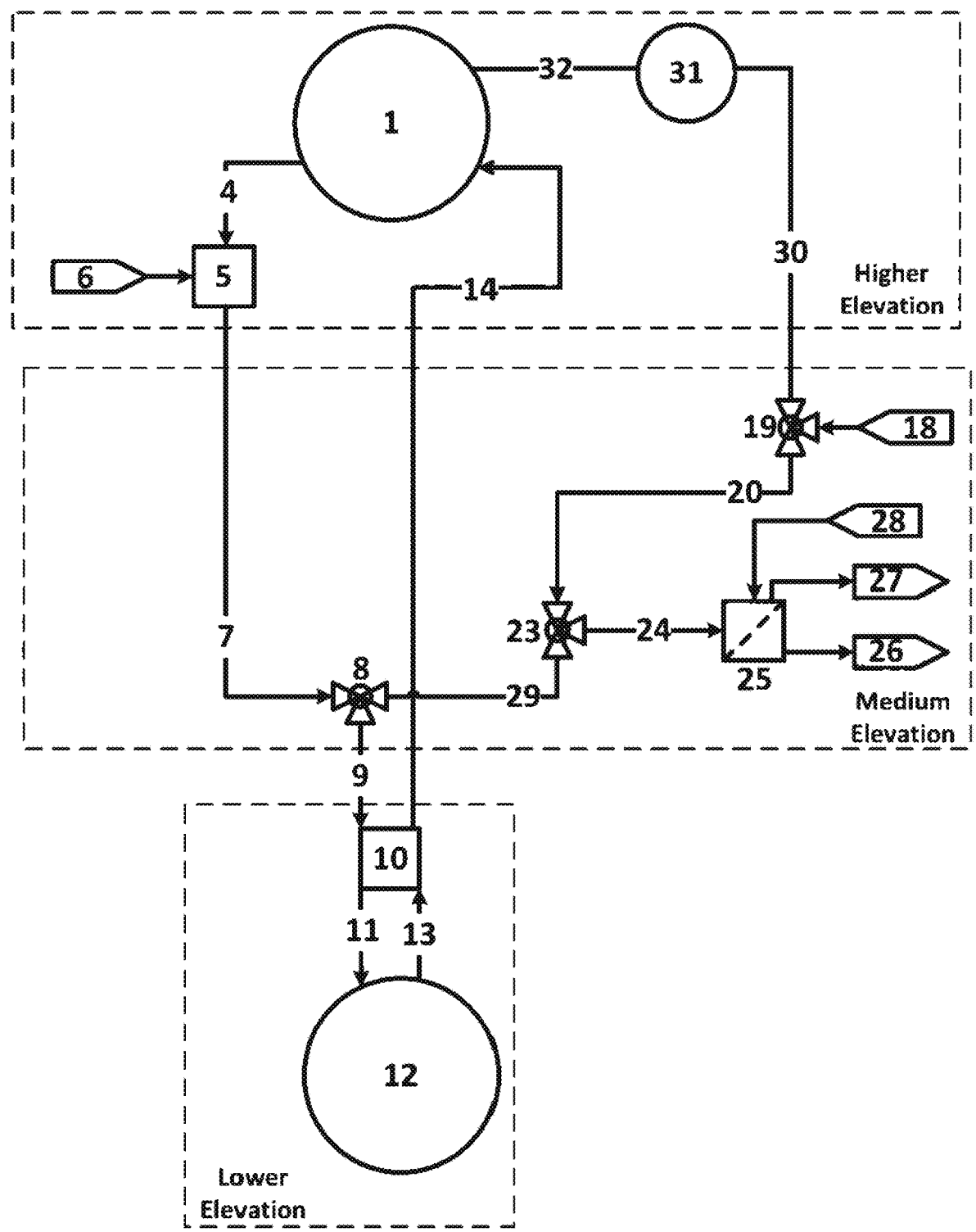
Figure 94 (Above)

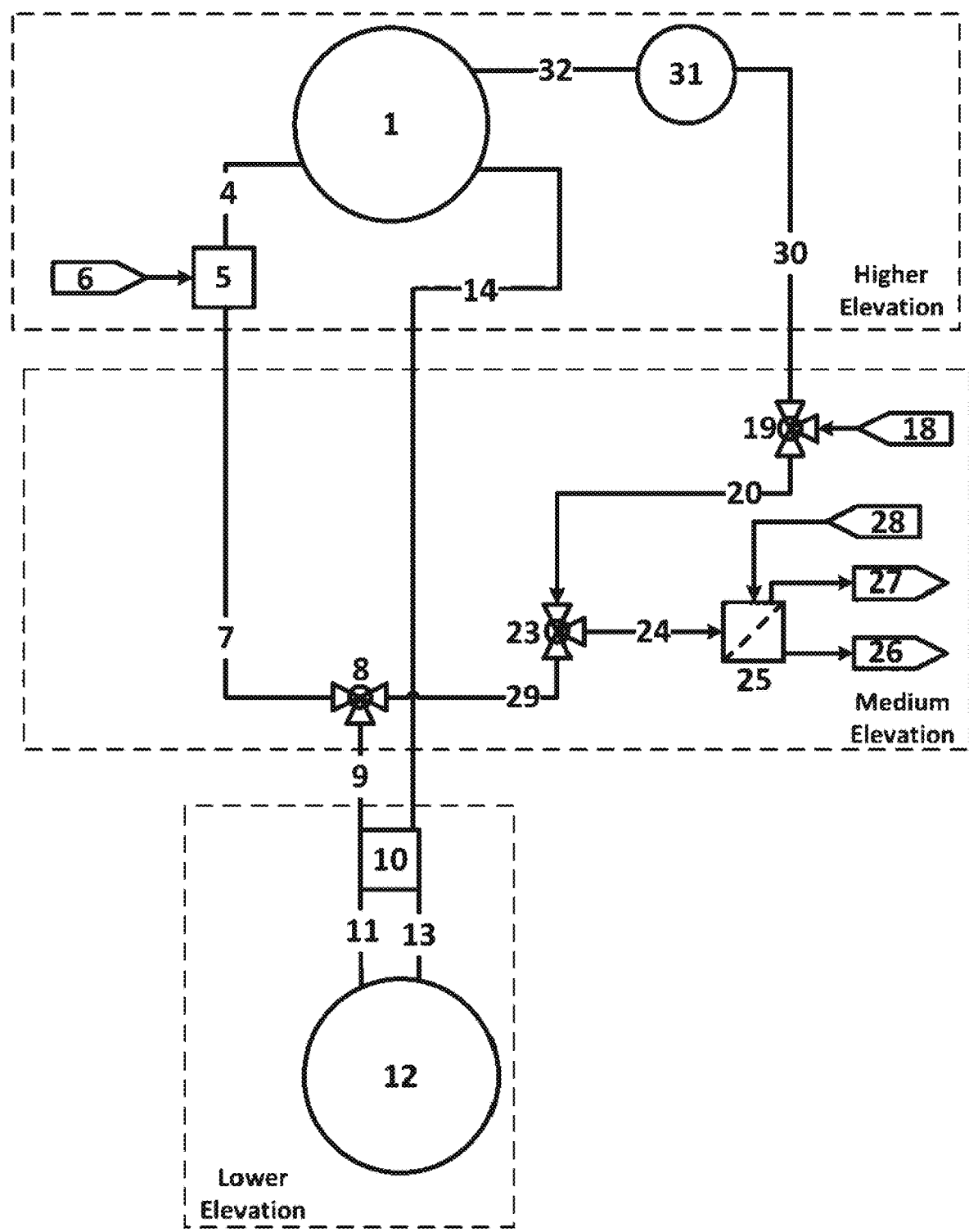
Figure 95 (Above)

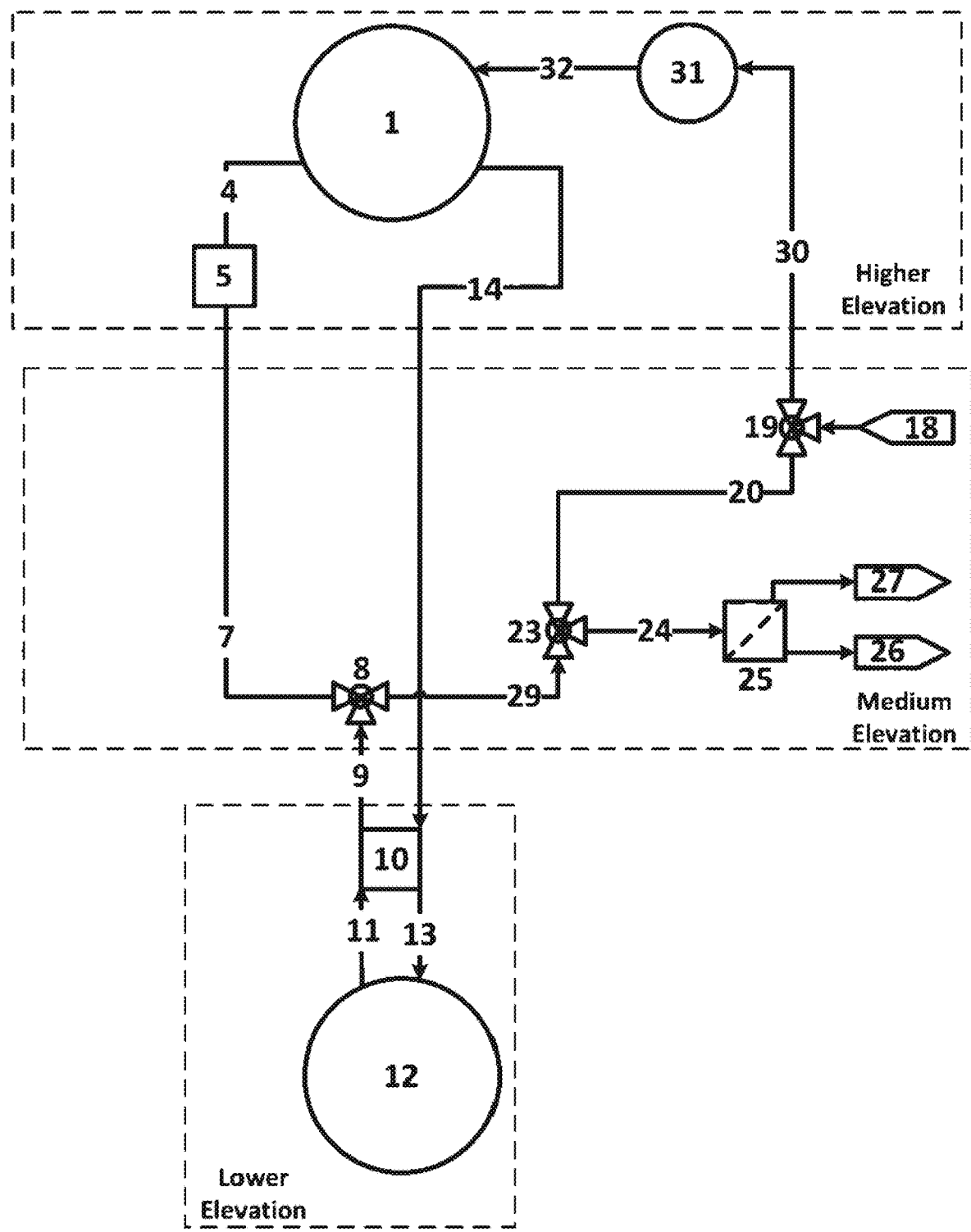
Figure 96 (Above)

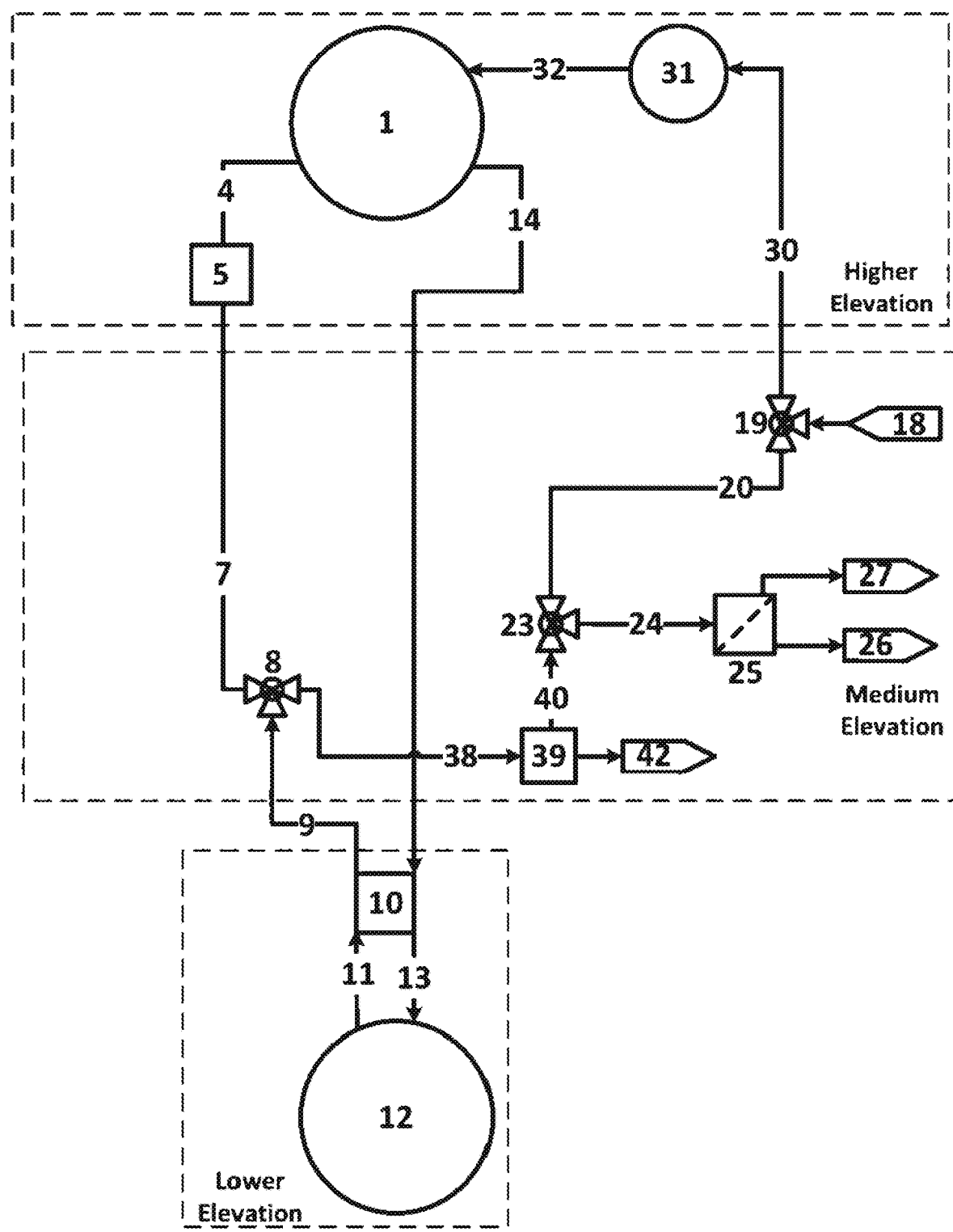
Figure 97 (Above)

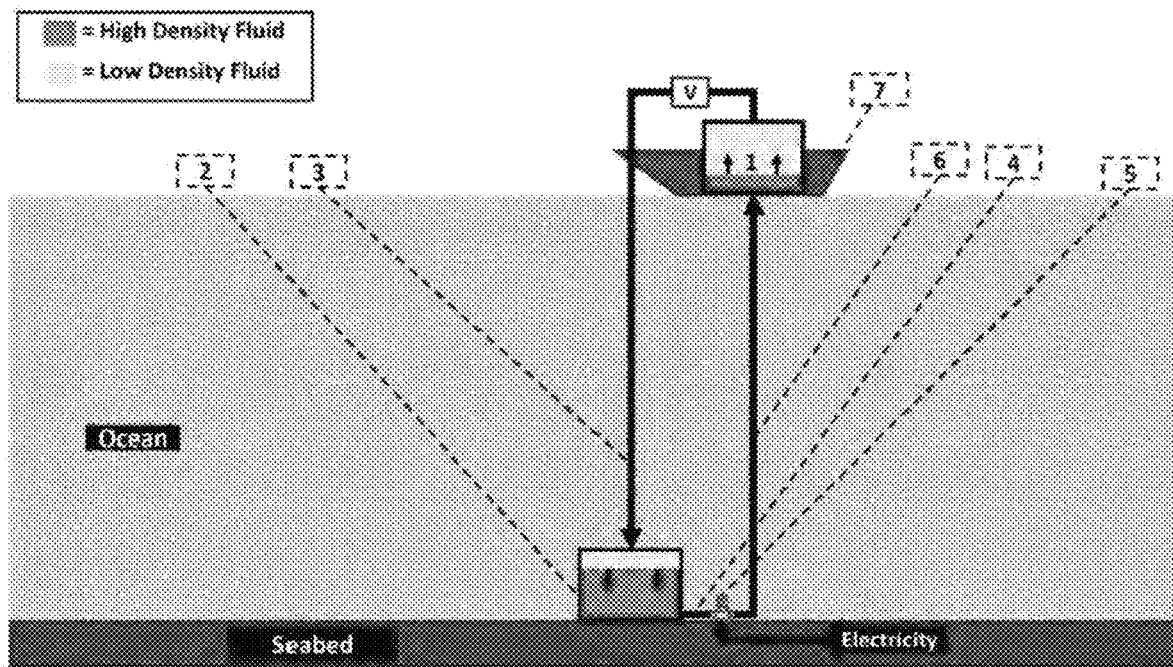
Figure 98 (Above)
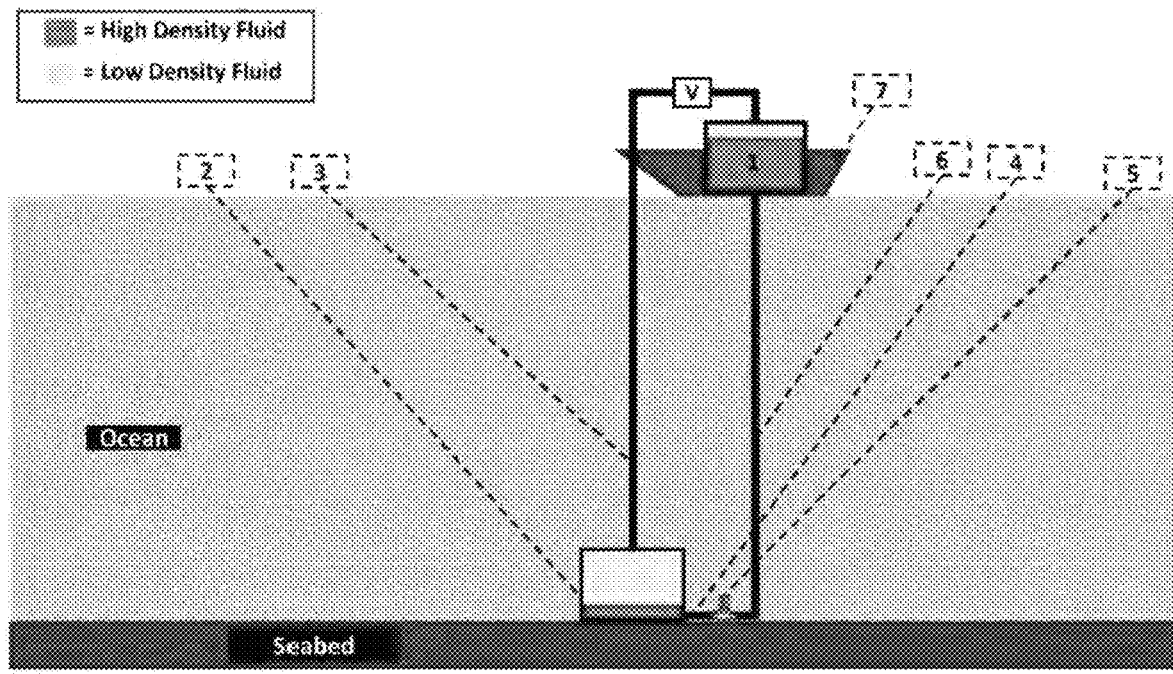
Figure 99 (Above)

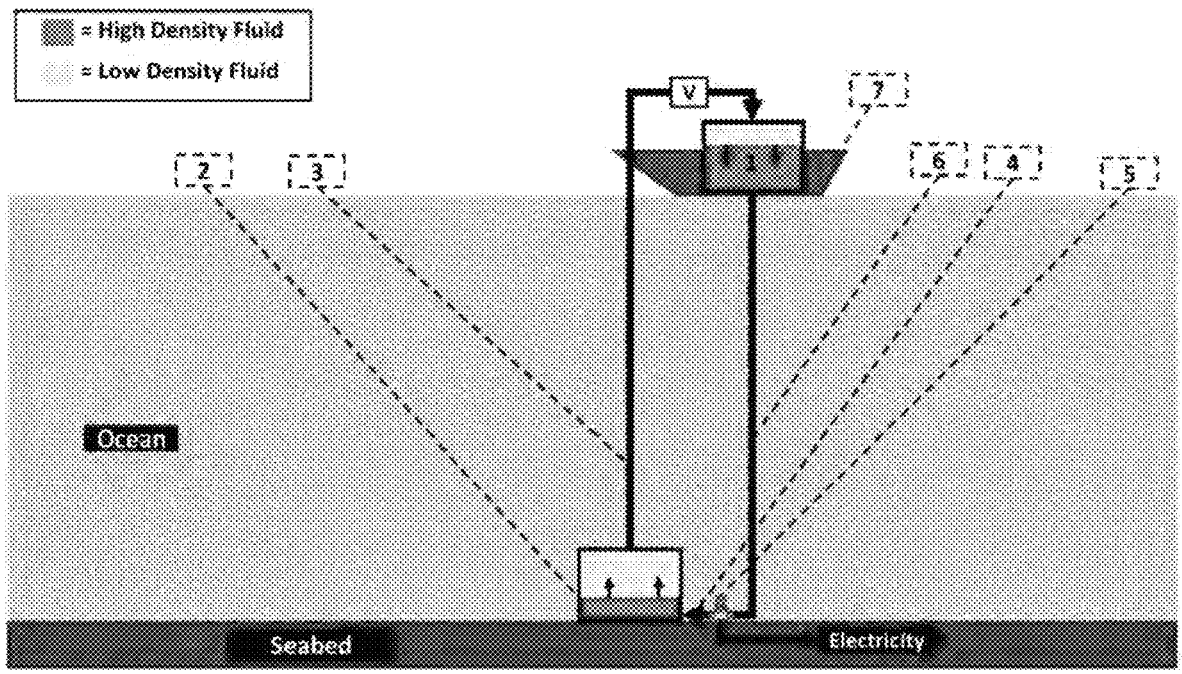
Figure 100 (Above)
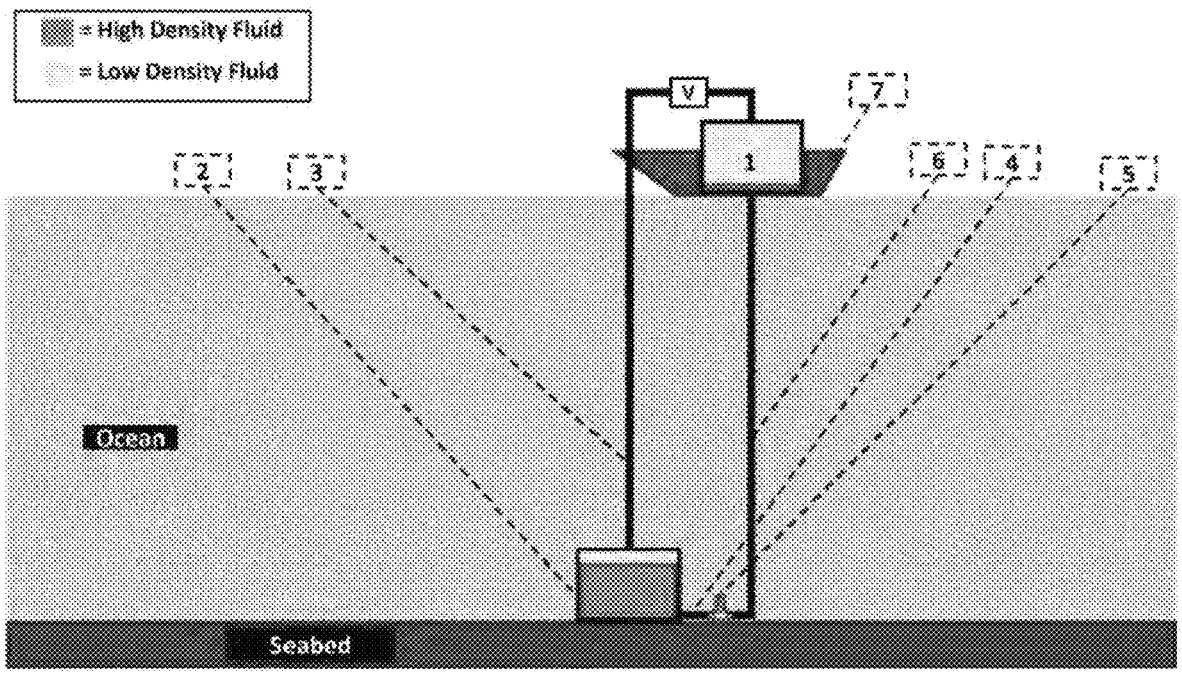
Figure 101 (Above)

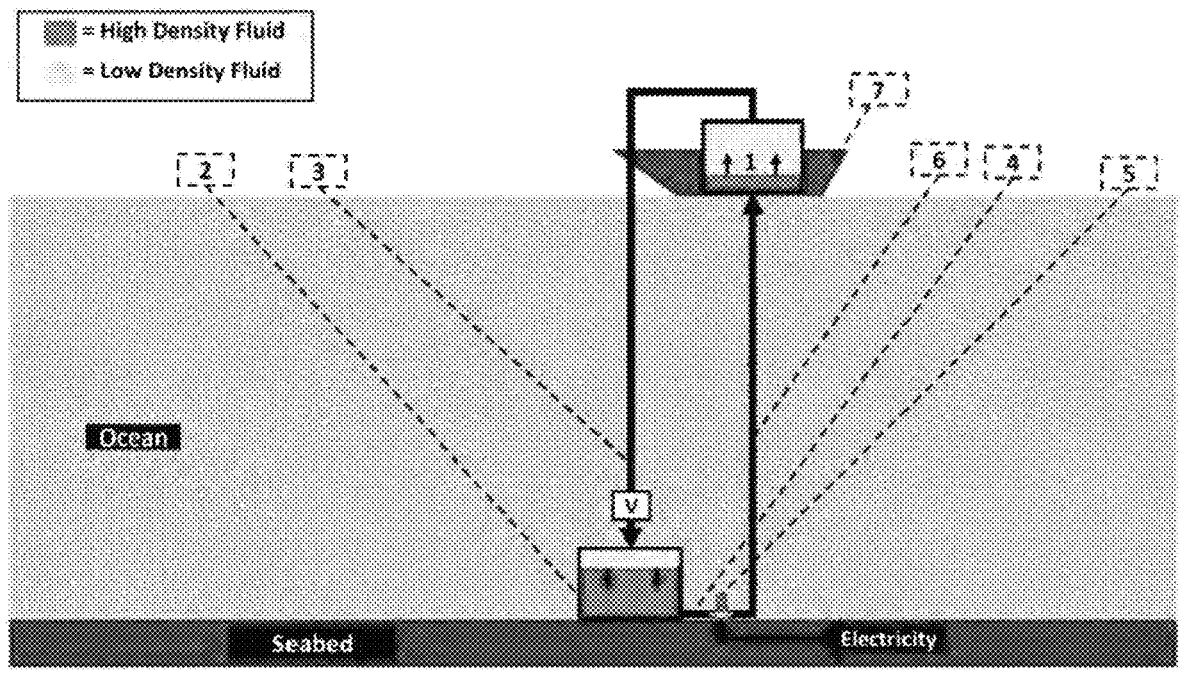
Figure 102 (Above)
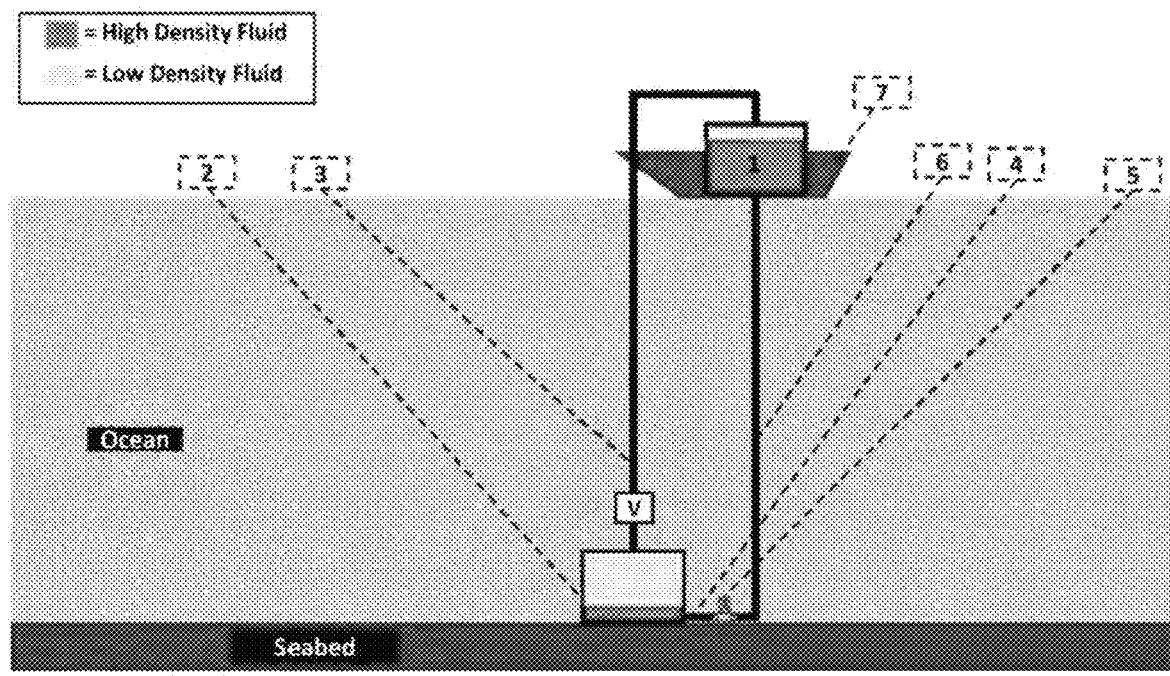
Figure 103 (Above)

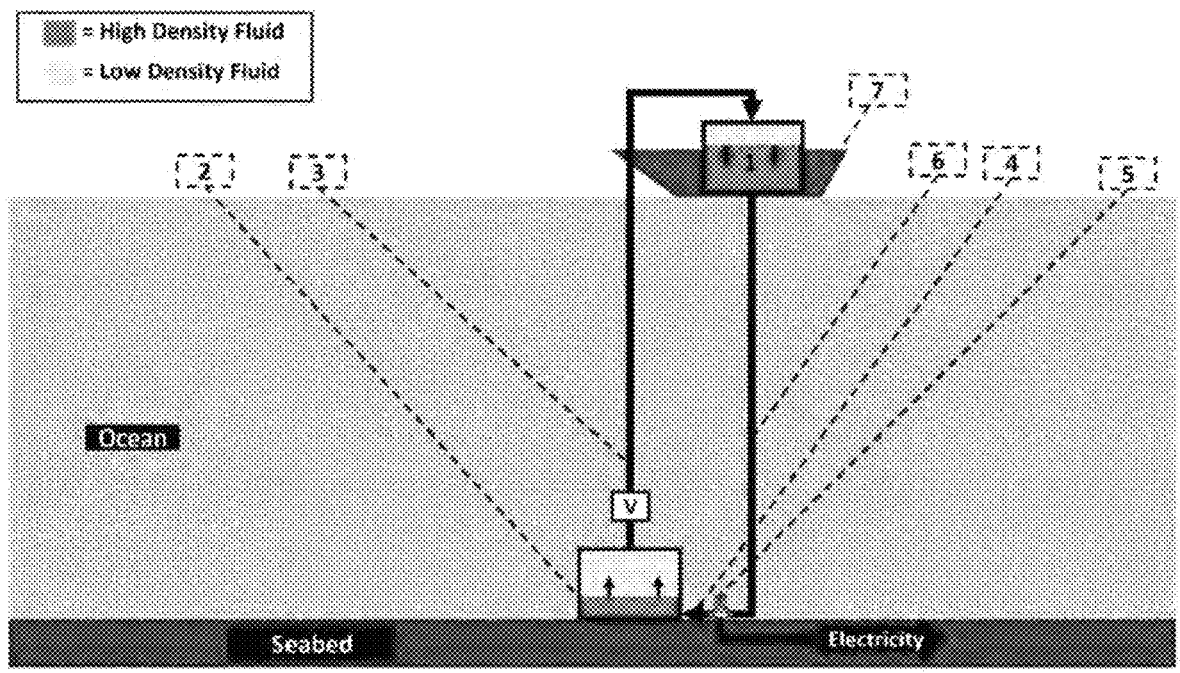
Figure 104 (Above)
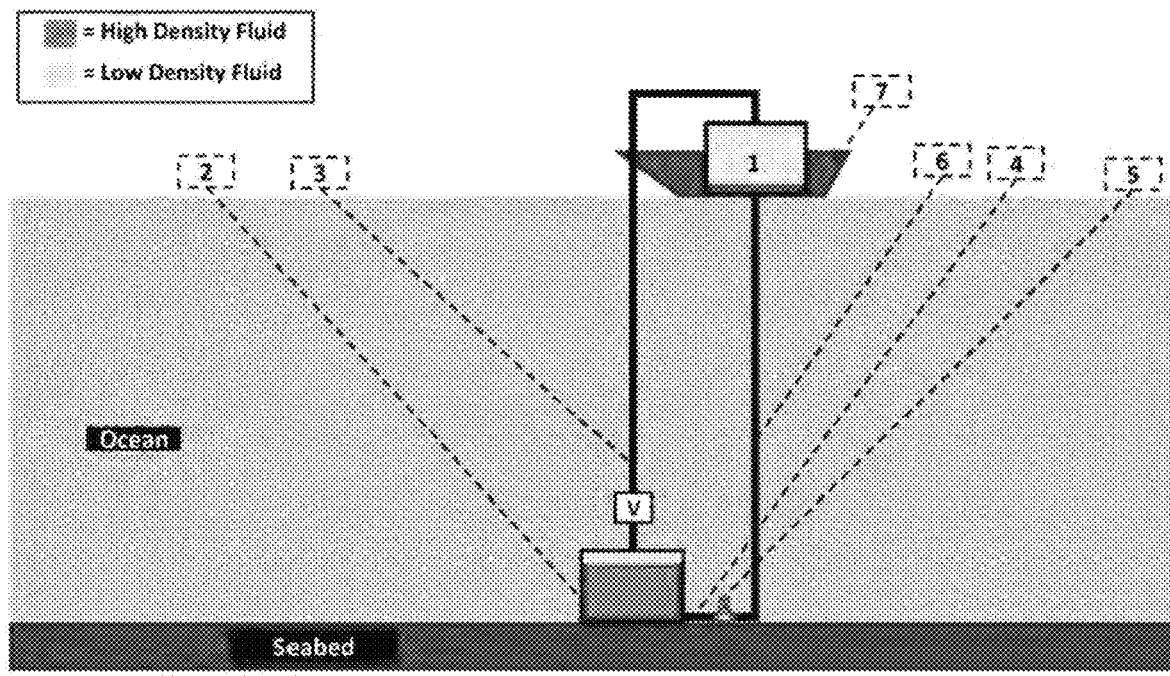
Figure 105 (Above)

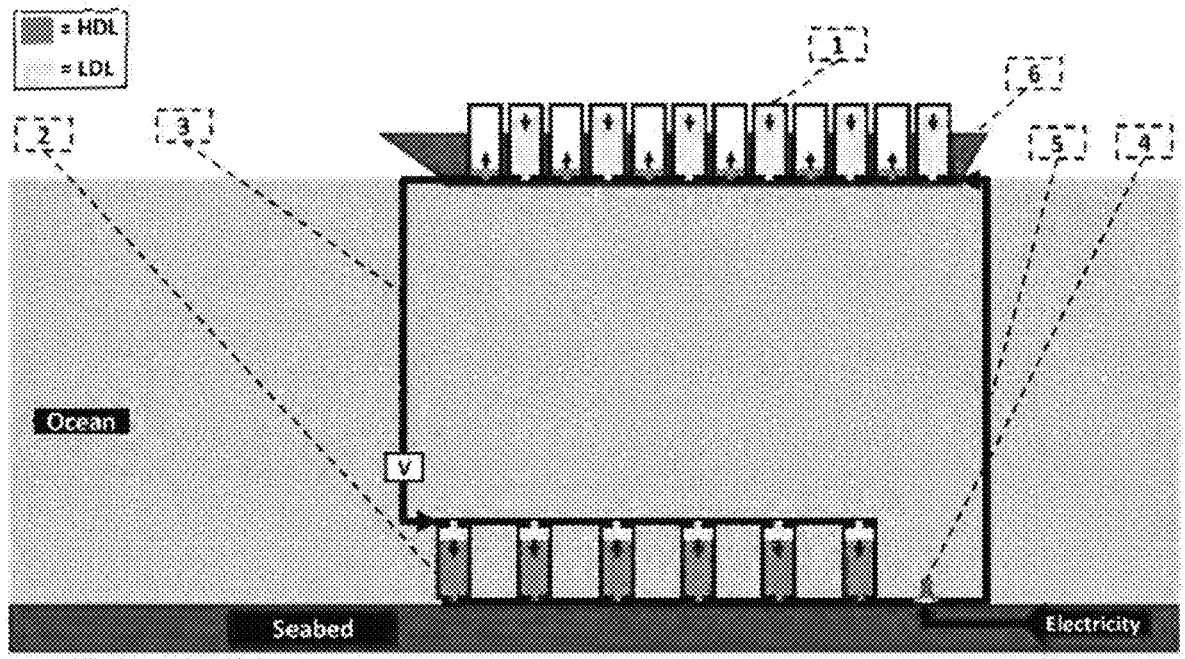
Figure 106 (Above)
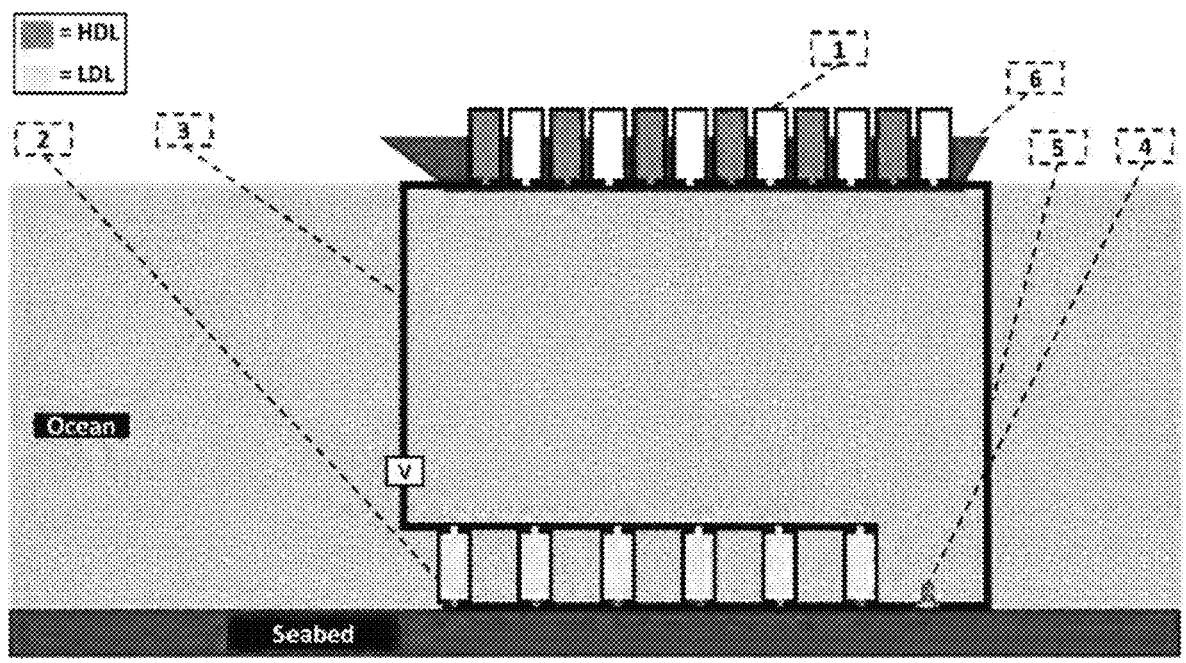
Figure 107 (Above)

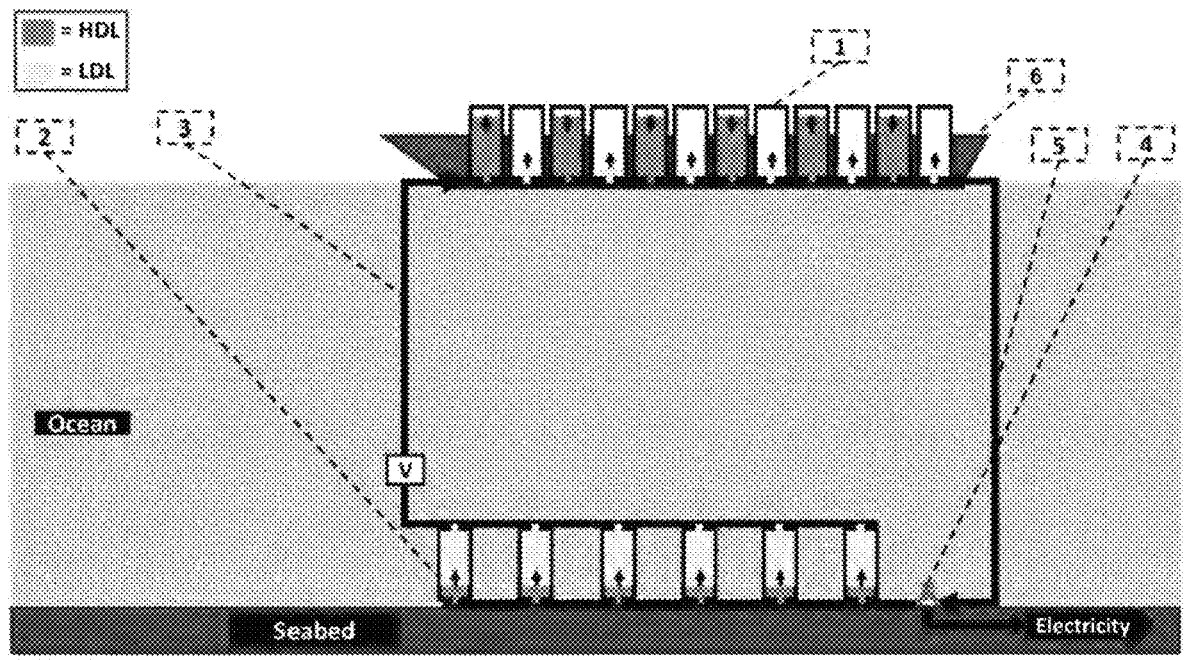
Figure 108 (Above)
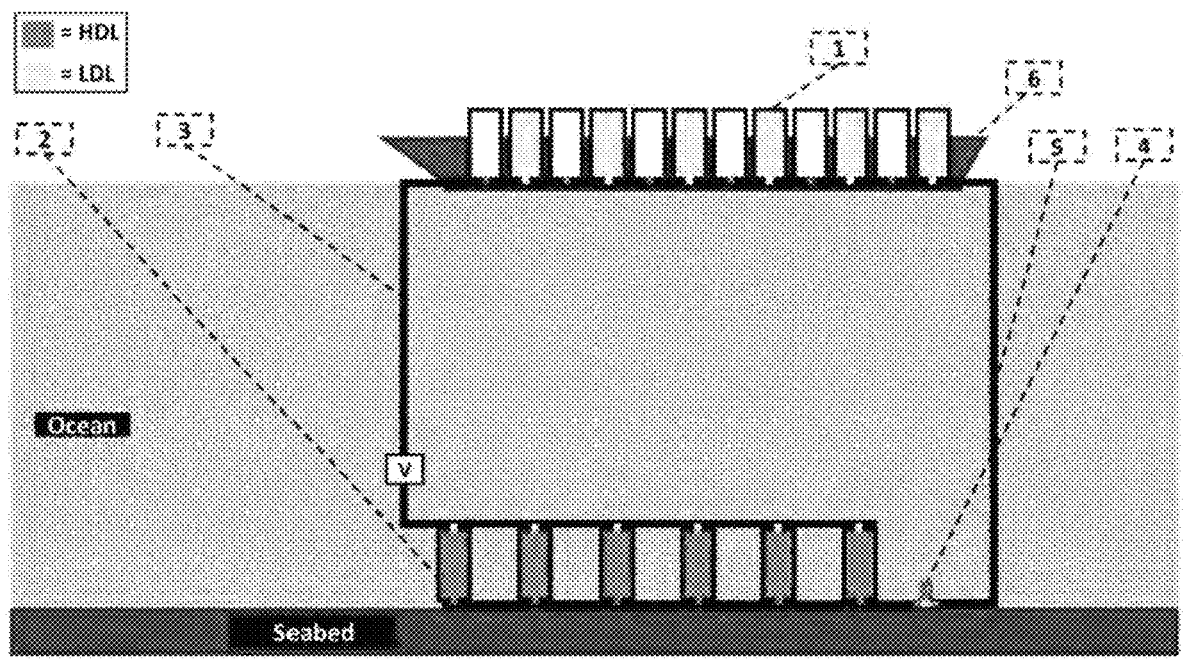
Figure 109 (Above)

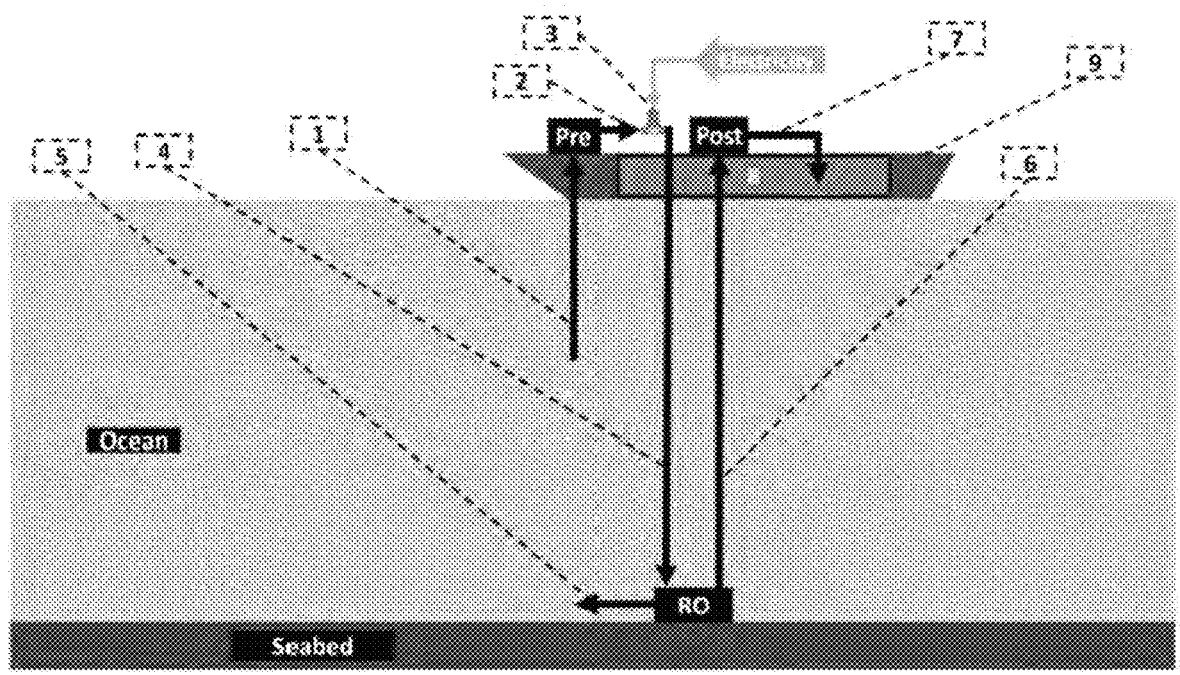
Figure 110 (Above)
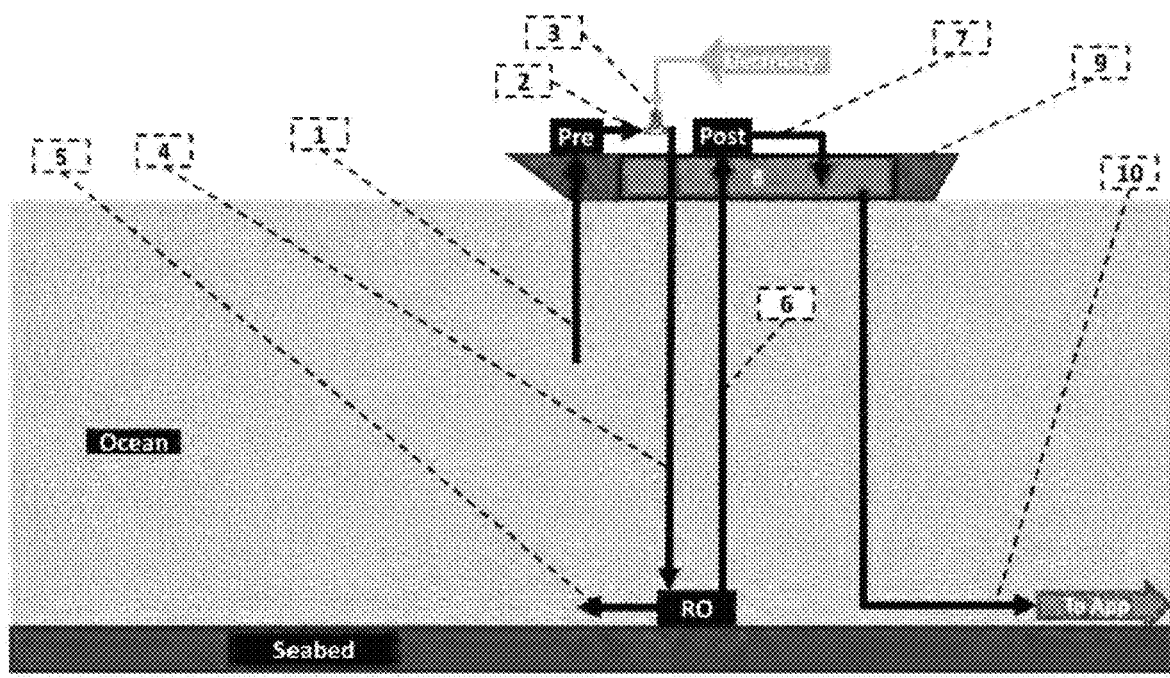
Figure 111 (Above)

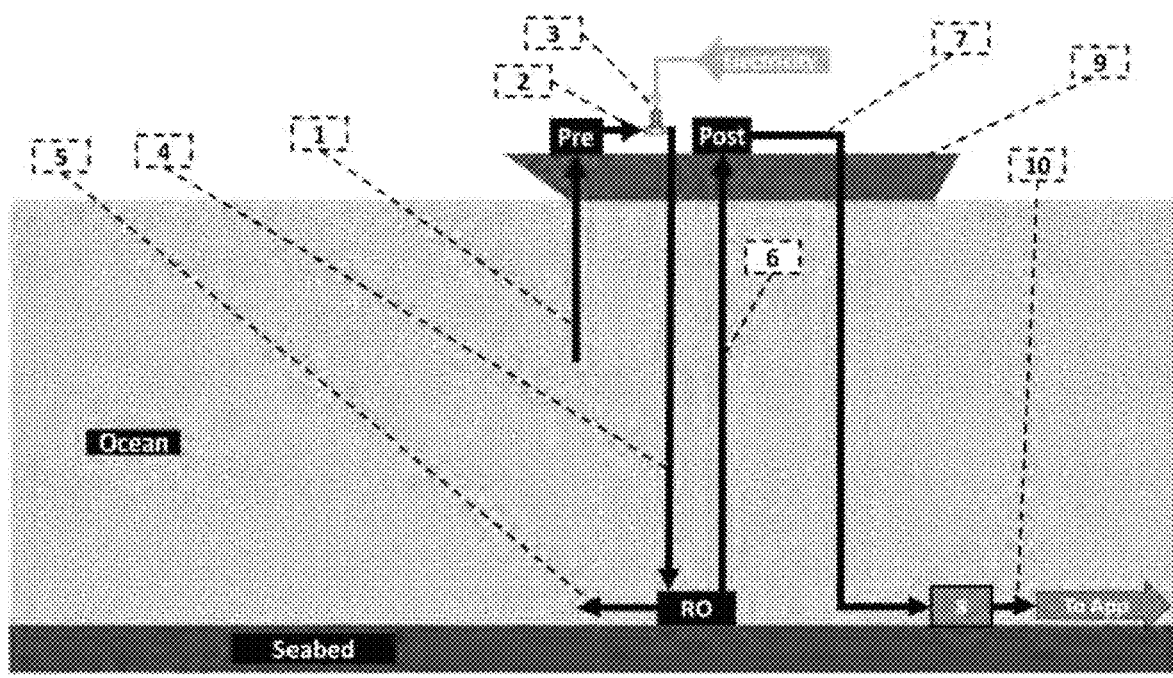
Figure 112 (Above)
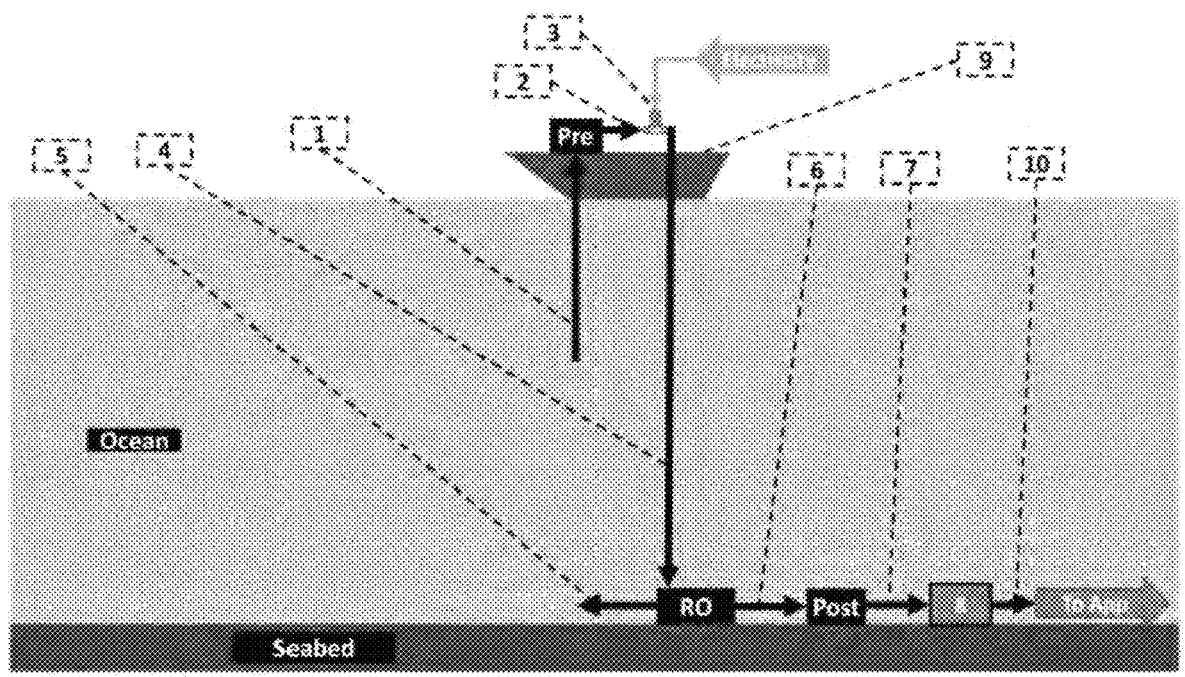
Figure 113 (Above)

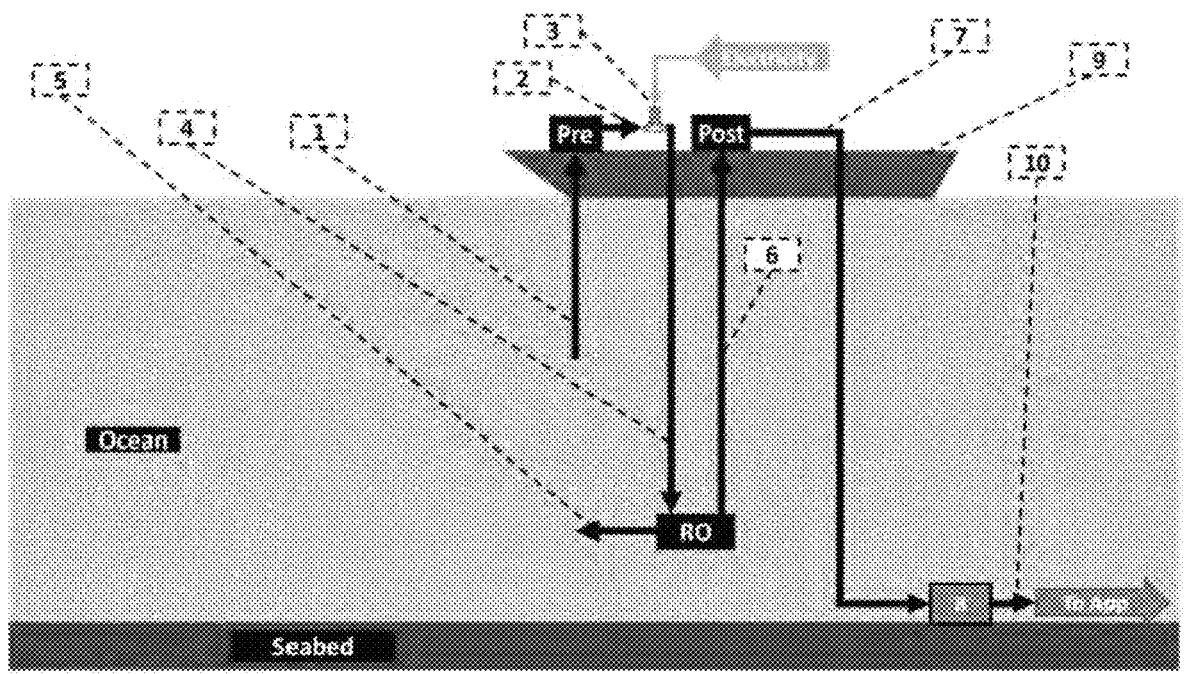
Figure 114 (Above)
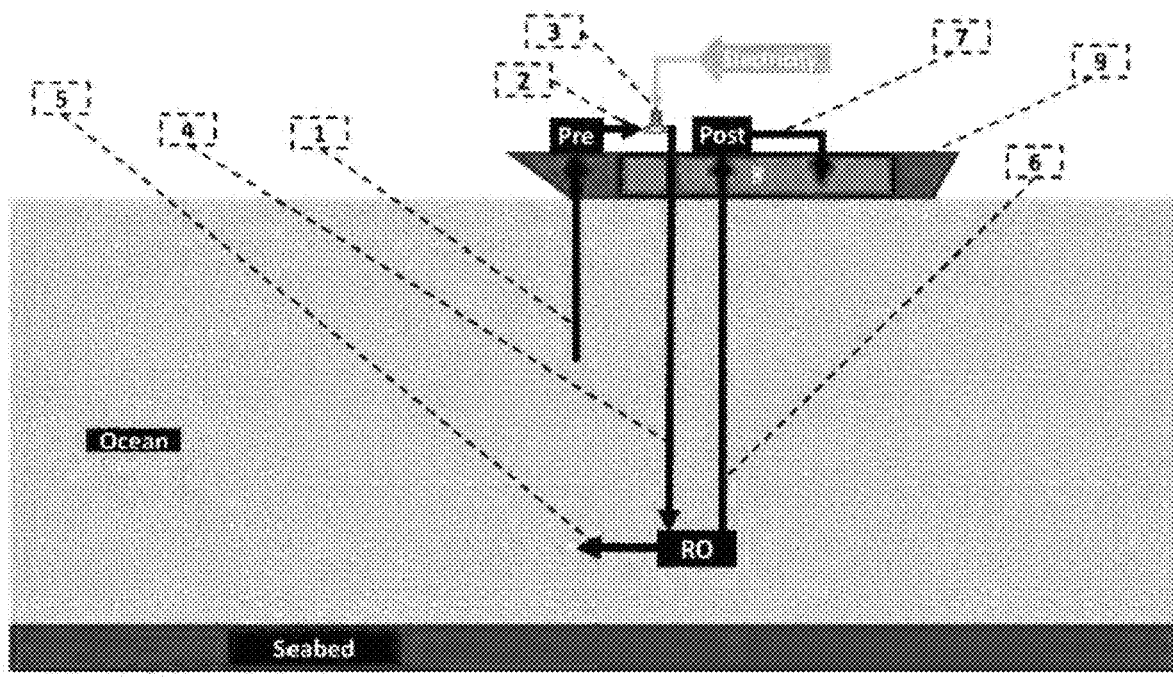
Figure 115 (Above)

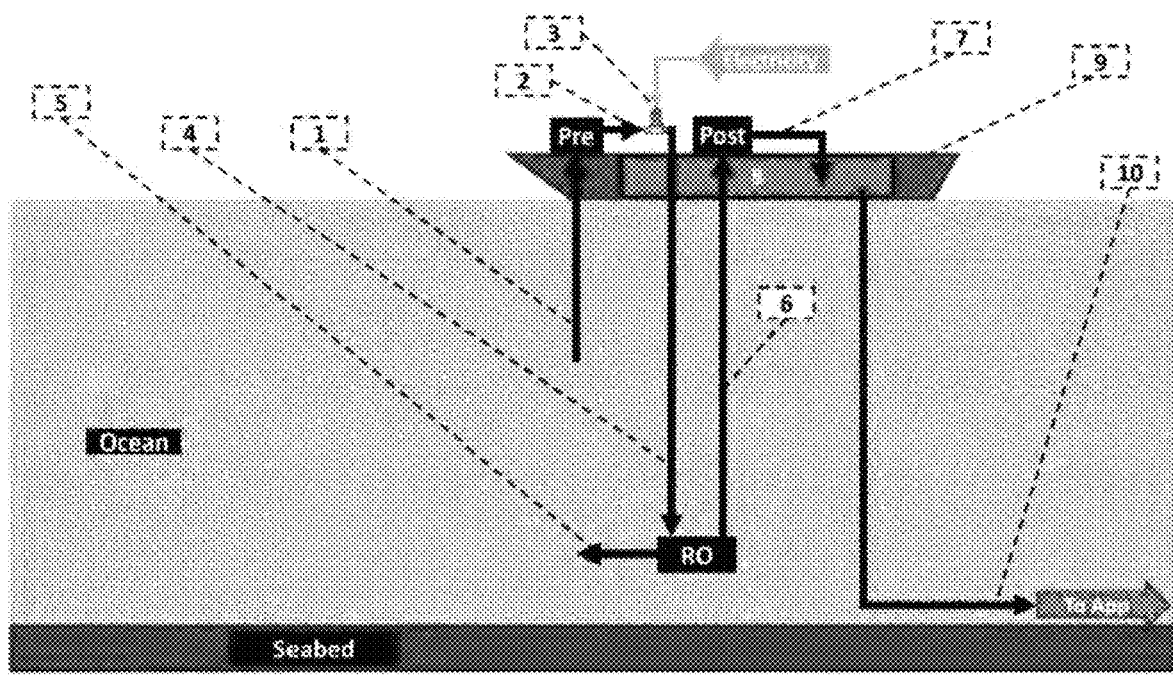
Figure 116 (Above)
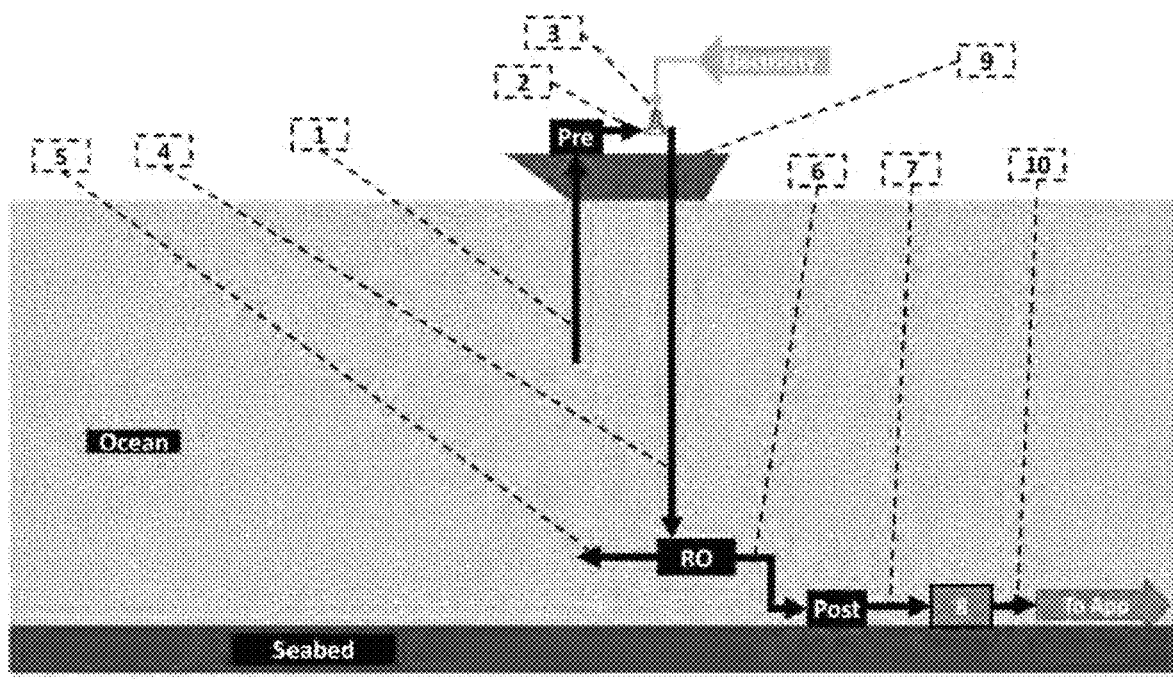
Figure 117 (Above)

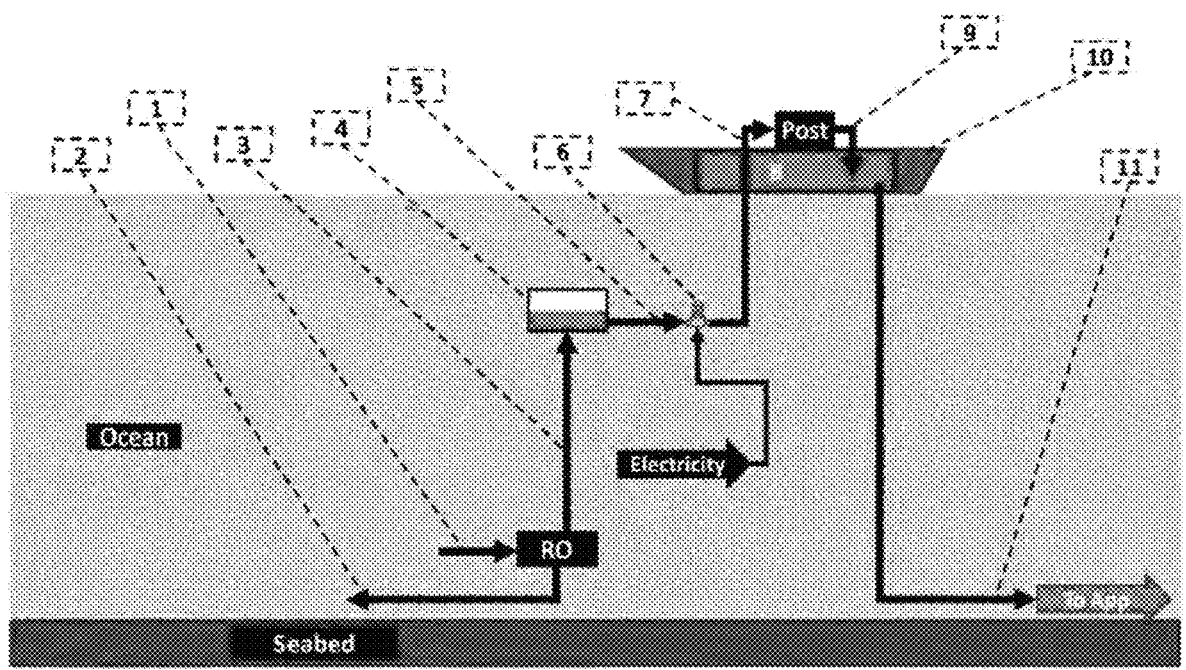
Figure 118 (Above)
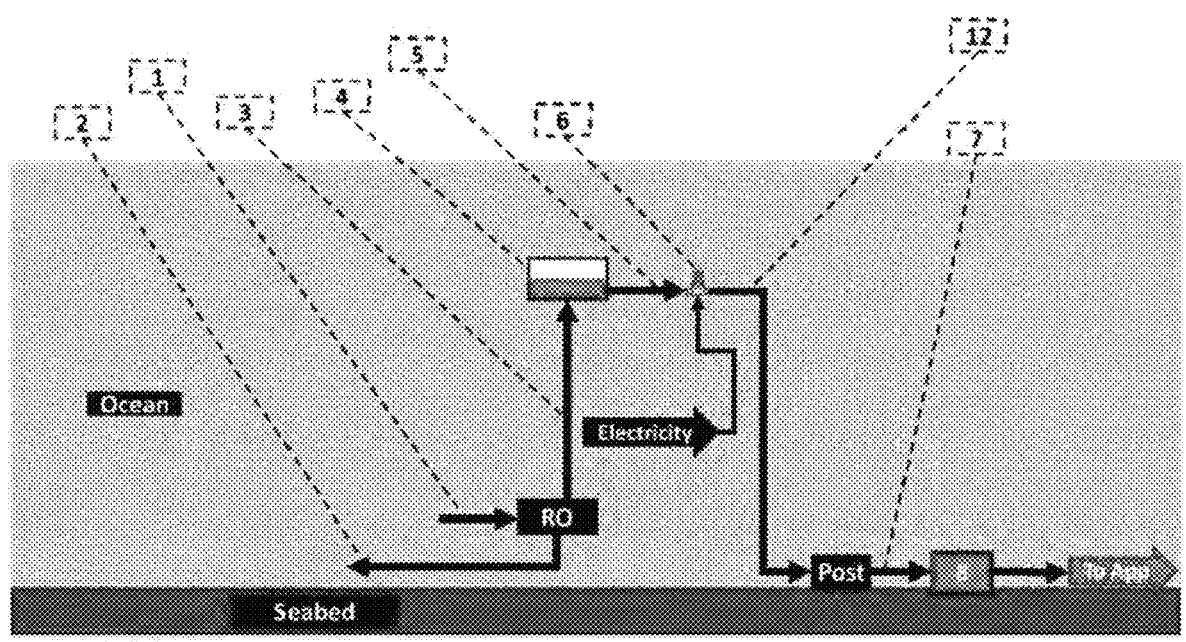
Figure 119 (Above)

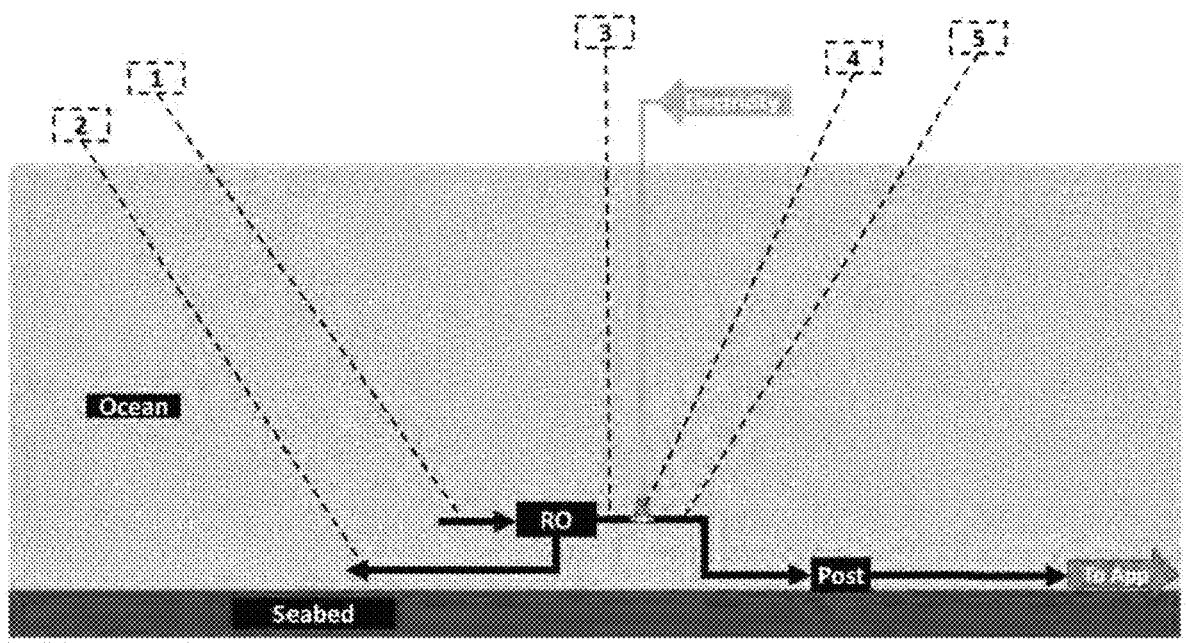
Figure 120 (Above)
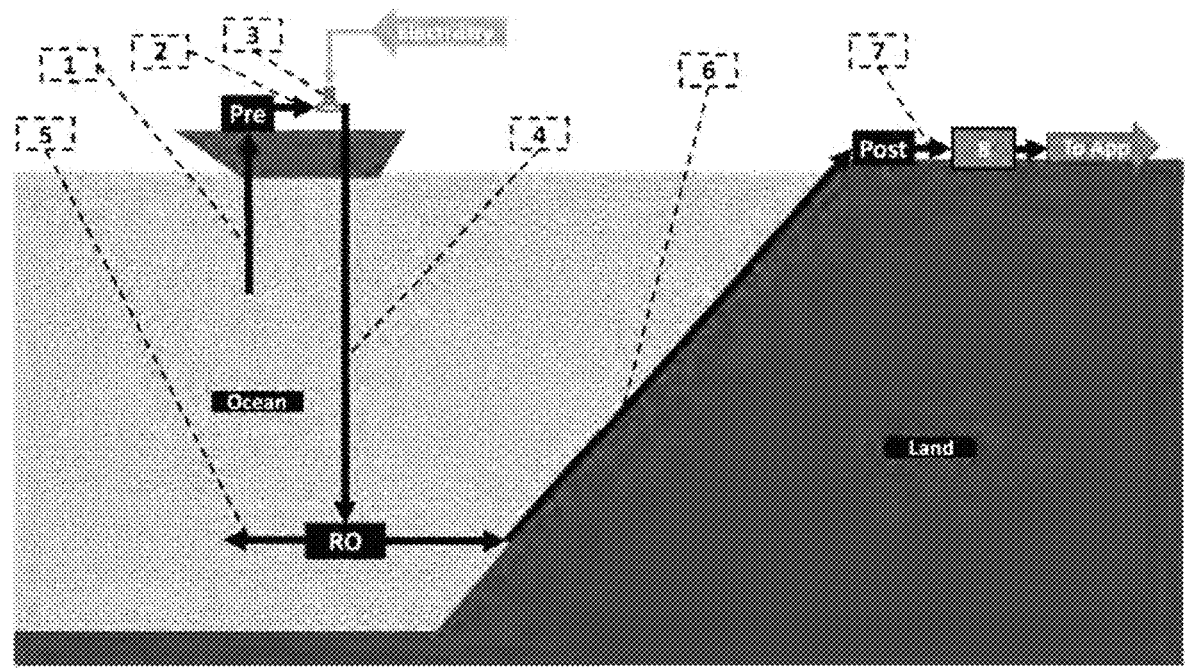
Figure 121 (Above)

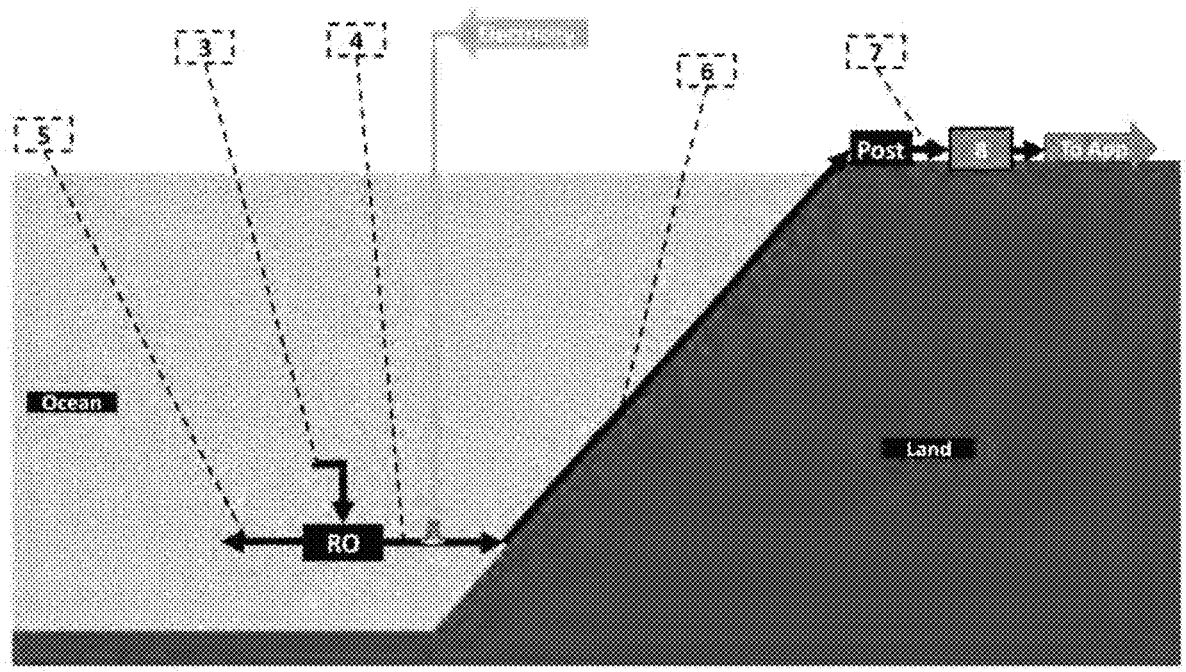
Figure 122 (Above)
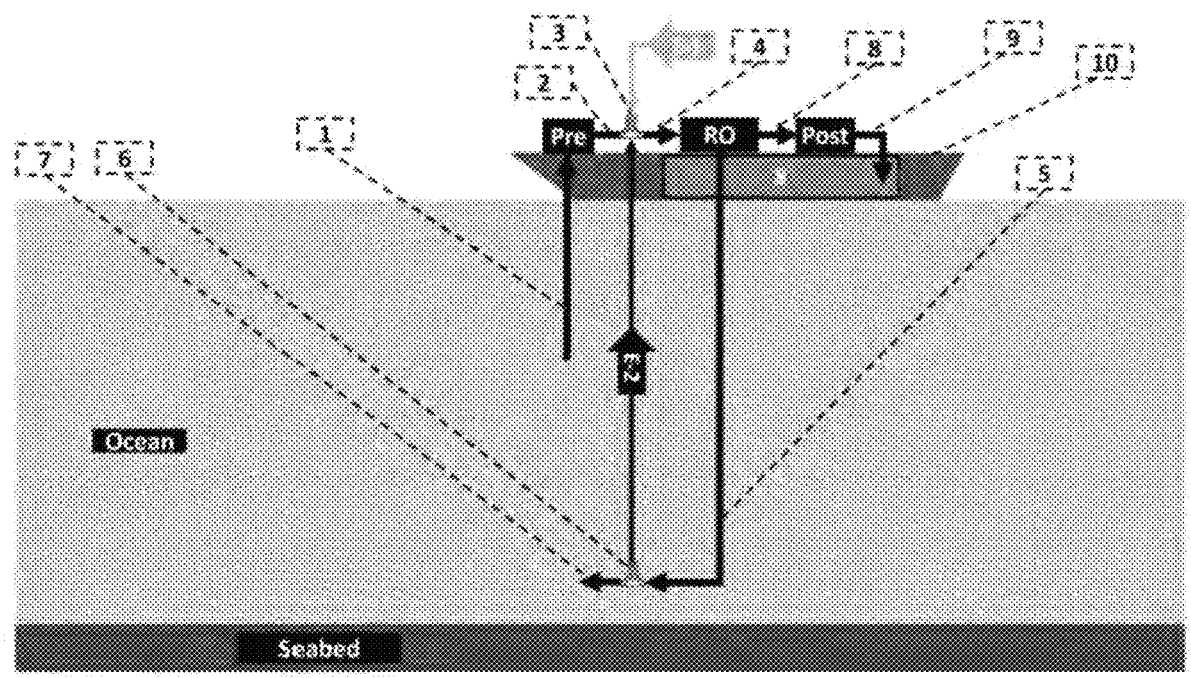
Figure 123 (Above)

POWER GENERATION USING STORAGE RESERVOIRS AT DIFFERENT ELEVATIONS

CROSS REFERENCE TO RELATED APPLICATIONS

The instant application is a continuation-in-part of US application Ser. No. 17/665,472 filed Feb. 4, 2022 which application is a continuation-in-part of PCT/US21/41931 filed Jul. 21, 2021 published as WO2022/016034 which PCT application claims priority to U.S. application Ser. No. 17/214,100 filed on Mar. 26, 2021 which is a continuation-in-part application of U.S. application Ser. No. 16/932,429 filed Jul. 17, 2020. The application also claims priority to U.S. application No. 63/117,355 filed Nov. 23, 2020; U.S. application No. 63/132,778 filed Dec. 31, 2020 and U.S. application No. 63/139,157 filed Jan. 19, 2021. The application also claims priority to U.S. application No. 63/249,100 filed Sep. 28, 2021 titled FLUID DISPLACEMENT ENERGY STORAGE FOR DESALINATION APPLICATION AND FLOW BATTERY APPLICATION. The application also claims priority to U.S. application No. 63/272,760 filed Oct. 28, 2021 titled FLUID DISPLACEMENT ENERGY STORAGE. All of the aforementioned applications are hereby incorporated by reference in their entirety.

SUMMARY OF INVENTION

The present invention relates to systems and methods for energy storage, or energy generation, or combinations thereof.

Some embodiments may be applicable to, for example, an energy storage device. Some embodiments may involve a storage reservoir at a higher elevation, or a higher elevation reservoir, and a storage reservoir at a lower elevation, or lower elevation reservoir. The higher elevation reservoir may be at a higher elevation than the lower elevation reservoir. Energy or power may be stored, or the energy storage system may be 'charged', by pumping a low density fluid from a higher elevation reservoir into the lower elevation reservoir, where the low density fluid displaced high density fluid in the lower elevation reservoir. In some embodiments, displaced high density fluid may exit the lower elevation reservoir. In some embodiments, displaced high density fluid may be transferred to the higher elevation reservoir. In some embodiments, displaced high density fluid may be transferred to the higher elevation reservoir in a closed system. In some embodiments, energy may be released or power may be generated, or the energy storage system may be 'discharged', by allowing high density fluid to displace low density fluid in the lower elevation reservoir. In some embodiments, energy may be released or power may be generated, or the energy storage system may be 'discharged', by allowing high density fluid to displace low density fluid in the lower elevation reservoir and transferring the displaced low density fluid to the higher elevation reservoir. In some embodiments, energy may be released or power may be generated, or the energy storage system may be 'discharged', by allowing high density fluid to displace low density fluid in the lower elevation reservoir and transferring the displaced low density fluid to a power recovery device, such as an electrical generator, or electrical turbine, or pressure exchanger, or any combination thereof. In some embodiments, energy may be released or power may be generated, or the energy storage system may be 'discharged', by allowing high density fluid to displace low density fluid in the lower elevation reservoir, wherein the displaced low density fluid comprises high pressure low density fluid. In some embodiments, energy may be released or power may be generated, or the energy storage system may be 'discharged', by allowing high density fluid to displace low density fluid in the lower elevation reservoir and transferring the displaced low density fluid into a power conversion process, such as an electrical generator, or electrical turbine, or pressure exchanger, or a desalination process, or any combination thereof.

In some embodiments, the higher elevation storage reservoir may be near the elevation of the surface of a body of water. In some embodiments, the higher elevation storage reservoir may be at an elevation substantially greater than the elevation of the surface of a body of water. In some embodiment, the higher elevation storage reservoir may be at an elevation below the surface of a body of water. In some embodiments, the higher elevation storage reservoir may be floating. In some embodiments, the higher elevation storage reservoir may be on land. In some embodiments, the higher elevation storage reservoir may be on a platform above a body of water. In some embodiments, the higher elevation storage reservoir may be floating or suspended beneath the surface of a body of water. In some embodiments, the higher elevation storage reservoir may be located on the seabed or land beneath the surface of a body of water.

In some embodiments, the lower elevation storage reservoir may be near the elevation of the surface of a body of water. In some embodiments, the lower elevation storage reservoir may be at an elevation substantially greater than the elevation of the surface of a body of water. In some embodiment, the lower elevation storage reservoir may be at an elevation below the surface of a body of water. In some embodiments, the lower elevation storage reservoir may be floating. In some embodiments, the lower elevation storage reservoir may be on land. In some embodiments, the lower elevation storage reservoir may be on a platform above a body of water. In some embodiments, the lower elevation storage reservoir may be floating or suspended beneath the surface of a body of water. In some embodiments, the lower elevation storage reservoir may be located on the seabed or land beneath the surface of a body of water.

Some embodiments may be applicable to, for example, desalination. For example, some embodiments may relate to employing energy stored in the energy storage system to power desalination. For example, some embodiments may relate to pressure exchanging low density fluid in the energy storage system with desalination feed water, which may result in the pressurization of desalination feed water and/or supplying a substantial portion of the energy required in desalination. For example, some embodiments may relate to employing desalination feed water as the low density fluid in an energy storage system. For example, some embodiments may relate to employ water, or aqueous solutions, as the low density fluid, or high density fluid, or any combination thereof in an energy storage system. For example, some embodiments may relate to powering desalination with an energy storage system, wherein the low density fluid, or high density fluid, or any combination thereof are chemically different than the desalination feed water.

BRIEF DESCRIPTION OF DRAWINGS

FIG. 1: Storage tank or storage unit configured to store high density fluid and low density fluid, wherein the high density fluid and low density fluid are separate due to a fluid-fluid interface, or cline, or any combination thereof, and wherein low density fluid is entering and high density fluid is exiting.

FIG. 2: Storage tank or storage unit configured to store high density fluid and low density fluid, wherein the high density fluid and low density fluid are separate due to a fluid-fluid interface, or cline, or any combination thereof, and wherein low density fluid is exiting and high density fluid is entering.

FIG. 3: Storage tank or storage unit configured to store high density fluid and low density fluid, wherein the high density fluid and low density fluid are separate due to a floating barrier, and wherein low density fluid is entering and high density fluid is exiting.

FIG. 4: Storage tank or storage unit configured to store high density fluid and low density fluid, wherein the high density fluid and low density fluid are separate due to a floating barrier, and wherein high density fluid is entering and low density fluid is exiting.

FIG. 5: An embodiment with a higher elevation reservoir on land, a lower elevation reservoir underwater, and a pressure exchanger located between the higher elevation reservoir and lower elevation reservoir, and wherein energy is being stored or the system is 'charging'.

FIG. 6: An embodiment with a higher elevation reservoir on land, a lower elevation reservoir underwater, and a pressure exchanger located between the higher elevation reservoir and lower elevation reservoir, and wherein energy is charged or nearly fully charged.

FIG. 7: An embodiment with a higher elevation reservoir on land, a lower elevation reservoir underwater, and a pressure exchanger located between the higher elevation reservoir and lower elevation reservoir, and wherein energy is be generated or the system is 'discharging'.

FIG. 8: An embodiment with a higher elevation reservoir on land, a lower elevation reservoir underwater, and a pressure exchanger located between the higher elevation reservoir and lower elevation reservoir, and wherein the system is discharged or nearly fully discharged.

FIG. 9: An embodiment with a higher elevation reservoir floating on water, a lower elevation reservoir underwater, and a pressure exchanger located between the higher elevation reservoir and lower elevation reservoir, and wherein energy is being stored or the system is 'charging'.

FIG. 10: An embodiment with a higher elevation reservoir floating on water, a lower elevation reservoir underwater, and a pressure exchanger located between the higher elevation reservoir and lower elevation reservoir, and wherein energy is being stored or the system is charged or nearly fully charged.

FIG. 11: An embodiment with a higher elevation reservoir floating on water, a lower elevation reservoir underwater, and a pressure exchanger located between the higher elevation reservoir and lower elevation reservoir, and wherein energy is be generated or the system is 'discharging'.

FIG. 12: An embodiment with a higher elevation reservoir floating on water, a lower elevation reservoir underwater, and a pressure exchanger located between the higher elevation reservoir and lower elevation reservoir, and wherein the system is discharged or nearly fully discharged.

FIG. 13: An embodiment with a higher elevation reservoir floating on water and a lower elevation reservoir underwater, wherein the higher elevation reservoir and lower elevation reservoir comprise multiple storage units configured to store low density fluid and high density fluid.

FIG. 14: An embodiment with a higher elevation reservoir floating on water and a lower elevation reservoir underwater, wherein the higher elevation reservoir and lower elevation reservoir comprise multiple storage units configured to store low density fluid and high density fluid.

FIG. 15: An embodiment with a higher elevation reservoir floating on water and a lower elevation reservoir underwater, wherein the higher elevation reservoir and lower elevation reservoir comprise multiple storage units configured to store low density fluid and high density fluid.

FIG. 16: An embodiment with a higher elevation reservoir floating on water and a lower elevation reservoir underwater, wherein the higher elevation reservoir and lower elevation reservoir comprise multiple storage units configured to store low density fluid and high density fluid.

FIG. 17: An embodiment with a higher elevation reservoir floating on water and a lower elevation reservoir underwater, wherein the higher elevation reservoir comprises storage units designed to store high density fluid separate from low density fluid.

FIG. 18: An embodiment with a higher elevation reservoir floating on water and a lower elevation reservoir underwater, wherein the higher elevation reservoir comprises storage units designed to store high density fluid separate from low density fluid.

FIG. 19: An embodiment with a higher elevation reservoir floating on water and a lower elevation reservoir underwater, wherein the higher elevation reservoir comprises storage units designed to store high density fluid separate from low density fluid, FIG. 20: An embodiment with a higher elevation reservoir floating on water and a lower elevation reservoir underwater, wherein the higher elevation reservoir comprises storage units designed to store high density fluid separate from low density fluid.

FIG. 21: An embodiment with a higher elevation reservoir on land and a lower elevation reservoir underwater, wherein there is a pressure exchanger located between the higher elevation reservoir and lower elevation reservoir, and wherein the higher elevation reservoir comprises storage units designed to store high density fluid separate from low density fluid.

FIG. 22: An embodiment with a higher elevation reservoir on land and a lower elevation reservoir underwater, wherein there is a pressure exchanger located between the higher elevation reservoir and lower elevation reservoir, and wherein the higher elevation reservoir comprises storage units designed to store high density fluid separate from low density fluid.

FIG. 23: An embodiment with a higher elevation reservoir on land and a lower elevation reservoir underwater, wherein there is a pressure exchanger located between the higher elevation reservoir and lower elevation reservoir, and wherein the higher elevation reservoir comprises storage units designed to store high density fluid separate from low density fluid.

FIG. 24: An embodiment with a higher elevation reservoir on land and a lower elevation reservoir underwater, wherein there is a pressure exchanger located between the higher elevation reservoir and lower elevation reservoir, and wherein the higher elevation reservoir comprises storage units designed to store high density fluid separate from low density fluid.

FIG. 25: An embodiment with a higher elevation reservoir on land and a lower elevation reservoir on land, wherein there is a pressure exchanger located between the higher elevation reservoir and lower elevation reservoir, and wherein the higher elevation reservoir comprises storage units designed to store high density fluid separate from low density fluid.

FIG. 26: An embodiment with a higher elevation reservoir on land and a lower elevation reservoir on land, wherein there is a pressure exchanger located between the higher elevation reservoir and lower elevation reservoir, and wherein the higher elevation reservoir comprises storage units designed to store high density fluid separate from low density fluid.

FIG. 27: An embodiment with a higher elevation reservoir on land and a lower elevation reservoir on land, wherein there is a pressure exchanger located between the higher elevation reservoir and lower elevation reservoir, and wherein the higher elevation reservoir comprises storage units designed to store high density fluid separate from low density fluid.

FIG. 28: An embodiment with a higher elevation reservoir on land and a lower elevation reservoir on land, wherein there is a pressure exchanger located between the higher elevation reservoir and lower elevation reservoir, and wherein the higher elevation reservoir comprises storage units designed to store high density fluid separate from low density fluid.

FIG. 29: An embodiment with a higher elevation reservoir on land and a lower elevation reservoir on land, wherein there is a pressure exchanger located between the higher elevation reservoir and lower elevation reservoir, and wherein the higher elevation reservoir and lower elevation reservoir comprises storage units designed to store high density fluid separate from low density fluid.

FIG. 30: An embodiment with a higher elevation reservoir on land and a lower elevation reservoir on land, wherein there is a pressure exchanger located between the higher elevation reservoir and lower elevation reservoir, and wherein the higher elevation reservoir and lower elevation reservoir comprises storage units designed to store high density fluid separate from low density fluid.

FIG. 31: An embodiment with a higher elevation reservoir on land and a lower elevation reservoir on land, wherein there is a pressure exchanger located between the higher elevation reservoir and lower elevation reservoir, and wherein the higher elevation reservoir and lower elevation reservoir comprises storage units designed to store high density fluid separate from low density fluid.

FIG. 32: An embodiment with a higher elevation reservoir on land and a lower elevation reservoir on land, wherein there is a pressure exchanger located between the higher elevation reservoir and lower elevation reservoir, and wherein the higher elevation reservoir and lower elevation reservoir comprises storage units designed to store high density fluid separate from low density fluid.

FIG. 33: An embodiment with a higher elevation reservoir on land and a lower elevation reservoir on land, wherein there is a pressure exchanger located between the higher elevation reservoir and lower elevation reservoir, and wherein the higher elevation reservoir and lower elevation reservoir comprise storage units designed to store high density fluid and low density fluid.

FIG. 34: An embodiment with a higher elevation reservoir on land and a lower elevation reservoir on land, wherein there is a pressure exchanger located between the higher elevation reservoir and lower elevation reservoir, and wherein the higher elevation reservoir and lower elevation reservoir comprise storage units designed to store high density fluid and low density fluid.

FIG. 35: An embodiment with a higher elevation reservoir on land and a lower elevation reservoir on land, wherein there is a pressure exchanger located between the higher elevation reservoir and lower elevation reservoir, and wherein the higher elevation reservoir and lower elevation reservoir comprise storage units designed to store high density fluid and low density fluid.

FIG. 36: An embodiment with a higher elevation reservoir on land and a lower elevation reservoir on land, wherein there is a pressure exchanger located between the higher elevation reservoir and lower elevation reservoir, and wherein the higher elevation reservoir and lower elevation reservoir comprise storage units designed to store high density fluid and low density fluid.

FIG. 37: An embodiment with a higher elevation reservoir on land and a lower elevation reservoir underground, and wherein the lower elevation reservoir is designed to store high density fluid and low density fluid.

FIG. 38: An embodiment with a higher elevation reservoir on land and a lower elevation reservoir underground, and wherein the lower elevation reservoir is designed to store high density fluid and low density fluid.

FIG. 39: An embodiment with a higher elevation reservoir on land and a lower elevation reservoir underground, and wherein the lower elevation reservoir is designed to store high density fluid and low density fluid.

FIG. 40: An embodiment with a higher elevation reservoir on land and a lower elevation reservoir underground, and wherein the lower elevation reservoir is designed to store high density fluid and low density fluid.

FIG. 41: An embodiment with a higher elevation reservoir on land and a lower elevation reservoir underwater, and wherein the elevation of the higher elevation reservoir is substantially greater than the elevation of the water level of the body of water.

FIG. 42: An embodiment with a higher elevation reservoir on land and a lower elevation reservoir underwater, and wherein the elevation of the higher elevation reservoir is substantially greater than the elevation of the water level of the body of water, FIG. 43: An embodiment with a higher elevation reservoir on land and a lower elevation reservoir underwater, and wherein the elevation of the higher elevation reservoir is substantially greater than the elevation of the water level of the body of water.

FIG. 44: An embodiment with a higher elevation reservoir on land and a lower elevation reservoir underwater, and wherein the elevation of the higher elevation reservoir is substantially greater than the elevation of the water level of the body of water.

FIG. 45: An embodiment with a higher elevation reservoir on land and a lower elevation reservoir underwater, wherein there is a pressure exchanger located between the higher elevation reservoir and lower elevation reservoir, and wherein the elevation of the higher elevation reservoir is substantially greater than the elevation of the water level of the body of water.

FIG. 46: An embodiment with a higher elevation reservoir on land and a lower elevation reservoir underwater, wherein there is a pressure exchanger located between the higher elevation reservoir and lower elevation reservoir, and wherein the elevation of the higher elevation reservoir is substantially greater than the elevation of the water level of the body of water.

FIG. 47: An embodiment with a higher elevation reservoir on land and a lower elevation reservoir underwater, wherein there is a pressure exchanger located between the higher elevation reservoir and lower elevation reservoir, and wherein the elevation of the higher elevation reservoir is substantially greater than the elevation of the water level of the body of water.

FIG. 48: An embodiment with a higher elevation reservoir on land and a lower elevation reservoir underwater, wherein there is a pressure exchanger located between the higher elevation reservoir and lower elevation reservoir, and wherein the elevation of the higher elevation reservoir is substantially greater than the elevation of the water level of the body of water.

FIG. 49: An embodiment with a higher elevation reservoir on land and a lower elevation reservoir underwater, wherein there is a pressure exchanger located between the higher elevation reservoir and lower elevation reservoir at an elevation near the elevation of the water level of the body of water, and wherein the elevation of the higher elevation reservoir is substantially greater than the elevation of the water level of the body of water, FIG. 50: An embodiment with a higher elevation reservoir on land and a lower elevation reservoir underwater, wherein there is a pressure exchanger located between the higher elevation reservoir and lower elevation reservoir at an elevation near the elevation of the water level of the body of water, and wherein the elevation of the higher elevation reservoir is substantially greater than the elevation of the water level of the body of water.

FIG. 51: An embodiment with a higher elevation reservoir on land and a lower elevation reservoir underwater, wherein there is a pressure exchanger located between the higher elevation reservoir and lower elevation reservoir at an elevation near the elevation of the water level of the body of water, and wherein the elevation of the higher elevation reservoir is substantially greater than the elevation of the water level of the body of water.

FIG. 52: An embodiment with a higher elevation reservoir on land and a lower elevation reservoir underwater, wherein there is a pressure exchanger located between the higher elevation reservoir and lower elevation reservoir at an elevation near the elevation of the water level of the body of water, and wherein the elevation of the higher elevation reservoir is substantially greater than the elevation of the water level of the body of water.

FIG. 53: An embodiment with a higher elevation reservoir on land and a lower elevation reservoir underwater, wherein there is a pressure exchanger located between the higher elevation reservoir and lower elevation reservoir at an elevation near the elevation of the water level of the body of water, and wherein the elevation of the higher elevation reservoir is substantially greater than the elevation of the water level of the body of water.

FIG. 54: An embodiment with a higher elevation reservoir on land and a lower elevation reservoir underwater, wherein there is a pressure exchanger located between the higher elevation reservoir and lower elevation reservoir, and wherein the elevation of the higher elevation reservoir is substantially greater than the elevation of the water level of the body of water.

FIG. 55: An embodiment with a higher elevation reservoir on land and a lower elevation reservoir underwater, wherein there is a pressure exchanger located between the higher elevation reservoir and lower elevation reservoir, and wherein the elevation of the higher elevation reservoir is substantially greater than the elevation of the water level of the body of water.

FIG. 56: An embodiment with a higher elevation reservoir on land and a lower elevation reservoir underwater, wherein there is a pressure exchanger located between the higher elevation reservoir and lower elevation reservoir, and wherein the elevation of the higher elevation reservoir is substantially greater than the elevation of the water level of the body of water.

FIG. 57: An embodiment with a higher elevation reservoir underwater and a lower elevation reservoir underwater, wherein there is a pressure exchanger located between the higher elevation reservoir and lower elevation reservoir, and wherein the elevation of the higher elevation reservoir is substantially greater than the elevation of the water level of the body of water.

FIG. 58: An embodiment with a higher elevation reservoir underwater and a lower elevation reservoir underwater, wherein there is a pressure exchanger located between the higher elevation reservoir and lower elevation reservoir, and wherein the elevation of the higher elevation reservoir is substantially greater than the elevation of the water level of the body of water.

FIG. 59: An embodiment with a higher elevation reservoir underwater and a lower elevation reservoir underwater, wherein there is a pressure exchanger located between the higher elevation reservoir and lower elevation reservoir, and wherein the elevation of the higher elevation reservoir is substantially greater than the elevation of the water level of the body of water.

FIG. 60: An embodiment with a higher elevation reservoir underwater and a lower elevation reservoir underwater, wherein there is a pressure exchanger located between the higher elevation reservoir and lower elevation reservoir, and wherein the elevation of the higher elevation reservoir is substantially greater than the elevation of the water level of the body of water.

FIG. 61: An embodiment with a pump and/or turbine and/or generator located near the lower elevation reservoir and fluidly connected to the high density fluid.

FIG. 62: An embodiment with a pump and/or turbine and/or generator located near the lower elevation reservoir and fluidly connected to the high density fluid.

FIG. 63: An embodiment with a pump and/or turbine and/or generator located near the lower elevation reservoir and fluidly connected to the high density fluid.

FIG. 64: An embodiment with a pump and/or turbine and/or generator located near the lower elevation reservoir and fluidly connected to the high density fluid.

FIG. 65: Energy Storage Charging, Desalination Powered by External Source

FIG. 66: Energy Storage Steady State, Desalination Powered by External Source FIG. 67: Energy Storage Discharging, Desalination Powered by Pressure Exchange with High Pressure Low Density Fluid Produced by Discharging Energy Storage System FIG. 68: Energy Storage Steady State, Desalination Powered by Pressure Exchange with Recirculating Low Density Fluid FIG. 69: Energy Storage Charging, Desalination may be Powered by Pressure Exchange a Portion of High Pressure Low Density Fluid Produced by Energy Storage System Charging, a Portion of Low Density Fluid may be Recirculated FIG. 70: Energy Storage Discharging, Splitting High Pressure Low Density Fluid Stream to Power Simultaneous Electricity Generation and Desalination FIG. 71: Energy Storage Charging, Desalinating Water with External Power Source, Embodiment with Direct Fluid Displacement in Lower Elevation Reservoir FIG. 72: Energy Storage Charging, Desalinating Water with External Power Source with Separate Pump from Energy Storage Pump FIG. 73: Energy Storage Charging, Desalinating Water with Same Pump as Employed in Energy Storage or Same Fluid as Low Density Fluid Employed in Energy Storage or any Combination Thereof FIG. 74: Energy Storage Steady State, Desalinating Water with External Power Source FIG. 75: Energy Storage Steady State, Pressurizing Desalination Feed Water using Same Pump as is Employed in Energy Storage FIG. 76: Energy Storage Discharging, High Pressure Low Density Fluid from Discharging Employed as at Least a Portion of Pressurized Desalination Feed Water FIG. 77: Energy Storage Discharging, High Pressure Low Density Fluid from Discharging Employed as at Least a Portion of Pressurized Desalination Feed Water FIG. 78: Energy Storage Discharging, High Pressure Low Density Fluid from Discharging Employed as at Least a Portion of Pressurized Desalination Feed Water and for Power Generation FIG. 79: Energy Storage Discharging, High Pressure Low Density Fluid from Discharging Employed as at Least a Portion of Pressurized Desalination Feed Water and for Power Generation FIG. 80: Energy Storage Charging, Desalinating Water with External Power Source, Embodiment may comprise Direct Fluid Displacement in Lower Elevation Reservoir FIG. 81: Energy Storage Charging, Desalinating Water with same Pump Employed in Energy Storage, or a Portion of the High Pressure Low Density Fluid Comprising Desalination Feed Water, or any combination thereof, Embodiment may comprise Direct Fluid Displacement in Lower Elevation Reservoir FIG. 82: Desalination, or Power Production, or any Combination Thereof Powered by Power Generated from the use of at Least a Portion of Low Density Fluid in Energy Storage System as a Fuel FIG. 83: An embodiment with subsea, underground lower elevation reservoir.

FIG. 84: An embodiment with subsea, underground lower elevation reservoir.

FIG. 85: An embodiment with subsea, underground lower elevation reservoir.

FIG. 86: An embodiment with subsea, underground lower elevation reservoir.

FIG. 87: An embodiment with subsea, underground lower elevation reservoir.

FIG. 88: An embodiment with subsea, underground lower elevation reservoir.

FIG. 89: An embodiment with subsea, underground lower elevation reservoir.

FIG. 90: An embodiment with subsea, underground lower elevation reservoir.

FIG. 91: Energy Storage Charging, Desalination occurring at Medium Elevation or Subsea at Medium Elevation FIG. 92: Energy Storage Steady State, Desalination occurring at Medium Elevation or Subsea at Medium Elevation FIG. 93: Energy Storage Discharging, Desalination occurring at Medium Elevation or Subsea at Medium Elevation, Desalination Pressurization Powered by Pressure Exchange with High Pressure Low Density Fluid from Discharging Energy Storage System FIG. 94: Energy Storage Charging, Desalination occurring at Medium Elevation or Subsea at Medium Elevation FIG. 95: Energy Storage Steady State, Desalination occurring at Medium Elevation or Subsea at Medium Elevation FIG. 96: Energy Storage Discharging, Desalination occurring at Medium Elevation or Subsea at Medium Elevation, High Pressure Low Density Fluid from Energy Storage Discharging may Comprise Pressurized Desalination Feed Water and may Provide at Least a Portion of the Power for Desalination FIG. 97: Energy Storage Discharging, Desalination occurring at Medium Elevation or Subsea at Medium Elevation, High Pressure Low Density Fluid from Energy Storage Discharging may Comprise Pressurized Desalination Feed Water and may Provide at Least a Portion of the Power for Desalination, at Least a Portion of Power may be Extracted from High Pressure Low Density Fluid before being Employed as Pressurized Desalination Feed Water FIG. 98: A system for storing or generating power by transferring low density fluid and a high density fluid between a lower elevation reservoir and a higher elevation reservoir employing a lower elevation pump and/or power generation device wherein the system is charging.

FIG. 99: A system for storing or generating power by transferring low density fluid and a high density fluid between a lower elevation reservoir and a higher elevation reservoir employing a lower elevation pump and/or power generation device wherein the system is at a steady state.

FIG. 100: A system for storing or generating power by transferring low density fluid and a high density fluid between a lower elevation reservoir and a higher elevation reservoir employing a lower elevation pump and/or power generation device wherein the system is discharging, FIG. 101: A system for storing or generating power by transferring low density fluid and a high density fluid between a lower elevation reservoir and a higher elevation reservoir employing a lower elevation pump and/or power generation device wherein the system is at a steady state.

FIG. 102: A system for storing or generating power by transferring low density fluid and a high density fluid between a lower elevation reservoir and a higher elevation reservoir employing a lower elevation pump and/or power generation device wherein the system is charging.

FIG. 103: A system for storing or generating power by transferring low density fluid and a high density fluid between a lower elevation reservoir and a higher elevation reservoir employing a lower elevation pump and/or power generation device wherein the system is at a steady state.

FIG. 104: A system for storing or generating power by transferring low density fluid and a high density fluid between a lower elevation reservoir and a higher elevation reservoir employing a lower elevation pump and/or power generation device wherein the system is discharging.

FIG. 105: A system for storing or generating power by transferring low density fluid and a high density fluid between a lower elevation reservoir and a higher elevation reservoir employing a lower elevation pump and/or power generation device wherein the system is at a steady state.

FIG. 106: A system for storing or generating power by transferring low density fluid and a high density fluid between a lower elevation reservoir and a higher elevation reservoir employing a lower elevation pump and/or power generation device wherein high density fluid and low density fluid are stored separately in the higher elevation reservoir and wherein the system is charging.

FIG. 107: A system for storing or generating power by transferring low density fluid and a high density fluid between a lower elevation reservoir and a higher elevation reservoir employing a lower elevation pump and/or power generation device wherein high density fluid and low density fluid are stored separately in the higher elevation reservoir and wherein the system is at a steady state.

FIG. 108: A system for storing or generating power by transferring low density fluid and a high density fluid between a lower elevation reservoir and a higher elevation reservoir employing a lower elevation pump and/or power generation device wherein high density fluid and low density fluid are stored separately in the higher elevation reservoir and wherein the system is discharging.

FIG. 109: A system for storing or generating power by transferring low density fluid and a high density fluid between a lower elevation reservoir and a higher elevation reservoir employing a lower elevation pump and/or power generation device wherein high density fluid and low density fluid are stored separately in the higher elevation reservoir and wherein the system is at a steady state, FIG. 110: A system or process for desalinating water wherein at least a portion of power is provided by the difference in gravitational hydrostatic pressure between desalination feed and desalinated water due to the difference in density between desalination feed and desalinated water and the elevation difference of a liquid column, FIG. 111: A system or process for desalinating water wherein at least a portion of power is provided by the difference in gravitational hydrostatic pressure between desalination feed and desalinated water due to the difference in density between desalination feed and desalinated water and the elevation difference of a liquid column.

FIG. 112: A system or process for desalinating water wherein at least a portion of power is provided by the difference in gravitational hydrostatic pressure between desalination feed and desalinated water due to the difference in density between desalination feed and desalinated water and the elevation difference of a liquid column.

FIG. 113: A system or process for desalinating water wherein at least a portion of power is provided by the difference in gravitational hydrostatic pressure between desalination feed and desalinated water due to the difference in density between desalination feed and desalinated water and the elevation difference of a liquid column.

FIG. 114: A system or process for desalinating water wherein at least a portion of power is provided by the difference in gravitational hydrostatic pressure between desalination feed and desalinated water due to the difference in density between desalination feed and desalinated water and the elevation difference of a liquid column.

FIG. 115: A system or process for desalinating water wherein at least a portion of power is provided by the difference in gravitational hydrostatic pressure between desalination feed and desalinated water due to the difference in density between desalination feed and desalinated water and the elevation difference of a liquid column.

FIG. 116: A system or process for desalinating water wherein at least a portion of power is provided by the difference in gravitational hydrostatic pressure between desalination feed and desalinated water due to the difference in density between desalination feed and desalinated water and the elevation difference of a liquid column.

FIG. 117: A system or process for desalinating water wherein at least a portion of power is provided by the difference in gravitational hydrostatic pressure between desalination feed and desalinated water due to the difference in density between desalination feed and desalinated water and the elevation difference of a liquid column.

FIG. 118: A system or process for desalinating water wherein at least a portion of power is provided by the difference in gravitational hydrostatic pressure between desalination feed and desalinated water due to the difference in density between desalination feed and desalinated water and the elevation difference of a liquid column.

FIG. 119: A system or process for desalinating water wherein at least a portion of power is provided by the difference in gravitational hydrostatic pressure between desalination feed and desalinated water due to the difference in density between desalination feed and desalinated water and the elevation difference of a liquid column.

FIG. 120: A system or process for desalinating water wherein at least a portion of power is provided by the difference in gravitational hydrostatic pressure between desalination feed and desalinated water due to the difference in density between desalination feed and desalinated water and the elevation difference of a liquid column.

FIG. 121: A system or process for desalinating water wherein at least a portion of power is provided by the difference in gravitational hydrostatic pressure between desalination feed and desalinated water due to the difference in density between desalination feed and desalinated water and the elevation difference of a liquid column.

FIG. 122: A system or process for desalinating water wherein at least a portion of power is provided by the difference in gravitational hydrostatic pressure between desalination feed and desalinated water due to the difference in density between desalination feed and desalinated water and the elevation difference of a liquid column.

FIG. 123: A system or process for generating power from the gravitational hydrostatic pressure difference between brine and seawater due to the difference in density between brine and seawater and the difference in elevation of a liquid column.

DETAILED DESCRIPTION OF THE INVENTION

FIGS. 65-82 and FIGS. 91-97 Description

Some of the present embodiments may relate to systems and methods of integrated energy storage and desalination. Some embodiments may involve employing the power from discharging an energy storage system to power desalination. In some embodiments, the discharging may be conducted in a manner which enables greater energy efficiency or greater round trip efficiency. In some embodiments, the discharging may be conducted in a manner which enables greater energy efficiency or greater round trip efficiency than converting the mechanical work or hydraulic pressure into electricity.

For example, some embodiments may comprise pressure exchanging the high pressure, low density fluid generated during discharging with desalination feed water, which may pressurize the desalination feed water to overcome the osmotic pressure of the desalination feed water, which may power at least a portion of the energy required for desalination. For example, in reverse osmosis desalination, pressurizing the desalination feed water to enable a pressure difference across a desalination membrane greater than the osmotic pressure of the desalination feed water may comprise most of the energy consumption in desalination. Pressure exchanging may be more energy efficient than converting the hydraulic pressure or mechanical work into electricity, especially if said electricity may be otherwise further employed to power desalination. For example, some desalination pressure exchangers are 95-99.5% energy efficient, which may be generally more energy efficient than most systems and methods for converting mechanical work or hydraulic pressure into electricity. In some embodiments, the pressure exchange may enable the output pressure of the desalination feed water to be similar to or about the same as the input low density fluid. In some embodiments, the pressure exchanger may enable the output pressure of the desalination feed water to be less than the pressure of the input low density fluid. For example, in some embodiments, the input low density fluid may have a first pressure and a first flow rate and the output desalination feed water may have a second pressure and a second flow rate, wherein the first pressure is greater than the second pressure and the second flow rate is greater than the first flow rate. In some embodiments, the pressure exchanger may enable the output pressure of the desalination feed water to be less than the pressure of the input low density fluid. For example, in some embodiments, the input low density fluid may have a first pressure and a first flow rate and the output desalination feed water may have a second pressure and a second flow rate, wherein the first pressure is less than the second pressure and the second flow rate is less than the first flow rate.

For example, some embodiments may involve the high pressure, low density fluid comprising desalination feed water, or about the same composition as desalination feed water, or any combination thereof. For example, the high pressure, low density fluid comprising desalination feed water may be transferred into a desalination process. For example, the high pressure, low density fluid comprising desalination feed water may be transferred into a desalination process, wherein the desalination feed water may already be sufficiently pressurized to overcome the osmotic pressure of the desalination feed water, which may result in desalinated water permeate. For example, by employing high pressure, low density fluid comprising desalination feed water as the desalination feed water, the energy storage system may require less power transformations to supply the desalination process with power for desalination, which may result in significantly greater round trip energy efficiency. For example, in some embodiments, if the high pressure, low density fluid comprising desalination feed water is employed as desalination feed water, the energy storage system may possess a round trip energy efficiency about equal to the efficiency of the pump required to pressurize or pump the low density fluid during charging and any frictional losses in the pipes. Because the desalination system may require pumps to pressurize the desalination feed regardless of the energy storage system, the total practical or end-to-end round-trip energy efficiency losses associated with the energy storage in the desalination process may be negligible.

For example, in some embodiments, if the pump has an energy efficiency of 92% and the pipe frictional losses are 1% on a total basis, the energy storage system may have a round trip energy efficiency of 91%, however, factoring in that high pressure pumping would be required regardless in the desalination system, a round trip energy efficiency of 99% may be more representative of the contextualized or end-to-end round trip energy efficiency of the example energy storage system.

For example, some embodiments may involve the high pressure, low density fluid comprising desalination feed water, or about the same composition as desalination feed water, or any combination thereof. For example, the high pressure, low density fluid comprising desalination feed water may be transferred into a desalination process. For example, the high pressure, low density fluid comprising desalination feed water may be transferred into a desalination process, wherein the desalination feed water may already be sufficiently pressurized to overcome the osmotic pressure of the desalination feed water, which may result in desalinated water permeate. In some embodiments, the pressure of the high pressure low density fluid from the energy storage system may be significantly greater than the pressure required for desalination. It may be desirable to first extract pressure or power from the high pressure low density fluid to reduce the pressure of the low density fluid to a pressure more optimal for desalination and/or while productively using the extracted pressure or power. For example, some embodiments may involve extracting pressure or power from the high pressure low density fluid comprising desalination feed water using a pressure exchanger, wherein the pressure exchanger pressurizes additional desalination feed water for desalination. For example, some embodiments may involve extracting pressure or power from the high pressure low density fluid comprising desalination feed water using a turbine or generator, which may convert the extracted pressure or power into electricity.

Some embodiments may involve multiple options of energy inputs and value streams. For example, some embodiments may enable desalination to be powered by electricity from one or more or any combination of electricity sources, or desalination to be powered by discharging the energy storage system, or any combination thereof. For example, some embodiments may involve optionally discharging the energy storage system to power the desalination of water, or generate electricity, or any combination thereof. For example, in embodiments where the low density fluid may comprise a potential fuel, it may be desirable under certain circumstances to employ the low density fluid as an energy or power source to, for example, including, but not limited to, one or more or any combination of the following: generate electricity, or desalinate water, or power a chemical synthesis process, or as a feedstock in a chemical synthesis process, or an intermediate in a chemical synthesis process, or a chemical in a chemical synthesis process, or a chemical in a chemical production process, or to produce heat, or any combination thereof. Said certain circumstances may include, but are not limited to, one or more or any combination of the following: supply chain shortage, or supply chain disruption, or delivery delay, or high commodity prices, or high electricity prices, or electricity shortage, or brown out, or black out, or natural disaster, or man-made disaster, or process disruption, or process delay, or power outage, or earthquake, or tsunamic, or volcanic eruption, or hurricane, or flooding, or mudslide, or landslide, or pipeline leak, or militant attack, or explosion, or tornado, or drought, or long period of low wind speeds, or long period of low sun, or commodity shortage.

Some embodiments may involve employing the same pump or pumps for energy storage as are employed for desalination. For example, some embodiments may comprise employing the pumps employed in energy storage in directly pumping desalination feed water for desalination, as in, for example, desalination feed water may flow through the same pumps. For example, some embodiments may comprise employing the pump or pumps employed in energy storage to also indirectly pump for desalination, which may involve, for example, pressurizing low density fluid in a circulating loop, wherein the pressurized low density fluid may be pressure exchanged with desalination feed water, pressurizing and/or pumping the desalination feed water.

Some embodiments may involve locating at least a portion of a desalination system subsea. In some embodiments, at least a portion of a desalination system may be located at or near the elevation of the lower elevation reservoir. In some embodiments, at least a portion of a desalination system may be located at an elevation greater than the elevation of the lower elevation reservoir and lower than the elevation of the higher elevation reservoir. In some embodiments, it may be desirable to locate. In some embodiments, it may be desirable to pressure exchange the high pressure low density fluid with the desalination feed water in a desalination system located at a medium elevation. In some embodiments, it may be desirable to employ high pressure low density fluid comprising desalination feed water as desalination feed water, during, for example, desalination. For example, it may be desirable to locate the desalination system at a medium elevation comprising, for example, a water depth or subsea depth of 200 meters-500 meters deep.

In some embodiments, it may be desirable to add low density fluid comprising desalination feed water to the higher elevation reservoir to, for example, makeup for low density fluid comprising desalination feed water exiting the energy storage system due to, for example, including, but not limited to, one or more or any combination of the following: being converted into desalinated water and/or desalination brine in a desalination process, or an overpressure event.

In some embodiments, desalination or the desalination process may occur subsea, however at least a portion of the pumping or pressurization of the desalination feed water may be powered by, or may be driven by, or may occur by pumps or other devices located above or near the surface of the water. In some embodiments, desalination or the desalination process or the desalination membrane may be located subsea, however at least a portion of the pumping or pressurization of the desalination feed water may be powered by, or may be driven by, or may occur by pumps or other devices located above or near the surface of the water.

Example FIGS. 65-82 and FIGS. 91-97 Key

| Label | Description |
|---|---|
| Higher Elevation | The 'High Elevation' label may be for the dashed line box which the 'Higher Elevation' text is inside and may represent the elevation of the system components in the dashed line box relative to system components in or between other dashed line boxes. 'High Elevation' may comprise the higher elevation region. High Elevation may comprise an elevation higher than the elevation of the Medium Elevation and/or an elevation higher than the elevation of the Lower Elevation. |
| Medium Elevation | The 'Medium Elevation' label may be for the dashed line box which the 'Medium Elevation' text is inside and may represent the elevation of the system components in the dashed line box relative to system components in or between other dashed line boxes. 'Medium Elevation' may comprise a medium elevation region or middle elevation region. Medium Elevation may comprise an elevation higher than the elevation of the Lower Elevation and/or an elevation lower than the elevation of the High Elevation. |
| Lower Elevation | The 'Lower Elevation' label may be for the dashed line box which the 'Lower Elevation' text is inside and may represent the elevation of the system components in the dashed line box relative to system components in or between other dashed line boxes. 'Lower Elevation' may comprise a lower elevation region. Lower Elevation may comprise an elevation lower than the elevation of the Medium Elevation and/or an elevation lower than the elevation of the Higher Elevation. |
| 1 | '1' may comprise a high elevation reservoir or higher elevation storage reservoir. '1' may comprise one or more storage units. For example, '1' may comprise one tank, or two tanks, or more tanks. '1' may comprise a tank configured to store high density fluid and low density fluid. '1' comprise a reservoir configured to store the low density fluid in storage units or storage tanks separate from the high density fluid. '1' may comprise a closed vessel. '1' may comprise an open vessel. '1' may comprise a body of liquid. '1' may comprise an open body of liquid. '1' may comprise an at least partially closed body of liquid. In some embodiments, the higher elevation reservoir may comprise a closed vessel, such, as a tank, or may comprise a contained reservoir, such as a lined pond. In some embodiments, the higher elevation reservoir may comprise an open body of water, such as an ocean, or sea, or lake. |
| 2 | '2' may comprise low density fluid transferred between a higher elevation reservoir and a valve, or flow controller, or pump, or any combination thereof. '2' may comprise low pressure low density fluid. |
| 3 | '3' may comprise a valve, or flow controller, or pump, or any combination thereof to direct or transfer low density fluid to or from a high elevation reservoir, or a pressure exchanger, or a pump, or a generator, or a turbine, or any combination thereof. |
| 4 | '4' may comprise low density fluid transferred between a valve, or flow controller, or pump, or any combination thereof and a pump, or pressure exchanger, or turbine, or generator. '4' may comprise low pressure low density fluid. |
| 5 | '5' may comprise a pump, or generator, or turbine. '5' may be designed to pump low density fluid. '5' may be designed to generate power from the potential or kinetic energy of low density fluid. '5' may be designed to convert power input, such as electricity, into mechanical energy or potential energy, or may be designed to convert a power input into pumping or pressurizing of the low density fluid. |
| 6 | '6' may comprise power input or output. '6' may comprise electricity input to power a pump. '6' may comprise electricity output from a generator, or turbine. |
| 7 | '7' may comprise low density fluid transferred between a pump, or turbine, or generator and a valve, or flow controller, or pump. '7' may comprise high pressure low density fluid. |
| 8 | '8' may comprise a valve, or flow controller, or pump transferring low density fluid to or from a pump or turbine or generator, or a higher elevation pressure exchanger, or a medium elevation pressure exchanger, or a lower elevation pressure exchanger, or a lower elevation reservoir, or any combination thereof. |

| Label | Description |
|---|---|
| 9 | '9' may comprise ow density fluid transferred to or from a lower elevation region, or medium elevation region, or a pressure exchanger, or a lower elevation reservoir, or any combination thereof. '9' may comprise high pressure low density fluid. '9' may comprise a pipe or riser. |
| 10 | '10' may comprise a pressure exchanger for, for example, pressure exchanging low density fluid and high density fluid. '10' may comprise a pressure exchanger located near or in the lower elevation region. '10' may comprise a pressure exchanger or power exchanger or similar process which may involve transferring power or pressure from one fluid to another fluid. |
| 11 | '11' may comprise low density fluid transferred between a pressure exchanger and a lower elevation storage reservoir. |
| 12 | '12' may comprise a lower elevation reservoir. '12' may comprise one or more storage units. For example, '12' may comprise one tank, or two tanks, or more tanks. '12' may comprise a tank configured to store high density fluid and low density fluid. '12' comprise a reservoir configured to store the low density fluid in storage units or storage tanks separate from the high density fluid. '12' may comprise a closed vessel. '12' may comprise an open vessel. '122' may comprise a body of liquid. '1' may comprise an open body of liquid. '12' may comprise an at least partially closed body of liquid. In some embodiments, the higher elevation reservoir may comprise a closed vessel, such as a tank. |
| 13 | '13' may comprise high density fluid transferred between a pressure exchanger and a lower elevation storage reservoir. |
| 14 | '14' may comprise high density fluid transferred between a lower elevation region, or lower elevation reservoir, or lower elevation pressure exchanger, or any combination thereof and a higher elevation reservoir. |
| 15 | '15' may comprise low density fluid transferred between a valve and a pressure exchanger. '15' may comprise high pressure, low density fluid before pressure exchanging with desalination feed water. |
| 16 | '16' may comprise a pressure exchanger or power exchanger or similar process which may involve transferring power or pressure from the high pressure low-density fluid to the low pressure desalination feed water, which may result in high pressure desalination feed water and low pressure low density fluid. |
| 17 | '17' may comprise low density fluid transferred between a pressure exchanger and a valve. '17' may comprise lower pressure low density fluid following a pressure exchange or power exchange. |
| 18 | '18' may comprise desalination feed water. '18' may comprise seawater, or brackish water, or the water or liquid or requiring desalination. '18' may comprise pre-treated or treated seawater. |
| 19 | '19' may comprise a valve, or pump, or flow controller, or any combination thereof which may transfer desalination feed water to a pressure exchanger, or a desalination process, or any combination thereof |
| 20 | '20' may comprise desalination feed water transferred between a valve, or pump, or flow controller, or any combination thereof and a desalination process, or valve or pump or flow controller, or any combination thereof. '20' may involve at least a portion of the desalination feed water bypassing a pressure exchanger with high pressure low density fluid. For example, in some embodiments, at least a portion of desalination may be conducted using power or pressure from another source, such as, for example, electricity and/or electric pumps. For example, in some embodiments, when desired, at least a portion of desalination may be powered by electricity or other power source instead of or in addition to pressure exchanging with the low density fluid. For example, in some embodiments, when the energy storage system is charging, or when affordable electricity is available, or any combination thereof, it may be desirable to power desalination using electricity, or electricity from a power source other than the energy storage system, or any combination thereof. |
| 21 | '21' may comprise desalination feed water transferred between a valve, or pump, or flow controller, or any combination thereof and a pressure exchanger. '21' may comprise low pressure desalination feed water. In some embodiments, it may be desirable for the desalination feed water to be directed the pathway of '21' if the energy storage system is discharging, or if the power for desalination or pressurization of the desalination feed water may be from pressure exchange with the low density fluid, or any combination thereof. For example, in some embodiments, the pump employed to pressurize low density fluid for charging the fluid displacement energy storage system may also be employed to pressurize low density fluid to power desalination by recirculating the low density fluid in a loop through the pressure exchanger. For example, in some embodiments, during discharging, power or pressure may be transferred from the low density fluid to the desalination feed water or '21'. |
| 22 | '22' may comprise desalination feed water transferred from a pressure exchanger to a valve, or a pump, or a flow controller, or a desalination process, or a desalination membrane, or treatment step, or any combination thereof. '22' may comprise high pressure desalination feed water. |
| 23 | '23' may comprise a valve, or flow controller, or pump, or any combination thereof transferring desalination feed water from a pressure exchanger, or other desalination feed water source, or any combination thereof to a desalination process, or reverse osmosis process, or any combination thereof. In some embodiments, the desalination feed water entering '23' may comprise pressurized |

| Label | Description |
|---|---|
| | desalination feed water, or non-pressurized desalination feed water, or any combination thereof. In some embodiments, desalination feed water exiting '23' may comprise pressurized desalination feed water, or non-pressurized desalination feed water, or any combination thereof. |
| 24 | '24' may comprise desalination feed water transferred from a valve, or flow controller, or pump, or any combination thereof to a desalination process. In some embodiments, '24' may comprise pressurized desalination feed water or desalination feed water at a pressure sufficiently high to overcome the osmotic pressure of the desalination feed water during a reverse osmosis or other pressure based desalination process. In some embodiments, '24' may comprise unpressurized desalination feed water or desalination feed water at a pressure lower than the pressure required to overcome the osmotic pressure of the desalination feed water during a reverse osmosis or other pressure based desalination process. |
| 25 | '25' may comprise a desalination process. '25' may include, but is not limited to, one or more or any combination of the following: reverse osmosis, or osmotically assisted reverse osmosis, or membrane desalination, or nanofiltration, or high pressure reverse osmosis, or high pressure nanofiltration. '25' may involve pumps, or pressure exchangers, or power recovery, or energy recovery, or pre-treatment, or post-treatment, or storage, or any combination thereof. |
| 26 | '26' may comprise desalination permeate. '26' may comprise a liquid or water with a lower salinity than the desalination feed water. '26' may comprise potable water, or practically freshwater, or freshwater according to municipal water definitions, or freshwater according to industrial water definitions, or any combination thereof. '26' may be transferred to storage, or transport, or pipeline, or vehicle, or vessel, or application, or municipal water application, or industrial water application, or any combination thereof. |
| 27 | '27' may comprise desalination concentrate or retentate. '27' may comprise a liquid or water with a greater salinity than the desalination feed water. '27' may be discharged, or released, or employed in an application, or may be further concentrated, or any combination thereof. |
| 28 | '28' may comprise an electricity or power input. '28' may comprise electricity input to power desalination or power the pressurization of desalination feed water instead of, or in addition to, pressurization of desalination feed water using a pressure exchange, or wherein the low density fluid during discharging of the energy storage system comprises pressurized low density fluid, or any combination thereof. |
| 29 | '29' may comprise low density fluid transferred from a lower elevation reservoir, or pressurize exchanger, or higher elevation valve, or medium elevation valve, or any combination thereof to or toward a desalination process. '29' may comprise low density fluid, wherein at least a portion of said low density fluid comprises desalination feed water. '29' may comprise high pressure low density fluid, wherein the low density fluid comprises at least a portion of desalination feed water. |
| 30 | '30' may comprise low density fluid, or desalination feed water, or any combination thereof. '30' may comprise desalination feed water transferred to a storage reservoir, or a higher elevation storage reservoir, or any combination thereof. '30' may comprise desalination feed water transferred to a storage reservoir, or a higher elevation storage reservoir, or any combination thereof to, for example, makeup for the volume or amount of high pressure low density fluid employed as desalination feed water and/or converted into desalinated permeate and/or concentrate or retentate. |
| 31 | '31' may comprise a low density fluid, storage tank, or desalination feed water storage tank, or a buffer tank, or a transfer tank, or any combination thereof. In some embodiments, '31' may be employed to enable the transfer of low density fluid Into the higher elevation storage reservoir with control, or smooth transition. |
| 32 | '32' may comprise low density fluid transferred into the higher elevation reservoir. '32' may comprise low density fluid transferred into the higher elevation reservoir to make up for low density fluid exiting the energy storage system to be employed as desalination feed water. |
| 33 | '33' may comprise desalination feed water. '33' may comprise low pressure desalination feed water input being transferred to a pump to be pressurized for desalination. In some embodiments, a pump employed during charging of the energy storage system may also be employed to pressurize desalination feed water for desalination, even if the desalination feed water being pressurized and directly transferred to a desalination process, rather than being employed as a low density fluid in the energy storage system intermediately. For example, when the energy storage system is fully charged, or when the energy storage system is not charging, or when the energy storage system is charging, or when the energy storage system is not discharging, or when the energy storage system is discharging, or when electricity is available or affordable, or any combination thereof, it may be desirable to pressurize at least a portion of the desalination feed water using at least one of the same pumps employed for pumping or pressurizing low density fluid in the energy storage system. |
| 34 | '34' may comprise pressurized desalination feed water employed for or transferred to desalination or a desalination process. In some embodiments, '34' may comprise the same solution as '7', or may comprise '7' directed to a desalination process. |

| Label | Description |
| --- | --- |
| 35 | '35' may comprise low density fluid transferred to or from a higher elevation storage reservoir. '35' may comprise low density fluid, which may comprise a fuel. For example, the low density fluid may comprise, including, but not limited to, a hydrocarbon, or butane, or propane, or diesel, or gasoline, or crude oil, or ethane, or methane, or kerosene, or hydrogen, or ammonia, or any combination thereof. '35' may comprise low density fluid transferred to a power generation system or method, which may combust or otherwise convert the low density fluid into power, or mechanical work, or electricity, or any combination thereof. |
| 36 | '36' may comprise a power generation system or method, which may comprise system or process for converting fuel, which may comprise low density fluid, into power, or mechanical work, or electricity, or any combination thereof. '36' may comprise, for example, including, but not limited to, one or more or any combination of the following: a gas turbine, or a combustion engine, or a piston, or a generator, or a steam turbine, or a Rankine cycle, or a stirring engine, or a fuel cell, or any combination thereof. It may be desirable to employ '36' as a backup or emergency source of power, for example, in case electricity is unavailable, or electricity is too expensive, or other power source is unavailable, or other power source is too expensive, or the other power sources are more expensive, or the energy storage system is fully discharged, or the energy storage system is being maintained, or the energy storage system is out of service, or any combination thereof. |
| 37 | '37' may comprise electricity, or mechanical fluid, or hydraulic fluid, or pneumatic fluid, or power, or other form of power transfer medium. '37' may comprise power generated from the power generation system or method, which may comprise '36'. '37' may comprise power transferred to a desalination process to power the desalination process. '37' may comprise power transferred to an electricity grid or other power consuming application. |
| 38 | '38' may comprise high pressure low density fluid. '38' may comprise high pressure low density fluid transferred in a medium elevation region. '38' may comprise low density fluid, or high pressure low density fluid, or any combination thereof transferred to a desalination process. '38' may comprise low density fluid, or high pressure low density fluid, or any combination thereof transferred to a power extraction device, or a power extractor, or turbine, or generator, which may generate power from the high pressure low density fluid. |
| 39 | '39' may comprise a power extraction device, or a power extractor, or turbine, or generator, which may generate power from the high pressure low density fluid, and/or may reduce the pressure of the low density fluid to a pressure greater than the osmotic pressure of the desalination feed water, or to a pressure greater than the hydrostatic pressure at the water depth by an amount equal to or greater than the osmotic pressure of the desalination feed water, or to a pressure desired for the desalination process, or any combination thereof. |
| 40 | '40' may comprise a low density fluid comprising desalination feed water at a pressure desired for a desalination process. |
| 42 | '42' may comprise electricity, or mechanic power, or hydraulic power, or other form of power extracted or otherwise produced from the high pressure low density fluid. Power in '42' may be transferred to an application requiring or otherwise benefiting from or needing said power. |

Example FIGS. 65-82 and FIGS. 91-97 Step-by-Step Descriptions

FIG. 65 Energy Storage Charging, Desalination Powered by External Source

Energy Storage:

Low density fluid from a higher elevation reservoir may be pumped using a pump to a lower elevation region. Low density fluid exiting the pump may be at a pressure greater than or equal to the hydrostatic or gravitational pressure of the high density fluid in the elevation difference between the higher elevation reservoir and lower elevation reservoir minus the hydrostatic or gravitation pressure of the low density fluid in the elevation difference between the higher elevation reservoir and lower elevation reservoir.

In the lower elevation region, the high pressure low density fluid may pressure exchange with the high density fluid in the lower elevation region, which may result in transfer of high density fluid from the lower elevation reservoir through the lower elevation pressure exchanger and into the higher elevation reservoir, and/or the transfer of low density fluid into the lower elevation reservoir.

Note: Adding a high density fluid to a reservoir, wherein the addition of the high density fluid into the reservoir, or the process of transferring the high density fluid to the reservoir, or the process of transferring the high density fluid between reservoirs, or any combination thereof results in removal or exiting of low density fluid from said reservoir may comprising 'displacing' low density fluid or 'displacement' of low density fluid.

Note: Adding a low density fluid to a reservoir, wherein the addition of the low density fluid into the reservoir, or the process of transferring the low density fluid to the reservoir, or the process of transferring the low density fluid between reservoirs, or any combination thereof results in removal or exiting of high density fluid from said reservoir may comprising 'displacing' high density fluid or 'displacement' of high density fluid.

Desalination:

Desalination feed water may be transferred into a desalination process, where it may be pressurized and converted into desalinated water permeate and desalination retentate or concentrate. In some embodiments, the desalination may be capable of operating with pumps, or power sources, or any combination thereof external from or separate from the energy storage system if desired, or when desired, or any combination thereof.

FIG. 66 Energy Storage Steady State, Desalination Powered by External Source Desalination:

Desalination feed water may be transferred into a desalination process, where it may be pressurized and converted into desalinated water permeate and desalination retentate or concentrate. In some embodiments, the desalination may be capable of operating with pumps, or power sources, or any combination thereof external from or separate from or independently of the energy storage system if desired, or when desired, or any combination thereof.

FIG. 67 Energy Storage Discharging, Desalination Powered by Pressure Exchange with High Pressure Low Density Fluid Produced by Discharging Energy Storage System Energy Storage:

High Density Fluid may be transferred from the higher elevation reservoir to the lower elevation region.

In the lower elevation region, the high density fluid may be pressure exchanged with the low density fluid in the lower elevation region, which may result in transfer of low density fluid from the lower elevation reservoir through the lower elevation pressure exchanger and into the higher elevation region and/or the transfer of high density fluid into the lower elevation reservoir.

In the higher elevation region, the low density fluid transferred from the lower elevation region, which may comprise high pressure low density fluid, may be pressure exchanged with desalination feed water, wherein at least a portion of the power or pressure in the high pressure low density fluid is transferred to the desalination feed water. In some embodiments, the resulting pressure of the desalination feed water after pressure exchange may be greater than the osmotic pressure of the desalination feed water, which may enable the desalination of the desalination feed water and/or enable the powering at least a portion of desalination by pressure exchanging the high pressure low density fluid with desalination feed water during the discharging of the energy storage system. After pressure exchange with desalination feed water and/or further power extraction, the low density fluid may be transferred into the higher elevation reservoir.

Desalination:

Low pressure desalination feed water may be transferred into a pressure exchanger, where it may be pressure exchanged with the high pressure low density fluid, which may result in pressurized desalination feed water and low pressure low density fluid. The pressurized desalination feed water may be transferred into a pressure driven desalination process, such as a reverse osmosis process, wherein the pressurized desalination feed water may be converted into desalination permeate and concentrate or retentate. The pressurization of the desalination feed water by pressure exchange may power the pressurization energy requirement of desalination, which may comprise a significant proportion of the total energy consumption related to desalination.

FIG. 68 Energy Storage Steady State, Desalination Powered by Pressure Exchange with Recirculating Low Density Fluid Desalination:

Low density fluid in the energy storage process may power the pumping or pressurization of desalination feed water by recirculating pressurization of the low density fluid and pressure exchange with the desalination feed water. For example, low pressure low density fluid may be transferred into a pump, where it may be pressurized into relatively high pressure low density fluid. Said high pressure low density fluid may be transferred to a pressure exchanger, which may pressure exchange the high pressure low density fluid with low pressure desalination feed water, which may result in pressurized desalination feed water and low pressure low density fluid. The low pressure density fluid may be transferred to the pump. The pressurized desalination feed water may be transferred into a desalination process, such as a pressure driven desalination process, such as reverse osmosis, wherein the pressurized desalination feed water may be converted into desalination permeate and desalination concentrate or retentate. The present embodiment may be beneficial or desirable because it may enable desalination to be powered using the same equipment, such as pumps or pressure exchangers, as may be used by the energy storage system during charging and discharging, even when the energy storage system may be at a steady state, which may reduce capital cost and weight of equipment.

FIG. 69 Energy Storage Charging, Desalination may be Powered by Pressure Exchange a Portion of High Pressure Low Density Fluid Produced by Energy Storage System Charging, a Portion of Low Density Fluid may be Recirculated Energy Storage:

Low density fluid from a higher elevation reservoir may be pumped using a pump. A portion of the high pressure low density fluid from said pumping may be transferred to a lower elevation region. A portion of the high pressure low density fluid from said pumping may be transferred to a pressure exchanger with the desalination feed water, which may be located in the higher elevation region, or medium elevation region, or any combination thereof. Low density fluid exiting the pump transferred to the lower elevation region may be at a pressure greater than or equal to the hydrostatic or gravitational pressure of the high density fluid in the elevation difference between the higher elevation reservoir and lower elevation reservoir minus the hydrostatic or gravitation pressure of the low density fluid in the elevation difference between the higher elevation reservoir and lower elevation reservoir.

In the lower elevation region, the high pressure low density fluid may pressure exchange with the high density fluid in the lower elevation region, which may result in transfer of high density fluid from the lower elevation reservoir through the lower elevation pressure exchanger and into the higher elevation reservoir, and/or the transfer of low density fluid into the lower elevation reservoir.

The high pressure low density fluid transferred to a pressure exchanger with the desalination feed water may be pressure exchanged with desalination feed water, which may result in pressurized desalination feed water and low pressure low density fluid. Low pressure low density fluid may be recirculated to the pump, or may be transferred to the higher elevation reservoir, or any combination thereof. The pressurized desalination feed water may be transferred to a desalination process.

Desalination:

Low density fluid in the energy storage process may power the pumping or pressurization of desalination feed water by recirculating pressurization of the low density fluid and pressure exchange with the desalination feed water. For example, low pressure low density fluid may be transferred into a pump, where it may be pressurized into relatively high pressure low density fluid. A portion of said high pressure low density fluid may be transferred to a pressure exchanger, which may pressure exchange the high pressure low density fluid with low pressure desalination feed water, which may result in pressurized desalination feed water and low pressure low density fluid. The low pressure density fluid may be transferred to the pump. The pressurized desalination feed water may be transferred into a desalination process, such as a pressure driven desalination process, such as reverse osmosis, wherein the pressurized desalination feed water may be converted into desalination permeate and desalination concentrate or retentate. The present embodiment may be beneficial or desirable because it may enable desalination to be powered using the same equipment, such as pumps or pressure exchangers, as may be used by the energy storage system during charging and discharging.

FIG. 70 Energy Storage Discharging, Splitting High Pressure Low Density Fluid Stream to Power Simultaneous Electricity Generation and Desalination Energy Storage:

High Density Fluid may be transferred from the higher elevation reservoir to the lower elevation region.

In the lower elevation region, the high density fluid may be pressure exchanged with the low density fluid in the lower elevation region, which may result in transfer of low density fluid from the lower elevation reservoir through the lower elevation pressure exchanger and into the higher elevation region and/or the transfer of high density fluid into the lower elevation reservoir.

In the higher elevation region, the low density fluid transferred from the lower elevation region, which may comprise high pressure low density fluid, may be split into at least two fluid streams, which may comprise a first fluid stream and a second fluid stream, wherein at least a first fluid stream may be transferred to a generator or turbine to generate power, such as electricity, and/or wherein at least a second fluid stream may be transferred to a pressure exchange with desalination feed water to power at least a portion of the pressurization of desalination feed water for desalination. After generating power, the low density fluid may be transferred into the higher elevation reservoir. After pressure exchanging with desalination feed water, the low density fluid may be transferred into the higher elevation reservoir.

Desalination:

Low pressure desalination feed water may be transferred into a pressure exchanger, where it may be pressure exchanged with the high pressure low density fluid, which may result in pressurized desalination feed water and low pressure low density fluid. The pressurized desalination feed water may be transferred into a pressure driven desalination process, such as a reverse osmosis process, wherein the pressurized desalination feed water may be converted into desalination permeate and concentrate or retentate. The pressurization of the desalination feed water by pressure exchange may power the pressurization energy requirement of desalination, which may comprise a significant proportion of the total energy consumption related to desalination.

FIG. 71 Energy Storage Charging, Desalinating Water with External Power Source, Embodiment with Direct Fluid Displacement in Lower Elevation Reservoir Energy Storage:

Low density fluid from a higher elevation reservoir may be pumped using a pump to a lower elevation region. Low density fluid exiting the pump may be at a pressure greater than or equal to the hydrostatic or gravitational pressure of the high density fluid in the elevation difference between the higher elevation reservoir and lower elevation reservoir minus the hydrostatic or gravitation pressure of the low density fluid in the elevation difference between the higher elevation reservoir and lower elevation reservoir.

In the lower elevation region, the high pressure low density fluid may be transferred into the lower elevation reservoir, which may displace at least a portion of the high density fluid in the lower elevation region, which may result in transfer of high density fluid from the lower elevation reservoir to the higher elevation reservoir, and/or the transfer of low density fluid into the lower elevation reservoir.

Desalination:

Desalination feed water may be transferred into a desalination process, where it may be pressurized and converted into desalinated water permeate and desalination retentate or concentrate. In some embodiments, the desalination may be capable of operating with pumps, or power sources, or any combination thereof external from or separate from the energy storage system if desired, or when desired, or any combination thereof.

FIG. 72 Energy Storage Charging, Desalinating Water with External Power Source with Separate Pump from Energy Storage Pump FIG. 73 Energy Storage Charging, Desalinating Water with Same Pump as Employed in Energy Storage or Same Fluid as Low Density Fluid Employed in Energy Storage or any Combination Thereof Energy Storage:

Low pressure low density fluid comprising desalination feed water and/or additional low pressure desalination feed water may be transferred into a pump, which may result in high pressure low density fluid comprising desalination feed water. The high pressure low density fluid may be split into two fluid streams, which may comprise a first fluid stream and a second fluid stream, wherein the first fluid stream may be transferred to a lower elevation region and wherein the second fluid stream may be transferred to a desalination process.

Said first fluid stream comprising high pressure low density fluid transferred to a lower elevation region may be pressure exchanged in the lower elevation region with high density fluid in the lower elevation region, which may result in transfer of high density fluid from the lower elevation reservoir through the lower elevation pressure exchanger and into the higher elevation reservoir, and/or the transfer of the low density fluid into the lower elevation reservoir.

Said second fluid stream comprising high pressure low density fluid may comprise desalination feed water and may be transferred into a desalination process, wherein the pressure of the high pressure low density fluid stream may power at least a portion of the desalination of the desalination feed water. In some embodiments, additional power or pressure may be extracted from the high pressure low density fluid stream before being employed as desalination feed water, if, for example, the pressure of the high pressure low density fluid stream may be significantly greater than the pressure required or desired for desalination. In some embodiments, additional power or pressure may be added to the high pressure low density fluid stream before being employed as desalination feed water, if, for example, the pressure of the high pressure low density fluid stream may be less than the pressure required or desired for desalination.

Desalination:

The second fluid stream comprising high pressure low density fluid comprising desalination feed water may be transferred into a desalination process. The desalination process may employ the power or pressure of the higher pressure low density fluid stream comprising desalinated feed water to desalinate at least a portion of the water, or to reduce the energy consumption related to desalinating at least a portion of said desalinated feed water.

FIG. 74 Energy Storage Steady State, Desalinating Water with External Power Source FIG. 75 Energy Storage Steady State, Pressurizing Desalination Feed Water using Same Pump as is Employed in Energy Storage FIG. 76 Energy Storage Discharging, High Pressure Low Density Fluid from Discharging Employed as at Least a Portion of Pressurized Desalination Feed Water High Density Fluid may be transferred from the higher elevation reservoir to the lower elevation region.

In the lower elevation region, the high density fluid may be pressure exchanged with the low density fluid in the lower elevation region, which may result in transfer of low density fluid from the lower elevation reservoir through the lower elevation pressure exchanger and into the higher elevation region and/or the transfer of high density fluid into the lower elevation reservoir.

In the higher elevation region, the low density fluid transferred from the lower elevation region, which may comprise high pressure low density fluid, and may comprise desalination feed water, may be transferred into a desalination process as pressurized desalination feed water, which may result in the production of desalinated water.

Note: Low density fluid, which may comprise desalination feed water, may be added to the energy storage system, or the higher elevation reservoir, or any combination thereof to, for example, one or more or any combination of the following: smake up for any low density fluid exiting the system, due to, for example, use in desalination, or due to another application, or due to losses, or due to pressure release, or any combination thereof.

FIG. 77 Energy Storage Discharging. High Pressure Low Density Fluid from Discharging Employed as at Least a Portion of Pressurized Desalination Feed Water FIG. 78 Energy Storage Discharging, High Pressure Low Density Fluid from Discharging Wherein a Portion is Employed as Pressurized Desalination Feed Water and a Portion is Employed for Power Generation FIG. 79 Energy Storage Discharging, High Pressure Low Density Fluid from Discharging Employed as at Least a Portion of Pressurized Desalination Feed Water and for Power Generation FIG. 80 Energy Storage Charging, Desalinating Water with External Power Source, Embodiment may comprise Direct Fluid Displacement in Lower Elevation Reservoir FIG. 81 Energy Storage Charging, Desalinating Water with same Pump Employed in Energy Storage, or a Portion of the High Pressure Low Density Fluid Comprising Desalination Feed Water, or any Combination Thereof, Embodiment May Comprise Direct Fluid Displacement in Lower Elevation Reservoir FIG. 82 Desalination, or Power Production, or any Combination Thereof Powered by Power Generated from the Use of at Least a Portion of Low Density Fluid in Energy Storage System as a Fuel If desired, a portion of low density fluid may be transferred from the energy storage system. For example, a portion of low density fluid may be transferred from the higher elevation reservoir. In some embodiments, the low density fluid may comprise a chemical which contains chemical energy or may comprise a chemical which is combustible. For example, the low density fluid may comprise, including, but not limited to, one or more or any combination of the following: a hydrocarbon, or LPG, or butane, or propane, or kerosene, or diesel, or gasoline, or ammonia, or hydrogen, or methanol, or ethanol, or propanol. In some embodiments, the low density fluid may be transferred to process which generates power from the low density fluid, such as, for example, a gas turbine, or a generator, or an engine. Said process may generate power, which may comprise, for example, electricity, or mechanical power, or hydraulic power, or pneumatic power, or any combination thereof.

In some embodiments, said power may be transferred to an application requiring or otherwise benefiting from said power. For example, in some embodiments, said power may be transferred to a desalination process to power at least a portion of desalination.

Note: When convenient or desired, low density fluid may be added to the energy storage system or the higher elevation reservoir to make up for low density fluid consumed for power generation.

FIG. 91 Energy Storage Charging, Desalination occurring at Medium Elevation or Subsea at Medium Elevation FIG. 92 Energy Storage Steady State, Desalination occurring at Medium Elevation or Subsea at Medium Elevation FIG. 93 Energy Storage Discharging, Desalination occurring at Medium Elevation or Subsea at Medium Elevation, Desalination Pressurization Powered by Pressure Exchange with High Pressure Low Density Fluid from Discharging Energy Storage System FIG. 94 Energy Storage Charging, Desalination occurring at Medium Elevation or Subsea at Medium Elevation FIG. 95 Energy Storage Steady State, Desalination occurring at Medium Elevation or Subsea at Medium Elevation FIG. 96 Energy Storage Discharging, Desalination occurring at Medium Elevation or Subsea at Medium Elevation, High Pressure Low Density Fluid from Energy Storage Discharging may Comprise Pressurized Desalination Feed Water and may Provide at Least a Portion of the Power for Desalination FIG. 97 Energy Storage Discharging, Desalination occurring at Medium Elevation or Subsea at Medium Elevation, High Pressure Low Density Fluid from Energy Storage Discharging may Comprise Pressurized Desalination Feed Water and may Provide at Least a Portion of the Power for Desalination, at Least a Portion of Power may be Extracted from High Pressure Low Density Fluid before being Employed as Pressurized Desalination Feed Water Note: in some embodiments, 'steady state' may mean the energy storage system is neither charging or discharging. In some embodiments, 'steady state' may mean the energy storage system is remaining at a stable or constant state of charge.

Note: 'State of charge' may comprise represent the amount of energy stored in an energy storage system relative to the system's total energy storage capacity.

Note: In some embodiments, treated seawater (which may be from a buffer or reserve tank) may be added to the higher elevation reservoir to make up for the loss of low density fluid, or high density fluid, or any combination thereof employed as the desalination feed water.

Note: In some embodiments, air or other gas may be employed to temporarily occupy the volume of the tank previously occupied by low density fluid, or high density fluid, or any combination thereof employed as desalination feed water.

Note: A power recovery device may comprise any device which transfers power or converts power. In some embodiments, 'pressure exchanger' may refer to a 'power recovery device' and/or the terms 'pressure exchanger' and 'power recovery device' or 'energy recovery device' may be employed interchangeably. For example, a power recovery device may comprise, including, but not limited, one or more or any combination of the following: a pressure exchanger, or a generator, or a turbine, or a turbocharger, or an electric generator.

Note: Desalination feed water may be sourced from a water depth deeper than or equal to one or more or any combination of the following: 1 meter, or 5 meters, or 10 meters, or 20 meters, or 30 meters, or 40 meters, or 50 meters, or 60 meters, or 70 meters, or 80 meters, or 90 meters, or 010 meters, or 150 meters, or 200 meters, or 250 meters, or 300 meters, or 350 meters, or 400 meters, or 450 meters, or 500 meters, or 550 meters, or 600 meters, or 650 meters, or 700 meters, or 750 meters, or 800 meters, or 850 meters, or 900 meters, or 950 meters, or 1,000 meters, or 1,500 meters, or 2,000 meters, or 2,500 meters, or 3,000 meters, or 3,500 meters, or 4,000 meters, or 4,500 meters, or 5,000 meters. In some embodiments, sourcing desalination feed water further from shore, or in deeper water, or any combination thereof may result in less particulates or pre-treatment requirement.

Note: Desalination retentate or concentrate may be released into a region of a water body with a depth deeper than or equal to one or more or any combination of the following: 1 meter, or 5 meters, or 10 meters, or 20 meters, or 30 meters, or 40 meters, or 50 meters, or 60 meters, or 70 meters, or 80 meters, or 90 meters, or 010 meters, or 150 meters, or 200 meters, or 250 meters, or 300 meters, or 350 meters, or 400 meters, or 450 meters, or 500 meters, or 550 meters, or 600 meters, or 650 meters, or 700 meters, or 750 meters, or 800 meters, or 850 meters, or 900 meters, or 950 meters, or 1,000 meters, or 1,500 meters, or 2,000 meters, or 2,500 meters, or 3,000 meters, or 3,500 meters, or 4,000 meters, or 4,500 meters, or 5,000 meters. In some embodiments, releasing desalination retentate or concentrate further from shore, or in deeper water, or any combination thereof may result in less impact on marine life, or local marine chemistry, or marine ecosystems, or sea life, or ecosystems.

EXAMPLE EXEMPLARY EMBODIMENTS (1) A system for storing and generating power comprising:
 a first storage reservoir configured to store a first fluid;
 a second storage reservoir located at a lower elevation than the first storage reservoir and configured to store a second fluid which has a higher density than the first fluid;
 a pump; and
 a generator;
 wherein the pump, generator, and the first and second reservoir are operatively connected such that power is stored by displacing the second fluid which has a higher density than the first fluid in the second storage reservoir by pumping the first fluid in the first storage reservoir to the second storage reservoir and power is generated or discharged by allowing the first fluid in the second storage reservoir to exit the second reservoir; and
 wherein the first fluid is a liquid.

(1) A system for storing and generating power comprising:
 a first storage reservoir configured to store a first fluid;
 a second storage reservoir located at a lower elevation than the first storage reservoir and configured to store a second fluid which has a higher density than the first fluid;
 a pump; and
 a generator;
 wherein the pump, generator, and the first and second reservoir are operatively connected such that power is stored by displacing the second fluid which has a higher density than the first fluid in the second storage reservoir by pumping the first fluid in the first storage reservoir to the second storage reservoir and power is generated or discharged by allowing the first fluid in the second storage reservoir to exit the second reservoir enter a hydraulic turbine or generator; and
 wherein the first fluid is a liquid.

(1) A system for storing and generating power comprising:
 a first storage reservoir configured to store a first fluid;
 a second storage reservoir located at a lower elevation than the first storage reservoir and configured to store a second fluid which has a higher density than the first fluid;
 a pump; and
 a generator;
 wherein the pump, generator, and the first and second reservoir are operatively connected such that power is stored by displacing the second fluid which has a higher density than the first fluid in the second storage reservoir by pumping the first fluid in the first storage reservoir to the second storage reservoir and power is generated or discharged by allowing the first fluid in the second storage reservoir to exit the second reservoir enter an energy recovery device or a pressure exchanger; and
 wherein the first fluid is a liquid.

(1) A system for storing and generating power comprising:
 a first storage reservoir configured to store a first fluid;
 a second storage reservoir located at a lower elevation than the first storage reservoir and configured to store a second fluid which has a higher density than the first fluid;
 a pump; and
 a generator;
 wherein the pump, generator, and the first and second reservoir are operatively connected such that power is stored by displacing the second fluid which has a higher density than the first fluid in the second storage reservoir by pumping the first fluid in the first storage reservoir to the second storage reservoir and power is generated or discharged by allowing the first fluid in the second storage reservoir to exit the second reservoir enter a desalination process as the feed solution; and
 wherein the first fluid is a liquid; and
 wherein the first fluid comprises treated seawater.
 Wherein the first fluid exiting the second storage reservoir is transferred into a power recovery device
 Wherein said power recovery device comprises a pressure exchanger
 Wherein said power recovery device transfers the kinetic energy from the first fluid to a desalination feed stream
 Wherein said power recovery device extracts power from the first fluid to pressurize desalination feed into a reverse osmosis process
 Wherein said desalination feed comprises treated seawater
 Wherein the first fluid is transferred into said first storage reservoir after said power recovery
 [Capable of converting to electricity or pressurized desalination feed]
 [Capable of converting to electricity or pressurized desalination feed and adjusting the proportion converted to electricity or desalination feed depending on demand]
 Wherein the first fluid exiting the second storage reservoir comprises a high-pressure fluid with a pressure greater than the osmotic pressure of seawater Wherein the first fluid exiting the second storage reservoir is transferred to a desalination process, wherein at least a portion of the first fluid comprises the desalination feed Wherein the first fluid exiting the second storage reservoir is transferred to a semipermeable membrane Wherein the first fluid exiting the second storage reservoir is transferred into a desalination process, wherein the first fluid is separated into desalinated water and desalination brine Wherein the first fluid exiting the second storage reservoir is transferred into a desalination process, wherein the first fluid is separated into desalinated water permeate and desalination retentate using a semipermeable membrane Wherein the first fluid exiting the second storage reservoir is transferred into a desalination process, wherein the first fluid is separated into desalinated water permeate and desalination retentate using a semipermeable membrane, and wherein the desalination retentate is discharged into the water body Wherein treated seawater is added to the first storage reservoir to makeup for the first fluid comprising treated seawater converted into desalinated water in the desalination process Wherein the low density fluid may comprise a fuel which may be burned to power desalination Wherein the low density fluid may comprise a chemical synthesized from the desalinated water Wherein the low density fluid may comprise a chemical synthesized employing the stored power Wherein the low density fluid may comprise a synthesized chemical Wherein the low density fluid may comprise desalinated water Wherein the low density fluid may comprise seawater or treated seawater Wherein the desalinated water may be converted to hydrogen Wherein the desalinated water may be converted to oxygen Wherein the desalinated water may be converted into chemicals Wherein the desalinated water is transported to an application using a pipeline or risers Wherein the desalinated water is transported to an application onshore Wherein the desalinated water is transported to an application offshore Wherein the desalinated water is transferred using a ship or a mobile vessel Wherein the desalinated water is transferred using a flying vessel Wherein the desalinated water is transferred using a submarine or subsea vessel or structure Wherein the desalinated water is transferred using a flying vehicle Wherein the synthesized chemicals are transferred using a pipeline Wherein the synthesized chemicals are transferred using a ship or floating vessel Wherein the synthesized chemicals are transferred using a flying vehicle Wherein the synthesized chemicals are transferred using a submarine or subsea vessel or structure Wherein the first storage reservoir is floating Wherein the first storage reservoir is underwater Wherein the first storage reservoir is on land Wherein storing power by pumping a low density fluid to displace a high density fluid Wherein stored power is employed to desalinate water Wherein stored power is employed to desalinate water by pressure exchanging the low density fluid with feed seawater to pressurize the feed seawater; and Transferring said feed seawater to a reverse osmosis desalination system Wherein stored power is employed to desalinate water by pressure exchanging the low density fluid with feed seawater to pressurize the feed seawater; and Contacting said feed seawater with a desalination membrane Wherein stored power is employed to desalinate water by pressure exchanging the low density fluid with feed seawater to pressurize the feed seawater: and Contacting said feed seawater with a reverse osmosis membrane Wherein stored power is employed to desalinate water by pressure exchanging the low density fluid with feed seawater to pressurize the feed seawater; and Contacting said feed seawater with a semipermeable membrane (1) A system for storing and generating power comprising:

a first storage reservoir configured to store a first fluid;

a second storage reservoir located at a lower elevation than the first storage reservoir and configured to store a second fluid which has a higher density than the first fluid;

a pump;

wherein the pump and the first and second reservoir are operatively connected such that power is stored by displacing the second fluid which has a higher density than the first fluid in the second storage reservoir by pumping the first fluid in the first storage reservoir to the second storage reservoir and power is generated by allowing the first fluid in the second storage reservoir to exit the second reservoir; and wherein the first fluid is a liquid.

(2) The system of example exemplary embodiment 1 wherein power is generated by transferring the first fluid into a power recovery device (3) The system of example exemplary embodiment 2 wherein said power recovery device comprises a pressure exchanger (4) The system of example exemplary embodiment 2 wherein said power recovery device transfers the power from the first fluid to a desalination feed stream (5) The system of example exemplary embodiment 2 wherein said power recovery device extracts power from the first fluid to pressurize desalination feed water (6) The system of example exemplary embodiment 5 wherein said desalination feed water comprises seawater or treated seawater (7) The system of example exemplary embodiment 5 wherein said pressurized desalination feed water is transferred into a reverse osmosis desalination process (8) The system of example exemplary embodiment 2 wherein the first fluid is transferred into the first storage reservoir after said power recovery (9) The system of example exemplary embodiment 1 wherein the first fluid comprises a chemical selected from the following: hydrocarbon, butane, propane, LPG, water, ammonia, ethanol, methanol, kerosene

(10) The system of example exemplary embodiment 1 wherein power in the first fluid is employed to generate electricity and pressure exchange to pressurized desalination feed water

(11) The system of example exemplary embodiment 10 wherein the proportion of power converted into electricity relative to the proportion of power transferred in a pressure exchange to pressurized desalination feed water is adjustable

(12) The system of example exemplary embodiment 2 wherein the first fluid transferred into a pressure recovery device comprises a pressure greater than the osmotic pressure of the desalination feed water

(13) The system of example exemplary embodiment 1 wherein the first fluid comprises desalination feed water

(14) The system of example exemplary embodiment 13 wherein power is generated by transferring the low density fluid into a desalination process

(15) The system of example exemplary embodiment 14 wherein the first fluid transferred to a desalination process comprises a pressure greater than the osmotic pressure of the desalination feed water

(16) The system of example exemplary embodiment 13 wherein at least a portion of the power in the first fluid is recovered using a power recovery device before transferring into a desalination process

(17) The system of example exemplary embodiment 13 wherein at least a portion of first fluid is transferred to an electric generator and at least a portion of the first fluid is transferred to a desalination process, Wherein the electric generator generates electricity from at least a portion of the power in the first fluid, and Wherein the desalination process converts at least a portion of the power in the first fluid into desalinated water

(18) The system of example exemplary embodiment 17 wherein the proportion of first fluid transferred to the desalination process and the proportion of first fluid transferred to the electric generator is adjustable

(19) The system of example exemplary embodiment 17 wherein the proportion of power in the first fluid transferred to the desalination process and the proportion of power in the first fluid transferred to the electric generator is adjustable

(20) The system of example exemplary embodiment 13 wherein the first fluid exiting the second storage reservoir is transferred into a desalination process, wherein the first fluid is separated into desalinated water

(21) The system of example exemplary embodiment 20 wherein desalination feed water is added to the first storage reservoir to make up for the first fluid exiting the system due to conversion into desalinated water

(22) The system of example exemplary embodiment 13 the first fluid exiting the second storage reservoir is transferred into a desalination process, wherein the first fluid is separated into desalinated water permeate and desalination retentate using a semipermeable membrane, and wherein the desalination retentate is discharged into the water body

(23) The system of example exemplary embodiment 1 wherein the low density fluid comprises desalinated water

(24) The system of example exemplary embodiment 1 wherein the stored power is employed to desalinate water

(25) The system of example exemplary embodiment 24 wherein the desalinated water is converted into chemicals selected from the following: hydrogen, oxygen, synthetic fuels, fuels, ammonia, hydrogen derived chemicals, carbon dioxide derived chemicals, air derived chemicals

(26) The system of example exemplary embodiment 1 wherein the higher elevation reservoir is in a location selected from the following: on land, floating on water, underwater

(27) The system of example exemplary embodiment 24 wherein the desalinated water is transported by a method selected from the following: a pipeline, a riser, a ship, an aircraft, a train, a truck, a conveyor belt

(28) The process of example exemplary embodiment 1 wherein the pump is employed to pressurize desalination feed water for desalination

(29) A process for storing power and desalinating water comprising:

a first storage reservoir configured to store a first fluid;

a second storage reservoir located at a lower elevation than the first storage reservoir and configured to store a second fluid which has a higher density than the first fluid;

a pump;

wherein the pump and the first and second reservoir are operatively connected such that power is stored by displacing the second fluid which has a higher density than the first fluid in the second storage reservoir by pumping the first fluid in the first storage reservoir to the second storage reservoir; and power is generated by allowing the first fluid to exit the second storage reservoir and pressure exchange with desalination feed water

(30) A process for storing power and desalinating water comprising:

a first storage reservoir configured to store a first fluid;

a second storage reservoir located at a lower elevation than the first storage reservoir and configured to store a second fluid which has a higher density than the first fluid;

a pump;

wherein the pump and the first and second reservoir are operatively connected such that power is stored by displacing the second fluid which has a higher density than the first fluid in the second storage reservoir by pumping the first fluid in the first storage reservoir to the second storage reservoir: and power is generated by allowing the first fluid to exit the second storage reservoir and enter a desalination process;

wherein the first fluid comprises desalination feed water

NOTES

Some embodiments may involve locating a desalination system or desalination plant offshore. For example, some embodiments may involve locating the desalination plant greater than 1 mile, or greater than 2 miles, or 3 miles, or 4 miles, or 5 miles, or 10 miles, or 15 miles, or 20 miles, or any combination thereof from shore. For example, some embodiments may involve locating the desalination plant on a floating platform, or floating vessel, or moored vessel, or semi-submersible vessel, or any combination thereof. For example, some embodiments may involve locating the desalination plant above water, or on the surface of a water body, or below the surface of a water body, or any combination thereof. For example, some embodiments may involve locating the desalination plant on a vessel or platform in deep water, such as in a location where the water depth is greater than 100 meters, or greater than 150 meters, or greater than 200 meters, or greater than 500 meters, or greater than 1,000 meters, or any combination thereof. There may be one or more or a combination of benefits in locating a desalination plant offshore, which may include, but are not limited to, one or more or a combination of the following:

For example, by locating a desalination plant offshore, a desalination plant may not occupy land, or may occupy substantially less land, or both.

For example an offshore desalination plant may enable the desalination in locations with limited available coastal land, or expensive coast land, or strict coastal zoning.

For example, an offshore desalination plant may substantially lower land or location costs because of minimal or no land use.

For example, an offshore desalination plant may require substantially less permitting or simpler permitting, or lower cost permitting, or any combination thereof due to, for example, including, but not limited to, one or more or a combination of the following: minimal or no modification to land, or minimal or no modification to coastal habitat, or minimal or no noise pollution, or minimal or no impact on road vehicle traffic patterns, or minimal or no visual pollution, or minimal impact to water access, or minimal or no impact to beach access, or minimal or no impact to coastal recreational activities.

For example, by locating a desalination plant offshore, the desalination plant may have minimal constraints related to scale or capacity because the desalination plant may not be constrained by land use or land availability. For example, larger capacity desalination plants may be feasibly constructed offshore than onshore, which may provide multiple benefits, which may include, but are not limited to, greater alleviation of or positive impact on water scarcity, and lower cost of desalinated water produced (cost per $m^3$ of desalinated water).

For example, by locating a desalination plant offshore, especially in locations with deep water, desalination brine effluent may dilute more effectively and may be less harmful to marine life. For example, desalination brine effluent may disperse more effectively in open ocean due to greater water volume per unit of water body surface area, or potentially greater ocean circulation, or potentially greater ocean kinetic energy, or any combination thereof. For example, desalination brine effluent may be less harmful to marine life in open ocean because it may disperse more effectively, it may not be in contact with or in close proximity to high-density marine habitats, such coral reefs, or kelp forests.

For example, locating a desalination plant offshore may reduce desalination pre-treatment costs due to the potentially lower concentration of suspended particles or sediments in the intake seawater water and due to the potentially more consistent composition and temperature of the intake seawater.

For example, locating a desalination plant offshore may enable the desalination plant to be powered irrespective of electricity grid disruptions or electricity shortages. For example, the desalination plant may have an integrated energy storage system, or backup power generation, or both. For example, the desalination plant may be at least partially powered by offshore energy sources, which may include, for example, offshore wind, or offshore solar, or wave power, or tidal power, or ocean thermal energy conversion (OTEC) power, or natural gas or oil produced offshore, or any combination thereof.

For example, an offshore desalination plant may be unharmed by or may not substantially be negatively impacted by earthquakes, forest fires, and tsunamis. In California, for example, forest fires are a common occurrence and earthquakes and tsunamis are a significant risk.

Some embodiments may comprise locating a desalination plant offshore and powering the desalination plant using a connected power source. For example, the desalination plant may be connected to an onshore power source, or electricity grid, or both using a subsea power cable. For example, the desalination plant may be connected to an offshore power source, such as, for example, offshore wind, or offshore floating wind, or wave power, or tidal power, or floating solar, or offshore solar, or offshore power generator, or ocean thermal energy conversion, or OTEC, or any combination thereof. For example, the desalination plant may be connected to both an offshore and onshore power source. For example, the desalination plant may be connected to one or more or a combination of onshore and/or offshore power sources, or power consumers, or both.

Some embodiments may comprise storing energy or power by displacing a high density fluid with a low density fluid, and releasing or discharging said stored energy by allowing said high density fluid to displace said low density fluid, wherein said releasing or discharging said stored energy or power comprises employing said released or discharged stored energy to power the desalination of water, such as salt water or seawater.

In some embodiments, low density fluid may be transferred between a lower elevation reservoir and a higher elevation reservoir, wherein the higher elevation reservoir possesses an elevation higher than the elevation of the lower elevation reservoir. In some embodiments, high density fluid may be transferred between a higher elevation reservoir and a lower elevation reservoir, wherein the higher elevation reservoir possesses an elevation higher than the elevation of the lower elevation reservoir. In some embodiments, a lower elevation reservoir may be located beneath the surface of a liquid body, such as beneath the surface of a body of water, or a solid body, such as beneath the surface of earth or other planet, or any combination thereof. In some embodiments, a higher elevation reservoir may be located above or on the surface of a liquid body, such as the surface of a body of water, or a solid body, such as the surface of earth or other planet, or any combination thereof. In some embodiments, a higher elevation reservoir may be located beneath the surface of a liquid body, such as beneath the surface of a body of water, or a solid body, such as beneath the surface of earth or other planet, or any combination thereof, although may be located at substantially a greater elevation than the lower elevation reservoir. In some embodiments, a higher elevation reservoir may be located in or on a floating vessel or platform. In some embodiments, a higher elevation reservoir may be located on a land. In some embodiments, a lower elevation reservoir may be located underwater, or beneath the surface of a water body, or on the seafloor or bottom of a water body, or tethered or suspended above the seafloor, or underground, or any combination thereof. In some embodiments, a higher elevation reservoir may be located underwater, or beneath the surface of a water body, or on the seafloor or bottom of a water body, or tethered or suspended above the seafloor, or underground, or any combination thereof. In some embodiments, the higher elevation reservoir may be configured to store low density liquid. In some embodiments, the lower elevation reservoir may be configured to store high density liquid. In some embodiments, the higher elevation reservoir may be configured to store high density liquid. In some embodiments, the lower elevation reservoir may be configured to store lower density liquid. In some embodiments, the higher elevation reservoir may be configured to store high density liquid, or low density liquid, or any combination thereof. In some embodiments, the lower elevation reservoir may be configured to store high density liquid, or low density liquid, or any combination thereof.

In some embodiments, the lower elevation reservoir and the higher elevation reservoir may be configured to store low density fluid. In some embodiments, the lower elevation tank may comprise a hydrostatic compensation tank, or bladder tank, or membrane tank. In some embodiments, power or energy may be stored by pumping a low density fluid into the subsea tank or lower elevation tank, expand the hydrostatic compensation tank, or bladder tank, or membrane tank and displacing ocean water or seawater. In some embodiments, power or energy may be generated by allowing the ocean water or seawater to displace the low density fluid in the subsea tank or lower elevation tank, collapsing the hydrostatic compensation tank, or bladder tank, or membrane tank and producing a high pressure flow of low density fluid and/or pressure exchanging said high pressure flow of low density fluid with desalination feed water in a desalination process.

In some embodiments, the lower elevation reservoir may be configured to store low density fluid and high density fluid. In some embodiments, the lower elevation tank may comprise a rigid tank or at least partially rigid tank. In some embodiments, power or energy may be stored by pumping a low density fluid into the subsea tank or lower elevation tank, displacing a high density fluid. In some embodiments, power or energy may be generated by allowing the high density fluid to displace the low density fluid in the subsea tank or lower elevation tank and producing a high pressure flow of low density fluid. In some embodiments, a pressure exchanger may be employed near the lower elevation reservoir to pressure exchange between the high density fluid and the low density fluid, which may facilitate the displacement of high density fluid using low density fluid or the displacement of low density fluid using high density fluid and/or may reduce stresses or required pressure resistance on the lower elevation reservoir or lower elevation reservoir tanks.

In some embodiments, high pressure low density fluid may be pressure exchanged with desalination feed water in a desalination process.

Some embodiments, may comprise employing the pressure of the low density fluid, such as displaced low density fluid, to pressurize or otherwise power the desalination of water, or saline water, or seawater.

For example, some embodiments may comprise pressure exchanging the high pressure low density liquid or a high pressure flow of low density liquid with desalination feed water before or during the desalination of at least a portion of said desalination feed water. Pressure exchanging may comprise an energy efficient process to employ the stored energy to power at least a portion of desalination.

For example, some embodiments may employ a liquid with the same or similar composition to desalination feed water as a low density fluid and may involve employing the high pressure low density liquid as a desalination feed water. Some embodiments may involve employing a pressure recovery device or pressure exchanger to extract power and/or reduce the pressure of the high pressure low density liquid to pressure appropriate for desalination feed water. Extracted pressure from said pressure recovery device or pressure exchanger may be employed to pressurize more desalination feed water, or to generate power, or to generate electricity, or for another purpose, or for another application, or any combination thereof. Some embodiments may involve employing a pressure recovery device or pressure exchanger to extract power and/or reduce the pressure of the high pressure low density liquid and/or employing the low density liquid as a desalination feed water. Some embodiments may have the capability of pressure exchanging, or employing high pressure low density liquid as desalination feed water, or employing low density liquid as desalination feedwater, or generating power from high pressure low density liquid, or any combination thereof. Some embodiments may have the capability of pressure exchanging, or employing high pressure low density liquid as desalination feed water, or employing low density liquid as desalination feedwater, or generating power from high pressure low density liquid, or any combination thereof and/or may have the capability of increasing or decreasing or controlling the relative rates of or amount of pressure exchanging, or employing high pressure low density liquid as desalination feed water, or employing low density liquid as desalination feedwater, or generating power from high pressure low density liquid, or any combination thereof. Employing a liquid comprising desalination feed water as a low density fluid and employing the high pressure displaced low density fluid as a desalination feed may comprise an energy efficient process to employ the stored energy to power at least a portion of desalination.

For example, some embodiments may comprise generating power from the high pressure low density fluid or a high pressure flow of low density fluid. Said generating of power may comprise generating electricity from displacement of low density fluid, which may comprise generating power from the high pressure low density fluid or a high pressure flow of low density fluid. Some embodiments may involve employing said generated power to power pumps or other equipment in a desalination process. For example, some embodiments may involve employing said generated power to power pumps to pressurize desalination feed water. It may be desirable to generate electric power from the stored energy discharged during the displacement of low density fluid because it may provide flexibility in the use of the power. For example, electricity may be used for other applications, or transmitted to an electricity grid, or employed to power pumps employed in desalination. For example, in some embodiments or in some instances, generating electric power from the stored energy discharged during the displacement of low density fluid may provide more flexibility in flow rates and pressures relative to a mechanical pressure exchanger. For example, in some embodiments or in some instances, generating electric power from the stored energy discharged during the displacement of low density fluid may allow for the desalination feed water pressurization system to be a further distance from the power generation of power from the high pressure displaced liquid relative to some mechanical pressure exchangers.

For example, some embodiments may discharge or release or generate power from at least a portion of said stored by pressure exchanging and/or power generation. For example, some embodiments may be capable of both pressure exchanging and/or power generation. For example, some embodiments controlling the level of pressure exchanging or power generation. For example, if demand for or value of electricity is greater than desalinated water, the system may increase rate or amount or level of power generation or electric power generation relative to the rate or amount or level of pressure exchanging. For example, if demand for or value of desalinated water is greater than electricity, the system may increase rate or amount or level of pressure exchanging relative to the rate or amount or level of power generation or electric power generation.

For example, some embodiments may be capable of powering desalination using grid electricity or other source of power in addition to or instead of energy stored. For example, in some instances, it may be desirable for at least a portion of the desalination process to be powered by the discharging of energy stored and at least a portion of the desalination process to be powered by power from another source, such as electricity from an electricity grid, or solar, or wind, or generator, or offshore power source, or any combination thereof. For example, in some embodiments, it may be desirable for the system to have at least a portion of control over the percentage or proportion of the desalination process powered by stored energy and the percentage or proportion of the desalination process powered by other sources of power or energy, such as electricity from an electricity grid, or solar, or wind, or generator, or offshore power source, or any combination thereof. In some embodiments, said stored energy may comprise stored power from said one or more sources of power or energy, which may include, but are not limited to, electricity from an electricity grid, or solar, or wind, or generator, or offshore power source, or any combination thereof. For example, in some instances, electricity from one or more sources may be in excess, or may be at a low or favorable cost, and the system may procure or obtain electricity and allocate at least a portion of said procured or obtained electricity for storage by means of fluid displacement energy storage and allocate at least a portion of said procured or obtained electricity to power a desalination process. For example, in some instances, electricity from one or more sources may be in excess, or may be at a low or favorable cost, and the system may procure or obtain electricity and allocate at least a portion of said procured or obtained electricity for storage and allocate at least a portion of said procured or obtained electricity to power a desalination process.

For example, in some embodiments, it may be desirable for the energy stored in the system to comprise at least a portion of electricity or energy or power sourced from or generated offshore. For example, in some embodiments, sourcing power from offshore may reduce the costs of the system or required scale of the subsea power cables because it may eliminate the need for, or reduce the required scale of, or both a subsea power cable from shore or land. For example, in some embodiments, sourcing power from offshore may reduce the cost of the system or construction timeline or permitting requirements because sourcing power offshore may eliminate the need for a subsea cable connected to shore or land and the associated permitting, or trenching, or burying, or siting, or any combination thereof.

For example, some embodiments may comprise pressure exchanging the high pressure high density liquid or a high pressure flow of high density liquid with desalination feed water before or during the desalination of at least a portion of said desalination feed water. Pressure exchanging may comprise an energy efficient process to employ the stored energy to power at least a portion of desalination.

There may be multiple potential benefits to pressure exchanging or employing the power of high pressure fluid from the discharging of a fluid displacement energy storage system to power desalination. Benefits may include, but are not limited to, one or more or any combination of the following:

For example, a direct or indirect pressure exchange may be significantly more energy efficient than generating electricity from hydraulic pressure or the flow of fluid and then using said generated electricity to power an electric pump to pressurize the seawater feed. For example, hydraulic pressure exchangers may be up to 98% or 99% energy efficient, meaning, in some embodiments, energy stored in a high pressure low density liquid or power in the high pressure low density liquid flow may be transferred or converted or transformed into a high pressure seawater feed solution at an energy efficiency of about 98%. For example, the round trip energy efficiency of storing energy and then employing said stored energy to power the pressurization of desalination feed water may be, for example, 88%. For example, the pump employed to store electricity may be 90% efficient and the efficiency of converting the stored energy into pressurized desalination water feed may be 98%, meaning the total round trip efficiency may be 0.9*0.98 or 88%.

For comparison, generating electricity from hydraulic pressure, such as hydraulic pressure from a high pressure low density liquid, may generally be about 90% energy efficient, and using said generated electricity to power a pump to pressurize the seawater feed may be about 90% energy efficient, meaning the energy efficiency of transforming stored energy in the form of gravitational potential energy or hydraulic pressure into a pressurized seawater feed solution via electricity generation and an electricity powered pump may be about 81% efficient, or 0.9*0.9.

For example, a direct or indirect pressure exchange may be significantly lower capital cost or CAPEX than generating electricity from hydraulic pressure or the flow of fluid and then using said generated electricity to power an electric pump to pressurize the seawater feed. For example, a hydraulic pressure exchanger may comprise a single unit or device which directly or indirectly transfers the hydraulic pressure of the displaced fluid, such as the high pressure low density fluid, to desalination feed water. A hydraulic pressure exchanger may comprise a mechanical pressure exchanger or a mechanical device or unit. For comparison, generating electricity from hydraulic pressure or flow of fluid using a generator and then using the generated electricity to power a pump to pressurize the desalination feed water may require at least two units, which may comprise a pump unit and a generator unit, which may be more expensive and more complex than a single pressure exchanger unit. Additionally, in some instances, a hydraulic or pneumatic or mechanical pressure exchanger may be lower cost than an equivalent capacity electric pump or electric generator because some pressure exchangers may not require substantial electrical components, including substantial electricity generation and/or electricity transmission components, which may add complexity and/or cost.

In some embodiments, a pressure exchanger may transfer kinetic energy or mechanical work between two fluid streams, wherein the fluid streams are each at different flow rates and pressures. For example, a pressure exchanger may transfer mechanical work or power from a high pressure low density liquid with 150 Bar pressure and a first flow rate, to a desalination feed water stream, wherein the desalination feed water stream has a second flow rate which is greater than said first flow rate and is pressurized from a starting pressure of 1 Bar to a resulting pressure of 68 Bar by the pressure exchanger. For example, a pressure exchanger may transfer mechanical work or power from a high pressure low density liquid with 150 Bar pressure and a first flow rate, to a desalination feed water stream, wherein the desalination feed water stream has a second flow rate which is greater than said first flow rate and is pressurized from a starting pressure of 30 Bar to a resulting pressure of 68 Bar by the pressure exchanger.

For example, a direct or indirect pressure exchange may enable the use of different fluids for energy storage than the desalination feed water. For example, a direct or indirect pressure exchange may enable the use of fluids which may comprise a different composition than desalination feed water as the high pressure low density liquid. For example, a direct or indirect pressure exchange may enable the use of fluids which may be soluble in the desalination feed water, or incompatible with the desalination feed water, a different temperature than the desalination feed water, or reactive with the desalination feedwater, or comprise a chemical other than desalination feed water, or any combination thereof.

There may be multiple potential benefits to employing at least a portion of the desalination feed water as a low density fluid in an energy storage system.

For example, employing the desalination feed water as a low density in the energy storage system may enable a greater round trip energy efficiency of the energy storage system if at least a portion of the energy stored in the energy storage system is employed to power desalination. For example, in some embodiments, discharging the energy storage system may involve a high density fluid, which may comprise a fluid with a greater density than the desalination feed water, displacing a low density fluid, which may comprise desalination feed water, and resulting in the low density fluid becoming a high pressure low density fluid stream. For example, in some embodiments, said high pressure low density fluid stream comprising desalination feed water may be transferred or directed into a reverse osmosis desalination process or other desalination process. For example, in some embodiments, said high pressure low density fluid stream comprising desalination feed water may be transferred or directed into a reverse osmosis desalination process or other desalination process, wherein the pressure of the high pressure low density fluid stream comprising desalination feed water may be sufficiently high to overcome the osmotic pressure of the dissolved salts or solutes and produce at least a portion of desalinated water permeate and/or at least a portion of retentate brine or desalination brine effluent. In some embodiments, transferring the high pressure low density fluid stream comprising desalination feed water into a reverse osmosis or other pressure driven desalination system may enable a higher energy efficiency because it may reduce the amount or level of mechanical or electrical conversions or exchanges to achieve the discharge of stored energy to power at least a portion of desalination. For example, in some embodiments, the round trip energy efficiency may be about 90%, because the pump employed to initial store energy by displacing a high density fluid using a low density fluid may have an energy efficiency of 90%, and releasing said stored energy may be conducted by allowing the high density fluid to displace the low density fluid with minimal additional mechanical exchange or facilitated by a high efficiency pressure exchanger. In some embodiments, if the pressure of the high pressure low density fluid may be greater than a desired pressure, such as the required pressure for desalination, and/or a pressure exchanger may extract or exchange a portion of pressure or power to reduce the pressure of the high pressure low density fluid to a desired pressure and/or employ the extracted pressure to pressurize another fluid, such as additional desalination feed water. In some embodiments, if the pressure of the high pressure low density fluid may be greater than a desired pressure, such as the required pressure for desalination, and/or a hydraulic power recovery turbine or generator may extract power and/or generate electricity to reduce the pressure of the high pressure low density fluid to a desired pressure and/or employ or transmit or sell or use said generated electricity. In some embodiments, the pressure of the high pressure low density fluid may be lower than the pressure required to overcome the osmotic pressure for desalination and the pressure of the high pressure low density fluid may be increased using, for example, including, but not limited to, one or more or any combination of the following: a booster pump, or a pressure exchanger, or pressure exchanger with retentate solution, or other pressure exchanger, or other pressure increasing mechanism.

For example, employing the desalination feed water as a low density in the energy storage system may reduce capital cost because it may reduce the need for or amount of mechanical pressure exchange or power generation equipment, or reduce system complexity, or any combination thereof.

In some embodiments there may be more than one pressure exchange. For example, in some embodiments, including but not limited to, a pressure exchanger may be employed to extract or exchange or transfer power or pressure from a high pressure low density fluid, or a pressure exchanger may be employed to extract or exchange or transfer power or pressure from desalination brine effluent or retentate brine, or any combination thereof.

In some embodiments, the low density fluid in an energy storage system may comprise desalination feed water. In some embodiments, the high density fluid in an energy storage system may comprise desalination feed water. In some embodiments, the low density fluid in an energy storage system may comprise desalination brine effluent or retentate. In some embodiments, the high density fluid in an energy storage system may comprise desalination brine effluent or retentate. In some embodiments, the high density fluid in an energy storage system may comprise further desalination brine effluent or retentate, which may have been further concentrated using, for example, including, but not limited to, one or more or any combination of the following: evaporation, or distillation, or membrane distillation, or forward osmosis, or high pressure reverse osmosis, or high pressure nanofiltration, or DTRO, or osmotically assisted reverse osmosis, or cryodesalination. In some embodiments, the low density fluid in an energy storage system may comprise desalinated water or freshwater. In some embodiments, the high density fluid in an energy storage system may comprise desalinated water or freshwater.

For example, some embodiments may comprise storing the desalinated water.

For example, in some embodiments, desalinated water may be stored in subsea storage tanks. In some embodiments, said subsea storage tanks may comprise bladder tanks or membrane tanks or other tanks in pressure equilibrium or pressure compensation with the surrounding or adjacent ocean and/or which involve desalinated water indirectly or displacing seawater. In some embodiments, because desalinated freshwater may be less dense than seawater, pumping desalinated water into the subsea tank may require more energy than pumping desalinated water out of the subsea tank because of the buoyancy of the desalinated freshwater in the seawater, and/or storing desalinated water subsea may comprise storing at least a portion of fluid displacement gravitational potential energy.

For example, in some embodiments, desalinated water may be stored in floating storage tanks, or floating storage vessels. In some embodiments, said floating storage vessel may comprise ships which store liquids and may be designed to transport liquids, such as desalinated water. In some embodiments, said floating storage vessel may comprise a vessel wherein at least a portion is located beneath the surface of a water body, although the vessel itself may be above or suspended above the seafloor. In some embodiments, said floating storage vessel may comprise a floating vessel in pressure equilibrium with the air. In some embodiments, said floating storage vessel may comprise a floating vessel in pressure equilibrium with the air, for example, by means of, including, but not limited to, a bladder tank, or floating roof, or direct liquid-air interface, or any combination thereof.

For example, in some embodiments, desalinated water may comprise a low density fluid in the energy storage system, and at least a portion of desalinated water may be stored while being employed as a low density liquid in the energy storage system. For example, in some embodiments, desalinated water may have a dual purpose of functioning as a low density fluid in a fluid displacement energy storage system and/or as water stored for a later transfer, or transport, or distribution, or consumption, or other use.

For example, in some embodiments, desalinated water may comprise a high density fluid in the energy storage system, and at least a portion of desalinated water may be stored while being employed as a high density liquid in the energy storage system. For example, in some embodiments, desalinated water may have a dual purpose of functioning as a high density fluid in an fluid displacement energy storage system and/or as water stored for a later transfer, or transport, or distribution, or consumption, or other use.

For example, in some embodiments, desalinated water may comprise a low density fluid in the energy storage system, wherein the desalinated water may be stored in a higher elevation reservoir, or a lower elevation reservoir, or both depending on the state of charge or level of charge or level of energy stored in the energy storage system. In some embodiments, the lower elevation reservoir may comprise a rigid tank, which may sometimes store both high density fluid and low density fluid. In some embodiments, the lower elevation reservoir may comprise a tank storing low density fluid separate or non-contiguously separate from a tank storing high density fluid and/or said tank or tanks may comprise a rigid tank, or bladder tank, or pressure compensated tank, or tank at pressure equilibrium with the surrounding or adjacent seawater, or any combination thereof, and/or wherein a pressure exchange may be employed to enable or facilitate the displacement of low density fluid with high density fluid, or high density fluid with low density fluid, or any combination thereof.

For example, in some embodiments, desalinated water may comprise a high density fluid in the energy storage system, wherein the desalinated water may be stored in a higher elevation reservoir, or a lower elevation reservoir, or both depending on the state of charge or level of charge or level of energy stored in the energy storage system. In some embodiments, the lower elevation reservoir may comprise a rigid tank, which may sometimes store both high density fluid and low density fluid. In some embodiments, the lower elevation reservoir may comprise a tank storing low density fluid separate or non-contiguously separate from a tank storing high density fluid and/or said tank or tanks may comprise a rigid tank, or bladder tank, or pressure compensated tank, or tank at pressure equilibrium with the surrounding or adjacent seawater, or any combination thereof, and/or wherein a pressure exchange may be employed to enable or facilitate the displacement of low density fluid with high density fluid, or high density fluid with low density fluid, or any combination thereof.

Note: Adding a high density fluid to a reservoir, wherein the addition of the high density fluid into the reservoir, or the process of transferring the high density fluid to the reservoir, or the process of transferring the high density fluid between reservoirs, or any combination thereof results in removal or exiting of low density fluid from said reservoir may comprising 'displacing' low density fluid or 'displacement' of low density fluid.

Note: Adding a low density fluid to a reservoir, wherein the addition of the low density fluid into the reservoir, or the process of transferring the low density fluid to the reservoir, or the process of transferring the low density fluid between reservoirs, or any combination thereof results in removal or exiting of high density fluid from said reservoir may comprising 'displacing' high density fluid or 'displacement' of high density fluid.

In some embodiments, the pump employed in storing energy may also be employed as a generator to generate electricity.

Desalination processes or regeneration processes or separation processes may include, but are not limited to, one or more or a combination of the following: reverse osmosis, or nanofiltration, or semi-permeable membrane based process, or mechanical vapor compression distillation, or vacuum distillation, or distillation, or membrane distillation, or forward osmosis, or solar desalination, or condensation, or osmotically assisted reverse osmosis, or DTRO, or electrodialysis, or cryodesalination, or high pressure reverse osmosis, or high pressure nanofiltration, or precipitation, or solventing-out, or extraction, or extractive distillation.

Some embodiments may involve transferring or transporting desalinated water from the offshore desalination plant to an onshore application, or to a transmission site, or a municipal water plant, or a municipal water distribution system, or city water distribution system, or an industrial water user or water consumer, or any combination thereof. In some embodiments, desalinated water may be transferred using a pipeline. In some embodiments, desalinated water may be transported using a ship, or submarine, or both. In some embodiments, desalinated water may be transported using a subsea pipeline, or suspended pipeline, or floating pipeline. In some embodiments, desalinated water may be transported using a conveyor belt, or a train. In some embodiments, desalinated water may be transported using an aircraft.

Some embodiments may involve using the desalinated water.

For example, some embodiments may involve employing the desalinated water to produce hydrogen. For example, some embodiments may involve employing the desalinated water to produce hydrogen derivatives, such as ammonia, or chemicals. For example, some embodiments may involve employing the desalinated water to produce chemicals. For example, some embodiments may involve employing the desalinated water to produce $CO_2$ derived chemicals. For example, some embodiments may involve employing the desalinated water to produce oxygen or liquid oxygen. For example, some embodiments may involve employing the desalinated water to produce rocket fuel, or fuel for a space ship, or fuel for a space port. For example, some embodiments may involve employing the desalinated water to produce hydrogen peroxide. For example, some embodiments may involve employing the desalinated water to produce synthetic fuels, or renewable fuels, or renewable energy derived chemicals, or low carbon chemicals, or low carbon emission chemicals, or lower carbon footprint chemicals or fuels, or any combination thereof. For example, some embodiments may involve producing said chemicals or fuels offshore. For example, some embodiments may involve producing said chemicals or fuels onshore.

For example, some embodiments may involve producing chemicals or fuels from desalinated water offshore, then transferring or transporting said chemicals or fuels. For example, said chemicals or fuels may be transported using one or more or any combination of vessels, such as ships. For example, said chemicals or fuels may be transported using one or more or a combination of pipelines. In some embodiments, said chemicals or fuels may be transferred or transported to applications or uses onshore. For example, in some embodiments, said chemicals or fuels may be employed to, for example, including, but not limited to, one or more or any combination of the following: fuel vessels, or fuel cars, or fuel trains, or fuel airplanes, or fuel ships, or fuel trucks, or heat or cool, or generate electricity, or produce chemicals, or use in one or more applications, or manufacture, or use in manufacturing, or produce products. In some embodiments, said chemicals or fuels may be transferred or transported to applications or uses offshore. For example, in some embodiments, said fuels may be employed to fuel-up or power ships, or marine vessels, or aircraft, or military aircraft, or military vessels, or military equipment, or equipment, or marine equipment, or autonomous vehicles, or offshore ports, or power generation equipment, or pumping equipment, or land vehicles, or surface vehicles, or subsea vehicles, or subsea equipment, or rockets, or spaceships, or space vehicles, or spaceports, or floating space ports, or $CO_2$ capture, or any combination thereof.

For example, some embodiments may involve employing synthesized chemicals as the low density fluid, or the high density fluid, or any combination thereof in the energy storage system. Employing synthesized chemicals as the low density fluid, or the high density fluid, or any combination thereof in the energy storage system may enable a dual purpose for the chemicals, which may involve simultaneous storage of the chemicals for sale or other use, and use of the chemicals for storing or generating power in the form of gravitational potential energy.

For example, some embodiments may involve using the desalinated water for offshore use or offshore consumption. For example, some embodiments may involve using the desalinated water for human consumption. For example, some embodiments may involve using the desalinated water for offshore agricultural use. For example, some embodiments may involve using the desalinated water for aquaculture. For example, some embodiments may involve using the desalinated water for the extraction, or production, or mining, or processing, or operation, or any combination thereof of natural resources, or oil, or natural gas, or clathrates, or minerals, or materials, or any combination thereof.

Some embodiments may comprise an offshore data center.

Desalination feed water may comprise the liquid from which a desalination process extracts water or produces desalinated water or the water source or the feedstock to produce desalinated water. For example, desalination feed water or feed water may comprise seawater or treated seawater.

Example Notes:

Locating desalination offshore potential benefits may include, but are not limited to:

No land use

Lower cost

Less permitting

More scalable

Less potential harm to marine life, greater effluent dilution, feedwater contains less particulates, lower pretreatment costs, Long duration energy storage to enable greater percentage of renewable power generation or renewable power for desalination Fluid displacement energy storage to store energy. In some embodiments, said energy may comprise electricity from renewable electricity sources, such as solar or wind.

Energy may be stored in the form of gravitational potential energy

Generating energy from the stored power may comprise allowing a high density fluid to displace a low density fluid, generating a high pressure low density liquid or a high pressure flow of low density fluid. In some embodiments, the high pressure low density fluid may be pressure exchanged with seawater feed, which may mechanically pressurize the seawater feed before or while feeding said seawater feed into a desalination process, such as a reverse osmosis process.

A direct or indirect pressure exchange may be significantly more energy efficient than generating electricity from said hydraulic pressure and then using said generated electricity to power an electric pump to pressurize the seawater feed. For example, hydraulic pressure exchangers may be about 98% energy efficient, meaning energy stored in a high pressure low density liquid may be transferred or converted or transformed into a high pressure seawater feed solution at an energy efficiency of about 98%. For comparison, generating electricity from hydraulic pressure, such as hydraulic pressure from a high pressure low density liquid, may generally be about 90% energy efficient, and using said generated electricity to power a pump to pressurize the seawater feed may be about 90%/a energy efficient, meaning the energy efficiency of transforming stored energy in the form of gravitational potential energy or hydraulic pressure into a pressurized seawater feed solution via electricity generation and an electricity powered pump may be about 81% efficient, or 0.9*0.9.

In most seawater reverse osmosis desalination processes, the most energy intensive part of desalination may be the pressurization of the seawater feed solution to overcome the osmotic pressure of the seawater and enable the extraction of freshwater from the seawater.

In some embodiments, said low density fluid may comprise seawater or treated seawater. In some embodiments, said high pressure low density fluid may comprise seawater and may comprise the feed solution to a desalination process, such as a reverse osmosis desalination process.

If electricity, such as renewable electricity, may be generated offshore, may eliminate need for a subsea transmission cable back to shore.

For example, electricity may comprise electricity generated offshore

In some embodiments, a subsea power cable may transfer electricity from shore to the offshore energy storage and desalination process, where the electricity may be used to power desalination, or may be stored using liquid displacement energy storage, or both.

Resilience—power in event of electricity grid disruptions or electricity shortages Potentially less impacted by earthquakes and forest fires Desalinated water may be transferred to shore or other application by ship, or pipeline Desalinated water may be employed in the production of hydrogen. For example, desalinated water may be employed in the production of hydrogen from the electrolysis of water, or thermolysis of water, or any combination thereof. For example, desalinated water may be employed in the production of hydrogen using the water gas shift process. For example, desalinated water may be employed in the production of hydrogen, or syngas, or other valuable energy carrier or material feedstock or material by creating steam for gasification of carbonaceous materials. Desalinated water may be employed in another industrial application involving the use of water.

In some embodiments, electricity may be transferred by a ship

Internal storage for desalinated water

High Density Liquid May Comprise Flow Battery Electrolyte (such as vanadium oxide, or iron oxide flow battery electrolyte)

In some embodiments, the high density fluid, or low density fluid, or both may comprise a flow battery electrolyte. Energy may be stored in the gravitational potential energy storage of low density fluid displacing high density fluid, or the flow battery electrolyte's chemical energy storage or state of charge, or any combination thereof.

In the present example, high density fluid may comprise flow battery electrolyte.

In some embodiments, when charging, low density fluid in a high elevation region reservoir may be pumped to displace the high density fluid in a low elevation reservoir, resulting in the low density fluid entering or filling the low elevation reservoir and the high density fluid entering or filling the high elevation reservoir. Fluids may be transferred between the low elevation reservoir and high elevation reservoir using one or more pipes or pipelines. Said high density fluid may comprise 'discharged' or low charge state flow battery electrolyte.

In the higher elevation region, the high density fluid, which may comprise discharged flow battery electrolyte, may be stored in a high elevation high density fluid storage tank configured to store discharged flow battery electrolyte. Additional energy or electricity may be stored by charging the discharged flow battery electrolyte, which may involve transferring the discharged flow battery electrolyte through a charging mechanism, such as an AEM and/or CEM, wherein the discharged flow battery electrolyte is transformed into a charged flow battery electrolyte by charging said flow battery electrolyte by an electrochemical reaction or by means of electricity, or by means of light, or by means of photons, or by means of introduction of an energy carrier, or any combination thereof, and then transferring and/or storing the charged flow battery electrolyte a high elevation region high density fluid storage tank, which may be configured to store charged flow battery electrolyte.

In some embodiments, when discharging, electricity may be generated by discharging or generating power from at least a portion of the charged flow battery electrolyte by transferring said charged flow battery electrolyte from the charged flow battery electrolyte storage tank into a discharging or power generating mechanism, such as an AEM and/or CEM, and generating electricity or power, and forming discharged flow battery electrolyte, and transferring said formed discharged flow battery electrolyte into a high elevation region discharged flow battery electrolyte storage reservoir, which may comprise a high elevation region high density fluid storage reservoir. Additional electricity may be generated or the energy storage system may be further discharged by allowing discharged flow battery electrolyte in the high elevation region discharged flow battery electrolyte storage reservoir to be transferred from the higher elevation region to the lower elevation region, displacing the low density fluid in the lower elevation region or lower elevation reservoir, and generating power from the high pressure displaced low density fluid. Fluids may be transferred between the low elevation reservoir and high elevation reservoir using one or more pipes or pipelines.

In some embodiments, at least a portion of the discharged flow battery electrolyte may be charged while or after being transferred to the higher elevation region, which may reduce the required scale of or eliminate the need for the higher elevation discharged flow battery electrolyte storage reservoir.

In some embodiments, the charged flow battery electrolyte may be employed as a high density fluid in the energy storage system.

Flow battery electrolyte, or other high density liquid, or other low density liquid, or low density liquid, or high density liquid, or any combination thereof may comprise a fluid. Said fluid may include, but is not limited to, one or more or any combination of the following: a liquid, a gas, a solid, a supercritical fluid, an emulsion, or solid-liquid mixture, a superfluid, a suspension, a solid-liquid, a phase change material, a gas-liquid mixture, or a pumpable substance, or a pumpable substance under certain conditions, or any combination thereof.

Example electrolytes may include, but are not limited to, iron, vanadium, manganese Example Notes:

Energy storage system wherein the low density fluid, during discharge, may be pressure exchanged, using a pressure exchanger, with seawater feed for desalination using reverse osmosis.

Example Advantages:

Hydraulic pressure exchanger may be more energy efficient than electric turbine or generator, increasing round trip energy efficiency Hydrogen production may require 'freshwater'—to produce hydrogen, generally water employed may be required to be freshwater, some embodiments of the present invention may function as the desalination system to produce the freshwater required to produce hydrogen Ocean water feed may be from deep, open ocean Feed seawater may be better water quality (for example: less particulates and pre-treatment)

Feed seawater may not need to be transported by an open intake pipeline onshore, which may be invasive to the shoreline and environment Feedwater pipeline may be shorter in length Feedwater pipeline may not need to be buried Feed seawater pipeline and water extraction significantly may be less impactful on the marine environment Some embodiments may have no or practically no land use Some embodiments may involve no or minimal shoreline use or shoreline destruction Some embodiments may enable practically infinitely scalable desalination with minimal impact to shoreline or coastal real estate Potential for near 100% renewable desalination—desalination plant with built-in energy storage for renewable energy storage Potentially lower permitting and environmental mitigation costs (especially expensive in California)

"The Carlsbad plant project cost has been estimated at approximately $650 million (3,400 m3/day) (Global Water Intelligence 2016), with about half of that cost related to permitting and environmental mitigation."

Possible location—Offshore Moss Landing California, with subsea transmission cable from Moss Landing Power Plant/Energy Storage location or from a floating offshore wind farm in some embodiments, HDL or LDL may themselves comprise reverse osmosis feed (e.g. HDL may be seawater or LDL may be seawater) —further increasing round trip energy efficiency because, if the LDL is seawater, no pressure exchange may be required.

Some embodiments may involve internal fresh/desalinated water storage

Electricity or power may be generated from renewable energy sources, such as floating solar, or floating wind, or offshore wind, or offshore solar, or wave power, or tidal power, or ocean thermal energy conversions, or salinity gradient power generation Some embodiments may transfer water to shore rather than electricity Greater round trip energy efficiency Water is transferred to shore instead of electricity Electricity may be generated offshore Electricity or power may be generated from renewable energy sources, such as floating solar, or floating wind, or offshore wind, or offshore solar, or wave power, or tidal power, or ocean thermal energy conversions Electricity or power may be generated from nuclear power Electricity or power may be generated from the combustion of one or more hydrocarbons Further lowering cost by potentially eliminated need for a subsea power transmission cable to or from shore An electric or otherwise renewable powered ship may transport water from the desalination plant. Multiple ships from multiple ports may be employed to ship the desalinated water to various parts of, for example, California or elsewhere In some embodiments, desalination may occur solely using hydraulic pressure exchange as pressure source In some embodiments, desalination may occur using hydraulic pressure exchanger when electricity is not available or too expensive (for example: during energy storage discharge) and using electric power when electricity is available and/or low cost and/or affordable Potential Integration with Offshore Renewables Long duration energy storage to enable greater percentage of renewable power generation Fluid displacement energy storage to store energy. In some embodiments, said energy may comprise electricity from renewable electricity sources, such as solar or wind.

Energy may be stored in the form of gravitational potential energy

Generating energy from the stored power may comprise allowing a high density fluid to displace a low density fluid, generating a high pressure low density liquid or a high pressure flow of low density fluid. In some embodiments, the high pressure low density fluid may be pressure exchanged with seawater feed, which may mechanically pressurize the seawater feed before or while feeding said seawater feed into a desalination process, such as a reverse osmosis process.

A direct or indirect pressure exchange may be significantly more energy efficient than generating electricity from said hydraulic pressure and then using said generated electricity to power an electric pump to pressurize the seawater feed. For example, hydraulic pressure exchangers may be about 98% energy efficient, meaning energy stored in a high pressure low density liquid may be transferred or converted or transformed into a high pressure seawater feed solution at an energy efficiency of about 98%. For comparison, generating electricity from hydraulic pressure, such as hydraulic pressure from a high pressure low density liquid, may generally be about 90% energy efficient, and using said generated electricity to power a pump to pressurize the seawater feed may be about 90% energy efficient, meaning the energy efficiency of transforming stored energy in the form of gravitational potential energy or hydraulic pressure into a pressurized seawater feed solution via electricity generation and an electricity powered pump may be about 81% efficient, or 0.9*0.9.

In most seawater reverse osmosis desalination processes, the most energy intensive part of desalination may be the pressurization of the seawater feed solution to overcome the osmotic pressure of the seawater and enable the extraction of freshwater from the seawater.

In some embodiments, said low density fluid may comprise seawater or treated seawater. In some embodiments, said high pressure low density fluid may comprise seawater and may comprise the feed solution to a desalination process, such as a reverse osmosis desalination process.

If electricity, such as renewable electricity, may be generated offshore, may eliminate need for a subsea transmission cable back to shore. For example, said renewable electricity may comprise In some embodiments, a subsea power cable may transfer electricity from shore to the offshore energy storage and desalination process, where the electricity may be used to power desalination, or may be stored using liquid displacement energy storage, or both.

Resilience—power in event of electricity grid disruptions or electricity shortages Desalinated water may be transferred to shore or other application by ship, or pipeline Desalinated water may be employed in the production of hydrogen. For example, desalinated water may be employed in the production of hydrogen from the electrolysis of water, or thermolysis of water, or any combination thereof. For example, desalinated water may be employed in the production of hydrogen using the water gas shift process. For example, desalinated water may be employed in the production of hydrogen, or syngas, or other valuable energy carrier or material feedstock or material by creating steam for gasification of carbonaceous materials. Desalinated water may be employed in another industrial application involving the use of water.

In some embodiments, electricity may be transferred by a ship

Internal storage for desalinated water

Detailed Figure Descriptions

FIGS. 1-4

FIGS. 1-4 Description

FIGS. 1-4 may show a tank of a storage reservoir which may be configured to store low density fluid and high density fluid. FIGS. 1-4 may show the changes in relative fluid amounts and fluid-fluid interface level during charging and discharging of some embodiments of energy storage system. FIG. 2 and FIG. 4 may represent a higher elevation reservoir tank during charging or storing power in the energy storage system, or may represent a lower elevation reservoir tank during discharging or generating power from the energy storage system. FIG. 1 and FIG. 3 may represent a higher elevation reservoir tank during discharging or generating power from the energy storage system, or may represent a lower elevation reservoir tank during charging or storing power in the energy storage system.

FIGS. 1 and 2 may provide 'liquid-liquid interface' as an example fluid-fluid interface. Fluid-fluid interfaces instead of, or in addition to, liquid-liquid interfaces may be employed, and may, for example, include, but are not limited to, one or more or any combination of the following: liquid-liquid interfaces, or gas-liquid interfaces, or [solid-liquid] —liquid interfaces, or emulsion—liquid interfaces, or suspension—liquid interfaces, or suspension-suspension interfaces, or [solid-liquid]—[solid-liquid] interfaces, or gas-suspension interfaces, or gas—emulsion interfaces, or interfaces comprising at least one fluid comprising a super-critical fluid, or supercritical fluid—liquid interfaces.

FIG. 1 and FIG. 2 may show a tank of a storage reservoir with a direct fluid-fluid interface or direct contact between the low density fluid and high density fluid within a storage reservoir tank. In some embodiments, it may be desirable to employ tanks configured with a direct fluid-fluid interface when the system may be designed to have the high density fluid and low density fluid practically mutually insoluble, or have the high density fluid and low density fluid mutually nearly fully saturated at solubility limits, or any combination thereof. In some embodiments, tanks configured with direct fluid-fluid interface may employ high density fluid and low density fluid which are mutually soluble. In some embodiments, tanks configured with direct fluid-fluid interface employing a high density fluid and low density fluid which are mutually soluble may possess a stratification layer or cline layer or chemocline at the interface between the low density fluid and high density fluid, which may comprise a varying concentration of high density fluid components and/or low density fluid components depending on location or elevation within the stratification layer or cline layer or chemocline layer.

FIG. 3 and FIG. 4 may show a tank of a storage reservoir with a divider or barrier which at least partially occupies a region which may otherwise be occupied by a direct fluid-fluid interface within a storage reservoir tank. In some embodiments, a divider or barrier at a fluid-fluid interface or a hypothetical fluid-fluid interface may reduce the surface area of a direct fluid-fluid interface, or reduce the surface area by which a high density fluid is in direct contact with a low density fluid, or any combination thereof. In some embodiments, a divider or barrier at a fluid-fluid interface or a hypothetical fluid-fluid interface may reduce the rate or amount of mixing between the low density fluid and/or high density fluid within a tank relative to embodiments with a direct fluid-fluid interface, which may reduce the rate of contamination or dilution of the high density fluid, or low density fluid, or both. In some embodiments, it may be desirable to employ at least a portion of a barrier or divider at a fluid-fluid interface between a high density fluid and low density fluid wherein the high density fluid may be at least a portion soluble in the low density fluid, or wherein the low density fluid may be at least a portion solution in the high density fluid, or any combination thereof.

In some embodiments, a portion of one or more chemical constituents of the higher density fluid may dissolve in the lower density fluid. It may be desirable to regenerate or otherwise remove said one or more chemical constituents of the higher density fluid from the lower density fluid. It may be desirable to employ systems for regenerating or otherwise removing said one or more chemical constituents of the higher density fluid from the lower density fluid using one or more or a combination of separation methods or processes.

In some embodiments, a portion of one or more chemical constituents of the lower density fluid may dissolve in the higher density fluid. It may be desirable to regenerate or otherwise remove said one or more chemical constituents of the lower density fluid from the higher density fluid. It may be desirable to employ systems for regenerating or otherwise removing said one or more chemical constituents of the lower density fluid from the higher density fluid using one or more or a combination of separation methods or processes.

Example FIGS. 1-4 Key

| Label in Figure | Description |
| --- | --- |
| Low Density Fluid | Low density fluid or lower density fluid may comprise a fluid within an fluid displacement energy storage system which possesses a density less than the density of the higher density fluid within the system under at least a portion of the operating conditions within the system. For example, some embodiments may employ a low density fluid and a high density fluid, wherein energy or power may be stored by displacing at least a portion of high density fluid in a lower elevation region to a higher elevation region using a low density fluid transferred from a higher elevation region. |
| IN | 'IN' may represent the flow or movement of a fluid into a tank. For example, 'IN' may represent that the amount of a given fluid is increasing within a tank. For example, 'IN' may represent that the rate of a given fluid entering the tank or reservoir is positive in a given location within a tank or reservoir, or the rate of change of an amount of a fluid within a tank net positive, or any combination thereof. For example, in FIG. 1 and FIG. 3, 'IN' may show a low density fluid entering a tank or being added to a tank or flowing into a tank. For example, in FIG. 2 and FIG. 4, 'IN' may show a high density fluid entering a tank or being added to a tank or flowing into a tank. |
| High Density Fluid | High density fluid or higher density fluid may comprise a fluid within an fluid displacement energy storage system which possesses a density greater than the density of the lower density fluid within the system under at least a portion of the operating conditions within the system. For example, some embodiments may employ a low density fluid and a high density fluid, wherein energy or power may be stored by displacing at least a portion of high density fluid in a lower elevation region to a higher elevation region using a low density fluid transferred from a higher elevation region. |
| OUT | 'OUT' may represent the flow or movement of a fluid out of or from a tank. For example, 'OUT' may represent that the amount of a given fluid is decreasing within a tank. For example, 'OUT' may represent that the rate of a given fluid exiting the tank or reservoir is positive in a given location within a tank or reservoir, or the rate of change of amount of fluid within a tank may |

Example FIGS. 1-4 Key

| Label in Figure | Description |
|---|---|
| | be net negative, or any combination thereof. For example, in FIG. 1 and FIG. 3, 'OUT' may show a high density fluid exiting a tank or being removed from a tank or flowing out of a tank. For example, in FIG. 2 and FIG. 4, 'OUT' may show a low density fluid exiting a tank or being removed from a tank or flowing out of a tank. |
| Liquid-Liquid Interlace | A liquid-liquid interface may be provided as an example fluid-fluid interface. In some embodiments, a fluid-fluid interface may comprise where a high density fluid and a low density fluid meet or intersect. In some embodiments, a direct fluid-fluid interface may comprise where a high density fluid and a low density fluid are in direct physical contact. In some embodiments, a fluid-fluid interface may comprise a stratification or cline layer where high density fluid transitions into low density fluid or vise versa. In some embodiments, the position or elevation of a liquid-liquid interface may change if for example, including, but not limited to, one or more or any combination of the following changes: the relative volume of high density fluid to low density fluid, or the total volume of high density fluid, or the total volume of low density fluid, or any combination thereof or the composition of low density fluid, or the composition of high density fluid. Some embodiments may employ or involve a hypothetical fluid-fluid interface or hypothetical liquid-liquid interface. In some embodiments, a hypothetical fluid-fluid interface may comprise where a fluid-fluid interface may exist or be present, if, for example, a barrier or divider was not present. |
| Floating Barrier | A floating barrier may comprise a barrier or divider which may occupy a region between a low density fluid and high density fluid within a tank or other storage vessel and/or may be located at or near a fluid-fluid interface or a hypothetical fluid-fluid interface. In some embodiments, the barrier or divider may be floating, for example, wherein the density of the floating barrier or divider may be greater than the density of the low density fluid and/or less than the density of the high density fluid. In some embodiments, the barrier or divider may be of a greater density than the higher density fluid, or may be of a lesser density than the lower density fluid, or any combination thereof. In some embodiments, the barrier or divider may adjust its position with passive mechanisms, or active mechanisms, or any combination thereof. |

FIGS. 1-4 Example Step-by-Step Description

At least a portion of low density fluid is transferred into the top region of the tank, displacing at least a portion of high density fluid below the low density fluid, wherein at least a portion of high density fluid exits from the bottom region of the tank. As low density fluid enters the tank and high density fluid is displaced, the position of the fluid-fluid interface or hypothetical fluid-fluid interface within the tank may change. For example, the position or elevation of the fluid-fluid interface or hypothetical fluid-fluid interface may decrease. If a barrier or divider is present, the position of the barrier or divider may change to match or nearly match the change in position or elevation of the fluid-fluid interface or hypothetical fluid-fluid interface.

At least a portion of high density fluid is transferred into the bottom region of the tank, displacing at least a portion of low density fluid above the high density fluid, wherein at least a portion of low density fluid exits from the top region of the tank. As high density fluid enters the tank and low density fluid is displaced, the position of the fluid-fluid interface or hypothetical fluid-fluid interface within the tank may change. For example, the position or elevation of the fluid-fluid interface or hypothetical fluid-fluid interface may increase. If a barrier or divider is present, the position of the barrier or divider may change to match or nearly match the change in position or elevation of the fluid-fluid interface or hypothetical fluid-fluid interface.

In some embodiments, when the system is neither charging or discharging, the position of the fluid-fluid interface or hypothetical fluid-fluid interface may remain relatively constant. In some embodiments, a portion of high density fluid may diffuse into the low density fluid, or a portion of low density fluid may diffuse into the high density fluid, which may change the relative amounts of high density fluid or low density fluid, or position or elevation of the fluid-fluid interface, or any combination thereof. In some embodiments, a portion of high density fluid, or low density fluid, or any combination thereof may be treated, or may undergo a process to recover or remove contaminants, or undergo a process to recover or remove constituents of the other fluid, or any combination thereof, which may result in changes to the position or elevation of a fluid-fluid interface, or may result in changes to the relative volumes or amounts of fluids in the tank, or any combination thereof.

FIGS. 5-8

FIGS. 5-8 Description

FIGS. 5-8 may show an embodiment with a high elevation reservoir on land and a lower elevation reservoir underwater or under a body of liquid, wherein storage tanks or other storage mechanisms in the higher elevation reservoir and lower elevation reservoir may be configured to store both high density fluid and low density fluid simultaneous, if desired. FIGS. 5-8 may employ a pressure exchange or similar mechanism to exchange power from one fluid to another fluid. The pressure exchanger may be located near the lower elevation reservoir.

In some embodiments, the high density fluid may possess a density greater than the density of the liquid body surrounding or adjacent to the lower elevation reservoir.

In some embodiments, the high density fluid may be at least a portion soluble in the low density fluid, or the low density fluid may be at least a portion soluble in the high density fluid.

In some embodiments, FIG. 5-8 may possess a fluid-fluid interface or hypothetical fluid-fluid interface in one or more or any combination of the tanks or other storage mechanisms employed comprising the higher elevation reservoir, or lower elevation reservoir, or both.

In some embodiments, FIG. 5-8 may employ a physical barrier or divider within one or more or any combination of the tanks or other storage mechanisms employed comprising the higher elevation reservoir, or lower elevation reservoir, or both.

Example FIGS. 5-8 Key

| Label in Figure | Description |
|---|---|
| Low Density Fluid | Low density fluid or lower density fluid may comprise a fluid within an fluid displacement energy storage system which possesses a density less than the density of the higher density fluid within the system under at least a portion of the operating conditions within the system. For example, some embodiments may employ a low density fluid and a high density fluid, wherein energy or power may be stored by displacing at least a portion of high density fluid in a lower elevation region to a higher elevation region using a low density fluid transferred from a higher elevation region., |
| High Density Fluid | High density fluid or higher density fluid may comprise a fluid within an fluid displacement energy storage system which possesses a density greater than the density of the lower density fluid within the system under at least a portion of the operating conditions within the system. For example, some embodiments may employ a low density fluid and a high density fluid, wherein energy or power may be stored by displacing at least, a portion of high density fluid in a lower elevation region to a higher elevation region using a low density fluid transferred from a higher elevation region. |
| Ocean | Ocean may comprise a body of liquid. Ocean may be provided as an example body of liquid, although other bodies of liquid instead of or in addition to Ocean may be employed, which may include, but are not limited to, one or more or any combination of the following: ocean, or seas, or lakes, or ponds, or flooded mines, or oil storage, or other bodies of liquid described herein, or other bodies of liquid known in the art. |
| Land | Land may comprise an at least partially rigid surface or ground. In some embodiments, land may comprise a body of solid earth. In some embodiments, land may comprise a fixed structure or platform in or attached to or embedded in the seafloor. |
| Electricity | Electricity may comprise power stored or generated. 'Electricity' may comprise an example of power stored or generated. Other forms of power or energy may be stored or generated instead of, or in addition to, 'Electricity', which may include, but are not limited to, one or more or any combination of the following: hydraulic power, or pneumatic power, or kinetic energy, or potential energy, or mechanical energy, or light, or heat, or chemical potential, or magnetism. |
| PX | PX may comprise a pressure exchanger or similar device or mechanism. PX may be employed to enable an exchange of at least a portion of pressure or power or energy between the low density fluid and high density fluid, or high density fluid and low density fluid, or any combination thereof, before the lower elevation reservoir. In some embodiments, a pressure exchanger may enable the use of a lower pressure difference rating lower elevation reservoir, which may reduce cost or material requirements. In some embodiments, a pressure exchanger may enable the use of one or more fluids with density greater than the fluids or materials or media surrounding or adjacent to the lower elevation reservoir. In some embodiments, a pressure exchanger may enable the elevation of the higher elevation reservoir to be higher than the elevation of the sea level or body of liquid level, for example, while enabling the lower elevation reservoir to be pressure difference resistant to a lower pressure difference than the hydraulic head, or to experience a pressure difference lower than may be presumed based on the hydraulic head, or any combination thereof. |
| 1 | '1' may comprise a higher elevation reservoir. In the present figure, '1' may comprise a higher elevation reservoir comprising storage vessels or tanks configured to store low density fluid arid high density fluid. |
| 2 | '2' may comprise a pump, or generator, or any combination thereof. In the present figure, '2' may be designed to pump and/or generate power front low density fluid. '2' may also comprise a valve and/or other fluid control or monitoring mechanisms. |
| 3 | '3' may comprise a pipe transferring low density fluid. '3' may comprise a pipe for transferring low density fluid between the lower elevation region and higher elevation region. '3' may comprise a pipe for transferring low density fluid between a pump or generator and a pressure exchanger. |

| Label in Figure | Description |
|---|---|
| 4 | '4' may comprise a pipe transferred low density fluid. '4' may comprise a pipe transferring low density fluid between a lower elevation reservoir and a pressure exchanger. '4' may comprise a pipe transferring low density fluid between a lower elevation reservoir comprising a tank or storage vessel and a pressure exchanger. |
| 5 | '5' may comprise a lower elevation reservoir. In the present figure, '5' may comprise a lower elevation reservoir comprising storage vessels or tanks configured to store low density fluid and high density fluid. |
| 6 | '6' may comprise a pipe transferring high density fluid. '6' may comprise a pipe transferring high density fluid between a lower elevation reservoir and a pressure exchanger. '6' may comprise a pipe transferring high density fluid between a lower elevation reservoir comprising a tank or storage vessel and a pressure exchanger. |
| 7 | '7' may comprise a pipe transferring high density fluid. '7' may comprise a pipe for transferring high density fluid between the lower elevation region and higher elevation region. '7' may comprise a pipe for transferring high density fluid between a higher elevation region and a pressure exchanger. '7' may comprise a pipe for transferring high density fluid between a higher elevation reservoir and a pressure exchanger. |

FIG. 5-8 Example Step-by-Step Description

Charging:

Low density fluid may be pumped from a higher elevation reservoir to a pressure exchanger, which may be located in or near a lower elevation region or a lower elevation reservoir In some embodiments, the pressure of low density fluid entering the pressure exchanger during charging may be greater than the pressure of high density fluid in the lower elevation reservoir or high density fluid in or near the pressure exchanger. In the pressure exchanger, power may be recovered from the higher pressure, low density fluid and transferred to the lower pressure, high density fluid, which may result in the formation of lower pressure, low density fluid and higher pressure, high density fluid. In some embodiments, during charging, the pressure of the low pressure low density fluid may be greater than the pressure of low pressure high density fluid. The resulting high pressure high density fluid may be transferred to the higher elevation reservoir, while the low pressure low density fluid may be transferred to the lower elevation reservoir. In some embodiments, during charging, low density fluid displaces high density fluid within a lower elevation reservoir. In some embodiments, during charging, high density fluid displaces low density fluid within a higher elevation reservoir.

Discharging:

A valve may be opened, allowing high density fluid in the higher elevation reservoir to displace low density fluid in the lower elevation reservoir. High density fluid may be transferred from a higher elevation reservoir to a pressure exchanger, which may be located in or near a lower elevation region or a lower elevation reservoir.

In some embodiments, the pressure of high density fluid entering the pressure exchanger during charging may be greater than the pressure of low density fluid in the lower elevation reservoir or low density fluid in or near the pressure exchanger. In the pressure exchanger, power may be recovered from the higher pressure, high density fluid and transferred to the lower pressure, low density fluid, which may result in the formation of lower pressure, high density fluid and higher pressure, low density fluid. In some embodiments, during discharging, the pressure of the low pressure high density fluid may be greater than the pressure of low pressure low density fluid. The resulting high pressure low density fluid may be transferred to the higher elevation reservoir, while the low pressure high density fluid may be transferred to the lower elevation reservoir. In some embodiments, during discharging, high density fluid displaces low density fluid within a lower elevation reservoir. In some embodiments, during discharging, low density fluid displaces high density fluid within a higher elevation reservoir.

FIGS. 9-12

FIGS. 9-12 Description

FIGS. 9-12 may show an embodiment with a high elevation reservoir floating in a water body or other body of liquid and a lower elevation reservoir underwater or under a body of liquid, wherein storage tanks or other storage mechanisms in the higher elevation reservoir and lower elevation reservoir may be configured to store both high density fluid and low density fluid simultaneous, if desired. FIGS. 9-12 may employ a pressure exchange or similar mechanism to exchange power from one fluid to another fluid. The pressure exchanger may be located near the lower elevation reservoir.

FIGS. 13-16

FIGS. 13-16 Description

FIGS. 13-16 may show an embodiment with a high elevation reservoir floating in a water body or other body of liquid and a lower elevation reservoir underwater or under a body of liquid, wherein storage tanks or other storage mechanisms in the higher elevation reservoir and lower elevation reservoir may be configured to store both high density fluid and low density fluid simultaneous, if desired. FIGS. 13-16 may show an embodiment wherein the higher elevation reservoir and/or the lower elevation reservoir comprise multiple sub-tanks or tanks or storage vessels or storage units. A potential benefit of multiple storage units in, for example, a higher elevation reservoir, may include, but are not limited to, one or more or any combination of the following: minimization of sloshing, or reduction in sloshing and related potentially damaging forces, or greater weight balance, or more consistent or stable weight distribution, or greater stability in rough ocean conditions and large waves. A potential benefit of multiple storage units, in, for example, a lower elevation reservoir, may include, but are not limited to, one or more or any combination of the following: easier installation, or lower weight capacity requirement for installation, or potential for greater pressure resistance (if desired), or greater redundancy, or a wider range of potential installation vessels, or any combination thereof.

Some versions of the present embodiment may employ a pressure exchanger.

In some embodiments, it may be desirable to store low density fluid and high density fluid in a storage unit because, for example, the total volume of fluid in the tank may remain relatively consistent, while the relative volume of fluid in the tank may vary or change. If the high density fluid and low density fluid are incompressible or practically incompressible, the storage unit may be capable of better handling pressure differences between the interior and exterior of the storage unit, depending on the design of the storage unit.

FIGS. 17-20

FIGS. 17-20 Description

FIGS. 17-20 may show an embodiment with a high elevation reservoir floating in a water body or other body of liquid and a lower elevation reservoir underwater or under a body of liquid, wherein storage tanks or other storage mechanisms in the higher elevation reservoir may be configures to store low density fluid in separate storage units from the high density fluid. FIGS. 17-20 may show an embodiment wherein the higher elevation reservoir and/or the lower elevation reservoir comprise multiple sub-tanks or tanks or storage vessels or storage units. A potential benefit of multiple storage units in, for example, a higher elevation reservoir, may include, but are not limited to, one or more or any combination of the following: minimization of sloshing, or reduction in sloshing and related potentially damaging forces, or greater weight balance, or more consistent or stable weight distribution, or greater stability in rough ocean conditions and large waves. A potential benefit of multiple storage units, in, for example, a lower elevation reservoir, may include, but are not limited to, one or more or any combination of the following: easier installation, or lower weight capacity requirement for installation, or potential for greater pressure resistance (if desired), or greater redundancy, or a wider range of potential installation vessels, or any combination thereof.

In some embodiments, low density fluid or high density fluid may be stored in separate storage units. In some embodiments, if the low density fluid comprises a liquid or solid-liquid and/or the high density fluid comprises a liquid or solid-liquid, the gas occupying the headspace of each storage unit may be interconnected or fluidly connected between storage units or the headspace of heat storage unit may be interconnected. For example, when a fluid comprising liquid or solid-liquid is added to a first storage unit and a fluid comprising liquid or solid-liquid is being removed from a second storage unit, at least a portion of gases from the headspace of said first storage unit may be transferred, or allowed to be transferred or may be flow freely, or any combination thereof to said second storage unit. By enabling gas in the headspace of each storage units to exchange between storage units, it may enable to the storage reservoir to comprise a closed system, or may prevent the fluids in the storage reservoir from requiring exposure to outside air or elements, or may minimize the exposure of the high density fluid and/or low density fluid to outside air or other outside elements, or any combination thereof. In some embodiments, during charging, the volumetry flow rate of low density fluid exiting the higher elevation reservoir may be about the same or very similar to the volumetric flow rate of high density fluid entering the higher elevation reservoir, which may enable relatively stable pressure during the exchange of headspace gases between storage units. In some embodiments, during discharging, the volumetry flow rate of high density fluid exiting the higher elevation reservoir may be about the same or very similar to the volumetric flow rate of low density fluid entering the higher elevation reservoir, which may enable relatively stable pressure during the exchange of headspace gases between storage units.

In some embodiments, a gas membrane or liquid membrane or hydrophobic barrier, or oleophobic barrier, or semi-permeable barrier may be placed in the gas space interconnected between the storage units. For example, in some embodiments, it may be desirable to employ a semi-permeable barrier in the pipes interconnecting the gas headspace of the storage units to, for example, enable gas to flow between storage units with prevent liquid or solid-liquid fluids from flowing between storage units.

FIGS. 21-24

FIG. 21-24 Description

FIGS. 21-24 may show an embodiment with a higher elevation reservoir located on land and a lower elevation reservoir located underwater or within a body of liquid. In some embodiments, the higher elevation reservoir may be configured to store high density fluid and low density fluid in separate storage units. In some embodiments, the lower elevation reservoir may be configured to store high density fluid and/or low density fluid. In some embodiments, the lower elevation reservoir may be configured such that when low density fluid is added, high density fluid is displaced, and when high density fluid is added, low density fluid is displaced. In some embodiments, a pressure exchanger or similar energy recovery or power transfer device or system may be employed. In some embodiments, a pressure exchanger or similar energy recovery or power transfer device or system may be employed near a lower elevation reservoir.

In some embodiments, low density fluid or high density fluid may be stored in separate storage units. In some embodiments, if the low density fluid comprises a liquid or solid-liquid and/or the high density fluid comprises a liquid or solid-liquid, the gas occupying the headspace of each storage unit may be interconnected or fluidly connected between storage units or the headspace of heat storage unit may be interconnected. For example, when a fluid comprising liquid or solid-liquid is added to a first storage unit and a fluid comprising liquid or solid-liquid is being removed from a second storage unit, at least a portion of gases from the headspace of said first storage unit may be transferred, or allowed to be transferred or may be flow freely, or any combination thereof to said second storage unit. By enabling gas in the headspace of each storage units to exchange between storage units, it may enable to the storage reservoir to comprise a closed system, or may prevent the fluids in the storage reservoir from requiring exposure to outside air or elements, or may minimize the exposure of the high density fluid and/or low density fluid to outside air or other outside elements, or any combination thereof. In some embodiments, during charging, the volumetry flow rate of low density fluid exiting the higher elevation reservoir may be about the same or very similar to the volumetric flow rate of high density fluid entering the higher elevation reservoir, which may enable relatively stable pressure during the exchange of headspace gases between storage units. In some embodiments, during discharging, the volumetry flow rate of high density fluid exiting the higher elevation reservoir may be about the same or very similar to the volumetric flow rate of low density fluid entering the higher elevation reservoir, which may enable relatively stable pressure during the exchange of headspace gases between storage units.

In some embodiments, a gas membrane or liquid membrane or hydrophobic barrier, or oleophobic barrier, or semi-permeable barrier may be placed in the gas space interconnected between the storage units. For example, in some embodiments, it may be desirable to employ a semi-permeable barrier in the pipes interconnecting the gas headspace of the storage units to, for example, enable gas to flow between storage units with prevent liquid or solid-liquid fluids from flowing between storage units.

FIGS. 25-28

FIGS. 25-28 Description

FIGS. 25-28 may show an embodiment with a higher elevation reservoir located on land and a lower elevation reservoir located on land, or above the elevation of a body of liquid, or any combination thereof. In some embodiments, the higher elevation reservoir may be configured to store high density fluid and low density fluid in separate storage units. In some embodiments, the lower elevation reservoir may be configured to store high density fluid and/or low density fluid. In some embodiments, the lower elevation reservoir may be configured such that when low density fluid is added, high density fluid is displaced, and when high density fluid is added, low density fluid is displaced. In some embodiments, a pressure exchanger or similar energy recovery or power transfer device or system may be employed. In some embodiments, a pressure exchanger or similar energy recovery or power transfer device or system may be employed near a lower elevation reservoir.

In some embodiments, low density fluid or high density fluid may be stored in separate storage units. In some embodiments, if the low density fluid comprises a liquid or solid-liquid and/or the high density fluid comprises a liquid or solid-liquid, the gas occupying the headspace of each storage unit may be interconnected or fluidly connected between storage units or the headspace of heat storage unit may be interconnected. For example, when a fluid comprising liquid or solid-liquid is added to a first storage unit and a fluid comprising liquid or solid-liquid is being removed from a second storage unit, at least a portion of gases from the headspace of said first storage unit may be transferred, or allowed to be transferred or may be flow freely, or any combination thereof to said second storage unit. By enabling gas in the headspace of each storage units to exchange between storage units, it may enable to the storage reservoir to comprise a closed system, or may prevent the fluids in the storage reservoir from requiring exposure to outside air or elements, or may minimize the exposure of the high density fluid and/or low density fluid to outside air or other outside elements, or any combination thereof. In some embodiments, during charging, the volumetry flow rate of low density fluid exiting the higher elevation reservoir may be about the same or very similar to the volumetric flow rate of high density fluid entering the higher elevation reservoir, which may enable relatively stable pressure during the exchange of headspace gases between storage units. In some embodiments, during discharging, the volumetry flow rate of high density fluid exiting the higher elevation reservoir may be about the same or very similar to the volumetric flow rate of low density fluid entering the higher elevation reservoir, which may enable relatively stable pressure during the exchange of headspace gases between storage units.

In some embodiments, a gas membrane or liquid membrane or hydrophobic barrier, or oleophobic barrier, or semi-permeable barrier may be placed in the gas space interconnected between the storage units. For example, in some embodiments, it may be desirable to employ a semi-permeable barrier in the pipes interconnecting the gas headspace of the storage units to, for example, enable gas to flow between storage units with prevent liquid or solid-liquid fluids from flowing between storage units.

FIGS. 29-32

FIGS. 29-32 Description

FIGS. 29-32 may show an embodiment with a higher elevation reservoir located on land and a lower elevation reservoir located on land, or above the elevation of a body of liquid, or any combination thereof. In some embodiments, the higher elevation reservoir may be configured to store high density fluid and low density fluid in separate storage units. In some embodiments, the lower elevation reservoir may be configured to store to store high density fluid and low density fluid in separate storage units. In some embodiments, a pressure exchanger or similar energy recovery or power transfer device or system may be employed. In some embodiments, a pressure exchanger or similar energy recovery or power transfer device or system may be employed near a lower elevation reservoir.

In some embodiments, low density fluid or high density fluid may be stored in separate storage units. In some embodiments, if the low density fluid comprises a liquid or solid-liquid and/or the high density fluid comprises a liquid or solid-liquid, the gas occupying the headspace of each storage unit may be interconnected or fluidly connected between storage units or the headspace of heat storage unit may be interconnected. For example, when a fluid comprising liquid or solid-liquid is added to a first storage unit and a fluid comprising liquid or solid-liquid is being removed from a second storage unit, at least a portion of gases from the headspace of said first storage unit may be transferred, or allowed to be transferred or may be flow freely, or any combination thereof to said second storage unit. By enabling gas in the headspace of each storage units to exchange between storage units, it may enable to the storage reservoir to comprise a closed system, or may prevent the fluids in the storage reservoir from requiring exposure to outside air or elements, or may minimize the exposure of the high density fluid and/or low density fluid to outside air or other outside elements, or any combination thereof. In some embodiments, during charging, the volumetry flow rate of low density fluid exiting the higher elevation reservoir may be about the same or very similar to the volumetric flow rate of high density fluid entering the higher elevation reservoir, which may enable relatively stable pressure during the exchange of headspace gases between storage units. In some embodiments, during discharging, the volumetry flow rate of high density fluid exiting the higher elevation reservoir may be about the same or very similar to the volumetric flow rate of low density fluid entering the higher elevation reservoir, which may enable relatively stable pressure during the exchange of headspace gases between storage units.

In some embodiments, a gas membrane or liquid membrane or hydrophobic barrier, or oleophobic barrier, or semi-permeable barrier may be placed in the gas space interconnected between the storage units. For example, in some embodiments, it may be desirable to employ a semi-permeable barrier in the pipes interconnecting the gas headspace of the storage units to, for example, enable gas to flow between storage units with prevent liquid or solid-liquid fluids from flowing between storage units.

FIGS. 33-36

FIGS. 33-36 Description

FIGS. 33-36 may show an embodiment with a higher elevation reservoir located on land and a lower elevation reservoir located on land, or above the elevation of a body of liquid, or any combination thereof. In some embodiments, the higher elevation reservoir may be configured to store high density fluid and/or low density fluid. In some embodiments, the lower elevation reservoir may be configured to store high density fluid and/or low density fluid. In some embodiments, the lower elevation reservoir may be configured such that when low density fluid is added, high density fluid is displaced, and when high density fluid is added, low density fluid is displaced. In some embodiments, the higher elevation reservoir may be configured such that when low density fluid is added, high density fluid is displaced, and when high density fluid is added, low density fluid is displaced. In some embodiments, a pressure exchanger or similar energy recovery or power transfer device or system may be employed. In some embodiments, a pressure exchanger or similar energy recovery or power transfer device or system may be employed near a lower elevation reservoir.

FIGS. 37-40

FIGS. 37-40 Description

FIGS. 37-40 may show an embodiment with a higher elevation reservoir located on land or underwater and a lower elevation reservoir located underground. The underground, lower elevation reservoir may comprise, including, but not limited to, one or more or any combination of the following: an underground mine, or a mineshaft, or a retired mine, or an abandoned mine, or an excavated cavern, or an excavated hole, or an underground cavern, or a salt cavern, or bedded salt cavern, or bedded salts, or salt dome, or salt dome cavern, or an aquifer, or an abandoned oil well, or an abandoned gas well, or a gas reservoir, or an oil reservoir, or any combination thereof. The present embodiment may enable the use of nearly entire volume of an underground region or underground cavity or an underground space for energy storage. The present embodiment may advantageously enable pumps, or generators, or turbines, or other moving parts, or any combination thereof to be located on or near the surface and/or in an accessible and maintainable location, which may enable practical operation and maintenance, and/or while also enabling the use of practically incompressible fluids, which may enable high round trip energy efficiency. In some embodiments, the lower elevation reservoir may comprise an open cavity. In some embodiments, the lower elevation reservoir may comprise a closed cavity. In some embodiments, a pipe may be installed by drilling through the ground to an open cavity located underground. In some embodiments, a cavity may be created underground using drilling fluids, or fluid injection, or excavation and/or said cavity may function as a lower elevation reservoir. In some embodiments, a tank may be installed underground. In some embodiments, an underground cavity may function as lower elevation reservoir. In some embodiments, an underground cavity may possess sufficient pressure resistance or resilience to enable the direct displacement of fluids within the underground cavity and/or for the underground cavity to experience the maximum hydraulic head pressure. In some embodiments, a pressure exchanger or similar power recovery or energy recovery device may be employed near the lower elevation reservoir and/or may reduce the potential pressure exerted on the underground cavity or lower elevation reservoir.

For example, in some embodiments, the lower elevation reservoir may comprise a salt cavern, which may be located under land, or under a body of water. For example, the lower elevation reservoir may comprise a salt cavern. In some embodiments, the low density fluid may comprise a hydrocarbon or hydrogen. In some embodiments, the high density fluid may comprise a brine. Power or energy may be stored by pumping a low density fluid into the lower elevation reservoir comprising a salt cavern, displacing high density fluid comprising brine from the lower elevation reservoir into the higher elevation reservoir. Power may be generated by allowing the high density fluid comprising brine in the higher elevation reservoir to displace the low density fluid from the lower elevation reservoir into the higher elevation reservoir. In some embodiments, power may be stored or generated using pumps, or turbines, or pressure exchangers, or other mechanical equipment located above ground or near the higher elevation reservoir. In some embodiments, the higher elevation reservoir may comprise a land based structure. In some embodiments, the higher elevation reservoir may comprise a floating structure. In some embodiments, the higher elevation reservoir may comprise an underwater structure.

FIGS. 41-44

FIGS. 41-44 Description

FIGS. 37-40 may show an embodiment with a higher elevation reservoir located on land at an elevation substantially greater than the body of water or body of liquid and a lower elevation reservoir located under the body of water or body of liquid. In some embodiments, the hydraulic pressure exerted on the inside of the lower elevation reservoir may be greater than the hydrostatic pressure of the body of water or body of liquid at the depth of the lower elevation reservoir. In some embodiments, the lower elevation reservoir may be designed to withstand a pressure difference between the internal and external pressures of the lower elevation reservoir greater than or equal to the pressure difference between the hydrostatic head pressure of the high density fluid in the system minus the hydrostatic heat pressure of the body of water or body of liquid at or near the depth of the lower elevation reservoir.

FIGS. 45-48

FIGS. 45-48 Description

FIGS. 45-48 may show an embodiment with a higher elevation reservoir located on land at an elevation substantially greater than the body of water or body of liquid and a lower elevation reservoir located under the body of water or body of liquid, and/or further comprising a pressure exchanger or other power recovery or energy recovery device or system. In some embodiments, said pressure exchanger may be located near the lower elevation reservoir. In some embodiments, said pressure exchanger may recover pressure or power in excess of the hydrostatic pressure head of the body of water or body of liquid adjacent to the lower elevation reservoir at the depth of the lower elevation reservoir, and provide said recovered pressure or power to the opposing fluid. By employing a pressure exchanger, the lower elevation reservoir may be constructed to withstand lower pressure differences and/or may be less expensive to construct and/or may be less expensive or easier to install compared to a lower elevation reservoir designed to withstand the full hydrostatic head pressure difference between the high density fluid and the body of water or body of other liquid adjacent to the lower elevation reservoir near the depth of the lower elevation reservoir.

FIGS. 49-52

FIGS. 49-52 Description

FIGS. 49-52 may show an embodiment with a higher elevation reservoir located on land at an elevation substantially greater than the body of water or body of liquid and a lower elevation reservoir located under the body of water or body of liquid, and/or further comprising a pressure exchanger or other power recovery or energy recovery device or system. The present embodiment may employ a higher elevation reservoir configured to store high density fluid and low density fluid in the same storage units or storage tanks. The present embodiment may employ a higher elevation reservoir configured to store high density fluid and low density fluid in separate storage units or storage tanks. In the present embodiment, the pressure exchanger may be located on land at an elevation lower than the elevation of the higher elevation reservoir and higher than the elevation of the lower elevation reservoir. In some embodiments, the pressure exchanger may be located near sea level, or near the water surface level of the body of water, or near the surface level of a body of water to enable the recovery of pressure or power associated with the elevation change or elevation difference above the body of water or body of liquid surface level, while preventing the lower elevation reservoir from experiencing the additional hydrostatic pressure resulting from the elevation change or elevation difference above the body of water or body of liquid surface level. Additionally, by locating the pressure exchanger on land, the pressure exchanger may be more accessible and/or easier to maintain, if needed.

FIGS. 53-56

FIGS. 53-56 Description

FIGS. 53-56 may show an embodiment with a higher elevation reservoir located on land at an elevation substantially greater than the body of water or body of liquid and a lower elevation reservoir located under the body of water or body of liquid, and/or further comprising a pressure exchanger or other power recovery or energy recovery device or system. The present embodiment may employ a higher elevation reservoir configured to store high density fluid and low density fluid in separate storage units or storage tanks. In some embodiments, while the high density fluid and low density fluid in the higher elevation reservoir may be stored in separate storage units or storage tanks, the headspace gas between the storage units or storage tanks may be interconnected between storage units or storage tanks.

FIGS. 57-60

FIGS. 57-60 Description

FIGS. 53-56 may show an embodiment with a higher elevation reservoir located underwater or under a body of water or under a body of liquid, and a lower elevation reservoir located under the body of water or body of liquid at an elevation substantially lower than the elevation of the higher elevation reservoir and/or further comprising a pressure exchanger or other power recovery or energy recovery device or system.

The present embodiment may be useful for offshore windfarms, or floating solar farms, or subsea cables, or other offshore infrastructure which may be located near an underwater shelf, such as a continental shelf. The present embodiment may be useful for applications where shallow water depths may be in relatively close proximity to deep water depths near a subsea slope or shelf.

FIGS. 61-64

FIGS. 61-64 Description

FIGS. 61-64 may show an embodiment where the pump and/or generator is located near the lower elevation reservoir. FIGS. 61-64 may show an embodiment where the pump and/or generator mechanically interacts with, or directly interacts with, or pumps, or generates power from, or any combination thereof the high density fluid.

In some embodiments, the pump and/or generator may be located near the lower elevation reservoir and may be fluidly connected to the high density fluid. In some embodiments, it may be desirable for the low density fluid to possess the lowest density practical. For example, in some embodiments, the low density fluid may comprise the vapor phase of the high density fluid. For example, in some embodiments, the low density fluid may comprise a gas at a pressure similar to or near the pressure of the ambient pressure outside or adjacent to the lower elevation reservoir, or higher elevation reservoir, or any combination thereof. For example, the low density fluid may comprise, including, but not limited to, one or more or any combination of the following: air, or nitrogen, or water vapor, or high density fluid vapor pressure, or high density fluid vapor phase, or argon, or hydrogen, or ammonia, or methane, or ethane, or propane, or a liquid, or helium, or butane, or pentane, or oxygen, or fluorocarbon gas phase, or refrigerant gas phase, or sulfurous compound gas phase, or any combination thereof. For example, the high density fluid may comprise, including, but not limited to, one or more or any combination of the following: water, or brine water, or aqueous solution, or solid-liquid mixture, or fluorocarbon liquid phase, or refrigerant liquid phase, sulfurous compound liquid, or sulfur dioxide liquid, or molten sulfur, or liquid sulfur, or molten salt, or liquid salt, or mercury, or gallium, or liquid metal, or liquid metal alloy, or nitric acid, or sulfuric acid, or phosphoric acid, or acid, or base, or high density liquid, or any combination thereof.

In some embodiments, the low density fluid may be at a pressure significantly below the hydraulic head or column head pressure of the high density fluid near the pump or generator near the lower elevation reservoir. For example, the low density fluid may be at a pressure near the ambient pressure adjacent to the lower elevation reservoir, or high elevation reservoir, or any combination thereof, or the low density fluid may be at a pressure near the vapor pressure of the high density fluid, or any combination thereof. In some embodiments, the pressure of inside the lower elevation reservoir and the higher elevation reservoir may be about the same as the pressure of the low density fluid. In some embodiments or the present embodiment, the greatest pressure in the system may exist near the pump or turbine or generator. In some embodiments or the present embodiment, the greatest pressure in the system may exist near the pump or turbine or generator outlet or inlet connecting to the pipe which transfers high density fluid between the lower elevation region and higher elevation region.

In some embodiments, during charging of the energy storage system, high density fluid may be pumped or transferred from a lower elevation reservoir to a higher elevation reservoir, wherein, for example, the high density fluid entering the higher elevation reservoir may displace the low density fluid in the higher elevation reservoir and/or said displaced low density fluid may be transferred to the lower elevation reservoir, wherein, for example, the low density fluid entering the lower elevation reservoir may displace the high density fluid in the lower elevation reservoir.

In some embodiments, during discharging of the energy storage system, high density fluid may transferred from a higher elevation reservoir to a lower elevation reservoir, through a generator or turbine, into the lower elevation reservoir, wherein, for example, the high density fluid entering the lower elevation reservoir may displace the low density fluid in the lower elevation reservoir and/or said displaced low density fluid may be transferred to the higher elevation reservoir, wherein, for example, the low density fluid entering the higher elevation reservoir may displace the high density fluid in the higher elevation reservoir.

Energy may be stored in the gravitational potential energy of a high density fluid in a reservoir or region which is at a higher elevation than another interconnected reservoir or region.

In some embodiments, the low density fluid and/or high density fluid may be transferred between the lower elevation reservoir and the higher elevation reservoir by means of pipes.

In some embodiments, the volume of high density fluid entering a reservoir may be about the same as the volume of low density fluid exiting a reservoir. In some embodiments, the volume of low density fluid entering a reservoir may be about the same as the volume of high density fluid exiting a reservoir.

In some embodiments, the energy storage system may comprise a closed system, wherein liquids, or gases, or solids, or any combination thereof remain within the system and/or practically or mechanically isolated from contact with the outside environment during regular or normal operation. In some embodiments, the exchange or transfer of low density fluid between the higher elevation reservoir and lower elevation reservoir and vise versa may enable the system to be a closed system.

Some embodiments may be a beneficial energy storage system for land or water based energy storage applications. Some embodiments may enable the use of a high density fluid with a vapor pressure, while, during normal operation, minimizing or eliminating possible high density fluid losses due to evaporation. Some embodiments may enable the use of a high density fluid which may be harmful for the environment. Some embodiments may enable the use of a hygroscopic high density fluid. Some embodiments may prevent or eliminate potential biofouling, or scaling, or degradation, or any combination thereof due to, for example, minimal or practically no exposure of low density fluid and/or high density fluid to air or outside environment during normal operation. Some embodiments may prevent high density fluid and/or low density fluid from being contaminated by rain, or dirt, or dust, or insects, or debris, or any combination thereof during normal operation. Some embodiments may improve the longevity of equipment and/or high density fluid and/or low density fluid due to being capable of operating as a closed system during normal operations. Some embodiments may prevent evaporation and related losses of high density fluid or low density fluid due to being capable of operating as a closed system during normal operations.

In some embodiments, the low density fluid may comprise an inert gas, such as nitrogen gas, or argon, or water vapor, or any combination thereof.

For example, the present embodiment may employ water or an aqueous solution as the high density fluid. For example, the ability to operate as a closed system during normal operations may prevent, or greatly reduce the risk or rate of biofouling. Due to the ability to operate as a closed system during normal operations, the water or aqueous solution may be deoxygenated, or treated, or deionized, or any combination thereof, which may greatly reduce or prevent corrosion, or degradation, or scaling.

For example, the present embodiment may employ a salt-water solution or a concentrated brine as the high density fluid. A salt water solution or concentrated brine may be deoxygenated or treated, preventing corrosion. Concentrated salt water brine may not be diluted or contaminated due to operating in a closed system during normal operations.

For example, the present embodiment may employ liquid sulfur as a high density fluid. Liquid sulfur has a viscosity of about 8 cP around 140 degrees Celsius, which is a low viscosity and a pumpable viscosity. Liquid sulfur may be low cost, ranging from $35 to $150 per metric ton based on recent commodity prices. Sulfur may be an abundant commodity and with many uses and applications. Liquid sulfur has a viscosity of about 8 cP around 140 degrees Celsius, which may be a low viscosity and/or a pumpable viscosity. The density of liquid sulfur is about 2 kg/L, or about 2 times greater density than water. Embodiments employing liquid sulfur and/or other above ambient temperature fluids may employ insulated tank and/or insulated pipes and/or insulated other equipment and/or may employ a heater to maintain the temperature of the liquid sulfur in the system. In some embodiments, heating may reduce the round trip efficiency, however, due to the large volumes and mass of liquid sulfur in the system, the relative reduction in efficiency from the heating may be less than a 1%, or 3%, or 5%, or 10%, or 15%, or 20%, round trip efficiency penalty. The present embodiment may enable the use of liquid sulfur due to, for example, the ability to operate as a closed system.

For example, the present embodiment may employ phosphoric acid as a high density fluid. Phosphoric acid is a strategically important commodity due to its important role in fertilizer and it scarcity. There may be a strategic or beneficial value in nations possessing a stockpile or reserve of phosphoric acid to ensure resilience in case of supply chain disruptions or manufacturing disruptions. Some embodiments may enable simultaneous or productive use of said stockpile or reserve by employing said stockpile or reserve phosphoric acid as a high density fluid in an energy storage system. Phosphoric acid possesses a density of about 1.88 kg/L, or about 1.88 times the density of water. 85 wt % aqueous solution of phosphoric acid in water possesses a viscosity less than 10 cP at about 20 degrees Celsius.

For example, the present embodiment may employ Urea-Ammonium Nitrate (UAN) solution as a high density fluid. Phosphoric acid is a strategically important commodity due to its important role in fertilizer. There may be a strategic or beneficial value in nations possessing a stockpile or reserve of UAN solution to ensure resilience in case of supply chain disruptions or manufacturing disruptions. Some embodiments may enable simultaneous or productive use of said stockpile or reserve by employing said stockpile or reserve UAN solution as a high density fluid in an energy storage system. UAN solution possesses a density of about 1.32 kg, or about 1.32 times the density of water. UAN solution possesses viscosity less than about 10 cP at about 20 degrees Celsius.

Note: The present embodiment may be located on land, or under water, or any combination thereof.

Example FIGS. 61-64 Key

| Label | Description |
|---|---|
| 1 | '1' may comprise a higher elevation reservoir. '1' may comprise a higher elevation reservoir comprising a storage unit or comprising storage units configured to store high density fluid and low density fluid. |
| 2 | '2' may comprise a pipe for transferring low density fluid between the lower elevation reservoir and higher elevation reservoir. |
| 3 | '3' may comprise a lower elevation reservoir. '3' may comprise a lower elevation reservoir comprising a storage unit or comprising storage units configured to store high density fluid and low density fluid. |
| 4 | '4' may comprise a pipe for transferring high density fluid between the lower elevation reservoir and a pump, or turbine, or generator, or any combination thereof. |
| 5 | '5' may comprise a pump, or turbine, or generator, or any combination thereof. '5' may be located near the lower elevation reservoir or in the lower elevation region in the present embodiment. |
| 6 | '6' may comprise a pipe for transferring high density fluid between the pump, or turbine, or generator, or any combination thereof and the higher elevation reservoir. |

FIGS. 83-90

FIGS. 83-90 Description

FIGS. 83-86 may show an embodiment with a lower elevation reservoir located underground under a body of water. FIG. 83-86 may show an embodiment where the lower elevation reservoir comprises a cavity or cavern beneath the seabed or a subterranean cavern under the seabed, or under a body of water, or under land near, or under the floor of a body of water.

FIGS. 83-90 may show an embodiment with a floating higher elevation reservoir and a lower elevation reservoir located underground, or beneath the seabed underground, or under a body of water, or any combination thereof. The underground, lower elevation reservoir may comprise, including, but not limited to, one or more or any combination of the following: an underground cavern, or a salt cavern, or bedded salt cavern, or bedded salts, or salt dome, or salt dome cavern, or an aquifer, or an abandoned oil well, or an abandoned gas well, or a gas reservoir, or an oil reservoir, or an underground mine, or a mineshaft, or a retired mine, or an abandoned mine, or an excavated cavern, or an excavated hole, or any combination thereof. The present embodiment may enable the use of nearly entire volume of an underground region or underground cavity or an underground space for energy storage. The present embodiment may advantageously enable pumps, or generators, or turbines, or other moving parts, or any combination thereof to be located on or near the surface and/or in an accessible and maintainable location, which may enable practical operation and maintenance, and/or while also enabling the use of practically incompressible fluids, which may enable high round trip energy efficiency. In some embodiments, the lower elevation reservoir may comprise an open cavity. In some embodiments, the lower elevation reservoir may comprise a closed cavity. In some embodiments, a pipe may be installed by drilling through the ground to an open cavity located underground. In some embodiments, a cavity may be created underground using drilling fluids, or fluid injection, or excavation and/or said cavity may function as a lower elevation reservoir. In some embodiments, a cavity may be pre-existing. In some embodiments, a cavity may be constructed using methods for constructing cavities known in the art. In some embodiments, a cavity may be constructed using systems and methods for constructing salt caverns or subterranean salt storage. In some embodiments, a tank may be installed underground. In some embodiments, an underground cavity may function as lower elevation reservoir. In some embodiments, an underground cavity may possess sufficient pressure resistance or resilience to enable the direct displacement of fluids within the underground cavity and/or for the underground cavity to experience the maximum hydraulic head pressure associated with, for example, elevation differences, or fluid densities, or gravity. In some embodiments, a pressure exchanger or similar power recovery or energy recovery device may be employed near the lower elevation reservoir and/or may reduce the potential pressure exerted on the underground cavity or lower elevation reservoir.

For example, in some embodiments, the lower elevation reservoir may comprise a salt cavern, which may be located under land, or under a body of water, or any combination thereof. For example, the lower elevation reservoir may comprise a salt cavern. In some embodiments, the low density fluid may comprise a hydrocarbon or hydrogen. In some embodiments, the high density fluid may comprise a brine. Power or energy may be stored by pumping a low density fluid into the lower elevation reservoir comprising a salt cavern, displacing high density fluid comprising brine from the lower elevation reservoir into the higher elevation reservoir. Power may be generated by allowing the high density fluid comprising brine in the higher elevation reservoir to displace the low density fluid from the lower elevation reservoir into the higher elevation reservoir. In some embodiments, power may be stored or generated using pumps, or turbines, or pressure exchangers, or other mechanical equipment located above ground or near the higher elevation reservoir. In some embodiments, the higher elevation reservoir may comprise a land based structure. In some embodiments, the higher elevation reservoir may comprise a floating structure. In some embodiments, the higher elevation reservoir may comprise an underwater structure.

Subsea subterranean salt formations are known in many geographically and economically favorable locations in the world, which include, but are not limited to the Gulf of Mexico and offshore Europe.

EXAMPLE EXEMPLARY EMBODIMENTS (1) A system for storing and generating power comprising:
a first storage reservoir configured to store a first fluid;
a second storage reservoir located at a lower elevation than the first storage reservoir and configured to store a second fluid which has a higher density than the first fluid;
a pump; and
a generator;
wherein the pump, generator, and the first and second reservoir are operatively connected such that power is stored by displacing the second fluid which has a higher density than the first fluid in the second storage reservoir by pumping the first fluid in the first storage reservoir to the second storage reservoir and power is generated or discharged by allowing the first fluid in the second storage reservoir to return to the first storage reservoir; and
wherein the first fluid is a liquid.

(2) The system of example exemplary embodiment 1 wherein the high density fluid is soluble in the low density fluid.

(3) The system of example exemplary embodiment 1 wherein the low density fluid and high density fluid are stored within the same storage units within at least the second storage reservoir.

(4) The system of example exemplary embodiment 3 wherein the low density fluid is located above the high density fluid within a storage unit.

(5) The system of example exemplary embodiment 3 wherein the low density fluid is separate from the high density fluid by a fluid-fluid interface.

(6) The system of example exemplary embodiment 3 wherein the low density fluid is separate from the high density fluid by a chemocline or chemocline layer.

(7) The system of example exemplary embodiment 3 wherein the low density fluid is separate from the high density fluid by a physical divider.

(8) The system of example exemplary embodiment 7 wherein the physical divider occupies at least 50% of the surface area or cross sectional area otherwise occupied by a fluid-fluid interface.

(9) The system of example exemplary embodiment 7 wherein the physical divider adjusts elevation to follow the change in elevation of the fluid-fluid interface or hypothetical fluid-fluid interface.

(10) The system of example exemplary embodiment 7 wherein the physical divider is floating.

(11) The system of example exemplary embodiment 7 wherein the density of the physical divider is greater than the density of the low density fluid and less than the density of the high density fluid.

(12) The system of example exemplary embodiment 1 wherein the high density fluid and low density fluid are stored in the same storage units within the first storage reservoir and the second storage reservoir.

(13) The system of example exemplary embodiment 2 wherein at least a portion of high density fluid mixes with at least a portion of low density fluid.

(14) The system of example exemplary embodiment 13 wherein at least a portion of high density fluid is removed from the low density fluid by a separation process.

(15) The system of example exemplary embodiment 14 wherein said separation process is selected from reverse osmosis, or forward osmosis, or distillation, or evaporation, or gravitational separation, or decanting, or coalescing, or centrifuge, or filtration, or cryodesalination, or freeze desalination, solventing out, or precipitation, or extraction, or extractive distillation.

(16) The system of example exemplary embodiment 2 wherein at least a portion of low density fluid mixes with at least a portion of high density fluid.

(17) The system of example exemplary embodiment 16 wherein at least a portion of low density fluid is removed from the high density fluid by a separation process.

(18) The system of example exemplary embodiment 17 wherein said separation process is selected from reverse osmosis, or forward osmosis, or distillation, or evaporation, or electrodialysis, or gravitational separation, or decanting, or coalescing, or centrifuge, or filtration, or cryodesalination, or freeze desalination, solventing out, or precipitation, or extraction, or extractive distillation.

(19) The system of example exemplary embodiment 2 wherein the low density fluid comprise water and the high density fluid comprises brine.

(20) The system of example exemplary embodiment 1 wherein the high density fluid and low density fluid are stored in separate storage units within at least the first storage reservoir.

(21) The system of example exemplary embodiment 20 wherein the high density fluid and low density fluid comprise liquids.

(22) The system of example exemplary embodiment 21 wherein the headspace of each storage unit within a reservoir is interconnected such that gas in the head space of the storage units is transferred from storage units where liquid is entering to storage units where liquid is exiting.

(23) The system of example exemplary embodiment 22 wherein a semi-permeable barrier is employed to allow the transfer of gas while preventing the transfer of liquid between storage units with different liquids.

(24) The system of example exemplary embodiment 1 wherein the first storage reservoir is located underwater.

(25) The system of example exemplary embodiment 1 wherein the first storage reservoir is at an elevation reservoir at an elevation greater than the elevation of the surface of the body of water.

(26) The system of example exemplary embodiment 1 wherein the first storage reservoir comprises a floating structure.

(27) The system of example exemplary embodiment 1 further comprising a pressure exchanger.

(28) The system of example exemplary embodiment 27 wherein the pressure exchanger is located at an elevation less than the elevation of the first storage reservoir and greater than or equal to the elevation of the second storage reservoir.

(29) The system of example exemplary embodiment 1 wherein the low density fluid or high density fluid comprises desalinated water.

(30) The system of example exemplary embodiment 1 wherein the low density fluid or high density fluid comprises seawater, or treated seawater.

(31) The system of exemplary embodiment 1 wherein the low density fluid comprises a hydrocarbon, or hydrogen, or any combination thereof.

(32) The system of exemplary embodiment 1 wherein the second storage reservoir comprises an underground cavern

(33) The system of exemplary embodiment 1 wherein the second storage reservoir comprises an underwater and underground cavern
wherein said underground cavern is located under the seabed

(34) The system of exemplary embodiment 1 wherein the second storage reservoir comprises a salt cavern

(35) The system of exemplary embodiment 1 wherein the low density fluid comprises a hydrocarbon selected from butane, or propane and the high density fluid comprises a brine Notes Note: Some embodiments may employ a reservoir, such as a storage vessel or tank, which may store a high density liquid and/or a low density liquid. In some embodiments, the high density liquid may be soluble in the low density liquid, or the low density liquid may be soluble in the high density liquid, or any combination thereof. In some embodiments, the reservoir may store high density liquid and low density liquid in the same tank or vessel and the high density liquid may be soluble in the low density liquid, or the low density liquid may be soluble in the high density liquid, or any combination thereof. In some embodiments, a tank or vessel may store low density liquid and high density liquid, wherein the low density liquid in the tank may be positioned above, or located above, or floating above the high density liquid. In some embodiments, the low density liquid in the tank may comprise a separate layer from the high density liquid, and/or wherein a liquid-liquid interface exists between the low density liquid and the high density liquid in the tank. In some embodiments, a transition layer may exist between the low density liquid layer and the high density liquid layer, wherein the concentration of low density liquid or high density liquid varies within the transition layer, and/or wherein the concentration of the low density liquid in the transition layer is greater the closer to the low density liquid layer and the concentration of the high density liquid in the transition layer is greater the closer to the high density liquid layer. In some embodiments, the low density liquid may comprise freshwater or water with a relatively low dissolved salt or solute concentration and the high density liquid may comprise a brine or an aqueous solution with a relatively high dissolved salt or solute concentration. In some embodiments, a transition layer may exist between the freshwater low density liquid layer and the brine high density liquid layer, wherein the concentration of dissolved salt or solute varies within the transition layer, and/or wherein the concentration of the dissolved salt or dissolved solute in the transition layer is lower the closer to the freshwater low density liquid layer and the concentration of the dissolved salt or dissolved solute is greater the closer to the high density liquid layer. In some embodiments, one or more diffusers may be employed in the vessel or tank to, for example, enable the addition or removal of low density liquid or high density liquid or both while minimizing turbulence or mixing of the layers. Said diffusers may include, but are not limited to, diffusers similar to those employed in large chilled water thermal storage tanks, which in chilled water applications may involve minimizing the mixing between a warm water layer and a cold water layer when warm water or cold water or both is removed from the tank.

Note: In some embodiments, a floating or suspended barrier or plate or physical divider may be located between the low density liquid layer and the high density liquid layer. If said physical divider is floating, it may be desirable for said physical divider to comprise a material or combination of materials and/or may have an overall density less than the density of the high density liquid and greater than the density of the low density liquid. If said physical divider is mechanically placed, it may be desirable Note: In some embodiments, the high density fluid may be soluble in the low density fluid, or the low density fluid may be soluble in the high density fluid, or any combination thereof. In some embodiments, high density fluid and/or low density fluid may mix. In some embodiments, said mixing of the high density fluid and/or low density fluid may be inadvertent. In some embodiments, said mixing of the high density fluid and/or low density fluid may be an aspect of the design or within the nature of the process. For example, some mixing of the high density fluid and/or low density fluid may occur in, including, but not limited to, one or more or any combination of the following: in a pressure exchanger, or in the higher elevation reservoir, or in the lower elevation reservoir, or in another location in the energy storage system, or any combination thereof. In some embodiments, the rate of mixing between the low density fluid and high density fluid may be unpredictable. In some embodiments, the rate of mixing between the low density fluid and high density fluid may be predictable. In some embodiments, mixing of the low density fluid and high density fluid may not result in a material dissolution of low density fluid into the high density fluid, or high density fluid into the low density fluid, or any combination thereof. In some embodiments, mixing of the low density fluid and high density fluid may result in a material dissolution of low density fluid into the high density fluid, or high density fluid into the low density fluid, or any combination thereof. In some embodiments, the high density fluid may be regenerated or purified, or the low density fluid may be regenerated or purified, or any combination thereof. In some embodiments, regeneration or purification may be conducted in a manner which is batch, or semi-batch, or continuous, or any combination thereof. For example, the high density fluid may be regenerated or purified, or the low density fluid may be regenerated or purified, or any combination thereof using, for example, including, but not limited to, one or more or any combination of the following:

In some embodiments, regeneration or purification may involve treating, or concentrating, or purifying only a portion of the high density fluid or the low density fluid.

Reverse osmosis or nanofiltration or membrane based process

For example, in some embodiments, the high density fluid may comprise a salt brine and the low density fluid may comprise freshwater. In some embodiments, a portion of high density fluid comprising a salt brine may mix with a portion of low density fluid comprising freshwater, which may result in the freshwater comprising a higher salinity or salt concentration and/or the brine comprising a lower salinity or salt concentration. In some embodiments, at least a portion of the low density comprising freshwater with a higher salinity may be transferred into a reverse osmosis desalination system as the feed solution, forming a salt solution retentate and freshwater with a lower salinity. In some embodiments, the freshwater with a lower salinity may be returned to or transferred to or mixed with the low density fluid comprising freshwater. In some embodiments, the retentate may be further concentrated, using, for example, including, but not limited to, one or more or any combination of the following: high pressure reverse osmosis, or high pressure nanofiltration, or DTRO, or forward osmosis, or osmotically assisted reverse osmosis, or distillation, or membrane distillation, or evaporation, or salting out, or solventing out, or cryodesalination, or zero liquid discharge techniques. If or when said further concentrated retentate possesses a salt concentration, or salinity, or osmotic pressure, or any combination thereof near, or equal to, or greater than the high density fluid, said further concentrated retentate may be transferred to or mixed with the high density fluid comprising salt brine.

Forward osmosis or dilution or any combination thereof

For example, in some embodiments, the low density fluid may comprise salt water with a lower salinity or salt concentration than a high density fluid, which may comprise a salt brine. For example, in some embodiments, the salt concentration or osmotic pressure of the low density fluid may be designed to be similar to, or less than, or greater than the salinity or osmotic pressure of ocean water. If or when the salinity or osmotic pressure of at least a portion of low density fluid increases due to mixing with the high density fluid comprising salt brine, it may be desirable to add water or other dilutent to the low density fluid. In some embodiments, the excess volume of low density fluid due to the dilution may be discharged into the ocean if, for example, the low density fluid comprises the same or similar composition as ocean water. In some embodiments, seawater or treated seawater may comprise a dilutent.

In some embodiments, seawater or treated seawater may be employed as a water source or feed solution in a forward osmosis process. For example, the low density fluid may be employed as a draw solution, and/or water from the feed solution comprising seawater or treated seawater travel across or through the membrane into the draw solution, which may effectively enable the addition of water or freshwater to the low density fluid from a seawater or other saline source. In some embodiments, pressure may be applied to the feed solution to facilitate the transfer of water from the feed solution to the draw solution.

In some embodiments, it may be desirable to concentrate the brine and/or add any makeup salt or brine solution from any potential losses.

Concentrating using evaporation, or distillation, or membrane distillation, or membrane based process, or any combination thereof In some embodiments, if brine is employed as a high density fluid, it may be desirable to concentrate the brine or remove water from the brine. In some embodiments, concentrating of the brine or removing water from the brine may comprise concentrating or removing water from at least a portion of the brine using, for example, including, but not limited to, one or more or any combination of the following: evaporation, or distillation, or membrane distillation, or membrane based process, or freeze desalination, or cryodesalination, or solventing out, or precipitation.

Note: Some embodiments may comprise a higher elevation reservoir and a lower elevation reservoir. Energy may be stored by displacing high density fluid from a lower elevation reservoir into a higher elevation reservoir by pumping a low density fluid pumped from a higher elevation reservoir into a lower elevation reservoir. Energy may be generated by displacing lower density fluid from the lower elevation reservoir through a generator, generating power, and into the higher elevation reservoir by allowing higher density from the higher elevation reservoir to transfer into the lower elevation reservoir. In some embodiments, the higher elevation reservoir may be floating, or may be on land, or a combination thereof.

In some embodiments, the higher elevation reservoir may comprise storage reservoirs for high density fluid and storage reservoirs for low density fluid, wherein the storage reservoirs for high density fluid are physical separate from the storage reservoirs for low density fluid.

In some embodiments, the lower elevation reservoir may comprise storage reservoirs for high density fluid and storage reservoirs for low density fluid, wherein the storage reservoirs for high density fluid are physical separate from the storage reservoirs for low density fluid.

In some embodiments, the higher elevation reservoir may comprise a storage reservoir designed for both high density fluid and low density fluid, wherein high density fluid and low density fluid may be stored in the same vessel or reservoir simultaneously. For example, the high density fluid and low density fluid may be stored in the same vessel and at least partially separated by a density stratification. For example, the high density fluid and low density fluid may be stored in the same vessel and at least partially separated by a physical divider.

In some embodiments, the lower elevation reservoir may comprise a storage reservoir designed for both high density fluid and low density fluid, wherein high density fluid and low density fluid may be stored in the same vessel or reservoir simultaneously. For example, the high density fluid and low density fluid may be stored in the same vessel and at least partially separated by a density stratification. For example, the high density fluid and low density fluid may be stored in the same vessel and at least partially separated by a physical divider.

In some embodiments, the higher elevation reservoir may be stable or may be stationary.

In some embodiments, the higher elevation reservoir may be mobile, or move positions. In some embodiments, the higher elevation reservoir may be mobile or move positions when in direct or indirect contact with a wave of a sufficient size in a body of water, which may involve, for example, the higher elevation reservoir rising and falling in the presence of said waves, which may be similar to a ship or oceangoing vessel. In some embodiments, substantial movement of a reservoir may result in movement or mixing or sloshing of the high density fluid and/or low density fluid. In embodiments with a reservoir with substantial sloshing and/or high density fluid soluble in low density fluid, it may be desirable for the high density fluid to be stored in a physically separate tank or reservoir from the low density liquid.

In some embodiments, the higher elevation reservoir may comprise physically separate storage for low density fluid and high density fluid, while the lower elevation reservoir may comprise storage of low density fluid and high density fluid in the same vessels or other form of reservoir.

In some embodiments, the low density fluid may comprise a low salt concentration aqueous solution, such as seawater or purified seawater or ionic solution with similar concentration or osmotic pressure as seawater, and the high density fluid may comprise a brine, which may comprise a greater ionic concentration or osmotic pressure than said low salt concentration aqueous solution.

In some embodiments, mobile reservoirs or reservoirs prone to sloshing may contain baffles or physical structures within the tanks which may minimize sloshing and/or may prevent potentially damaging internal wave accumulation.

In some embodiments, the higher elevation reservoir may comprise a floating structure with storage tanks for low density fluid non-contiguously separate from storage tanks for high density fluid. In some embodiments, the high density fluid tanks and low density fluid tanks may be positioned in or on a floating structure in a configuration which may facilitate stability regardless of the state of charge of the energy storage system, or the relative amount of high density fluid in the higher elevation region, or the relative amount of low density fluid in the higher elevation region, or any combination thereof. For example, in some embodiments, in some embodiments, high density fluid storage tanks may be located between low density fluid tanks, or low density fluid tanks may be located between high density fluid tanks, or any combination thereof. For example, in some embodiments, at least a portion of the outside of a floating structure may store high density fluid, while at least a portion of the inside of a floating structure may storage low density fluid.

Note: In some embodiments, the energy storage system may be entirely on land. For example, in some embodiments, the higher elevation reservoir may be located on land and lower elevation reservoir may be located on land.

For example, some embodiments may comprise a higher elevation reservoir and a lower elevation reservoir, wherein the higher elevation reservoir possesses an elevation higher than the lower elevation reservoir and may be located on land and the lower elevation reservoir possesses an elevation lower than the higher elevation reservoir and may be located on land. In some embodiments, the higher elevation reservoir may be located at least partially above ground and the lower elevation reservoir may be located at least partially underground. In some embodiments, the higher elevation reservoir may be located entirely above ground and the lower elevation reservoir may be located entirely underground. In some embodiments, the higher elevation reservoir may be located underground and the lower elevation reservoir may be located underground. In some embodiments, the higher elevation reservoir may be located at least partially underground and the lower elevation reservoir may be located at least partially underground. Energy may be stored by displacing a high density fluid from the lower elevation reservoir to the higher elevation reservoir by pumping a low density from the higher elevation reservoir to the lower elevation reservoir. Energy may be generated by displacing lower density fluid from the lower elevation reservoir through a generator, generating power, and into the higher elevation reservoir by allowing higher density from the higher elevation reservoir to transfer into the lower elevation reservoir. In some embodiments, the higher elevation reservoir may comprise a tank or body of liquid or other reservoir located on or near the surface of the ground, while the lower elevation reservoir may comprise an underground region. For example, said underground region may comprise, including, but not limited to, one or more or any combination of the following: a salt cavern, or a cavern, or an excavated region, or a mine, or an underground mine, or a cave, or an aquifer, or an oil field, or a gas field, or subterranean storage region. Additionally, if practically incompressible fluids, such as liquids, are employed, the present embodiments may enable high round trip efficiency pumped energy storage system which may possess multiple advantageous characteristics, which may include, but are not limited to, one or more or any combination of the following: pumps or turbines near the surface or near an accessible region and/or possess a high round trip efficiency due to working fluid practical incompressibility and/or enables near full use of the volume of an underground cavity or region. Some of the present embodiments may enable the pump, or turbine, or electrical equipment, or other parts requiring potential maintenance, or moving parts, or any combination thereof to be located above ground, or at a higher elevation, or in an easily accessible location, or any combination thereof. In some embodiments, the energy storage system may not require a pressure exchanger due to the pressure resistance of an underground space or region. In some embodiments, the underground space or region may comprise the lower elevation reservoir.

For example, some embodiments may comprise a higher elevation reservoir and a lower elevation reservoir, wherein the higher elevation reservoir possesses an elevation higher than the lower elevation reservoir and may be located on land and the lower elevation reservoir possesses an elevation lower than the higher elevation reservoir and may be located on land. The system may be configured to store a high density fluid and a low density fluid. Energy may be stored by displacing a high density fluid from the lower elevation reservoir to the higher elevation reservoir by pumping a low density from the higher elevation reservoir to the lower elevation reservoir. Energy may be generated by displacing tower density fluid from the lower elevation reservoir through a generator, generating power, and into the higher elevation reservoir by allowing higher density from the higher elevation reservoir to transfer into the lower elevation reservoir. In some embodiments, displacement of high density fluid and/or low density fluid may involve direct displacement within a tank. In some embodiments, displacement of high density fluid and/or low density fluid may be conducted by passing the fluids through a pressure exchanger located at or near or below the elevation of the lower elevation reservoir. The pressure exchanger may be located along the pipes which may transfer the fluids between the higher elevation and lower elevation reservoirs. A pressure exchanger may enable the pressure of one fluid to displace or pump or result in the transfer of the other fluid by exchanging kinetic energy or hydraulic pressure or pressure. A pressure exchanger may enable the exchange of pressure between high pressure fluids while enabling the lower elevation reservoir to operate at a low pressure state or at a pressure near atmospheric pressure. In some embodiments, the pump and/or generator pump may be located near the higher elevation reservoir. In some embodiments, the energy storage system may employ reservoirs comprising rigid tanks. In some embodiments, the total volume of liquid or fluid in each reservoir may remain relatively constant regardless of the charge state of the energy storage system.

Note: In some embodiments, tanks, pumps, pressure exchangers, and/or other pieces of equipment may be modular, or may be mass manufactured, or may be serial manufactured, or any combination thereof.

Note: In some embodiments, more than one pressure exchanger may be employed.

Note: In some embodiments, employing water or seawater as a low density fluid, and/or brine or aqueous brine as a high density fluid, may enable the use of open air reservoirs or bodies of water for the higher elevation reservoir, or lower elevation reservoir, or any combination thereof.

Note: In some embodiments, employing water or seawater as a low density fluid, and/or brine or aqueous brine as a high density fluid, may enable the use of floating roof tanks, or tank or reservoir designs typically employed in municipal water storage or waste water storage, or any combination thereof for the higher elevation reservoir, or lower elevation reservoir, or any combination thereof.

Note: In figures, the label 'ocean' may be employed to described an example water body. Other water bodies, instead of or in addition to, 'ocean', may be employed. For example, water bodies may include, but are not limited to, one or more or any combination of the following: oceans, or seas, or lakes, or mines, or excavated ground filled with water, or underground cavities, or aquifers, or ponds, or storage reservoirs, or any combination thereof may be employed as bodies of water.

Note: 'Low density liquid' or 'LDL' may be provided as a type of low density fluid. Other fluids instead of, or in addition to, liquids, may be employed where 'Low density liquid' or 'LDL' may be described.

Note: 'High density liquid' or 'HDL' may be provided as a type of high density fluid. Other fluids instead of, or in addition to, liquids, may be employed where 'How density liquid' or 'HDL' may be described.

Note: In some embodiments, in an overpressure event or in a situation with risk of an overpressure event, the system may release high density fluid, or low density fluid, or any combination thereof, to, for example, prevent damage to the system. If, for example, the high density fluid comprises water, or a salt, or a brine, or any combination thereof, or the low density fluid comprises water, or a salt, or a brine, or any combination thereof, I some embodiments, the fluid release may have negligible impact on the marine environment, or chemical composition, or chemical constituents, or any combination thereof in an adjacent water body, or ocean, or sea, or lake, or any combination thereof, if applicable. For example, if the fluid pressure near a lower elevation reservoir increases to a pressure near a tolerance pressure or a threshold pressure, a pressure release or valve may open to release fluid to relieve at least a portion of pressure. In some embodiments, said pressure release valve may be located near or in the lower elevation reservoir, or near or in a pressure exchanger, or near or in a pump, or near or in a generator, or near or in a pipe, or near or in a valve, or any combination thereof. In some embodiments, said pressure release valve may be located near or in the higher elevation reservoir, or near or in a pump, or near or in a generator, or near or in a pipe, or near or in a valve, or near or in a pressure exchanger, or any combination thereof.

Note: In some embodiments, a buffer tank may be located near or connected to an interconnected pipeline near a pressure exchanger. In some embodiments, the buffer tank may comprise a floating roof tank. For example, in some embodiments, the pressure exchanger may be located on land, and an interconnected buffer tank may possess a floating roof and may add or release fluid in response to sudden changes in fluid pressure. A floating roof buffer tank may be employed, for example, between a pressure exchanger and a lower elevation reservoir, at about the same elevation as the pressure exchanger. It may be desirable for a floating roof buffer tank to be connectable or disconnectable and may be employed when and where the pressure of the fluid should be at or near equilibrium with the ambient pressure conditions.

Note: A storage tank may comprise an example storage unit, or storage vessel, or storage mechanism. A reservoir may comprise storage units, or storage vessels, or storage mechanisms.

Note: Some embodiments may employ water as the low density fluid and liquid sulfur as the high density fluid. The density difference between water and liquid sulfur is about 1 kg/L, enabling significant energy density. Low viscosity liquid sulfur may be at a temperature of about 117 degrees Celsius to about 151 degrees Celsius, at which the vapor pressure of water is about 1.8 bar to 4.91 bar. The higher elevation reservoir may need to be pressurized at about 1.8 bar to 4.91 bar to ensure the water remains a liquid phase. Liquid sulfur between about 117 degrees Celsius to about 151 degrees Celsius possesses a viscosity less than about 15 cP. Liquid sulfur is practically insoluble in water. The present embodiment may require heating to maintain the temperature of the liquid sulfur and the water, and/or the present embodiment may require or benefit from insulation of the tanks, or pumps, or pipes, or other equipment to, for example, minimize heat losses into the environment, or prevent the liquid sulfur from cooling below its melting point, or any combination thereof. In some embodiments, heat may be supplied from, including, but not limited to, one or more or any combination of the following: solar thermal heat, or waste heat, or heat pump, or electricity, or natural gas, or combustion, or chemical reaction, or fertilizer production, or burning sulfur, or combustion of sulfur, or the production of sulfuric acid, or any combination thereof.

Note: In some embodiments employing liquid sulfur or other above ambient temperature fluids, it may be desirable to maintain the liquid sulfur at a temperature near 150 degrees Celsius to provide a buffer to prevent liquid sulfur from cooling to a temperature less than or equal to its freezing point or melting point to, for example, prevent the potential clogging of pipes or equipment.

Note: In some embodiments employing liquid sulfur or other above ambient temperature fluids, it may be desirable to employ insulated and/or heated pipelines or flow lines.

Note: Electricity transmission may be conducted using, including, but not limited to, a subsea or submarine cable, or an above ground cable, or a electricity transfer ship, or an underground cable, or a buried cable, or hydraulic transfer, or any combination thereof.

Note: In some embodiments, the elevation of the higher elevation reservoir may be higher than or equal to the elevation of the surface of the body of water or body of liquid. For example, the elevation of the higher elevation reservoir may be higher than or equal to one or more or any combination of the following relative to the elevation of the surface of the body of water or body of liquid: 0 meters, or 5 meters, or 10 meters, or 20 meters, or 30 meters, or 40 meters, or 50 meters, or 60 meters, or 70 meters, or 80 meters, or 90 meters, or 100 meters, or 120 meters, or 140 meters, or 160 meters, or 15 meters, or 200 meters, or 250 meters, or 300 meters, or 350 meters, or 400 meters, or 450 meters, or 500 meters, or 550 meters, or 600 meters, or 650 meters, or 700 meters, or 750 meters, or 800 meters, or 850 meters, or 900 meters, or 950 meters, or 1000 meters.

Note: In some embodiments, the elevation of the higher elevation reservoir may be lower than or equal to the elevation of the surface of the body of water or body of liquid, which may mean the higher elevation reservoir is located beneath the body of water or body of liquid. For example, the elevation of the higher elevation reservoir may be lower than or equal to one or more or any combination of the following relative to the elevation of the surface of the body of water or body of liquid: 0 meters, or −5 meters, or −10 meters, or −20 meters, or −30 meters, or −40 meters, or −50 meters, or −60 meters, or −70 meters, or −80 meters, or −90 meters, or −100 meters, or −120 meters, or −140 meters, or −160 meters, or −15 meters, or −200 meters, or −250 meters, or −300 meters, or −350 meters, or −400 meters, or −450 meters, or −500 meters, or −550 meters, or −600 meters, or −650 meters, or −700 meters, or −750 meters, or −800 meters, or −850 meters, or −900 meters, or −950 meters, or −1000 meters.

Note: In some embodiments, the higher elevation reservoir may be located underwater, although may be floating or suspended underwater. In some embodiments, it may be desirable for the higher elevation reservoir to be located underwater, or to be floating or suspended underwater, such as to minimize or prevent exposure of the higher elevation reservoir to waves, or wind, or debris, which may be more prevalent near the surface of the water than underwater at a sufficient depth.

A system for storing and generating power comprising:
a first storage reservoir configured to store a first fluid;
a second storage reservoir located at a lower elevation than the first storage reservoir and configured to store a second fluid which has a higher density than the first fluid;
a pump; and
a generator;
wherein the pump, generator, and the first and second reservoir are operatively connected such that power is stored by displacing the second fluid which has a higher density than the first fluid in the second storage reservoir by pumping the first fluid in the first storage reservoir to the second storage reservoir and power is generated or discharged by allowing the first fluid in the second storage reservoir to return to the first storage reservoir; and
wherein the first fluid is a liquid.

Additional Physical Divider in Reservoir or Tank Notes

Adjustable Tank Divider

It may be possible for a boundary layer or stratification layer to form at the liquid-liquid interface between the high density fluid and low density fluid. It may be desirable to minimize the size or volume of said boundary layers or stratification layers to, for example, maximize usable tank capacity. It may be desirable to minimize the possible transfer or diffusion of chemical components in the high density fluid into the low density fluid and/or vise versa.

In some embodiments, systems and methods for minimizing mixing or heat transfer between the high density fluid and low density fluid may comprise mechanisms to minimize turbulence or mixing when fluids are being added or removed or otherwise transferred into or out of a tank or vessel. For example, a tank may employ diffusers which may minimize turbulence when adding or removing or otherwise transferring fluids. For example, diffusers may promote the formation of laminar flow when adding or removing or otherwise transferring fluids, which may prevent mixing between fluids. For example, a system may employ kinetic energy or wave or motion damping mechanisms, which may convert said kinetic energy or wave or motion into heat, or liquid, or electricity, or sound, or transfer kinetic energy, or otherwise remove or transfer away turbulence or waves or mixing from liquid-liquid interfaces or boundary layers or stratification layers or fluid interfaces. For example, some embodiments may employ features or walls or dividers storing or comprising a compressible fluid, such as a gas or a foam, which may convert kinetic energy into heat.

In some embodiments, systems and methods for minimizing mixing between fluids may comprise physical dividers. In some embodiments, physical dividers may comprise a solid material which may be located, at least in part, between two fluids, or between the high density fluid and low density fluid within a tank or other form of reservoir. Physical dividers may prevent mixing between fluids by, including, but not limited to, one or more or any combination of the following: minimizing the surface area which fluids are in direct contact, or preventing or minimizing turbulence or waves or fluid motion from traveling between fluids at or near fluid interfaces inside a tank, or provide an insulative divider which may prevent or minimize the transfer of heat between liquid phases within a tank.

In some embodiments, the volume of each fluid in the tank may change depending on the state of charge of an energy storage system. If the relative volumes of each liquid phase or liquid layer in a tank change, the location or elevation of fluid interfaces or hypothetical fluid interfaces inside the tank may also change, which may result in the need for physical dividers to move. In some embodiments, it may be desirable for the movement of the physical dividers to match or attempt to at least partially match the movement of a fluid or liquid-liquid interface or of a hypothetical liquid-liquid interface or hypothetical fluid interface. For example, if the elevation of a liquid-liquid interface or the liquid level layer decreases by a first amount of centimeters, it may be desirable for the physical divider to decrease by about the same amount of centimeters, plus or minus a tolerance amount. Said tolerance amount may comprise the maximum amount of deviation in movement between the physical divider and/or movement in the liquid-liquid interface while maintaining layer separation or without substantial mixing between layers, minus a contingency amount. Said tolerance amount may comprise the maximum amount of deviation in position or location or elevation between the physical divider and/or movement in the liquid-liquid interface while maintaining layer separation or without substantial mixing between layers, minus a contingency amount.

A physical divider may comprise a solid or liquid material. A physical divider may comprise including, but not limited to, one or more or a combination of the following: a plastic, or a composite, or a rubber, or an elastic material, or a polymer, or a metal, or a ceramic, or a solid, or a liquid, or a gas. A physical divider may comprise a rigid material, or a flexible material, or any combination thereof. For example, a physical divider may comprise a rigid interior with a flexible skirt around the perimeter of the physical divider, for example, where the physical divider may be near or in contact with the tank walls. It may be desirable to place a skirt at the perimeter of a physical divider or where a physical divider meets or nearly meets a tank wall because said skirt may ensure a physical divider occupies a maximum cross sectional surface area while enabling the physical divider to be movable or mobile or capable of changing position. Said skirt may comprise a flexible material. Said skirt may comprise a flexible material which returns to about the same shape after the force which flexed the material is at least partially relieved. Said skirt may comprise an elastic material. It may be desirable for a physical divider to have a shape of at least a portion of the cross sectional shape or area of a tank near at least one point where a hypothetical liquid-liquid interface may be located. It may be desirable for the physical divider to occupy at least a portion of the cross sectional area of a tank and/or occupy at least a portion of a surface a liquid phase and/or occupy a space or location which may otherwise comprise a direct liquid-liquid interface and/or reduce the total surface area of a direct or potentially direct contact liquid-liquid interface or fluid-fluid interface.

It is important to note that 'liquid-liquid interface' may be provided as an example fluid-fluid interface, and other fluid-fluid interfaces instead of or in addition to a 'liquid-liquid interface' may be employed or may exist where 'liquid-liquid interface' is described.

It is important to note that 'liquids' may be provided as an example fluid, and other fluids instead of or in addition to 'liquids' may be employed where 'liquids' are described.

In some embodiments, one or more or a combination of mechanisms may be employed to ensure physical dividers are in the appropriate location, or are near or in or providing a barrier at a liquid-liquid interface or other fluid-fluid interface, or any combination thereof. In some embodiments, the placement or movement of a physical divider may be enabled or facilitated by a passive mechanism. For example, a passive mechanism may involve a mechanism which enables the physical divider to move, such as rise or fall, with the level of layers or the level of a liquid-liquid interface or other fluid-fluid interface utilizing the change in position of the liquid-liquid interface or the position or volume of a liquid layer. For example, in some embodiments, a passive mechanism may not require an external power source or control device beyond external power sources or control devices involved with the pumping or transferring of fluids. It is important to note one or more or any combination of passive mechanisms may be combined. It is important to note one or more or any combination of passive mechanisms may be combined and/or may be combined with one or more or any combination of active mechanisms.

For example a passive mechanism may comprise, including, but not limited to, one or more or any combination of the following:

A physical divider with a density less than the density of one layer and greater than the density of another layer, which may enable the physical divider to naturally gravitate to a position between the lower density layer and the higher density layer due to intrinsic buoyancy properties and/or may enable the physical divider to be positioned at the liquid-liquid or other fluid-fluid interface between two layers.

A physical divider which may utilize hydrophobicity and/or hydrophilicity and/or surface tension to facilitate its position within a tank and/or to minimize mixing between layers. For example, a physical divider may be located between two liquid phases wherein both liquid phases are hydrophilic and, by employing hydrophobic surfaces on at least one side of the physical divider and/or hydrophilic surfaces on at least one side of the physical divider, the physical divider may gravitate to a position between the two liquid phases or a position at the liquid-liquid interface between two liquid phases. For example, a physical divider may be located between two liquid phases wherein both liquid phases are hydrophobic and, by employing hydrophobic surfaces on at least one side of the physical divider and/or hydrophilic surfaces on at least one side of the physical divider, the physical divider may gravitate to a position between the two liquid phases or a position at the liquid-liquid interface between two liquid phases. For example, a physical divider may be located between two liquid phases wherein at least one liquid phase is hydrophilic in a temperature range and at least one liquid phase is hydrophilic in a different temperature range, and, by employing hydrophobic surfaces on at least one side of the physical divider and/or hydrophilic surfaces on at least one side of the physical divider, the physical divider may gravitate to a position between the two liquid phases or a position at the liquid-liquid interface between two liquid phases. For example, a physical divider may be located between two liquid phases and the physical divider may be hydrophilic. For example, a physical divider may be located between two liquid phases and the physical divider may be hydrophobic.

A physical divider which may utilize surface tension. For example, a physical divider may utilize the surface tension at a liquid-liquid interface or other fluid-fluid interface to enable positioning at a liquid-liquid interface or other fluid-fluid interface. For example, a physical divider may utilize the difference in surface tension between two liquid phases. For example, a physical divider may employ material surface properties, such as surface geometry, to utilize surface tension to position a physical divider at a liquid-liquid interface. For example, surface tension or capillary forces may be employed to enable positioning of the physical divider. For example, the surface tension or capillary forces utilized may not be limited to surface tension or capillary forces at a liquid-liquid interface, and may also include, but is not limited to, surface tension or capillary forces between the physical divider and the tank wall, or the physical divider and tank wall in the presence of a liquid-liquid interface, or any combination thereof.

A physical divider may employ geometry and/or initial placement or positioning to maintain position or maintain a position at a liquid-liquid interface or at a hypothetical liquid-liquid interface. For example, a physical divider may employ a convex or concave geometric which may prevent the physical barrier from rising into an upper liquid layer or falling into a lower liquid layer. For example surface tension or suction forces or the inability for another liquid phase or fluid to enter the concave region may facilitate placement of a cup at a liquid-liquid interface. For example, in some embodiments, a physical divider may employ at least one concave surface and at least one convex surface. For example, in some embodiments, a physical divider may employ convex surfaces or external siding. For example, in some embodiments, a physical divider may employ concave surfaces or external siding. For example, in some embodiments, a physical divider may employ an internal compartment with storing at least one liquid phase and/or with an opening to a layer comprising at least a portion of said stored liquid phase.

For example, a practical demonstration of an example of phenomena at a fluid interface involving physical divider geometry may involve submerging a cup in water, filling the cup with water, then lifting the bottom of the cup above the surface of the water with the cup in an inverted or upside-down position. If the opening of the cup remains beneath the air—water interface or the water's surface, the water will remain in the cup. In such a scenario, even if the density of the cup is less than the density of the water, the cup may not fully float above the surface of the water or may not substantially rise above the surface of the water if the cup remains in an inverted or upside-down position because of the water occupying the cup and the associated density of the water relative to the air.

A physical divider may employ a difference in viscosity between two liquid phases or liquid layers at a liquid-liquid interface or hypothetical liquid-liquid interface or other fluids or other fluid interfaces. One liquid phase may possess a substantially different viscosity than another liquid phase, and said substantially different viscosity may be employed to help facilitate the placement of or maintain the position of a physical divider and/or to maintain a separation between two liquid phases.

A physical divider may employ electrostatic properties to maintain a position and/or maintain/or enable a separation of liquid phases. For example, two liquid phases or layers may possess different electrostatic properties or electrostatic charge, which may be utilized to ensure liquid-liquid separation in a tank with a physical barrier. For example, two liquid phases or layers may possess similar electrostatic properties or electrostatic charge, which may be utilized to ensure liquid-liquid separation in a tank with a physical divider. For example, a physical divider may be designed with electrostatic properties which may prevent the physical divider from undesirably floating or sinking and/or may enable the physical divider to maintain proper placement and/or maintain a position at a liquid-liquid interface and/or prevent or minimize mixing between liquid phases.

A physical divider may employ magnetic properties to maintain a position and/or maintain/or enable a separation of liquid phases. For example, two liquid phases or layers may possess different magnetic properties, which may be utilized to ensure liquid-liquid separation in a tank with a physical divider. For example, two liquid phases or layers may possess similar magnetic properties, which may be utilized to ensure liquid-liquid separation in a tank with a physical divider. For example, a physical divider may be designed with magnetic properties which may prevent the physical divider from undesirably floating or sinking and/or may enable the physical divider to maintain proper placement and/or maintain a position at a liquid-liquid interface and/or prevent or minimize mixing between liquid phases.

In some embodiments, the percentage of surface area or cross sectional area or both of a liquid-liquid interface or fluid-fluid interface covered or occupied by a physical divider may be greater than, or equal to, or less than, one or more or any combination of the following: 1%, or 5%, or 10%, or 15%, or 20%, or 25%, or 30%, or 35%, or 40%, or 45%, or 50%, or 55%, or 60%, or 65%, or 70%, or 75%, or 80%, or 85%, or 90%, or 95%, or 99%, or 99.5%.

For example an active mechanism may comprise, including, but is not limited to, one or more or any combination of the following:

In some embodiments, the physical divider's position, or shape, or any combination thereof may be adjusted using a mechanical device or a mechanical mechanism.

Density

In some embodiments, a physical divider may possess a density greater than the density of one or more or all the liquid phases in a thermal storage tank.

In some embodiments, a length adjustment mechanism may be located, for example, at or near the top of the tank.

In some embodiments, a physical divider may possess a density less than the density of one or more or all the liquid phases in a thermal storage tank.

In some embodiments, a length adjustment mechanism may be located, for example, at or near the bottom of the tank.

In some embodiments a system may possess at least one physical divider with a density greater than the density of one or more or all the liquid phases.

Controlling Position of a Physical Divider in some embodiments, a system may employ information on system operations to determine the appropriate or desired position of the physical divider and instruct the adjustment mechanism to move the physical divider to said appropriate or desired position. A liquid-liquid interface or hypothetical liquid-liquid interface may move at one, or more, or any combination of rates of change based on, including, but not limited to, one or more or a combination of the following: the flow rate, or material or chemical or physical properties, or geometry, or the geometry of the physical divider, or the geometry of the tank or vessel, or any combination thereof. In some embodiments, the desired position of a physical divider may change in connection with or correlation with the change in position of a liquid-liquid interface. A system may determine or compute the relationship between the liquid flow rate of one or more liquid phases and the rate of change in position of a liquid-liquid interface or a hypothetical liquid-liquid interface and/or employ information on said relationship to determine the desired position of a physical divider. In some embodiments, said relationship may be an established equation or algorithm. In some embodiments, said relationship, or live or semi-live information on system operations, or other information, or any combination thereof may be employed to determine the desired location of the physical divider at any desired time interval and/or a predicted rate of change of the desired location of the physical divider. In some embodiments, the adjustment mechanism may be controlled or instructed to adjust the position of a physical divider at a specific rate of change or direction based on said information. Information may include, but is not limited to, for example, information on the flow rate of one or more liquid phases entering or exiting a thermal storage system and/or information on the geometry of the thermal storage tank. Information may be computational or digital. In some embodiments, information may be gathered from one or more equipment or sensors, or information may be stored in a digital or physical storage mechanism, or any combination thereof. In some embodiments control or actions made by a system may be at least partially automated or fully automated.

Cable or Thread Based Adjustment Mechanism:

In some embodiments, the location or elevation or position of the physical divider in a tank may be controlled or maintained or adjusted using threads or cables attached to the physical divider, or indirectly connected to the physical divider, or connected to the physical divider using a magnetic coupling, or indirectly connected to the physical divider using a magnetic force, or any combination thereof. Said threads or cables may comprise, including, but not limited to, one or more or a combination of the following: synthetic material, or organic material, or natural fiber, or composite material, or metallic material, or ceramic material, or carbon material, or hydrocarbon material, or plastic, or metal, or fibrous material, or nylon, or polyvinylidene fluoride, or polyethylene, or polyester, or Dacron, or UHMWPE, or PTFE, or fluorocarbon, or carbon fibre, or cotton, or Dyneema, or Kevlar. Said threads or cables may be connected to an adjustment mechanism or a length adjustment mechanism. Said threads or cables may be connected to an adjustment mechanism or a length adjustment mechanism. Said adjustment mechanism may comprise, for example, including, but not limited to, one or more or a combination of the following: a pulley, or reel, or actuator. Said adjustment mechanism may adjust the position of a liquid-liquid separator by adjusting the length of one or more cables or lines.

Some embodiments may employ one cable. Some embodiments may employ one cable with a cable split near a physical divider, which may split or branch one cable into multiple cables, wherein each of said multiples cables or branch cables may anchor or be connected to the physical divider, or may anchor to distributed points or locations on the physical divider, or any combination thereof. Some embodiments may employ multiple cables. Some embodiments may employ one cable and one adjustment mechanism. Some embodiments may employ multiple adjustment mechanisms and one cable. Some embodiments may employ one adjustment mechanism and multiple cables. Some embodiments may employ multiple adjustment mechanisms and multiple cables.

In some embodiments, such as, for example, in embodiments with at least one physical divider positioned at an elevation below another physical divider and/or where a cable length adjustment mechanism is located near the top of the tank, it may be desirable for the threads or cables connected to the lower elevation physical divider to pass through the higher elevation physical divider, which may require holes in the higher elevation physical divider which allow said threads or cables of the lower elevation physical divider to pass through the higher elevation physical divider, while allowing the higher elevation physical divider to operate. In some embodiments, such as, for example, in embodiments with at least one physical divider positioned at an elevation above another physical divider and/or where a cable length adjustment mechanism is located near the bottom of the tank, it may be desirable for the threads or cables connected to the higher elevation physical divider to pass through the lower elevation physical divider, which may require holes in the higher elevation physical divider which allow said threads or cables of the lower elevation physical divider to pass through the higher elevation physical divider, while allowing the higher elevation physical divider to operate. It may be desirable for said threads or cables to be as small in diameter as possible and said holes in the higher elevation physical divider to be as small in diameter as possible to minimize mixing between liquid phases and/or minimize surface area of direct contact liquid-liquid interface. It may be desirable to employ surface geometry, or specific geometry of the cable or thread or hole, or any combination thereof to, for example to, for example, minimize potential mixing between different liquid phases at said holes and/or at said threads or lines. It may be desirable to employ hydrophilic, or hydrophobic, or other material property coating or material at or in said holes and/or on said threads or cables to, for example, minimize potential mixing between different liquid phases at said holes and/or at said threads or lines.

In some embodiments, it may be desirable to maximize the volume of a tank occupied by a thermal storage medium and minimize the volume of a tank occupied by a physical divider or both.

In some embodiments, a physical divider may be connected to at least a portion of an adjustment mechanism by a magnetic coupling, or magnetic force, or magnetic interaction, or magnetic mechanism. For example, at least a portion of the siding or perimeter of a physical divider may be magnetic or may comprise a magnet and/or an actuator outside of the tank may comprise a magnet and/or said actuator may control the position of a physical divider due to the magnetic force connecting the actuator to the physical divider. In some embodiments, employing a magnetic mechanism may prevent or reduce mixing of layers because, for example, a magnetic mechanism may enable control or movement of the physical divider with less moving parts or holes in the tank or physical divider. In some embodiments, the use of a magnetic mechanism may reduce the tank volume occupied by the adjustment mechanism and/or tank divider, which may increase the available volume or percentage of volume available for or occupied by a thermal storage medium.

In some embodiments, the position of a physical divider may be adjusted by one or more or any combination of a physical bolt or screw or a threaded rod. A rotation mechanism, such as an electric motor, may be connected to said physical bolt or screw or a threaded rod. The physical bolt or screw or a threaded rod may be connected to a physical divider. In some embodiments, the physical bolt or screw or a threaded rod may be attached to the top of a physical divider. In some embodiments, a physical divider may possess complementary threads to the threads of the physical bolt or screw or a threaded rod and the physical bolt or screw or a threaded rod may pass through the physical divider. Depending on the direction of rotation, the position or elevation of a physical divider may change based on the rotation of the physical bolt or screw or a threaded rod in the presence of complementary threads in the physical divider. In some embodiments, a single physical bolt or screw or a threaded rod may be employed. In some embodiments, a physical bolt or screw or a threaded rod may be employed, however multiple non-threaded or threaded guide posts or rods, which may ensure a physical divider remains aligned or in a proper position, may also be employed. In some embodiments, multiple physical bolts or screws or threaded rods may be employed. In some embodiments with more than one physical divider, it may be desirable to employ different physical bolts or screws or threaded rods to adjust the position of each physical divider. In some embodiments with more than one physical divider, it may be desirable to employ the same physical bolts or screws or threaded rods to adjust the position of each physical divider.

In some embodiments, an adjustment mechanism may help maintain the position of a physical divider, for example, by preventing the physical divider from becoming misaligned or crooked.

In some embodiments, physical dividers may possess an electrostatic change. In some embodiments, physical dividers an electrostatic charge may be provided to a physical divider and/or electricity or an electric charge from an energy source may be provided to a physical divider. In some embodiments, an electrostatic charge or electrical charge may be employed to facilitate the position of a physical divider at a liquid-liquid interface or hypothetical liquid-liquid interface. In some embodiments, an electrostatic charge or electrical charge may be employed to further minimize mixing between liquid layers near a physical divider.

In some embodiments, the higher elevation reservoir may be integrated with a power transformer, or crew quarters, or any combination thereof. For example, in some embodiments, the higher elevation reservoir may comprise a floating power transformer or may incorporate or be adjacent to a floating power transformer.

Active mechanism may involve physical movement requiring power input to operate and/or may involve using mechanical device, for example, which may include, but is not limited to, a cable, or actuator, or rotating bolt or screw, or magnetism, or magnetic bearing, or magnetic actuator, or powered electrostatic charge, or electrical charge.

Note: 'To attempt to at least partially match' may mean ensuring the position of a physical divider is within the tolerance amount of a liquid-liquid interface or hypothetical liquid-liquid interface.

Note: 'A hypothetical liquid-liquid interface' may mean the likely location of a liquid-liquid interface or other fluid-fluid interface, even if liquid layers or fluid layers or fluids are not or are minimally in direct contact within a tank. A hypothetical liquid-liquid interface may be determined, for example, based on, including, but not limited to, one or more or a combination thereof: the volume of a liquid layer or the volume of each liquid layer in the tank and the geometry of the tank, or by sensors employing light, or viscosity, or density, or color, or other means to determine the location of a layer and the transition from one layer to another layer, or any combination thereof.

[Diffuser to minimize mixing or turbulence between the layers and/or maintain a liquid-liquid interface] [physical barrier or divider placed between at least a portion of the layers which may minimize or prevent mixing between the layers]

Storage of Liquid Phases
Densities
Density differences may be primarily driven by concentration of one or more chemical components, because each liquid phase may possess difference concentration or composition than the other liquid phases]

Layering in tank may occur with liquid-liquid interfaces and minimal mixing or turbulence in tank, which may be facilitated with diffusers.

Due to defined liquid-liquid interface and/or defined density differences physical dividers may be placed or located between the layers near or at liquid-liquid interfaces.

Dividers may be employed to, for example:

Minimize mixing between liquid phases

Minimize heat transfer between liquid phases

Enable more turbulent flow or less complicated or expensive diffusers or inlets or outlets by, for example, preventing or minimizing mixing between layers.

Enable greater energy densities

Minimize or reduce potential unusable tank volume at liquid-liquid interfaces

Dividers may be located in liquid-liquid interfaces due to customized densities which may be greater than the density of a layer above the divider and less than the density of the layer below the divider. Buoyancy based placement of dividers may comprise passive placement of dividers.

Dividers may be located in liquid-liquid interfaces due to mechanical or other active mechanisms. Said active mechanism placement may involve moving the location or elevation or placement of the divider by means independent of the buoyancy of the divider in the layers or liquid phases. Said active mechanism placement may involve moving the location or elevation or placement of the divider in response to changes in the energy storage system, such as, including, but not limited to, fluids entering or exiting the storage tank, or changes in the volume of one or more fluids in the storage tank, or any combination thereof.

Some embodiments may involve both active and/or passive physical placement or movement of dividers.

Example Application Notes

Background

In 2015, Hawaii was the first US state to sign into law a 100% renewable energy mandate, requiring the state to generate 100% of its power from renewable energy by 2045. Hawaii has an isolated electricity grid and limited hydropower resources, making Hawaii's transition to 100% renewable energy challenging compared to other US states.

Fortunately, Hawaii has favorable attributes for renewable energy projects. Hawaii electricity prices for large industrial power users were $0.2172 per kWh on Oahu and $0.2915 per kWh on Big Island, significantly greater than the levelized cost of electricity from most solar and wind projects and about 184% and 281% greater, respectively, than the average price of $0.0765 per kWh for industrial power users on the US mainland. Hawaii Electric Power Corporation, Hawaii's electric power utility, is an investment grade credit rated electric power off-taker. Hawaii has relatively significant power capacity, with 1,794.5 MW of firm capacity and 853 MW of non-firm capacity on the island of Oahu, and 213.3 MW of firm capacity and 155.4 MW of non-firm capacity on the Big Island. Hawaii has an abundance of consistent solar and wind resources and relatively consistent climate.

Hawaii's plans for transitioning to 100% renewable energy rely on intermittent power sources, solar and wind, combined with energy storage. Currently, any new solar project developed in Hawaii must be co-developed with energy storage. To date, Hawaii energy storage comprises almost entirely lithium ion battery projects. Most significantly, on the Island of Oahu, Hi. plans to replace the 15 MW AES coal power plant with a 185 MW, 565 MWh lithium ion battery project by September 2022. Lithium ion batteries, however, are unlikely to provide the long term energy storage Hawaii needs to reliably and sustainably transition to 100% renewable energy. Lithium-ion batteries have limited cycle lives and generally need to be replaced after 10 years. Lithium-ion batteries are currently non-recyclable and are made of scarce materials, including lithium, graphite, and cobalt. Additionally, Hawaii will require increasingly longer duration energy storage to ensure power grid reliability while increasing the penetration of intermittent solar and wind power, and lithium ion batteries are ill-suited for long duration energy storage because lithium ion batteries are unable to decouple power capacity from energy capacity. Hawaii will need sustainable and reliable long duration electricity storage to achieve its 100% renewable energy mandate.

Technical Overview of Fluid Displacement Energy Storage

FLUID DISPLACEMENT ENERGY STORAGE is a long duration energy storage technology which stores power in the gravitational potential energy of displacing a high density liquid with a low density liquid between two regions of different elevation. In some embodiments, FLUID DISPLACEMENT ENERGY STORAGE has a lower elevation reservoir located beneath the surface of a body of water, and a higher elevation reservoir located near or above the surface of a body of water or otherwise at an elevation greater than the elevation of the lower elevation reservoir. Some versions of FLUID DISPLACEMENT ENERGY STORAGE employ a floating higher elevation reservoir, which may comprise a floating storage vessel, such as an FSO. Some versions of FLUID DISPLACEMENT ENERGY STORAGE employ a higher elevation reservoir located on land and a lower elevation reservoir located under the water. FLUID DISPLACEMENT ENERGY STORAGE may comprise a closed system, meaning all working fluids are internally contained within the system and are not in contact with the surrounding ocean water. Some embodiments may be built using equipment and materials well-established in other applications, such as in pipelines, offshore oil & gas projects, hydroelectric dams, municipal water systems, and desalination facilities.

The energy stored in FLUID DISPLACEMENT ENERGY STORAGE may be primarily dependent on the difference in elevation between the higher elevation reservoir and lower elevation reservoir, the difference in density between the high density liquid (HDL) and low density liquid (LDL), and the volume of high density liquid and low density liquid. Generally, the greater the density difference between the HDL and the LDL, and/or the greater the elevation difference between the lower elevation reservoir and higher elevation reservoir, the greater the energy density of the system. In addition to energy density, factors for selecting HDL-LDL pairs include compatibility, availability, cost, and environmental impact. Example HDL-LDL pairs selected based on the aforementioned criteria include, but are not limited to, those shown in Table 1. Table 2 shows the energy density of each HDL-LDL pair at elevation differences of 1,000 meters, 1,500 meters, 2,000 meters, 2,500 meters, 3,000 meters, 3,500 meters, and 4,000 meters. Tables 3-5 show example pros and cons of each HDL-LDL pair provided in Table 1.

TABLE 1

Selected Example High Density Liquid - Low Density Liquid Pairs

| Label | High Density Liquid | Density (kg/L) | Low Density Liquid | Density (kg/L) | Density Difference (kg/L) |
|---|---|---|---|---|---|
| Pair #1 | Brine (e.g. Magnesium Chloride and/or Calcium Chloride + Water) | 1.30 | Freshwater | 1.00 | 0.30 |
| Pair #2 | Seawater | 1.03 | n-Butane | 0.57 | 0.46 |
| Pair #3 | Brine (e.g. Magnesium Chloride and/or Calcium Chloride + Water) | 1.30 | n-Butane | 0.57 | 0.73 |

TABLE 2

Calculated Energy Density (kWh per m$^3$) of Selected Example HDL - LDL Pairs vs. Elevation Difference

| | 1,000 m | 1,500 m | 2,000 m | 2,500 m | 3,000 m | 3,500 m | 4,000 m |
|---|---|---|---|---|---|---|---|
| Pair #1 | 0.82 | 1.23 | 1.64 | 2.04 | 2.45 | 2.86 | 3.27 |
| Pair #2 | 1.25 | 1.88 | 2.51 | 3.13 | 3.76 | 4.38 | 5.01 |
| Pair #3 | 1.99 | 2.99 | 3.98 | 4.97 | 5.97 | 6.96 | 7.96 |

TABLE 3

Example Brine (HDL) - Freshwater (LDL) Pair Pros and Cons

| Pros | Cons |
|---|---|
| Low cost HDL and LDL | 0.3 kg/L density difference is lower than pairs with n-Butane LDL |
| Abundant HDL and LDL | |
| Same composition as ocean water, minimal environmental impact in event of leak | Subsea pressure exchanger may be required because the HDL has density greater than ocean water |
| Both LDL and HDL Non-flammable | LDL cannot be used as a fuel if needed |
| Relatively low cost storage structures | |
| Non-toxic | |
| Standard hydroelectric turbine may be employed as pump/generator | |

TABLE 4

Example Seawater (HDL) - n-Butane (LDL) Pair Pros and Cons

| Pros | Cons |
|---|---|
| 0.46 kg/L density difference | n-Butane cost $0.50-2.00 gallon depending on commodity prices |
| Non-toxic | |
| n-Butane does not form 'gas-hydrates' | Surface tank must be regulated at about 40 degrees F. to ensure n-Butane remains a liquid without pressurization, which is fortunately about the same temperature as deep-sea ocean water (Alternatively surface tank may be pressurized at 2-3 Bar) |
| In the event of a leak, n-Butane cannot form a 'slick' because it is a 'gas-liquid' and n-Butane is not a potent greenhouse gas | |
| Subsea tank at pressure equilibrium with surrounding ocean water without a pressure exchanger, even in closed system, due to Seawater HDL having the same density as the surrounding ocean water | n-Butane is flammable |
| Hydraulic power recovery turbine (HPRT) may be employed as electric hydraulic pump/generator | |
| LDL can be used as a fuel if needed | |

TABLE 5

Example Brine (HDL) - n-Butane (LDL) Pair Pros and Cons

| Pros | Cons |
| --- | --- |
| 0.73 kg/L density difference<br>Nou-toxic<br>n-Butane does not form 'gas-hydrates'<br>In the event of a leak, n-Butane cannot form a 'slick' because it is a 'gas-liquid' and n-Butane is not a potent greenhouse gas<br>Hydraulic power recovery turbine (HPRT) may be employed as electric hydraulic pump/generator<br>LDL can be used as a fuel if needed | n-Butane cost $0.50-2.00 gallon depending on commodity prices<br>Surface tank must be regulated at about 40 degrees F. to ensure n-Butane remains a liquid without pressurization, which is fortunately about the same temperature as deep-sea ocean water (Alternatively surface tank may be pressurized at 2-3 Bar)<br>Subsea pressure exchanger may be required because the HDL has density greater than ocean water<br>n-Butane is flammable |

Hawaiian Islands' Geography and Fluid Displacement Energy Storage

Hawaii is a geographically favorable location for FLUID DISPLACEMENT ENERGY STORAGE long duration energy storage. The largest power plant and related power transmission infrastructure on the Hawaii Island of Oahu are within 7.1 kilometers of 1,000 meter ocean water depth and 15.2 kilometers of 2,000 meter ocean water depth. The largest power plant and related power transmission infrastructure on Hawaii's Big Island are within 2.5 kilometers of 1,000 meter ocean water depth, 3.9 kilometers of 1,500 meter ocean water depth, 5.8 kilometers of 2,000 meter ocean water depth, 13.7 kilometers of 3,000 meter ocean water depth, and 17.3 kilometers of 4,000 meter ocean water depth. FLUID DISPLACEMENT ENERGY STORAGE may be uniquely suited to provide the sustainable and reliable long duration electricity storage Hawaii requires to achieve its 100% renewable energy mandate.

Example Fluid Displacement Energy Storage Demonstration Project

Natural Energy Laboratory of Hawaii Authority (NELHA) Hawaii Ocean Science and Technology (HOST) Park ('NELHA HOST Park') in Kailua-Kona, Hi. may be selected as a potential FLUID DISPLACEMENT ENERGY STORAGE project location.

FLUID DISPLACEMENT ENERGY STORAGE Potential Demonstration Project Overview

Summary: The design, working fluids, and water depths may be chosen to minimize construction timeline and reduce supply chain risk, including by enabling the use of a wide range of equipment vendors. The project may be co-developed with a solar PV plant to demonstrate FLUID DISPLACEMENT ENERGY STORAGE's synergy with intermittent renewable energy sources and enable an offtake agreement.

Example Project Specs:
Power Capacity: 3 MW
Energy Capacity: 30 MWh
Lower Elevation Reservoir Water Depth: 1,500 meters
Pipeline Distance (shore to lower elevation reservoir): 3,900 meters
HDL: Brine
LDL: Water
Diagrams of Onshore-Offshore FLUID DISPLACEMENT ENERGY STORAGE Version Please Note: All diagrams are simplified representations. Pipelines are likely not suspended above the sea floor. Relative sizes and distances are not intended to be representative of actual relative sizes and distances in a real system.

Example Description of Components and Example Vendors

| Label in Figure | Description |
| --- | --- |
| 1 | Higher elevation reservoir. Onshore HDL and LDL storage tank. May comprise a stratified layer water tank, similar to tanks employed in chilled water thermal storage. Stratified layering may be maintained or facilitated by diffusers, or by a floating barrier, or both. |
| 2 | Hydroelectric turbine. In the present version, '2' may only interact with the low density liquid, which, may comprise freshwater. The hydroelectric turbine employed in '2' may be the same as or similar to hydroelectric turbines employed in pumped-hydro. |
| 3 | Subsea pipeline between higher elevation reservoir and pressure exchanger near lower elevation reservoir. Designed to transfer LDL. Subsea pipelines may be manufactured by a wide range of vendors. Subsea large diameter subsea pipelines may generally be installed by pipeline installation vessels. |
| 4 | Subsea pipeline between pressure exchanger and lower elevation reservoir. May be designed to transfer LDL. |
| 5 | Lower elevation reservoir. May comprise a subsea HDL and LDL storage tank. |
| 6 | Subsea pipeline between lower elevation reservoir and pressure exchanger. May be designed to transfer HDL. |
| 7 | Subsea pipeline between pressure exchanger and higher elevation reservoir. May be designed to transfer HDL. |
| PX | Pressure exchange. Pressure exchanger or other power or energy transfer or recovery device may be located subsea near the lower elevation reservoir. Pressure exchangers may be well established In the reverse osmosis desalination industry and may be known to have power recovery or power transfer efficiencies up to 98%. |

Example Figures of Stratified Tank

Note: Darker color or darker shaded fluid may comprise high density liquid.

Note: Lighter color or lighter shaded fluid may comprise low density liquid and/or may comprise a water, brackish water, or freshwater.

In some embodiments, brine may be periodically or continuously concentrated or water may be periodically or continuously removed from brine. For example, the brine may be concentrated using distillation or evaporation.

In some embodiments, low density liquid or freshwater may be purified or salt may be removed periodically or continuously. For example, the low density liquid or freshwater may be purified by means of reverse osmosis or membrane based process or by a desalination process or electrodialysis.

Desalination Embodiments

1. A system for storing and generating power comprising:
a first storage reservoir configured to store a first fluid;
a second storage reservoir located at a lower elevation than the first storage reservoir and configured to store a second fluid wherein said second fluid has a higher density than the first fluid;
a pump;
wherein the pump and the first and the second reservoir are operatively connected such that power is stored by displacing the second fluid in the second storage reservoir by pumping the first fluid from the first storage reservoir to the second storage reservoir and such that power is generated by allowing the pumped first fluid in the second storage reservoir to exit the second reservoir; and wherein the first fluid is a liquid.

2. The system of embodiment 1 wherein the system is configured to generate power by transferring the first fluid into a power recovery device.

3. The system of embodiment 2 wherein said power recovery device comprises a pressure exchanger.

4. The system of embodiment 2 wherein said power recovery device is configured to transfer the power from the first fluid to a desalination feed stream.

5. The system of embodiment 2 wherein said power recovery device is configured to extract power from the first fluid to pressurize a desalination feed comprising water.

6. The system of embodiment 5 wherein said desalination feed comprising water comprises seawater or treated seawater.

7. The system of embodiment 5 wherein the system is configured such that said pressurized desalination feed comprising water is transferred into a reverse osmosis desalination system.

8. The system of embodiment 2 wherein the system is configured such that the first fluid is transferred into the first storage reservoir after said power recovery.

9. The system of embodiment 1 wherein the first fluid comprises a hydrocarbon, butane, propane, LPG, water, ammonia, ethanol, methanol, kerosene, or any mixture thereof.

10. The system of embodiment 1 wherein the system is configured such that power in the first fluid is employed to generate electricity for pressurizing a desalination feed water.

11. The system of embodiment 10 wherein the system is configured such that the proportion of power converted into electricity relative to the proportion of power transferred to pressurize the desalination feed water is adjustable.

12. The system of embodiment 5 wherein the system is configured such that the first fluid transferred into a power recovery device comprises a pressure greater than an osmotic pressure of the desalination feed comprising water.

13. The system of embodiment 1 wherein the first fluid comprises a desalination feed comprising water.

14. The system of embodiment 13 wherein the system is configured such that power is generated by transferring the low density fluid into a desalination system.

15. The system of embodiment 14 wherein the system is configured such that the first fluid transferred to a desalination system comprises a pressure greater than the osmotic pressure of the desalination feed comprising water.

16. The system of embodiment 13 wherein the system is configured such that at least a portion of the power in the first fluid is recovered using a power recovery device before transferring the first fluid to a desalination system.

17. The system of embodiment 13 wherein the system is configured such that at least a first portion of the first fluid is transferred to an electric generator and at least a second portion of the first fluid is transferred to a desalination system,
wherein the electric generator generates electricity from at least a portion of the generated power in the first fluid, and
wherein the desalination system converts at least a portion of the generated power in the first fluid into desalinated water.

18. The system of embodiment 17 wherein the system is configured such that the proportion of first fluid transferred to the desalination system and the proportion of first fluid transferred to the electric generator is adjustable.

19. The system of embodiment 17 wherein the system is configured such that the proportion of power in the first fluid transferred to the desalination system and the proportion of power in the first fluid transferred to the electric generator is adjustable.

20. The system of embodiment 13 wherein the system is configured such that the first fluid exiting the second storage reservoir is transferred into a desalination system to produce desalinated water.

21. The system of embodiment 20 wherein desalination feed comprising water is added to the first storage reservoir to make up for the produced desalinated water.

22. The system of embodiment 13 the system is configured such that the first fluid exiting the second storage reservoir is transferred into a desalination system to separate the first fluid into a desalinated water permeate and a desalination retentate using a semipermeable membrane.

23. The system of embodiment 1 wherein the low density fluid comprises desalinated water.

24. The system of embodiment 1 wherein the system is configured such that the stored power is employed to desalinate water.

25. The system of embodiment 24 wherein the system is configured such that the desalinated water is converted into chemicals selected from the group consisting of hydrogen, oxygen, synthetic fuels, fuels, ammonia, hydrogen derived chemicals, carbon dioxide derived chemicals, air derived chemicals, and any mixture thereof.

26. The system of embodiment 1 wherein the system is configured such that the higher elevation reservoir is locatable on land, floating on water, or underwater.

27. The system of embodiment 24 wherein the system is configured such that the desalinated water is transportable by a pipeline, a riser, a ship, an aircraft, a train, a truck, or a conveyor belt.

28. The system of embodiment 1 wherein the pump is configured to pressurize a desalination feed comprising water.

29. A process for storing power and desalinating water comprising:
storing a first fluid in a first storage reservoir:
storing a second fluid which has a higher density than the first fluid in a second storage reservoir located at a lower elevation than the first storage reservoir;
operatively connecting a pump and the first and second reservoir such that power is stored by displacing the second fluid in the second storage reservoir by pumping the first fluid in the first storage reservoir to the second storage reservoir; and allowing the first fluid to exit the second storage reservoir and pressure exchange with a desalination feed comprising water to generate power.

30. A process for storing power and desalinating water comprising:
   storing a first fluid in a first storage reservoir;
   storing a second fluid which has a higher density than the first fluid in a second storage reservoir located at a lower elevation than the first storage reservoir;
   operatively connecting a pump and the first and second reservoir such that power is stored by displacing the second fluid in the second storage reservoir by pumping the first fluid in the first storage reservoir to the second storage reservoir; and
   allowing the first fluid to exit the second storage reservoir and enter a desalination system;
   wherein the first fluid comprises a desalination feed comprising water.

Brine-Water Embodiments

1. A system for storing and generating power comprising:
   a first storage reservoir configured to store a first fluid;
   a second storage reservoir located at a lower elevation than the first storage reservoir and configured to store a second fluid wherein said second fluid has a higher density than the first fluid;
   a pump; and
   a generator;
   wherein the pump, the generator, and the first and the second reservoir are operatively connected such that power is stored by displacing the second fluid in the second storage reservoir by pumping the first fluid in the first storage reservoir to the second storage reservoir and power is generated or discharged by allowing the first fluid in the second storage reservoir to return to the first storage reservoir; and
   wherein the first fluid is a liquid.

2. The system of embodiment 1 wherein the high density fluid is soluble in the low density fluid.

3. The system of embodiment 1 wherein the second storage reservoir comprises at least one storage unit within it and wherein the system is configured such that the low density fluid and the high density fluid are storable within the same storage unit in the second storage reservoir.

4. The system of embodiment 3 wherein the system is configured such that the low density fluid is located above the high density fluid within the storage unit.

5. The system of embodiment 3 wherein the system is configured such that a fluid-fluid interface separates the low density fluid from the high density fluid in the storage unit.

6. The system of embodiment 3 wherein the system is configured such that a chemocline or chemocline layer separates the low density fluid from the high density fluid.

7. The system of embodiment 3 wherein the system is configured such that a physical divider separates the low density fluid from the high density fluid.

8. The system of embodiment 7 wherein the system is configured such that the physical divider occupies at least 50% of the cross sectional area otherwise occupied by a fluid-fluid interface in the absence of the physical divider.

9. The system of embodiment 7 wherein the system is configured such that an elevation of the physical divider adjusts to follow a change in elevation of the fluid-fluid interface that would be present in the absence of the physical divider.

10. The system of embodiment 7 wherein the system is configured such that the physical divider is floating.

11. The system of embodiment 7 wherein the system is configured such that the density of the physical divider is greater than the density of the low density fluid and less than the density of the high density fluid.

12. The system of embodiment 1 wherein the system is configured such that the first storage reservoir comprises at least one first reservoir storage unit within it and the second storage reservoir comprises at least one second reservoir storage unit within it and wherein the system is configured such that the high density fluid and low density fluid are stored in the same storage units within the first storage reservoir and the second storage reservoir.

13. The system of embodiment 2 wherein the system is configured such that at least a portion of high density fluid mixes with at least a portion of low density fluid.

14. The system of embodiment 13 wherein the system is configured such that at least a portion of high density fluid is removed from the low density fluid by separation.

15. The system of embodiment 14 wherein the system is configured such that said separation comprises reverse osmosis, or forward osmosis, or distillation, or evaporation, or electrodialysis, or gravitational separation, or decanting, or coalescing, or centrifuge, or filtration, or cryodesalination, or freeze desalination, solventing out, or precipitation, or extraction, or extractive distillation.

16. The system of embodiment 2 wherein the system is configured such that at least a portion of low density fluid mixes with at least a portion of high density fluid.

17. The system of embodiment 16 wherein the system is configured such that at least a portion of low density fluid is removed from the high density fluid by separation.

18. The system of embodiment 17 wherein said separation comprises reverse osmosis, or forward osmosis, or distillation, or evaporation, or gravitational separation, or decanting, or coalescing, or centrifuge, or filtration, or cryodesalination, or freeze desalination, solventing out, or precipitation, or extraction, or extractive distillation.

19. The system of embodiment 2 wherein the low density fluid comprises water and the high density fluid comprises brine.

20. The system of embodiment 1 wherein the system is configured such that the first storage reservoir comprises a first and a second storage unit and wherein the system is configured such that the high density fluid is stored within the first storage unit and the low density fluid is stored in the second storage unit.

21. The system of embodiment 20 wherein the high density fluid comprises a liquid.

22. The system of embodiment 21 wherein the system is configured such that the first and the second storage unit are operably connected such that a gas is transferrable between the first and the second storage unit as liquid enters a unit and displaces the gas.

23. The system of embodiment 22 wherein the system is configured such that a semi-permeable barrier allows the transfer of gas while preventing the transfer of liquid.

24. The system of embodiment 1 wherein the system is configured such that the first storage reservoir is located under a body of water.

25. The system of embodiment 1 wherein the system is configured such that the first storage reservoir is at an elevation greater than the surface of the body of water.

26. The system of embodiment 1 wherein the system is configured such that the first storage reservoir comprises a floating structure.

27. The system of embodiment 1 further comprising a pressure exchanger.

28. The system of embodiment 27 wherein the system is configured such that the pressure exchanger is located at an elevation less than the elevation of the first storage reservoir and greater than or equal to the elevation of the second storage reservoir.

29. The system of embodiment 1 wherein the low density fluid or high density fluid comprises desalinated water.

30. The system of embodiment 1 wherein the low density fluid or high density fluid comprises treated seawater.

Embodiments with a Subsea Pump and/or Generator

The present embodiments may pertain to fluid displacement energy storage employing a subsea pump and/or subsea generator, or a pump and/or generator located near the lower elevation reservoir, or any combination thereof.

Some embodiments may comprise a higher elevation reservoir and a lower elevation reservoir. The higher elevation reservoir may have an elevation greater than or higher than the lower elevation reservoir. The lower elevation reservoir may have an elevation lower than the higher elevation reservoir. One or more pipes may interconnect the higher elevation reservoir to the lower elevation reservoir. In some embodiments, the system may be designed to store a high density fluid and a low density fluid, wherein the high density fluid comprises a higher density fluid than the density of the low density fluid.

In some embodiments, energy or power may be stored by transferring or pumping high density fluid from the lower elevation reservoir to the higher elevation reservoir, displacing low density fluid from the higher elevation reservoir into the lower elevation reservoir. In some embodiments, energy or power may be generated by allowing high density fluid from higher elevation reservoir to be transferred to the lower elevation reservoir, displacing low density fluid in the lower elevation reservoir into the higher elevation reservoir. It may be desirable for the volumetric flow rate of the low density fluid transferred between the reservoirs to be about the same as the volumetric flow rate of the high density fluid transferred between the reservoirs. It may be desirable for power to be generated from the high density fluid, or low density fluid, or any combination thereof using a power recovery device, which may include, but are not limited to, a generator, or a turbine, or a reversible pump—generator, or a pressure exchanger, or a desalination system or process, or any combination thereof.

In some embodiments, energy or power may be stored by transferring or pumping high density fluid from the lower elevation reservoir to the higher elevation reservoir, while allowing low density fluid to be transferred from the higher elevation reservoir to the lower elevation reservoir. In some embodiments, energy or power may be generated by allowing high density fluid from the higher elevation reservoir to be transferred to the lower elevation reservoir, while allowing low density fluid to be transferred from the lower elevation reservoir to the higher elevation reservoir. It may be desirable for the volumetric flow rate of the low density fluid transferred between the reservoirs to be about the same as the volumetric flow rate of the high density fluid transferred between the reservoirs. It may be desirable for power to be generated from the high density fluid, or low density fluid, or any combination thereof using a power recovery device, which may include, but are not limited to, a generator, or a turbine, or a reversible pump—generator, or a pressure exchanger, or a desalination system or process, or any combination thereof.

In some embodiments, it may be desirable to locate the pump and/or generator near the lower elevation reservoir. For example, it may be desirable for the pump and/or generate interconnected to a pipe at or near the lower elevation reservoir. For example, it may be desirable for the pump and/or generator to be fluidly connected to the high density fluid. By placing the pump and/or generate at an elevation near the elevation of the lower elevation reservoir and/or locating the pump and/or generator between the lower elevation reservoir and the higher elevation reservoir, it may be possible for the portion of the pump and/or generator exposed to the fluid transferred between the pump and/or generator and the higher elevation reservoir to be at a pressure near the hydrostatic pressure of the high density fluid, while the portion of the pump and/or generator exposed to the fluid transferred between the pump and/or generator and the lower elevation reservoir may be at a pressure near the hydrostatic pressure of the low density fluid, or near the hydrostatic pressure of the fluid body or water body or ocean with which the lower elevation reservoir is immersed at the elevation of the lower elevation reservoir, or any combination thereof. By locating the pump and/or generating at an elevation near the lower elevation reservoir, it may be possible for the lower elevation reservoir to operate with an internal fluid pressure or internal pressure near the pressure of the hydrostatic pressure of the body of liquid or body of water adjacent to the lower elevation reservoir at or near the elevation of the lower elevation reservoir, even if the high density fluid has a density greater than the density of the water, or seawater, or other liquid comprising the body of water or body of liquid, or the density of the low density liquid, or any combination thereof.

In some embodiments, it may be desirable for the low density fluid to comprise a liquid. For example, in some embodiments, if the low density fluid comprises a liquid, the volume of the low density fluid may negligibly change or remain relatively constant in response to changes in pressure of the low density fluid. Due to, for example, the practical incompressibility of liquids, employing a liquid as a low density fluid may enable the lower elevation reservoir to comprise a rigid structure. Due to, for example, the practical incompressibility of liquids, employing a liquid as a low density fluid may enable high round trip energy efficiency energy storage in a practically constant volume system. Due to, for example, the practical incompressibility of liquids, employing a liquid as a low density fluid may enable high round trip energy efficiency energy storage in a system without requiring thermal storage or storage of heat generated from the compression of a fluid.

In some embodiments, it may be desirable to employ a liquid with a similar density to a body of liquid or body of water adjacent to or immersing the lower elevation reservoir. For example, it may be desirable to employ water, or treated seawater, or other liquid with similar density to the surrounding or adjacent water body as the low density fluid to enable pressure inside the lower elevation reservoir to be similar to, or close to, or as close as desired to the pressure outside the lower elevation reservoir. For example, if the low density fluid comprises treated seawater and the lower elevation reservoir is immersed in ocean water or seawater of similar density to the low density fluid, the hydrostatic pressure or elevation column pressure may be similar inside and outside the lower elevation reservoir. The lower the pressure difference between the inside and outside of an reservoir, the lower the required pressure difference resistance or pressure difference tolerance of the storage reservoir, and/or the lower the required wall thickness, and/or the cost. For example, reducing the design pressure difference between the inside and outside of a reservoir may enable lower cost of manufacturing, or lower material cost, or lower installation cost, or any combination thereof of the lower elevation reservoir or tanks. For example, if the low density fluid is seawater, or water, or a fluid of similar density to the liquid in the adjacent or surrounding body of water, the subsea reservoir or subsea reservoir comprising a subsea tank may be at or near the pressure of the adjacent water body at the same elevation, for example, even if the tank comprises a rigid structure or a closed rigid structure.

In some embodiments, a valve may be employed to control the pressure of the low density fluid, or high density fluid, or any combination thereof. In some embodiments, if the pressure in the lower elevation reservoir, or pipe, or any combination thereof exceeds a threshold value, a valve may open to allow low density fluid to be displaced into the higher elevation reservoir. In some embodiments, if the pressure in the lower elevation reservoir, or pipe, or any combination thereof is equal to or less than a threshold value, a valve may closed. The use of a valve to manage pressure of the low density fluid may enable the use of low density fluids with densities different from the density of the liquid, or fluid, or body of liquid which the lower elevation reservoir is immersed. The use of a valve to manage pressure of the low density fluid may enable the use of low density fluids with density less than or equal to the density of the liquid, or fluid, or body of liquid which the lower elevation reservoir is immersed. The use of a valve to manage pressure of the low density fluid may enable the use of low density fluids with density different than the density of the liquid, or fluid, or body of liquid which the lower elevation reservoir is immersed, while enabling the internal pressure of the lower elevation reservoir to be near the pressure of the adjacent water body at the same elevation. The use of a valve to manage pressure of the low density fluid may enable the use of low density fluids with density less than or equal to the density of the liquid, or fluid, or body of liquid which the lower elevation reservoir is immersed, while enabling the internal pressure of the lower elevation reservoir to be near the pressure of the adjacent water body at the same elevation.

In some embodiments, the high density fluid may be stored in separate storage units from the low density fluid within the higher elevation reservoir. In some embodiments, the high density fluid may be stored in the same storage units as the low density fluid within the higher elevation reservoir.

In some embodiments, the high density fluid may be stored in separate storage units from the low density fluid within the lower elevation reservoir. In some embodiments, the high density fluid may be stored in the same storage units as the low density fluid within the tower elevation reservoir.

In some embodiments, the higher elevation reservoir may be floating, or the higher elevation reservoir may be on land, or the higher elevation reservoir may be subsea, or the higher elevation reservoir may be located on the seabed subsea, or the higher elevation reservoir may be located suspended or otherwise above the seabed subsea, or any combination thereof.

In some embodiments, the lower elevation reservoir may be floating, or the lower elevation reservoir may be on land, or the lower elevation reservoir may be subsea, or the lower elevation reservoir may be located on the seabed subsea, or the lower elevation reservoir may be located suspended or otherwise above the seabed subsea, or any combination thereof.

FIGS. 98-109 Summary

FIGS. 98-109 may show an energy storage system which may store power by changing the elevation of a low density fluid and a high density fluid. Energy or power may be stored by raising the elevation of at least a portion of a high density fluid, while lowering the elevation of a least a portion of a low density fluid. Energy or power may be generated by lowering the elevation of a high density fluid, while raising the elevation of a low density fluid. In some embodiments, the volumetric flow rate of low density fluid transferred between reservoirs may be similar or about the same as the volumetric flow rate of high density fluid transferred between reservoirs.

FIGS. 98-101 may show an embodiment where energy may be stored by pumping a high density fluid from a lower elevation reservoir to a higher elevation reservoir, displacing low density fluid in the higher elevation reservoir and/or resulting in the transfer of low density fluid from the higher elevation reservoir to the lower elevation reservoir. 98-101 may employ a valve to help control the pressure of the low density fluid, which may be shown in or near the higher elevation reservoir in FIGS. 98-101. In FIGS. 98-101, the higher elevation reservoir may be floating on a body of water, while the lower elevation reservoir may be located under or immersed in the body of water. In FIGS. 98-101, low density fluid and/or high density fluid may be stored in the same storage units in the higher elevation reservoir and the lower elevation reservoir.

FIGS. 102-105 may show an embodiment where energy may be stored by pumping a high density fluid from a lower elevation reservoir to a higher elevation reservoir, displacing low density fluid in the higher elevation reservoir and/or resulting in the transfer of low density fluid from the higher elevation reservoir to the lower elevation reservoir. 102-105 may employ a valve to help control the pressure of the low density fluid, which may be shown in or near the lower elevation reservoir in FIGS. 102-105. In FIGS. 102-105, the higher elevation reservoir may be floating on a body of water, while the lower elevation reservoir may be located under or immersed in the body of water. In FIGS. 102-105, low density fluid and/or high density fluid may be stored in the same storage units in the higher elevation reservoir and the lower elevation reservoir.

FIGS. 106-109 may show an embodiment where energy may be stored by pumping a high density fluid from a lower elevation reservoir to a higher elevation reservoir, and/or allowing the transfer of low density fluid from the higher elevation reservoir to the lower elevation reservoir. 106-109 may employ a valve to help control the pressure of the low density fluid. In FIGS. 106-109, the higher elevation reservoir may be floating on a body of water, while the lower elevation reservoir may be located under or immersed in the body of water. In FIGS. 106-109, low density fluid and/or high density fluid may be stored in separate storage units in the higher elevation reservoir and the lower elevation reservoir.

Example FIGS. 98-105 Key

| Label | Description |
|---|---|
| 1 | '1' may comprise a higher elevation reservoir. '1' may be configured to store low density fluid and high density fluid. |
| 2 | '2' may comprise a lower elevation reservoir. '2' may be configured to store low density fluid and high density fluid. |
| 3 | '3' may comprise a low density fluid pipe, which may be configured to transfer low density fluid between the higher elevation reservoir and lower elevation reservoir. A valve may be connected to the low density fluid pipe to control the pressure of the low density fluid pipe. For example, the valve may open to allow an increase in pressure of the lower elevation reservoir or pipe. For example, the valve may close to allow an increase in pressure of the lower elevation reservoir or pipe. For example, the valve may open to allow a reduction in pressure of the lower elevation reservoir or pipe. For example, the valve may dose to allow a reduction in pressure of the lower elevation reservoir or pipe. |
| 4 | '4' may comprise a segment of pipe transferring high density fluid between the lower elevation reservoir and the pump, or generator, or pressure exchanger, or power recovery device, or desalination system or process, or any combination thereof. In some embodiments, '4' may be at a lower pressure than '6' where '6' is at the same elevation as '4'. |
| 5 | '5' may comprise a pump, or generator, or pressure exchanger, or power recovery device, or desalination system or process, or any combination thereof. '5' may be configured to pump high density fluid, and/or generate power from high density fluid, or any combination thereof. |
| 6 | '6' may comprise a segment of pipe transferring high density fluid between the pump, or generator, or pressure exchanger, or power recovery device, or desalination system or process, or any combination thereof and a higher elevation reservoir. In some embodiments, '6' may be at a higher pressure than '4' at the same elevation as '4'. |
| 7 | '7' may comprise a vessel or platform which the higher elevation reservoir is located. In some embodiments, '7' may be floating on a body of water. |
| V | 'V' may comprise a valve, or flow controller, or pump, or power recovery device, or any combination thereof. 'V' may be interconnected to the low density fluid, or high density fluid, or any combination thereof. 'V' may be employed to control the flow rate of fluid, or pressure of fluid, or any combination thereof. In some embodiments, 'V' may be interconnected with the low density fluid to control the pressure of the low density fluid. In some embodiments, 'V' may be located at any elevation. In some embodiments, 'V' may be located on or interconnected to or fluidly connected to a pipe between the higher elevation reservoir and/or the lower elevation reservoir. |
| Seabed | Land located underneath or submerged in a body of water. |
| Ocean | A body of liquid wherein which the energy storage system or process may be located. |
| High Density Fluid | A fluid with a density greater than, the low density fluid. |
| Low Density Fluid | A fluid with a density lower than the high density fluid. |
| Electricity | Power transferred to or from the energy storage system or process. |

Example FIGS. 106-109 Key

| Label | Description |
|---|---|
| 1 | '1' may comprise a higher elevation reservoir. '1' may be configured to store low density fluid and high density fluid in separate storage units. |
| 2 | '2' may comprise a lower elevation reservoir. '2' may be configured to store low density fluid and high density fluid in the same storage units, or separate storage units, or any combination thereof. |
| 3 | '3' may comprise a low density fluid pipe, which may be configured to transfer low density fluid between the higher elevation reservoir and lower elevation reservoir. A valve may be connected to the low density fluid pipe to control the pressure of the low density fluid pipe. For example, the valve may open to allow an increase in pressure of the lower elevation reservoir or pipe. For example, the valve may close to allow an increase in pressure of the lower elevation reservoir or pipe. For example, the valve may open to allow a reduction in pressure of the lower elevation reservoir or pipe. For example, the valve may close to allow a reduction in pressure of the lower elevation reservoir or pipe. |

| Example FIGS. 106-109 Key | |
|---|---|
| Label | Description |
| 4 | '4' may comprise a pump, or generator, or pressure exchanger, or power recovery device, or desalination system or process, or any combination thereof. '4' may be configured to pump high density fluid, and/or generate power from high density fluid, or any combination thereof. |
| 5 | '5' may comprise a segment of pipe transferring high density fluid between the pump, or generator, or pressure exchanger, or power recovery device, or desalination system or process, or any combination thereof and a higher elevation reservoir. |
| 6 | '6' may comprise a vessel or platform which the higher elevation reservoir is located. In some embodiments, '6' may be floating on a body of water. |
| V | 'V' may comprise a valve, or flow controller, or pump, or power recovery device, or any combination thereof. 'V' may be interconnected to the low density fluid, or high density fluid, or any combination thereof. 'V' may be employed to control the flow rate of fluid, or pressure of fluid, or any combination thereof. In some embodiments, 'V' may be interconnected with the low density fluid to control the pressure of the low density fluid. In some embodiments. 'V' may be located at any elevation. In some embodiments, 'V' may be located on or interconnected to or fluidly connected to a pipe between the higher elevation reservoir and/or the lower elevation reservoir. |
| Seabed | Land located underneath or submerged in a body of water. |
| Ocean | A body of liquid wherein which the energy storage system or process may be located. |
| High Density Fluid | A fluid with a density greater than the low density fluid. |
| Low Density Fluid | A fluid with a density lower than the high density fluid. |
| Electricity | Power transferred to or from the energy storage system or process. |

EXAMPLE EXEMPLARY EMBODIMENTS

A system for storing and generating power comprising:
a first storage reservoir configured to store a first fluid;
a second storage reservoir located at a lower elevation than the first storage reservoir and configured to store a second fluid wherein said second fluid has a higher density than the first fluid;
a pump;
wherein the pump and the first and the second reservoir are operatively connected such that power is stored by displacing the first fluid in the first storage reservoir by pumping the second fluid from the second storage reservoir to the first storage reservoir and such that power is generated by allowing the pumped second fluid in the first storage reservoir to return to the second reservoir; and
wherein the first fluid is a liquid.
Notes
Note: In some embodiments, one or more power generation devices may be located near the lower elevation reservoir and/or may be fluidly connected to the high density fluid, or low density fluid, or any combination thereof. For example, power generation devices may include, but are not limited to, one or more or any combination of the following: a pump, or a generator, or a turbine, or a pressure exchanger, or a power recovery device, or a power exchanger, or a desalination process, or a semi-permeable membrane, or a reverse osmosis process, or a membrane distillation process, or a separation process. In some embodiments, a reverse osmosis or other semi-permeable membrane desalination process may be interconnected or fluidly connected to the low density fluid pipe or low density fluid. For example, in some embodiments, it may be desirable for the system to pressurize the low density fluid using, for example, a pump, or generator, or valve, or the high density fluid, or any combination thereof, wherein at least a portion of the pressure of the low density fluid may be converted to power or harnessed by transferring at least a portion of the low density fluid through a pressure exchanger or a power recovery device, which may transfer the power or pressure to a desalination feed, which may be transferred into a desalination process or system, such as a reverse osmosis process or system, or nanofiltration process or system. For example, in some embodiments, the low density fluid may comprise seawater, or treated seawater, or any combination thereof. For example, in some embodiments, it may be desirable for the system to pressurize the low density fluid using, for example, a pump, or generator, or valve, or the high density fluid, or any combination thereof, wherein at least a portion of the pressure of the low density fluid may be converted to power or harnessed by transferring at least a portion of the low density fluid into a desalination process or system, such as a reverse osmosis process or system, or nanofiltration process or system. In some embodiments, it may be desirable to locate at least a portion of the desalination, or at least the membrane portion of the desalination system or process, near the lower elevation reservoir, or at a lower elevation. For example, by placing a desalination system or process at a lower elevation relative to the elevation of the desalination feed, the density difference between the desalinated water and the desalination feed may result in a hydrostatic pressure difference which may provide at least a portion of a driving force or otherwise facilitate the powering of desalination. The greater the elevation difference between the elevation of the desalination process and the elevation of the desalination feed source, the greater the force or pressure supplied by the hydrostatic pressure difference between the desalinated water and the desalination feed due to the density difference between the desalinated water and the desalination feed, which may significantly reduce the thermodynamic minimum required applied power or pressure or energy to desalinate at least a portion of the desalination feed water. For example, in some embodiments, to achieve the energy efficiency or reduction in required power or pressure, the desalination retentate or concentrate must be discharged at a lower elevation or an elevation near the elevation of the desalination process.

Embodiments Employing Density Differentials to Facilitate Power Generation and Desalination Background Desalination is energy intensive. Desalinating seawater using reverse osmosis generally requires greater than 2 kWh electricity or power per m3 of freshwater permeate produced. The thermodynamic minimum energy requirement to produce freshwater from seawater is about 1 kWh per $m^3$. Generally, the minimum thermodynamic energy consumption of desalination involves the energy required to produce the pressure difference required to overcome the osmotic pressure of the desalination feed. Seawater has an osmotic pressure of about 27 Bar. Generally, desalination may occur when a pressure equal to or greater than the osmotic pressure of the desalination feed water, such as seawater, is applied to the desalination feed water in the presence of a semipermeable membrane, wherein the desalination membrane has a first side and a second side, wherein the pressure difference between the first side of the membrane and the second side of the membrane may be greater than or equal to the osmotic pressure of the desalination feed water. It may be desirable for the desalination feed water to be located on the first side or the side with the greater pressure and/or it may be desirable for the pressure applied to the first side is applied with the desalination feed water.

Reverse osmosis desalination generally comprises a feed desalination water input and a semi-permeable membrane, wherein the pressure of the feed desalination water against the desalination membrane results in the permeation of water through the membrane and the rejection of at least a portion of the dissolved salts, forming a 'permeate' lower salinity stream on the opposite side of the membrane from the desalination feed water and a higher salinity concentrate or retentate stream.

Summary of Invention

Some embodiments of the present invention may pertain to desalination facilitated by or at least partially powered by the difference in gravitational hydrostatic pressure between desalination feed and desalinated water in a liquid column. Some embodiments of the present invention may pertain to the generation of power from the discharge or release of desalination retentate, or concentration, or brine effluent in a liquid column due to, for example, the difference in gravitational hydrostatic pressure between desalination retentate, or concentration, or brine effluent and seawater in a liquid column.

Detailed Description

The present invention pertains to desalination. The present invention may pertain to a lower energy consumption or greater energy efficiency system or process for desalination. The present invention may pertain to a system or process for desalinating wherein desalination is facilitated by the difference in density between freshwater and desalination feed, such as seawater. The present invention may pertain to a system or process for desalinating wherein desalination is facilitated by the difference in hydrostatic pressure between desalinated water and desalination feed in a liquid column which may be driven by the density difference between higher salinity desalination feed, such as seawater, and lower salinity desalinated water, such as freshwater.

Some embodiments may comprise a first liquid column and a second liquid column, wherein the first liquid column comprises desalination feed and the second liquid column comprises desalinated water. In some embodiments, at least a portion of a desalination process may be located at an elevation lower than the elevation of the highest elevation portion of the first column and/or the highest elevation portion of the second column. In some embodiments, it may be desirable for at least a portion of a desalination process to be located at a lower elevation portion of the first column, or second column, or any combination thereof. In some embodiments, the desalinating step, such as, for example, the reverse osmosis membrane, may be located at the deepest or lowest practical elevation of the first liquid column, or second liquid column, or any combination thereof. In some embodiments, the first liquid column may be connected or fluidly connected to the desalinating step and the second liquid column may be connected or fluidly connected to the desalinating step. In some embodiments, the first liquid column may be separated from the second liquid column by the desalinating step, which may comprise a desalination membrane, such as a reverse osmosis membrane. At any given traversed elevation or depth, the liquid in the first liquid column may have a different hydrostatic pressure than the liquid in the second liquid column due to the difference in density between the liquid in the first column and the liquid in the second column. At its natural state, a desalinating step, which may be located at an elevation lower than the maximum elevation of the first liquid column and second liquid column and fluidly connected to the liquid in the first liquid column and the liquid in the second liquid column, may experience a pressure difference between portions in contact with the first liquid column and portions in contact with the second liquid column. At its natural state, a reverse osmosis membrane, which may be located at an elevation lower than the maximum elevation of the first liquid column and second liquid column and fluidly connected to the liquid in the first liquid column and the liquid in the second liquid column, may experience a pressure difference between the side of the membrane in contact with the first liquid column and the side of the membrane in contact with the second liquid column. The natural state hydrostatic pressure difference between the first liquid column and the second liquid column may be dependent on the density difference between the liquid in the first liquid column and the liquid in the second liquid column, and the traversed elevation or depth of the first liquid column and the second liquid column. In some embodiments, the natural state hydrostatic pressure difference between the first liquid column and second liquid column may be lower than the osmotic pressure of the desalination feed, however the pressure difference may be sufficient to significantly reduce the required applied pressure, or applied power, or energy, or any combination thereof required to at least partially desalinate desalination feed. For example, the hydrostatic pressure of the first liquid column comprising desalination feed may be greater than the hydrostatic pressure of the second liquid column comprising desalinated water because of the density difference between the desalination feed and desalinated water. Some embodiments may involve increasing the pressure in the first liquid column to a pressure greater than the hydrostatic pressure, or reducing the pressure of the second liquid column to a pressure less than the hydrostatic pressure, or any combination thereof to enable a pressure difference across the desalination step or reverse osmosis membrane sufficient to overcome the osmotic pressure of the desalination feed and enable desalination. Some embodiments may employ, for example, including, but not limited to, a pump, or pressure exchanger, or fluid displacement, or any combination thereof to increase pressure, or reduce pressure, or any combination thereof. In some embodiments, to achieve potential energy efficiency benefits, it may be desirable to release desalination retentate or concentrate at an elevation less than the maximum elevation of the first water column, or the second water column, or any combination thereof. In some embodiments, to achieve potential energy efficiency benefits, it may be desirable to release desalination retentate or concentrate at the lowest possible, or practical, or desirable elevation. In some embodiments, the lower the elevation which the desalination retentate or concentrate is discharged or released, the lower the energy or power which must be expended to discharge or release said desalination retentate or concentrate. In fact, in some embodiments, power may be generated from the discharging of desalination retentate or concentrate. For example, if the elevation of the desalination system or process producing the desalination retentate or concentrate is higher than the elevation which the desalination retentate or concentrate is discharged and/or the density of the desalination retentate or concentrate is greater than the density of the adjacent or surrounding liquid body, the desalination retentate or concentrate may possess kinetic energy, or potential energy, or may generate power.

The density of seawater is generally 1.02 g/mL-1.035 g/mL, with the most common density seawater density generally between 1.025 g/mL-1.028 g/mL. The density of freshwater is about 1 g/mL. In semi-permeable membrane based desalination processes, such as reverse osmosis, the desalination feed water stream generally possesses a greater salinity than the desalination permeate and a lower salinity than the desalination concentrate or retentate. For example, a desalination process with 40% recovery may comprise a desalination feed water comprising a salinity of 35 g/L and a density of 1.025 kg/L, or a desalination permeate or desalinated water comprising a salinity of municipal freshwater and a density of 1 kg/L, or a desalination concentrate or retentate comprising a salinity of 58.3 g/L and a density of 1.04 kg/L, or any combination thereof.

In some embodiments, a desalination system or process may be located at an elevation higher than the lowest possible or lowest practical elevation within a water body. For example, a desalination system or process or a desalination step may be located floating on the surface of water body. For example, a desalination system or process or a desalination step may be located beneath the surface of a water body, however above the lowest possible or lowest practical elevation within a water body. For example, a desalination system or process or a desalination step may be located beneath the surface of a water body, however above the seafloor. In some embodiments, it may be desirable to place the seawater intake or desalination feed intake at an elevation above the seafloor and below the surface of the water body to minimize potential particulates, or scaling, or fouling, or sediment, or turbidity, or seafloor disturbance, or any combination thereof from the movement of seawater or desalination feed into the desalination system or process.

Natural Difference in Hydrostatic Pressure Between Freshwater and Seawater from the Density Difference Between Freshwater and Seawater across a Liquid Column

| Liquid Column Vertical Elevation (meters) | Hydrostatic Pressure Difference (Bar) | Pressure Difference as a Percentage of Seawater Osmotic Pressure | Pressure Difference as a Percentage of Typical RO Applied Pressure Difference |
|---|---|---|---|
| 500 | 1.28 | 4.72% | 1.82% |
| 1000 | 2.55 | 9.45% | 3.64% |
| 1500 | 3.83 | 14.17% | 5.47% |
| 2000 | 5.10 | 18.90% | 7.29% |
| 2500 | 6.38 | 23.62% | 9.11% |
| 3000 | 7.65 | 28.34% | 10.93% |
| 3500 | 8.93 | 33.07% | 12.76% |
| 4000 | 10.20 | 37.79% | 14.58% |
| 4500 | 11.48 | 42.52% | 16.40% |
| 5000 | 12.76 | 47.24% | 18.22% |
| 5500 | 14.03 | 51.97% | 20.04% |
| 6000 | 15.31 | 56.69% | 21.87% |
| 6500 | 16.58 | 61.41% | 23.69% |
| 7000 | 17.86 | 66.14% | 25.51% |
| 7500 | 19.13 | 70.86% | 27.33% |
| 8000 | 20.41 | 75.59% | 29.15% |
| 8500 | 21.68 | 80.31% | 30.98% |
| 9000 | 22.96 | 85.03% | 32.80% |
| 9500 | 24.23 | 89.76% | 34.62% |
| 10000 | 25.51 | 94.48% | 36.44% |
| 10500 | 26.79 | 99.21% | 38.27% |
| 11000 | 28.06 | 103.93% | 40.09% |
| 11500 | 29.34 | 108.65% | 41.91% |
| 12000 | 30.61 | 113.38% | 43.73% |

The above table uses a recovery ratio of 40% to determine the typical RO applied pressure difference of 70 Bar pressure. In some embodiments, it may be desirable to employ a lower recovery ratio, such as a recovery ratio of less than 40%. For example, it may be desirable to employ a lower recovery ratio because the cost or energy involved with pre-treatment may be lower due to the lower concentration of particulates, or fouling agents, or scalants in open water, or deeper water, or offshore, or any combination thereof. A lower recovery ratio may reduce the required applied pressure, which may reduce the required applied power and/or increase the 'Pressure Difference as a Percentage of Typical RO Applied Pressure Difference' of the natural hydrostatic pressure difference between freshwater and seawater, significantly reducing power requirements and energy consumption.

As shown in the above table, depending of the water depth or the elevation difference of the liquid column, the natural hydrostatic pressure difference between freshwater and seawater may significantly reduce the required applied pressure for desalination. For example, a 3,000 meter liquid column or 3,000 meter water depth, the natural hydrostatic pressure difference between freshwater and seawater provides about 27.78% of the osmotic pressure of seawater, which may mean the natural hydrostatic pressure difference between freshwater and seawater may reduce the theoretical minimum applied power requirement or applied energy requirement for desalination by about 27.78%. In some embodiments, with liquid columns greater than about 10,800 meters, the natural hydrostatic pressure difference between freshwater and seawater may be about equal to or greater than the osmotic pressure of seawater, which may mean it is possible for desalination to be powered from the natural hydrostatic pressure difference between freshwater and seawater and may not require significant additional applied power or pressure.

In some embodiments, a desalination system or process may be located at an elevation higher than the lowest possible or lowest practical elevation within a water body. In some embodiments, the desalination system or process may transform or separate intake desalination feed, which may comprise seawater, into desalination permeate, which may comprise desalinated water, and desalination concentrate or retentate, which may comprise a higher salinity than the desalination feed, wherein the density and/or salinity for the desalination concentrate or retentate is greater than the density and/or salinity of the desalination feed, or seawater, or any combination thereof. In some embodiments, power may be generated from the desalination retentate or concentrate. For example, in some embodiments, desalination retentate or concentrate may be transferred into a liquid column comprising desalination retentate or concentrate which traverses a difference in elevation, wherein the lowest elevation point or deepest point of the liquid column exhibits a hydrostatic pressure greater than the hydrostatic pressure of the adjacent water body or seawater body at the same elevation or depth. For example, in some embodiments, desalination retentate or concentrate may be transferred into a liquid column comprising desalination retentate or concentrate which traverses a difference in elevation, wherein the lowest elevation point or deepest point of the liquid column exhibits a hydrostatic pressure greater than the hydrostatic pressure of the adjacent water body or seawater body at the same elevation or depth, due to, for example, the density difference between desalination retentate or concentrate and the liquid comprising the adjacent water body, such as, for example, seawater.

For example, in some embodiments, the liquid column comprising desalination retentate or concentrate may comprise a pipe, wherein the higher elevation end of the pipe is located at or near or may be connected to the desalination system or process and the lower elevation end of the pipe may be located at an elevation significantly lower than the elevation of the desalination system or process. A hydraulic generator or other power recovery device may be located on or fluidly connected to the pipe or liquid column. In some embodiments, desalination retentate or concentrate may enter the higher elevation end of the pipe or liquid column and exit the lower elevation end of the pipe or liquid column, wherein power is generated from the flow of desalination retentate or concentrate. Power or energy may be generated due to the gravitational potential energy from the difference in density between the desalination retentate or concentrate and the adjacent seawater or adjacent body of water and the difference in elevation between the higher elevation end and lower elevation end of the liquid column.

In some embodiments, the concentration of the retentate or concentrate may be increased, or a greater density brine may be sourced from another source, or any combination thereof which may increase the potential power density, or hydrostatic pressure difference, or power output from the liquid column. For example, the retentate or concentrate may be concentrated with evaporation. For example, seawater may be concentrated using evaporation. For example, the greater the density difference between the higher density liquid and the seawater or other liquid in the water body, the greater the potential hydrostatic pressure difference and/or the greater the potential and/or the greater the potential power output for the same volumetric flow rate in the same elevation difference or vertical column of the liquid column.

Natural Difference in Hydrostatic Pressure Between Desalination Concentrate and Seawater from the Density Difference Between Desalination Concentrate and Seawater across a Liquid Column and the Potential Energy Output per m3 of Concentrate

| Liquid Column Vertical Elevation (meters) | Hydrostatic Pressure Difference (Bar) | Energy Generated per m3 of Concentrate (kWh) | Energy Generated as a Percentage of Theoretical Minimum RO Energy | Energy Generated as a Percentage of Typical RO Energy |
|---|---|---|---|---|
| 500 | 0.765 | 0.020 | 3.06% | 1.39% |
| 1000 | 1.531 | 0.041 | 6.13% | 2.78% |
| 1500 | 2.296 | 0.061 | 9.19% | 4.18% |
| 2000 | 3.061 | 0.082 | 12.25% | 5.57% |
| 2500 | 3.827 | 0.102 | 15.31% | 6.96% |
| 3000 | 4.592 | 0.123 | 18.38% | 8.35% |
| 3500 | 5.357 | 0.143 | 21.44% | 9.74% |
| 4000 | 6.122 | 0.163 | 24.50% | 11.14% |
| 4500 | 6.888 | 0.184 | 27.56% | 12.53% |
| 5000 | 7.653 | 0.204 | 30.63% | 13.92% |
| 5500 | 8.418 | 0.225 | 33.69% | 15.31% |
| 6000 | 9.184 | 0.245 | 36.75% | 16.70% |
| 6500 | 9.949 | 0.265 | 39.81% | 18.10% |
| 7000 | 10.714 | 0.286 | 42.88% | 19.49% |
| 7500 | 11.480 | 0.306 | 45.94% | 20.88% |
| 8000 | 12.245 | 0.327 | 49.00% | 22.27% |
| 8500 | 13.010 | 0.347 | 52.06% | 23.66% |
| 9000 | 13.776 | 0.368 | 55.13% | 25.06% |
| 9500 | 14.541 | 0.388 | 58.19% | 26.45% |
| 10000 | 15.306 | 0.408 | 61.25% | 27.84% |
| 10500 | 16.071 | 0.429 | 64.31% | 29.23% |
| 11000 | 16.837 | 0.449 | 67.38% | 30.63% |
| 11500 | 17.602 | 0.470 | 70.44% | 32.02% |
| 12000 | 18.367 | 0.490 | 73.50% | 33.41% |

The above table employs an example reverse osmosis energy consumption of 2.2 kWh per m$^3$ of permeate and a recovery ratio of about 40% for the typical reverse osmosis system. Using the example in the above table, a 100 MW desalination plant next to a 3,000 meter liquid column may receive about 8.35 MW of power from desalination concentrate transferred into the liquid column in a scenario where the desalination plant operates at 2.2 kWh per m$^3$ of permeate, or may receive about 18.38 MW of power from desalination concentrate transferred into the liquid column in a scenario where the desalination plant operates at 1 kWh per m$^3$ of permeate.

Example FIG. 110 Key

Example FIG. 110 Key

| Label | Description |
|---|---|
| 1 | '1' may comprise a seawater intake or desalination Intake pipe or riser. '1' may transfer seawater from the water body into a pre-treatment step or otherwise into the desalination system or process. It may be desirable for '1' to draw or intake seawater from a depth of significant depth, or a depth wherein turbidity or particulate concentrations are lower than the ocean or sea or other water body surface. For example, it may be desirable for '1' to draw or intake seawater from a water depth greater than 50 meters, or 100 meters, or 150 meters, or 200 meters, or 250 meters, or 300 meters, or 350 meters, or 400 meters, or 450 meters, or 500 meters, or 550 meters. |

-continued

| Label | Description |
|---|---|
| | Example FIG. 110 Key |
| 2 | '2' may comprise desalination feed after pre-treatment and/or before pressurization with a pump or pressure exchanger or power transfer device. |
| 3 | '3' may comprise a pump, or pressure exchanger, or power transfer device, or any combination thereof. '3' may pressurize or apply pressure to the desalination feed and/or transfer the desalination feed into a pipe or transfer to transfer the desalination feed to a lower elevation reverse osmosis step, or pressure driven desalination step, or any combination thereof. |
| 4 | '4' may comprise a pipe or riser transferring pressurized desalination feed from a higher elevation region or a pump in a higher elevation region to a desalination step, such as a reverse osmosis desalination step, in a lower elevation region. |
| 5 | '5' may comprise discharge of desalination concentrate or retentate or brine effluent. '5' may comprise a discharge pipe or discharge outlet. It may be desirable to discharge the desalination concentrate or retentate or brine at an elevation at, or near, or lower than the elevation of the desalination process to minimize energy consumption associated with the discharging. In some embodiments, power may be generated from discharging the desalination concentrate or retentate or effluent brine if, for example, the desalination concentrate or retentate or effluent brine is discharged at a lower elevation than the elevation of the desalination step, or reverse osmosis system or process, or any combination thereof. |
| 6 | '6' may comprise desalinated water or desalination permeate. '6' may comprise a lower salinity than the salinity of '4'. '6' may comprise a pipe or riser. '6' may transfer desalination permeate from a desalination step or reverse osmosis system or process at a lower elevation region to a post treatment step or to storage or to transfer to an application or any combination thereof at a higher elevation region. |
| 7 | '7' may comprise desalinated water after a Post treatment step. '7' may comprise transferring desalinated water from a post treatment step to a storage unit or storage facility or storage reservoir for desalinated water or freshwater, or to an application, or any combination thereof. |
| 8 | '8' may comprise a storage unit or storage facility or storage reservoir for desalinated water or freshwater. |
| 9 | '9' may comprise a floating vessel housing a portion of the system or process. In the present embodiment, '9' may comprise a vessel with the pre-teatment step, or the pump or power transfer device, or the post treatment step, or the desalinated water storage unit or storage facility or storage reservoir, or any combination thereof. '9' may be moored. '9' may be attached to a detachable or disconnectable mooring system. In some embodiments, '9' may produce hydrogen or other chemicals from the desalinated water. In some embodiments, '9' may transfer the desalinated water to a vessel or ship, or in a pipeline, or any combination thereof to an application. |
| Pre | 'Pre' may comprise a pre-tteatmenf step. 'Pre' may comprise removing dissolved gases from the seawater intake. 'Pre' may comprise adding additives, or filtration, or coagulation, or separation, or other treatment, or desalination pre-treatments known in the art, or any combination thereof. It may be advantageous to locate 'Pre' in an accessible location or on a floating vessel to enable maintenance and/or to reduce energy consumption associated with depressurization and/or removal of dissolved gases. |
| RO | 'RO' may comprise a reverse osmosis desalination system or process, or may comprise a reverse osmosis membrane module, or may comprise a membrane separation process, or may comprise a pressure difference driven desalination system, or process, or any combination thereof. It may be desirable to locate 'RO' at a lower elevation than the elevation of the seawater intake, or the highest elevation point of the liquid column, or the highest elevation point of '4' or the highest elevation point of '6', or any combination thereof to benefit from the energy efficiency and supplied power benefits of the natural hydrostatic pressure difference between a liquid column comprising desalination feed and a liquid column comprising desalinated water or freshwater. In some embodiments, it may be desirable to locate 'RO' at the lowest possible, or desirable, or practical elevation. In some embodiments, 'RO' may be located on the seabed or seafloor. In some embodiments, 'RO' may be suspended or tethered or otherwise located above the seafloor. In some embodiments, it may be desirable for 'RO' to be located beneath the surface of a body of water or a body of liquid. |
| Post | 'Post' may comprise a post treatment step. In some embodiments, 'Post' may comprise adding or removing salts, or biocides, or minerals, or other potential chemicals required for some applications. In some embodiments, 'Post' may comprise desalination post-treatment systems and methods known in the art. In some embodiments, desalinated water may bypass 'Post' or otherwise be transferred into '8' if, for example, 'Post' is unnecessary or undesired. |
| Electricity | 'Electricity' may comprise a power source. In some embodiments, 'Electricity' may comprise power supplied from an external source, or may comprise power supplied from an internal source, or may comprise power supplied from an offshore source, or may comprise power supplied by an onshore source, or may comprise power supplied from the discharging of desalination retentate or concentrate, or any combination thereof. |

-continued

Example FIG. 110 Key

| Label | Description |
| --- | --- |
| Ocean | 'Ocean' may comprise a body of water, which may include, but is not limited to, an ocean, or sea, or bay, or estuary, or lake, or any combination thereof. |
| Seabed | 'Seabed' may comprise the seafloor or land located, at or near the bottom of a body of water or body of liquid. |

FIG. 111

FIG. 111 may comprise the same embodiment as FIG. 110, except may show a riser and/or pipeline for transferring desalinated water or freshwater or post-treatment water to an application, or to an offshore application, or to an onshore application, or any combination thereof.

FIG. 112

FIG. 112 may comprise the same embodiment as FIG. 111, except may show a subsea storage reservoir for, for example, storing desalinated water.

FIG. 113

FIG. 113 may comprise the same embodiment as FIG. 112, except may show a Post treatment step located in a lower elevation region.

FIG. 114

FIG. 114 may comprise the same embodiments as FIG. 112, except may show the reverse osmosis system or process, or reverse osmosis membrane, or desalination membrane module, or other desalination step, or any combination thereof located at an elevation higher than the elevation of the seabed and lower than the elevation of the surface of the body of water, or the source of desalination feed, or the pump, or the pretreatment, or the post treatment, or any combination thereof.

FIG. 115

FIG. 115 may comprise the same embodiments as FIG. 110, except may show the reverse osmosis system or process, or reverse osmosis membrane, or desalination membrane module, or other desalination step, or any combination thereof located at an elevation higher than the elevation of the seabed and lower than the elevation of the surface of the body of water, or the source of desalination feed, or the pump, or the pretreatment, or the post treatment, or any combination thereof.

FIG. 116

FIG. 116 may comprise the same embodiments as FIG. 111, except may show the reverse osmosis system or process, or reverse osmosis membrane, or desalination membrane module, or other desalination step, or any combination thereof located at an elevation higher than the elevation of the seabed and lower than the elevation of the surface of the body of water, or the source of desalination feed, or the pump, or the pretreatment, or the post treatment, or any combination thereof.

FIG. 117

FIG. 117 may comprise the same embodiments as FIG. 113, except may show the reverse osmosis system or process, or reverse osmosis membrane, or desalination membrane module, or other desalination step, or any combination thereof located at an elevation higher than the elevation of the seabed and lower than the elevation of the surface of the body of water, or the source of desalination feed, or the pump, or the pretreatment, or the post treatment, or any combination thereof,

FIG. 118 Summary

FIG. 118 may relate to a desalination system or process facilitated by or at least partially powered by the difference in hydrostatic pressure between freshwater or desalinated water and seawater or desalination feed across a liquid column, or a across an elevation, or between a lower elevation region and a higher elevation region, or any combination thereof. The present embodiment may be further facilitated by or powered by reducing the pressure of desalination feed water to a pressure lower than the hydrostatic pressure of the freshwater or the desalinated water. In some embodiments, a subsea vessel or tank may be positioned or located at a depth or elevation equal to or greater than the supplemental additional hydraulic head or reduction in hydraulic head pressure required to drive reverse osmosis desalination. For example, in some embodiments, said subsea vessel or tank may comprise a low pressure tank or pump-out tank, wherein a pump or other liquid transfer device may pump or otherwise transfer water from said subsea vessel or tank, which may result in the internal pressure of the subsea tank to be substantially lower than the hydrostatic pressure at the water depth, or the natural hydrostatic pressure of the desalinated water, or any combination thereof. By locating the pump and/or the low pressure tank at a significantly higher elevation than the reverse osmosis module, the system or process may be at least partially powered by the difference in natural hydrostatic pressure between seawater and desalinated water across the liquid column comprising the elevation difference between the reverse osmosis module and the pump and/or low pressure tank. By locating the pump and/or the low pressure tank at a significantly higher elevation than the reverse osmosis module and allowing the reverse osmosis module to discharge desalination concentrate, or retentate, or effluent brine at an elevation near, or equal to, or less than the elevation of the reverse osmosis module, the system or process may be at least partially powered by or driven by the difference in natural hydrostatic pressure between seawater and desalinated water across the liquid column comprising the elevation difference between the reverse osmosis module and the pump and/or low pressure tank. By locating the pump and/or the low pressure tank at a significantly higher elevation than the reverse osmosis module, the pump and/or low pressure tank may be more accessible for maintenance.

In some embodiments, the lower pressure tank may be located at an elevation lower than the elevation of the pump. In some embodiments, the pressure inside the lower pressure tank may be different from the natural hydrostatic pressure of the desalinated water by a pressure difference required or desired for reverse osmosis. In some embodiments, the lower pressure tank may be located adjacent to or at a similar elevation as the reverse osmosis module. In some embodiments, pre-treatment may be conducted before transferring the desalination feed into the reverse osmosis process.

Example FIG. 118 Key

| Label | Description |
|---|---|
| 1 | '1' may comprise seawater intake or desalination feed intake. It may be desirable for '1' to be located in a lower elevation region, which may be at a substantially lower elevation than the elevation of the pump. In some embodiments, '1' may be located at an elevation or in a location within a body of water with low turbidity, which may minimize the required pre-treatment, if any. In some embodiments, '1' may be transferred to the surface or to a higher elevation region for pre-treatment, or to remove at least a portion of dissolved gases, or any combination thereof, and then transferred to the reverse osmosis step or other desalination step. |
| 2 | '2' may comprise discharge of desalination concentrate or retentate or brine effluent. '2' may comprise a discharge pipe. It may be desirable to discharge the desalination concentrate or retentate or brine at an elevation at, or near, or lower than the elevation of the desalination process to minimize energy consumption associated with the discharging. In some embodiments, power may be generated from discharging the desalination concentrate or retentate or effluent brine if, for example, the desalination concentrate or retentate or effluent brine is discharged at a lower elevation than the elevation of the desalination step, or reverse osmosis system or process, or any combination thereof. |
| 3 | '3' may comprise desalinated water, or freshwater, or any combination thereof. '3' may transfer desalinated water, or freshwater, or any combination thereof to a medium elevation region or a higher elevation region. '3' may transfer desalinated water, or freshwater, or any combination thereof from a reverse osmosis step or desalination step to a lower pressure tank, or a pump, or any combination thereof. In some embodiments, the elevation difference between the desalinated water entering '3' and the desalinated water exiting '3' may comprise the elevation difference or column related to the natural hydrostatic pressure difference or gravitational hydrostatic pressure difference which may power at least a portion of desalination. |
| 4 | '4' may comprise a low pressure tank, or a pump-out tank, or pump-out vessel. '4' may comprise a vessel with a lower internal pressure than the gravitational hydrostatic pressure. '4' may be operated such that the pressure difference between the internal pressure of '4' and the natural or gravitational hydrostatic pressure is sufficient to provide the additional power or pressure required or desired to drive, or facilitate, or enable desalination. In some embodiments, '4' may be located at a higher elevation than the desalination step or reverse osmosis step. The elevation or depth of the lower elevation tank may influence or correlate with the potential reduction in pressure or pressure difference provided by the low pressure tank to drive desalination. For example, if the low pressure tank is located at a 450 meter depth, the potential increase in hydrostatic pressure difference provided by the low pressure tank may be up to about 45.9 Bar pressure, or about 450/gravitational factor or about 450/9.8. |
| 5 | '5' may comprise desalinated water transferred from the low pressure tank to a pump. In some embodiments, the pressure of '5' may be about equivalent to the pressure inside '4'. In some embodiments, the pressure of '5' may be lower than the pressure of '7' at about the same elevation. |
| 6 | '6' may comprise a pump, or pressure exchanger, or other liquid transfer device. '6' may transfer desalinated water from a low pressure tank to an application requiring water, or a post treatment step, or water storage, or any combination thereof. In some embodiments, '6' may pump desalinated water to the surface or to an elevation near, or at, or above the elevation of a water body. '6' may provide the additional power or pressure required to overcome the osmotic pressure of seawater, or power desalination, or enable desalination, or any combination thereof. |
| 7 | '7' may comprise freshwater or desalinated water transferred from a pump to a post treatment step. In some embodiments, '7' may transfer desalinated water from the elevation of the pump and/or low pressure tank to an elevation at, or near, or above the elevation of a water body. In some embodiments, '7' may transfer desalinated water from a low pressure tank to an application requiring water, or a post treatment step, or water storage, or any combination thereof. In some embodiments, '7' may comprise a riser or pipe. |
| 8 | '8' may comprise a storage unit or storage facility or storage reservoir for desalinated water or freshwater. |
| 9 | '9' may comprise desalinated water after a post treatment step transferred to a storage unit or storage facility or storage reservoir comprising desalinated water, or freshwater, or any combination thereof. |
| 10 | '10' may comprise a floating vessel housing a portion of the system or process. In the present embodiment, '10' may comprise a vessel with a post-treatment step, or a pump or power transfer device, or a desalinated water storage unit or storage facility or storage reservoir, or any combination thereof. '10' may be moored. '10' may be attached to a detachable or disconnectable mooring system. In some embodiments, '10' may produce hydrogen or other chemicals from the desalinated water. In some embodiments. '10' may transfer the desalinated water to a vessel or ship, or in a pipeline, or any combination thereof to an application. |

-continued

Example FIG. 118 Key

| Label | Description |
|---|---|
| 11 and 'To App' | '11' may comprise desalinated water, or freshwater, or chemicals derived from desalinated water, or any combination thereof transferred to an application. In some embodiments, '11' may comprise a riser, or a pipeline, or any combination thereof. |
| RO | 'RO' may comprise a reverse osmosis desalination system or process, or may comprise a reverse osmosis membrane module, or may comprise a membrane separation process, or may comprise a pressure difference driven desalination system or process, or any combination thereof. It may be desirable to locate 'RO' at a lower elevation than the elevation of the seawater intake, or the highest elevation point of the liquid column, or the highest elevation point of '3' or the highest elevation point of '6', or any combination thereof to benefit from the energy efficiency and supplied power benefits of the natural hydrostatic pressure difference between a liquid column comprising desalination feed and a liquid column comprising desalinated water or freshwater. In some embodiments, it may be desirable to locate 'RO' at the lowest possible, or desirable, or practical elevation. In some embodiments, 'RO' may be located on the seabed or seafloor. In some embodiments, 'RO' may be suspended or tethered or otherwise located above the seafloor. In some embodiments, it may be desirable for 'RO' to be located beneath the surface of a body of water or a body of liquid. |
| Electricity | 'Electricity' may comprise a power source. In some embodiments, 'Electricity' may comprise power supplied from an external source, or may comprise power supplied from an internal source, or may comprise power supplied from an offshore source, or may comprise power supplied by an onshore source, or may comprise power supplied from the discharging of desalination retentate or concentrate, or any combination thereof. |
| Post | 'Post' may comprise a post treatment step. In some embodiments, 'Post' may comprise adding or removing salts, or biocides, or minerals, or other potential chemicals required for some applications. In some embodiments, 'Post' may comprise desalination post-treatment systems and methods known in the art. In some embodiments, desalinated water may bypass 'Post' or otherwise be transferred into '8' if, for example, 'Post' is unnecessary or undesired. |
| Ocean | 'Ocean' may comprise a body of water, which, may include, but is not limited to, an ocean, or sea, or bay, or estuary, or lake, or any combination thereof |
| Seabed | 'Seabed' may comprise the seafloor or land located at or near the bottom of a body of water or body of liquid. |

Example FIG. 118 Step-by-Step Description (1) Seawater transferred into a desalination module, such as a reverse osmosis module at a lower elevation. In some embodiments, the depth of the reverse osmosis module, or the seawater intake, or both may desirably be sufficiently deep for the hydrostatic pressure to be greater than the osmotic pressure of the seawater. For example, in some embodiments, the difference in pressure between the hydrostatic pressure of seawater at the water depth of the reverse osmosis module and the pressure of the permeate or desalinated water may comprise the driving force or a significant driving force for the flow of seawater into the reverse osmosis module and the desalination of the seawater or desalination feed. In some embodiments, the elevation of the reverse osmosis module and/or the seawater intake may be significantly lower than the elevation of the pump or lower pressure tank to, for example, maximize or enhance the potential natural gravitational hydrostatic pressure difference between the desalinated water and the desalination feed or seawater. In some embodiments, pressure may be added using a pump on the seawater feed or desalination feed or seawater intake or a pump may be located on the seawater feed or desalination feed or seawater intake.

(2) Desalination feed, which may comprise seawater or pre-treated seawater, may be transferred into a reverse osmosis desalination module. In the reverse osmosis module, the pressure of the desalination feed may be greater on the desalination feed side than the desalination permeate side of the membrane. In the reverse osmosis module, wherein the desalination feed may be separated into desalination permeate, which may comprise desalinated water, and desalination concentrate or retentate, which may comprise a brine effluent. The desalination concentrate may be released or discharged. In some embodiments, the desalination concentrate may be released or discharged at an elevation near, or at, or lower than the elevation of the reverse osmosis module and/or power may be generated from the gravitational hydrostatic pressure difference from the density difference between the seawater and the desalination concentrate in a liquid column. The permeate or the desalinated water may be transferred to a higher elevation region.

(3) In the higher elevation region, the desalinated water may be transferred into a lower pressure tank. A lower pressure tank may comprise a tank with an internal pressure lower than the gravitational hydrostatic pressure at the depth or elevation or relative to the liquid column gravitational hydrostatic head. At least a portion of desalinated water may be pumped out of the lower pressure tank, which may involve a batch, or semi-batch, or continuous process.

(4) Desalinated water may be pumped to an application, or to a storage vessel on or near the surface of the water body, or a subsea storage vessel, or a subsea pipeline or riser, or any combination thereof. In some embodiment.

(5) The desalinated water may undergo post-treatment or further processing before transfer into storage, or to a storage vessel on or near the surface of the water body, or a subsea storage vessel, or a subsea pipeline or riser, or any combination thereof.

FIG. 119

FIG. 119 may comprise the same embodiment as FIG. 118, except may employ a subsea post treatment step and/or a subsea desalinated water storage facility, or storage unit, or storage vessel, or any combination thereof.

FIG. 120

FIG. 120 may comprise a desalination process or system wherein reverse osmosis desalination occurs in a lower elevation region subsea and/or post treatment is conducted subsea and/or desalinated water is transferred to an application, or to shore, or any combination thereof.

FIG. 121

FIG. 121 may comprise a desalination process or system wherein pre-treatment and reverse osmosis desalination may be conducted offshore and/or post treatment and water storage and distribution may be conducted on land and/or a riser or pipeline transfers desalinated water from the offshore portion of the desalination system or process to the onshore portion of the desalination system or process. In some embodiments, pre-treatment may comprise transferring deep seawater intake or deep seawater feed to at or near the surface of a water body to depressurize and/or remove at least a portion of dissolved gases. In some embodiments, the pump and/or other equipment or moving parts may be located at or near the surface of the water body or in a higher elevation region relative to the reverse osmosis system. In some embodiments, the liquid column or elevation difference may comprise the difference in elevation between the reverse osmosis module and the elevation of the on-land portions of the desalination process or system and/or the difference in elevation between the pre-treatment and/or pump and the reverse osmosis module.

FIG. 122

FIG. 122 may comprise an embodiment where the reverse osmosis module may be located in a lower elevation region subsea and the desalinated water is transferred to a higher elevation region, which may comprise a higher elevation region on land. The natural gravitational hydrostatic pressure difference may be driven by the difference in the gravitational hydrostatic pressure of the seawater at the depth of the seawater intake or the reverse osmosis module and the gravitational hydrostatic pressure of desalinated water transferred to land or the higher elevation region.

FIG. 123 Summary

FIG. 123 may relate to a system or process for desalinating water, wherein at least a portion of power is generated from the discharging of brine, or desalination concentrate, or desalination retentate, or brine effluent, or any combination thereof. In some embodiments, power may be generated by forming a liquid column, wherein brine, which may be generated from a desalination process, is transferred from a higher elevation region to a lower elevation region, which may be subsea, wherein the brine is discharged in the lower elevation region, and/or generating power from the difference in the gravitational hydrostatic pressure between the higher density brine and the lower density seawater, or ocean water, or liquid in the body of water, or any combination thereof at the same or similar depth or elevation. In some embodiments, power may be generated by discharging brine at a lower elevation than the elevation which the brine was created or formed. In some embodiments, brine may be transferred through a pipe, or riser, or any combination thereof, which may enable the formation of a liquid column, which may facilitate the formation of the gravitational hydrostatic pressure difference or the pressure difference. In some embodiments, power may be generated using a turbine, or electric generator, or a reversible pump/generator, or a pump, or a power exchanger, or a power transfer device, or a power generation device, or a hydraulic power generator, or a pneumatic power transfer device, or a hydraulic power transfer device, or a power recovery device, or a desalination system or process, or any combination thereof. In some embodiments, power generated from the discharge of brine may be transferred to a desalination system or process, or transferred to an application, or transferred to an electricity grid, or transferred as electricity, or transferred as hydraulic pressure, or transferred as mechanical energy, or transferred as kinetic energy, or transferred as electromagnetic energy, or transferred as chemical energy, or any combination thereof. In some embodiments, the desalination process or system, or brine generation process or system, or any combination thereof may comprise, including, but not limited to, one or more or any combination of the following: a desalination system or process known in the art, or reverse osmosis, or nanofiltration, or mechanical vapor compression distillation, or vacuum distillation, or distillation, or multi-stage flash distillation, or membrane distillation, or forward osmosis, or osmotically assisted reverse osmosis, or extractive distillation, or cryodesalination, or elecrodialysis, or a separation system or process.

The present embodiment may comprise a floating system or process, or a subsea system or process, or an on-land system or process, or on platform system or process, or offshore system o process, or seabed based system or process, or any combination thereof.

In some embodiments, power or energy may be stored by storing brine in a storage reservoir, or storage unit at an elevation higher than the second elevation or an elevation higher than the brine discharge outlet.

Example FIG. 123 Key

| Label | Description |
|---|---|
| 1 | '1' may comprise seawater intake or desalination feed intake. In some embodiments, it may be desirable far at least a portion of '1' may be located at an elevation or in a location within a body of water with low turbidity, which may minimize the required pre-treatment, if any. In some embodiments, '1' may be transferred to the surface or to a higher elevation region for pre-treatmem, or to remove at least a portion of dissolved gases, or any combination thereof, and then transferred to the reverse osmosis step or tohter desalination step. |
| 2 | '2' may comprise desalination feed after pre-treatment and/or before pressurization with a pump or pressure exchanger or power transfer device. |
| 3 | '3' may comprise a pump, or pressure exchanger, or power transfer device, or any combination thereof. '3' may pressurize or apply pressure to the desalination feed and/or transfer the desalination feed into a pipe or transfer to transfer the desalination feed to a reverse osmosis step, or pressure driven desalination step, or any combination thereof. |

-continued

Example FIG. 123 Key

| Label | Description |
|---|---|
| 4 | '4' may comprise pressurized desalination feed transferred from a pump to a desalination system or process, such as a reverse osmosis system or process. |
| 5 | '5' may comprise concentrate or retentate or brine effluent or brine. Concentrate or retentate or brine effluent may be transferred from a higher elevation region to a lower elevation region. For example, concentrate or retentate or brine effluent may be transferred from the source of the concentrate or retentate or brine effluent, which may comprise a desalination process, to a lower elevation region, which may be located subsea. Concentrate or retentate or brine effluent may be transferred from the higher elevation region to the lower elevation region using a pipe, or pipeline, or a riser. A liquid column may be created wherein the gravitational hydrostatic pressure in '5' is greater than the gravitational hydrostatic pressure in the ocean or sea or body of water at the same water depth or same elevation, and/or wherein the deeper the depth or lower the elevation, the gravitational hydrostatic pressure in '5' may be greater than the gravitational hydrostatic pressure in the ocean or sea or body of water as the same elevation. |
| 6 | '6' may comprise a generator, or turbine, or pressure exchanger, or power exchanger, or power generation device, or power transfer device, or power recovery device, or any combination thereof. '6' may be located at a lower elevation region. Concentrate or retentate or brine effluent may be transferred into '6', wherein '6' may generate power from the pressure difference or gravitational hydrostatic pressure difference between the concentrate or retentate or brine effluent and the adjacent body of water. Power generated from may be transferred to a desalination system or process, or to an application, or may be converted, or may be stored, or any combination thereof. |
| 7 | '7' may comprise discharged concentrate or retentate or brine effluent, which may comprise discharging or releasing into a body of water, which may comprise a sea or ocean, at a lower elevation than the source of the concentrate or retentate or brine effluent. '7' may comprise a brine discharge outlet. '7' may be at a lower pressure than '5' at the same elevation. '7' may comprise diffusers or distributors, which may minimize or reduce the potential for a localized increase in salinity near or adjacent to the discharge. |
| 8 (pipe) | '8' may comprise desalination permeate or desalinated water. Desalinated water may be transferred to a post treatment step, or to desalinated water storage or freshwater storage, or any combination, thereof. |
| 8 (storage) | '8' may comprise a storage unit, or storage reservoir, or storage vessel, or storage facility, or any combination thereof comprising desalinated water or freshwater. |
| 9 | '9' may comprise desalinated water transferred to a storage unit, or to an application, or any combination thereof. Desalinated water or freshwater may be transferred in a pipe, or pipeline or riser to an application, or further treatment step, or any combination thereof. |
| 10 | '10' may comprise a floating vessel, housing a portion of the system or process. '10' may be moored. '10' may be attached to a detachable or disconnectable mooring system. In some embodiments, '10' may produce hydrogen, or other chemicals from the desalinated water. In some embodiments, '10' may transfer the desalinated water to a vessel or ship, or in a pipeline, or any combination thereof to an application. |
| E-1 | 'E-1' may comprise a power source. 'E-1' may comprise power sourced from an external source, or an internal source, or any combination thereof, which may be employed to power desalination, or other systems or processes, or any combination thereof. |
| E-2 | 'E-2' may comprise power generated from the discharge of brine. 'E-2' may be transferred to provide at least a portion of the power for desalination, or to a power application, or any combination thereof. |
| Pre | 'Pre' may comprise a pre-treatment step. 'Pre' may comprise removing dissolved gases from the seawater intake or desalination feed. 'Pre' may comprise adding additives, or filtration, or coagulation, or separation, or other treatment, or desalination pre-treatments known in the art, or any combination thereof. It may be advantageous to locate 'Pre' in an accessible location or on a floating vessel to enable maintenance and/or to reduce energy consumption associated with depressurization and/or removal of dissolved gases. |
| RO | 'RO' may comprise a reverse osmosis desalination system or process, or may comprise a reverse osmosis membrane module, or may comprise a membrane separation process, or may comprise a pressure difference driven desalination system or process, or any combination thereof. RO may comprise a desalination system or process, which may include, but is not limited to, desalination systems or processes described herein, or desalination systems or processes described in the art, or any combination thereof. |
| Post | 'Post' may comprise a post treatment step. In some embodiments, 'Post' way comprise adding or removing salts, or biocides, or minerals, or other potential chemicals required for some applications. In some embodiments, 'Post' may comprise desalination post-treatment systems and methods known in the art. In some embodiments, desalinated water may bypass 'Post' or otherwise be transferred to a storage reservoir or an application if, for example, 'Post' is unnecessary or undesired. |

| | -continued |
|---|---|
| | Example FIG. 123 Key |
| Label | Description |
| Ocean | 'Ocean' may comprise a body of water, which may include, but is not limited to, an ocean, or sea, or bay, or estuary, or lake, or any combination thereof. |
| Seabed | 'Seabed' may comprise the seafloor or land located at or near the bottom of a body of water or body of liquid. |

Example FIG. 123 Step-by-Step Description (1) Seawater or other desalination intake or desalination feed may be transferred to a pre-treatment step. Seawater or other desalination intake or desalination feed may be sourced from a body of water. In some embodiments, it may be desirable for the seawater intake opening to be located in a region or depth of a water body wherein the seawater possesses low turbidity to, for example, minimize or reduce potential fouling or scaling or pre-treatment costs.

(2) Seawater or other desalination intake or desalination feed may be pre-treated. In some embodiments, pre-treatment may comprise removing at least a portion of dissolved gases. In some embodiments, pre-treatment may comprise the addition or removal of chemicals, and/or the filtration of particulates.

(3) Desalination feed, which may comprise seawater or treated seawater, may be pumped into a desalination system or process. In some embodiments, desalination feed may be pumped and/or pressurized and transferred into a reverse osmosis desalination system or process. In some embodiments, desalination feed may be at least partially desalinated or converted into freshwater or desalinated water using a system or process in addition to, or other than, reverse osmosis desalination. In some embodiments, the seawater, or brine effluent, or any combination thereof may be evaporated to form brine or high density brine to facilitate power generation in later steps.

(4) In some embodiments, a system or process may produce brine with a density greater than the density of seawater or the water in the body of water. In some embodiments, a system or process may produce desalinated water and concentrate, or retentate, or brine effluent. Desalinated water may be transferred to a post-treatment step, or a storage unit, or an application, or a chemical synthesis process, or a hydrogen production process, or a chemical process, or a pipeline, or a riser, or any combination thereof.

(5) Brine may be transferred from a higher elevation region or from a brine source in a higher elevation region, to a lower elevation region, where the brine may be discharged or released to generate power. Power may be generated from the gravitational hydrostatic pressure difference due to the elevation difference between the higher elevation region and lower elevation region and the difference in density between the brine and the adjacent seawater or body of water at about the same elevation. Generated power may be transferred to a desalination system or process, or an application, or any combination thereof. For example, generated power may be transferred to a desalination system or process, or an application, or any combination thereof using an electricity transmission cable, or electricity transmission infrastructure, or energy storage, or a power transfer mechanism, or any combination thereof.

EXAMPLE EXEMPLARY EMBODIMENTS

Density Differential Desalination Example Exemplary Embodiments (1a) A system for desalinating water comprising:
A first liquid column;
A second liquid column;
Wherein the first liquid column comprises desalination feed;
Wherein the second liquid column comprises desalinated water; and
Wherein at least a portion of the power for desalination is provided by the difference in gravitational hydrostatic pressure between the first liquid column and the second liquid column due to the density difference between the desalination feed and desalinated water (1a) A system for desalinating water comprising:
A first liquid column;
A second liquid column;
Wherein the first liquid column comprises desalination feed;
Wherein the second liquid column comprises desalinated water; and
Wherein at least a portion of the pressure for desalination is provided by the difference in gravitational hydrostatic pressure between the first liquid column and the second liquid column due to the density difference between the desalination feed and desalinated water (2) The system of example exemplary embodiment 1 wherein said desalination feed comprises seawater (3) The system of example exemplary embodiment 1 wherein said desalinated water comprises freshwater (4) The system of example exemplary embodiment 1 wherein the system is in a body of water (5) The system of example exemplary embodiment 4 wherein the body of water comprises an ocean, or a sea (6) The system of example exemplary embodiment 4 wherein the system comprises a first elevation and a second elevation; and wherein the first elevation comprises the elevation of the surface of a body of water; and wherein the second elevation comprises an elevation lower than the first elevation (7) The system of example exemplary embodiment 6 wherein a reverse osmosis desalination membrane is positioned at the second elevation (8) The system of example exemplary embodiment 1 wherein the first column comprises a body of water (9) The system of example exemplary embodiment 7 wherein the first column comprises a pipe transferring desalination feed between the first elevation and the reverse osmosis desalination membrane at the second elevation

(10) The system of example exemplary embodiment 7 wherein the second column comprises a pipe transferring desalinated water between the reverse osmosis desalination membrane at the second elevation and an application at the first elevation (1) The system of example exemplary embodiment 10 wherein said pipe comprises a riser

(12) The system of example exemplary embodiment 6 wherein the second elevation is at an elevation greater than 1,000 meters lower than the elevation of the first elevation

(13) The system of example exemplary embodiment 7 wherein desalination concentrate is discharged from the reverse osmosis at an elevation within 50 meters of the elevation of the reverse osmosis membrane

(14) The system of example exemplary embodiment 7 wherein the desalination concentrate is discharged from the reverse osmosis at an elevation equal to or lower than the elevation of the reverse osmosis membrane

(15) The system of example exemplary embodiment 1 wherein desalination feed is pre-treated before transfer into the liquid column

(16) The system of example exemplary embodiment 15 wherein said pretreatment is located at the first elevation; and wherein said pretreatment comprises removing at least a portion of dissolved gases

(17) The system of example exemplary embodiment 9 wherein additional pressure is applied to the desalination feed in the first liquid column using a pump at the first elevation

(18) The system of example exemplary embodiment 9 wherein additional pressure is applied to the desalination feed in the first liquid column using a pressure exchange with a discharging fluid displacement energy storage system

(19) The system of example exemplary embodiment 9 wherein additional pressure is applied to the desalination feed in the first liquid column using a pump at an elevation between the first elevation and the second elevation

(20) The system of example exemplary embodiment 9 wherein additional pressure is applied to the desalination feed in the first liquid column using a pump at the second elevation

(21) The system of example exemplary embodiment 1 wherein the difference in gravitational hydrostatic pressure between the first liquid column at the second liquid column at the second elevation is greater than 5 Bar

(22) The system of example exemplary embodiment 1 wherein the difference in pressure between the first liquid column and the second liquid column is supplemented by reducing the pressure of the second liquid column

(23) The system of example exemplary embodiment 22 wherein the pressure of the second liquid column is reduced by transferring desalinated water in the second liquid column into a lower pressure tank

(24) The system of example exemplary embodiment 23 wherein the internal pressure of the lower pressure tank is lower than the gravitational hydrostatic pressure associated with the elevation difference between the elevation of the lower pressure tank and the surface of the body of water

(25) The system of example exemplary embodiment 23 wherein the internal pressure of the lower pressure tank is lower than the gravitational hydrostatic pressure associated with the elevation difference between the elevation of the lower pressure tank and the outlet of the second liquid column

(26) The system of example exemplary embodiment 23 wherein the elevation of the lower pressure tank is between the first elevation and the second elevation

(27) The system of example exemplary embodiment 23 wherein the elevation of the lower pressure tank is lower than the first elevation by an elevation difference about equal to or greater than the hydrostatic head pressure for desalinating desalination feed at a desired recovery ratio minus the gravitational hydrostatic pressure difference between the first liquid column and the second liquid column

(28) The system of example exemplary embodiment 23 wherein the pressure of the lower pressure tank is maintained by a pump transferring desalinated water from the lower pressure tank

(29) The system of example exemplary embodiment 23 wherein the pressure of the lower pressure tank is maintained by a pressure exchanger transferring desalinated water from the lower pressure tank powered by pressure exchanging with a discharging fluid displacement energy storage system

(30) The system of example exemplary embodiment 1 wherein the density difference between desalination feed and the desalinated water is greater than 0.005 kg/L Brine Power Generation Example Exemplary Embodiments A system for generating power comprising:
A brine source;
A pipe;
A generator;
A body of water; and
A brine discharge outlet
Wherein the brine source is at a first elevation and the brine discharge outlet is at a second elevation; and
Wherein the first elevation is higher than the second elevation; and
Wherein the pipe connects the brine source at the first elevation to the brine discharge outlet at the second elevation; and
Wherein the brine discharge outlet and at least a portion of the pipe are located beneath the surface of the body of water; and
Wherein power is generated by transferring brine from the first elevation to the second elevation The system of example exemplary embodiment 1 wherein power is generated due to the gravitational hydrostatic pressure difference between the brine in the pipe and the adjacent body of water due to the density difference between brine and seawater The system of example exemplary embodiment 1 wherein a generator is connected to the pipe located between the brine source at the first elevation and discharge outlet at the second elevation The system of example exemplary embodiment 1 wherein the body of water comprises a sea or ocean The system of example exemplary embodiment 1 wherein the brine comprises desalination concentrate, or desalination retentate The system of example exemplary embodiment 1 wherein the brine source comprises a desalination system The system of example exemplary embodiment 1 wherein the pipe comprises a riser The system of example exemplary embodiment 1 wherein the brine is discharged into the body of water through the brine discharge outlet at the second elevation The system of example exemplary embodiment 1 wherein brine enters the pipe at the first elevation The system of example exemplary embodiment 1 wherein the generator is located beneath the surface of a water body at the second elevation The system of example exemplary embodiment 6 wherein the generator generates power in the form of electricity; and wherein the generated electricity is transferred to provide at least a portion of power to the desalination system The system of example exemplary embodiment 6 wherein at least a portion of the desalination system is floating on the body of water The system of example exemplary embodiment 6 wherein at least a portion of the desalination system is beneath the surface of a body of water at the first elevation The system of example exemplary embodiment 6 wherein at least a portion of the desalination system is on land at the first elevation The system of example exemplary embodiment 1 wherein the brine source comprises an evaporation process The system of example exemplary embodiment 1 wherein the generator comprises a power exchanger, wherein at least a portion of the power generated is employed to pressurize at least a portion of desalination feed The system of example exemplary embodiment 1 wherein the discharge outlet comprises distributors to reduce the localized increase in salinity adjacent to the discharge The system of example exemplary embodiment 1 wherein the discharge outlet is at an elevation greater than 1000 meters below the elevation of the surface of the water body The system of example exemplary embodiment 1 wherein the difference in elevation between the first elevation and second elevation is greater than 1000 meters The system of example exemplary embodiment 1 wherein the generator is at an elevation within 50 meters of the discharge outlet The system of example exemplary embodiment 6 wherein the power source for desalination comprises electricity transferred from an external source through a subsea cable The system of example exemplary embodiment 11 wherein power transferred from the generator to the desalination system is transferred employing the same subsea umbilical The system of example exemplary embodiment 2 wherein the density difference between the brine and the seawater is greater than 0.005 kg/L The system of example exemplary embodiment 1 wherein energy is stored by storing brine in a storage reservoir at the first elevation Notes Note: In some embodiments, power may be transferred employing a subsea umbilical and/or a subsea cable.

Note: In some embodiments, the density difference between brine or concentrate or retentate and seawater or desalination feed may be greater than or equal to, including, but not limited to, one, or more, or any combination of the following: 0.0001 kg/L, or 0.001 kg/L, or 0.002 kg/L, or 0.003 kg/L, or 0.004 kg/L, or 0.005 kg/L, or 0.006 kg/L, or 0.007 kg/L, or 0.008 kg/L, or 0.009 kg/L, or 0.010 kg/L, or 0.011 kg/L, or 0.012 kg/L, or 0.013 kg/L, or 0.014 kg/L, or 0.015 kg/L, or 0.016 kg/L, or 0.017 kg/L, or 0.018 kg/L, or 0.019 kg/L, or 0.020 kg/L, or 0.021 kg/L, or 0.022 kg/L, or 0.023 kg/L, or 0.024 kg/L, or 0.025 kg/L, or 0.026 kg/L, or 0.027 kg/L, or 0.028 kg/L, or 0.029 kg/L, or 0.030 kg/L, or 0,035 kg/L, or 0.040 kg/L, or 0.045 kg/L, or 0.050 kg/L.

Note: In some embodiments, the density difference between seawater or desalination feed and desalinated water or desalination permeate or freshwater may be greater than or equal to, including, but not limited to, one, or more, or any combination of the following: 0.0001 kg/L, or 0.001 kg/L, or 0.002 kg/L, or 0.003 kg/L, or 0.004 kg/L, or 0.005 kg/L, or 0.006 kg/L, or 0.007 kg/L, or 0.008 kg/L, or 0.009 kg/L, or 0.010 kg/L, or 0.011 kg/L, or 0.012 kg/L, or 0.013 kg/L, or 0.014 kg/L, or 0.015 kg/L, or 0.016 kg/L, or 0.017 kg/L, or 0.018 kg/L, or 0.019 kg/L, or 0.020 kg/L, or 0.021 kg/L, or 0.022 kg/L, or 0.023 kg/L, or 0.024 kg/L, or 0.025 kg/L, or 0.026 kg/L, or 0.027 kg/L, or 0.028 kg/L, or 0.029 kg/L, or 0.030 kg/L, or 0.035 kg/L, or 0.040 kg/L, or 0.045 kg/L, or 0.050 kg/L.

Note: The gravitational hydrostatic pressure difference between the desalination feed in the first liquid column and desalinated water in the second liquid column at the second elevation may be greater than or equal to, including, but not limited to, one, or more, or any combination of the following: 0.01 Bar, or 0.5 Bar, or 1.0 Bar, or 1.5 Bar, or 2 Bar, or 2.5 Bar, or 3 Bar, or 3.5 Bar, or 4.0 Bar, or 4.5 Bar, or 5.0 Bar, or 5.5 Bar, or 6.0 Bar, or 6.5 Bar, or 7.0 Bar, or 7.5 Bar, or 8.0 Bar, or 8.5 Bar, or 9.0 Bar, or 9.5 Bar, or 10 Bar, or 11 Bar, or 12 Bar, or 13 Bar, or 14 Bar, or 15 Bar, or 16 Bar, or 17 Bar, or 18 Bar, or 19 Bar, or 20 Bar, or 21 Bar, or 22 Bar, or 23 Bar, or 24 Bar, or 25 Bar, or 26 Bar, or 27 Bar, or 28 Bar, or 29 Bar, or 30 Bar, or 35 Bar, or 40 Bar, or 45 Bar, or 50 Bar.

Note: The gravitational hydrostatic pressure difference between seawater and brine in a pipe at the second elevation may be greater than or equal to, including, but not limited to, one, or more, or any combination of the following: 0.01 Bar, or 0.5 Bar, or 1.0 Bar, or 1.5 Bar, or 2 Bar, or 2.5 Bar, or 3 Bar, or 3.5 Bar, or 4.0 Bar, or 4.5 Bar, or 5.0 Bar, or 5.5 Bar, or 6.0 Bar, or 6.5 Bar, or 7.0 Bar, or 7.5 Bar, or 8.0 Bar, or 8.5 Bar, or 9.0 Bar, or 9.5 Bar, or 10 Bar, or 11 Bar, or 12 Bar, or 13 Bar, or 14 Bar, or 15 Bar, or 16 Bar, or 17 Bar, or 18 Bar, or 19 Bar, or 20 Bar, or 21 Bar, or 22 Bar, or 23 Bar, or 24 Bar, or 25 Bar, or 26 Bar, or 27 Bar, or 28 Bar, or 29 Bar, or 30 Bar, or 35 Bar, or 40 Bar, or 45 Bar, or 50 Bar.

Note: In some embodiments, seawater intake, or desalination feed, or any combination thereof may be transferred from deep water to the surface of a water body, to, for example, depressurize the seawater intake, or desalination feed, or any combination thereof which may result in the release of at least a portion of dissolved gases from the seawater intake, or desalination feed, or any combination thereof. Transferring deep seawater or other desalination feed to a higher elevation or a lower pressure environment may be a pre-treatment step to remove at least a portion of dissolved gases. In some embodiments, the desalination feed may be mixed, or agitated, or sparged with air, or sparged with gas, or any combination thereof to accelerate the rate which dissolved gases are released from the desalination feed. It may be desirable to remove at least a portion of dissolved gases to, for example, prevent or minimize the formation of gas or supercritical fluid during the desalination step or reverse osmosis step of a desalination system or process.

Note: in some embodiments, dissolved gases in seawater may comprise carbon dioxide and/or said carbon dioxide may be captured and/or converted and/or utilized. In some embodiments, the released dissolved gases may comprise a similar composition to air, or may comprise air gases, or any combination thereof. In some embodiments, released dissolved gases may be vented into the air.

Note: Some embodiments may comprise a floating offshore desalination system wherein the desalination concentrate or retentate, which may comprise brine effluent, may be transferred through a riser pipe into deep water. At or near the bottom of the riser pipe may be a turbine or generator which may generate power or electricity from the hydrostatic pressure difference in the liquid column between the adjacent seawater or body of water and the higher density desalination brine effluent. Electricity or power may be transferred to the desalination process to facilitate or power at least a portion of desalination, or electricity or power may be transferred to another application, or electricity or power may be transferred to power another desalination system, or any combination thereof. For example, the generator or turbine may comprise a pressure exchanger, which may pressure exchange with desalination feed and facilitate or at least partially power desalination at a lower elevation. Some embodiments be land based if, for example, land may be relatively close to ultra-deep water. For example, if the water is 3,000 meters deep, the potential power generated may be 10-20% of the electricity consumed in a reverse osmosis desalination process.

Note: Some embodiments may create a pressure difference sufficient for desalination by reducing the pressure of the desalinated water liquid column or the permeate liquid column or freshwater liquid column to a pressure below the gravitational hydrostatic pressure of the liquid column. For example, some embodiments may involve a pump-out tank or a lower pressure tank, wherein a desalinated water liquid column comprising a riser or pipeline is connected to a tank with an internal pressure lower than the hydrostatic pressure at the water depth, wherein said the lower internal pressure is maintained by a pump which pumps water from the tank into a pipeline or riser to a post treatment step, or an application, or any combination thereof. In some embodiments, the pump-out tank or lower pressure tank may be located beneath the surface of a body of water and/or at a water depth or elevation associated with the necessary reduction in hydrostatic head or liquid column gravitational pressure to enable or facilitate or drive desalination. It may be desirable for said pump and/or pump-out tank and/or lower pressure tank to be located at a water depth which is shallower or more accessible and/or the minimum desired water depth to sufficiently reduce hydrostatic pressure of the desalinated water liquid column for desalination. For example, if the total liquid column traverses an elevation of 3,000 meters or has a vertical elevation of 3,000 meters, the natural hydrostatic pressure difference between the liquid columns may be 7.65 Bar, which may mean the lower pressure tank or the desalinated water liquid column must be at a pressure 19.35 Bar lower than the natural hydrostatic pressure to overcome the osmotic pressure of seawater or at a pressure 62.35 Bar lower than the natural hydrostatic pressure to provide the same applied pressure difference employed in an example reverse osmosis system with a 40% recovery ratio, which means it may be desirable for the water depth of the lower pressure tank and/or the pump may be at least 199.43 meters, or at least 620.8 meters, respectively if the lower pressure tank has an internal pressure of about 1 Bar.

Note: A liquid column may comprise a liquid body traversing or spanning a significant elevation. In some embodiments, a liquid column may comprise a pipe or riser containing liquid. In some embodiments, a liquid column may comprise an open body of water. For example, a liquid column may comprise a liquid body traversing or spanning an elevation difference of greater than 10 meters, or 20 meters, or 30 meters, or 40 meters, or 50 meters, or 60 meters, or 70 meters, or 80 meters, or 90 meters, or 100 meters, or 150 meters, or 200 meters, or 250 meters, or 300 meters, or 350 meters, or 400 meters, or 450 meters, or 500 meters, or 600 meters, or 700 meters, or 800 meters, or 900 meters, or 1,000 meters, or 1,250 meters, or 1,500 meters, or 1,750 meters, or 2,000 meters, or 2,250 meters, or 2,500 meters, or 2,750 meters, or 3,000 meters, or 3,250 meters, or 3,500 meters, or 4,000 meters, or 5,000 meters, or 6,000 meters, or 7,000 meters, or 8,000 meters, or 9,000 meters, or 10,000 meters, or 11,000 meters.

Note: Reverse osmosis desalination recovery percentage may be greater than or equal to one or more or any combination of the following: 0.1%, or 1%, or 5%, or 10%, or 15%, or 20%, or 25%, or 30%, or 35%, or 40%, or 45%, or 50%, or 55%, or 60%, or 65%, or 70%, or 75%, or 80%, or 85%, or 90%, or 95%

Note: In some embodiments, traversed elevation, or elevation difference, or vertical elevation may have the same meaning.

Note: In some embodiments, the reverse osmosis system or other desalination step may be suspended, or tethered above the seafloor.

Note: Some embodiments may be advantageous due to locating at least a portion of significant moving parts or parts requiring maintenance above or outside of the ocean or other water body. Some embodiments may be advantageous due to locating at least a portion of significant moving parts or parts requiring maintenance at potentially accessible or easily accessible water depths or elevations, which in some embodiments may include, but is not limited to, water depths of less than 1,000 meters.

Note: In some embodiments, pumps may comprise pressure exchangers, which may involve pressure exchanging with an energy storage system or fluids in an energy storage system to power at least a portion of desalination.

Storing and Generating Power Embodiments without Generator

1. A system for storing and generating power comprising:
a first storage reservoir configured to store a first fluid;
a second storage reservoir located at a lower elevation than the first storage reservoir and configured to store a second fluid wherein said second fluid has a higher density than the first fluid;
a pump;
wherein the pump and the first and the second reservoir are operatively connected such that power is stored by displacing the second fluid in the second storage reservoir by pumping the first fluid from the first storage reservoir to the second storage reservoir and such that power is generated by allowing the pumped first fluid in the second storage reservoir to exit the second reservoir; and wherein the first fluid is a liquid.

2. The system of embodiment 1 wherein the system is configured to generate power by transferring the first fluid into a power recovery device.

3. The system of embodiment 2 wherein said power recovery device comprises a pressure exchanger.

4. The system of embodiment 2 wherein said power recovery device is configured to transfer the power from the first fluid to a desalination feed stream.

5. The system of embodiment 2 wherein said power recovery device is configured to extract power from the first fluid to pressurize a desalination feed comprising water.

6. The system of embodiment 5 wherein said desalination feed comprising water comprises seawater or treated seawater.

7. The system of embodiment 5 wherein the system is configured such that said pressurized desalination feed comprising water is transferred into a reverse osmosis desalination system.

8. The system of embodiment 2 wherein the system is configured such that the first fluid is transferred into the first storage reservoir after said power recovery.

9. The system of embodiment 1 wherein the first fluid comprises a hydrocarbon, butane, propane, LPG, water, ammonia, ethanol, methanol, kerosene, or any mixture thereof.

10. The system of embodiment 1 wherein the system is configured such that power in the first fluid is employed to generate electricity for pressurizing a desalination feed water.

11. The system of embodiment 10 wherein the system is configured such that the proportion of power converted into electricity relative to the proportion of power transferred to pressurize the desalination feed water is adjustable.

12. The system of embodiment 5 wherein the system is configured such that the first fluid transferred into a power recovery device comprises a pressure greater than an osmotic pressure of the desalination feed comprising water.

13. The system of embodiment 1 wherein the first fluid comprises a desalination feed comprising water.

14. The system of embodiment 13 wherein the system is configured such that power is generated by transferring the low density fluid into a desalination system.

15. The system of embodiment 14 wherein the system is configured such that the first fluid transferred to a desalination system comprises a pressure greater than the osmotic pressure of the desalination feed comprising water.

16. The system of embodiment 13 wherein the system is configured such that at least a portion of the power in the first fluid is recovered using a power recovery device before transferring the first fluid to a desalination system.

17. The system of embodiment 13 wherein the system is configured such that at least a first portion of the first fluid is transferred to an electric generator and at least a second portion of the first fluid is transferred to a desalination system,
wherein the electric generator generates electricity from at least a portion of the generated power in the first fluid, and
wherein the desalination system converts at least a portion of the generated power in the first fluid into desalinated water.

18. The system of embodiment 17 wherein the system is configured such that the proportion of first fluid transferred to the desalination system and the proportion of first fluid transferred to the electric generator is adjustable.

19. The system of embodiment 17 wherein the system is configured such that the proportion of power in the first fluid transferred to the desalination system and the proportion of power in the first fluid transferred to the electric generator is adjustable.

20. The system of embodiment 13 wherein the system is configured such that the first fluid exiting the second storage reservoir is transferred into a desalination system to produce desalinated water.

21. The system of embodiment 20 wherein desalination feed comprising water is added to the first storage reservoir to make up for the produced desalinated water.

22. The system of embodiment 13 the system is configured such that the first fluid exiting the second storage reservoir is transferred into a desalination system to separate the first fluid into a desalinated water permeate and a desalination retentate using a semipermeable membrane.

23. The system of embodiment 1 wherein the low density fluid comprises desalinated water.

24. The system of embodiment 1 wherein the system is configured such that the stored power is employed to desalinate water.

25. The system of embodiment 24 wherein the system is configured such that the desalinated water is converted into chemicals selected from the group consisting of hydrogen, oxygen, synthetic fuels, fuels, ammonia, hydrogen derived chemicals, carbon dioxide derived chemicals, air derived chemicals, and any mixture thereof.

26. The system of embodiment 1 wherein the system is configured such that the higher elevation reservoir is locatable on land, floating on water, or underwater.

27. The system of embodiment 24 wherein the system is configured such that the desalinated water is transportable by a pipeline, a riser, a ship, an aircraft, a train, a truck, or a conveyor belt.

28. The system of embodiment 1 wherein the pump is configured to pressurize a desalination feed comprising water.

29. A process for storing power and desalinating water comprising:
storing a first fluid in a first storage reservoir;
storing a second fluid which has a higher density than the first fluid in a second storage reservoir located at a lower elevation than the first storage reservoir;
operatively connecting a pump and the first and second reservoir such that power is stored by displacing the second fluid in the second storage reservoir by pumping the first fluid in the first storage reservoir to the second storage reservoir; and
allowing the first fluid to exit the second storage reservoir and pressure exchange with a desalination feed comprising water to generate power.

30. A process for storing power and desalinating water comprising:
storing a first fluid in a first storage reservoir;
storing a second fluid which has a higher density than the first fluid in a second storage reservoir located at a lower elevation than the first storage reservoir;
operatively connecting a pump and the first and second reservoir such that power is stored by displacing the second fluid in the second storage reservoir by pumping the first fluid in the first storage reservoir to the second storage reservoir; and
allowing the first fluid to exit the second storage reservoir and enter a desalination system;
wherein the first fluid comprises a desalination feed comprising water.

Storing and Generating Power Embodiments with Generator

1. A system for storing and generating power comprising:
a first storage reservoir configured to store a first fluid;
a second storage reservoir located at a lower elevation than the first storage reservoir and configured to store a second fluid wherein said second fluid has a higher density than the first fluid;
a pump; and
a generator;
wherein the pump, the generator, and the first and the second reservoir are operatively connected such that power is stored by displacing the second fluid in the second storage reservoir by pumping the first fluid in the first storage reservoir to the second storage reservoir and power is generated or discharged by allowing the first fluid in the second storage reservoir to return to the first storage reservoir; and
wherein the first fluid is a liquid.

2. The system of embodiment 1 wherein the high density fluid is soluble in the low density fluid.

3. The system of embodiment 1 wherein the second storage reservoir comprises at least one storage unit within it and wherein the system is configured such that the low density fluid and the high density fluid are storable within the same storage unit in the second storage reservoir.

4. The system of embodiment 3 wherein the system is configured such that the low density fluid is located above the high density fluid within the storage unit.

5. The system of embodiment 3 wherein the system is configured such that a fluid-fluid interface separates the low density fluid from the high density fluid in the storage unit.

6. The system of embodiment 3 wherein the system is configured such that a chemocline or chemocline layer separates the low density fluid from the high density fluid.

7. The system of embodiment 3 wherein the system is configured such that a physical divider separates the low density fluid from the high density fluid.

8. The system of embodiment 7 wherein the system is configured such that the physical divider occupies at least 50% of the cross sectional area otherwise occupied by a fluid-fluid interface in the absence of the physical divider.

9. The system of embodiment 7 wherein the system is configured such that an elevation of the physical divider adjusts to follow a change in elevation of the fluid-fluid interface that would be present in the absence of the physical divider.

10. The system of embodiment 7 wherein the system is configured such that the physical divider is floating.

11. The system of embodiment 7 wherein the system is configured such that the density of the physical divider is greater than the density of the low density fluid and less than the density of the high density fluid.

12. The system of embodiment 1 wherein the system is configured such that the first storage reservoir comprises at least one first reservoir storage unit within it and the second storage reservoir comprises at least one second reservoir storage unit within it and wherein the system is configured such that the high density fluid and low density fluid are stored in the same storage units within the first storage reservoir and the second storage reservoir.

13. The system of embodiment 2 wherein the system is configured such that at least a portion of high density fluid mixes with at least a portion of low density fluid.

14. The system of embodiment 13 wherein the system is configured such that at least a portion of high density fluid is removed from the low density fluid by separation.

15. The system of embodiment 14 wherein the system is configured such that said separation comprises reverse osmosis, or forward osmosis, or distillation, or evaporation, or electrodialysis, or gravitational separation, or decanting, or coalescing, or centrifuge, or filtration, or cryodesalination, or freeze desalination, solventing out, or precipitation, or extraction, or extractive distillation.

16. The system of embodiment 2 wherein the system is configured such that at least a portion of low density fluid mixes with at least a portion of high density fluid.

17. The system of embodiment 16 wherein the system is configured such that at least a portion of low density fluid is removed from the high density fluid by separation.

18. The system of embodiment 17 wherein said separation comprises reverse osmosis, or forward osmosis, or distillation, or evaporation, or gravitational separation, or decanting, or coalescing, or centrifuge, or filtration, or cryodesalination, or freeze desalination, solventing out, or precipitation, or extraction, or extractive distillation.

19. The system of embodiment 2 wherein the low density fluid comprises water and the high density fluid comprises brine.

20. The system of embodiment 1 wherein the system is configured such that the first storage reservoir comprises a first and a second storage unit and wherein the system is configured such that the high density fluid is stored within the first storage unit and the low density fluid is stored in the second storage unit.

21. The system of embodiment 20 wherein the high density fluid comprises a liquid.

22. The system of embodiment 21 wherein the system is configured such that the first and the second storage unit are operably connected such that a gas is transferrable between the first and the second storage unit as liquid enters a unit and displaces the gas.

23. The system of embodiment 22 wherein the system is configured such that a semi-permeable barrier allows the transfer of gas while preventing the transfer of liquid.

24. The system of embodiment 1 wherein the system is configured such that the first storage reservoir is located under a body of water.

25. The system of embodiment 1 wherein the system is configured such that the first storage reservoir is at an elevation greater than the surface of the body of water.

26. The system of embodiment 1 wherein the system is configured such that the first storage reservoir comprises a floating structure.

27. The system of embodiment 1 further comprising a pressure exchanger.

28. The system of embodiment 27 wherein the system is configured such that the pressure exchanger is located at an elevation less than the elevation of the first storage reservoir and greater than or equal to the elevation of the second storage reservoir.

29. The system of embodiment 1 wherein the low density fluid or high density fluid comprises desalinated water.

30. The system of embodiment 1 wherein the low density fluid or high density fluid comprises treated seawater.

Desalinating Water Embodiments

1. A system for desalinating water comprising:
a first liquid column operably connected to a second liquid column;
wherein the first liquid column comprises a desalination feed;
wherein the second liquid column comprises desalinated water; and
wherein the system is configured such that at least a portion of pressure for desalination is provided by a difference in gravitational hydrostatic pressure between the first liquid column and the second liquid column due to a density difference between the desalination feed and the desalinated water.

2. The system of embodiment 1 wherein said desalination feed comprises seawater.

3. The system of embodiment 1 wherein said desalinated water comprises freshwater.

4. The system of embodiment 1 wherein the first liquid column comprises a body of water.

5. The system of embodiment 4 wherein the body of water comprises an ocean, or a sea.

6. The system of embodiment 4 wherein the system comprises a first elevation and a second elevation; and wherein the first elevation comprises the elevation of the surface of a body of water; and wherein the second elevation comprises an elevation lower than the first elevation.

7. The system of embodiment 6 wherein a reverse osmosis desalination membrane is positioned at the second elevation.

8. The system of embodiment 1 wherein the first column comprises a body of water.

9. The system of embodiment 7 wherein the first column comprises a pipe configured to transfer the desalination feed from the first elevation to the reverse osmosis desalination membrane at the second elevation.

10. The system of embodiment 7 wherein the second column comprises a pipe configured to transfer desalinated water from the reverse osmosis desalination membrane at the second elevation to an application requiring desalinated water at or above the first elevation.

11. The system of embodiment 10 wherein said pipe comprises a riser.

12. The system of embodiment 6 wherein the second elevation has at least one point which is greater than 1,000 meters lower than the first elevation.

13. The system of embodiment 7 wherein a desalination concentrate is discharged at an elevation within 50 meters of the elevation of the reverse osmosis membrane.

14. The system of embodiment 7 wherein a desalination concentrate is discharged at an elevation which at least one point is equal to or lower than the elevation of the reverse osmosis membrane.

15. The system of embodiment 1 wherein the desalination feed is pre-treated.

16. The system of embodiment 1 wherein the desalination feed comprises a feed wherein at least a portion of dissolved gases are removed.

17. The system of embodiment 9 wherein the system further comprises a pump configured to apply pressure to the desalination feed in the first liquid column.

18. The system of embodiment 9 wherein the system further comprises a discharging fluid displacement energy storage system to apply pressure to the desalination feed in the first liquid column.

19. The system of embodiment 17 wherein the pump is at an elevation between the first elevation and the second elevation.

20. The system of embodiment 17 wherein the pump is at the second elevation.

21. The system of embodiment 1 wherein the difference in gravitational hydrostatic pressure is greater than 5 Bar.

22. The system of embodiment 1 wherein the system is configured to supplement the difference in gravitational hydrostatic pressure by a reduction of the pressure of the second liquid column.

23. The system of embodiment 22 wherein the reduction of the pressure of the second liquid column is reduced by transferring desalinated water in the second liquid column into a lower pressure tank.

24. The system of embodiment 23 wherein the system is configured such that an internal pressure of the lower pressure tank is lower than the gravitational hydrostatic pressure associated with the elevation difference between the elevation of the lower pressure tank and the surface of the body of water.

25. The system of embodiment 23 wherein the system is configured such that an internal pressure of the lower pressure tank is lower than the gravitational hydrostatic pressure associated with the elevation difference between the elevation of the lower pressure tank and the outlet of the second liquid column.

26. The system of embodiment 23 wherein the system is configured such that the elevation of the lower pressure tank is above the elevation of at least one desalination membrane.

27. The system of embodiment 23 wherein the system is configured such that the elevation of the lower pressure tank is lower than the elevation of the surface of the body of water by an elevation difference about equal to or greater than the hydrostatic head pressure for desalinating desalination feed at a desired recovery ratio minus the gravitational hydrostatic pressure difference between the first liquid column and the second liquid column.

28. The system of embodiment 23 wherein the system is configured such that the pressure of the lower pressure tank is maintained by a pump transferring desalinated water from the lower pressure tank.

29. The system of embodiment 23 wherein the system is configured such that the pressure of the lower pressure tank is maintained by a pressure exchanger transferring desalinated water from the lower pressure tank powered by pressure exchanging with a discharging fluid displacement energy storage system.

30. A method for desalinating water comprising:
feeding saline water from a first liquid column comprising a body of water to a reverse osmosis desalination membrane; and
feeding the water through the reverse osmosis membrane at a pressure sufficient to provide desalinated water and forming a second liquid column comprising desalinated water;
wherein at least a portion of the pressure is provided by a difference in gravitational hydrostatic pressure between the first liquid column and the second liquid column due to a density difference between the feed and the desalinated water.

Generating Power from Brine

1. A system for generating power comprising:
a brine source:
a pipe comprising a generator
and
a brine discharge outlet;
wherein the brine source is at a first elevation and the brine discharge outlet is at a second elevation; and
wherein the first elevation is higher than the second elevation; and
wherein the pipe connects the brine source at the first elevation to the brine discharge outlet at the second elevation; and
wherein the brine discharge outlet and at least a portion of the pipe are configured to be located beneath a surface of a body of water; and
wherein power is generated by transferring brine from the brine source at the first elevation through the pipe comprising the generator to the brine discharge outlet at the second elevation.

2. The system of embodiment 1 wherein the system is configured such that power is generated due to a gravitational hydrostatic pressure difference between the brine in the pipe and the body of water due to the density difference between the brine and water in the body of water.

3. The system of embodiment 1 wherein the body of water comprises a sea or ocean.

4. The system of embodiment 1 wherein the brine source comprises a desalination concentrate, or a desalination retentate.

5. The system of embodiment 1 wherein the brine source comprises a desalination system.

6. The system of embodiment 1 wherein the pipe comprises a riser.

7. The system of embodiment 1 wherein the system is configured such that brine is discharged into the body of water.

8. The system of embodiment 1 wherein the generator is located beneath the surface of the water body.

9. The system of embodiment 5 wherein the generator generates power in the form of electricity; and wherein the system is configured to employ the electricity to at least partially power the desalination system.

10. The system of embodiment 5 wherein at least a portion of the desalination system is floating on the body of water.

11. The system of embodiment 5 wherein at least a portion of the desalination system is beneath the surface of the body of water.

12. The system of embodiment 5 wherein at least a portion of the desalination system is on land.

13. The system of embodiment 1 wherein the brine source comprises brine from an evaporation system.

14. The system of embodiment 1 wherein the generator comprises a power exchanger and wherein the system is configured such that at least a portion of the power generated is employed to pressurize at least a portion of desalination feed.

15. The system of embodiment 1 wherein the discharge outlet comprises one or more distributors to reduce a localized increase in salinity adjacent to the discharge outlet.

16. The system of embodiment 1 wherein the discharge outlet is at an elevation greater than 1000 meters below the elevation of the surface of the body of water.

17. The system of embodiment 1 wherein the difference in elevation between the first elevation and second elevation is greater than 1000 meters.

18. The system of embodiment 1 wherein the generator is at an elevation within 50 meters of the discharge outlet.

19. The system of embodiment 5 wherein the desalination system is operably connected to a power source by a subsea cable.

20. The system of embodiment 9 wherein the electricity is transferred from the generator to the desalination system with a subsea umbilical.

21. The system of embodiment 2 wherein the density difference between the brine and the water in the body of water is greater than 0.005 kg/L.

22. The system of embodiment 1 wherein the system is configured to store energy by storing brine in a storage reservoir.

23. A method for generating power comprising:
transferring brine from a brine source at a first elevation through a pipe comprising a generator to a brine discharge outlet at a second elevation below a surface of a body of water;
and
generating power using a gravitational hydrostatic pressure difference between the brine in the pipe and the water in the body of water due to the density difference between the brine and the water in the body of water.

24. The method of embodiment 23 wherein the body of water comprises a sea or ocean.

25. The method of embodiment 23 wherein the brine source comprises a desalination method.

26. The method of embodiment 23 wherein the pipe comprises a riser.

27. The method of embodiment 23 wherein the generator generates power in the form of electricity; and wherein the method is configured to employ the electricity to at least partially power the desalination method.

28. The method of embodiment 23 wherein the generator comprises a power exchanger and wherein the method is configured such that at least a portion of the power generated is employed to pressurize at least a portion of desalination feed.

29. The method of embodiment 23 wherein the system is configured to store energy by storing brine in a storage reservoir.

30. The method of embodiment 23 wherein the brine source comprises brine from an evaporation method.

Seawater

As used herein "seawater" may include salinated water from an ocean or sea, as well as or salinated water from underground regions below sea level, or above seawater, or any combination thereof such as produced water and/or flowback water resulting from, for example, oil and gas operations, or saline water from a saline aquifer, or saline water comprising resident brine, or saline water from a salt cavern, or saline brine pool, or subsea saline brine pool, or saline water from lithium production, or saline water from potassium production, or saline water from potash production, or saline water from evaporation, or saline water from evaporation pond, or saline water from alkali salt production, or saline water from alkaline earth salt production, or saline water from metal extraction, or saline water from mining, or saline water comprising synthetic brine, or saline water comprising man-made brine, or saline water comprising man-made salt water, or saline water produced from a chemical production process, or saline water produced from a material production process, or saline water from a cooling tower, or saline water from smoke stack blowdown, or saline water from co2 capture, or saline water from co2 storage, or saline water from water treatment, or saline water from acid gas scrubbing, or saline water comprising a byproduct, or saline water comprising an effluent, or any combination thereof. In some embodiments. "seawater" may include any water comprising a greater osmotic pressure than deionized water.

Generating Power

In some embodiments, generating power may comprise providing power to a desalination system instead of, or in addition to, reverse osmosis, which may include, but are not limited to, one or more or any combination of the following: vacuum distillation, or mechanical vapor compression distillation, or membrane distillation, or vapor recompression distillation, or multistage flash distillation, or heat pump driven distillation, or pressure driven membrane distillation, or multi-effect desalination, or vapor compression desalination, or freeze desalination, or refrigeration based freeze desalination. Power may be transferred or exchanged by means of, for example, including, but not limited to, one or more or any combination of the following: hydraulic exchange, or mechanical exchange, or pressure exchange, or power exchange, or power transfer, or electrical motor, or turbo power recovery, or turbine, or direct mechanical exchange, or indirect mechanical exchange, or directly fluid flow, or aspirating valve, or venturi valve, or venturi effect based system, or venturi effect based process, or fluid mixing, or any combination thereof.

Additional Notes

Note: In some embodiments, the low density fluid may comprise a density within 0.005 kg/L, or 0.01 kg/L, or 0.015 kg/L, or 0.02 kg/L, or 0.025 kg/L, or 0.03 kg/L, or 0.035 kg/L, or 0.04 kg/L, or 0.045 kg/L, or 0.05 kg/L, or 0.055 kg/L, or 0.06 kg/L, or 0.065 kg/L, 0.07 kg/L, or 0.075 kg/L, or 0.08 kg/L, or 0.085 kg/L, or 0.09 kg/L, or 0.095 kg/L, or 0.10 kg/L, or 0.11 kg/L, or 0.12 kg/L, or 0.13 kg/L, or 0.14 kg/L, or 0.15 kg/L, or any combination thereof of the density of water.

Note: In some embodiments, the low density fluid may comprise a density within 0.005 kg/L, or 0.01 kg/L, or 0.015 kg/L, or 0.02 kg/L, or 0.025 kg/L, or 0.03 kg/L, or 0.035 kg/L, or 0.04 kg/L, or 0.045 kg/L, or 0.05 kg/L, or 0.055 kg/L, or 0.06 kg/L, or 0.065 kg/L, 0.07 kg/L, or 0.075 kg/L, or 0.08 kg/L, or 0.085 kg/L, or 0.09 kg/L, or 0.095 kg/L, or 0.10 kg/L, or 0.11 kg/L, or 0.12 kg/L, or 0.13 kg/L, or 0.14 kg/L, or 0.15 kg/L, or any combination thereof of the density of seawater.

Note: In some embodiments, the pressure inside the lower elevation reservoir may be within 0.5%, or 1%, or 1.5%, or 2%, or 2.5%, or 3%, or 3.5%, or 4%, or 4.5%, or 5%, or 5.5%, or 6%, or 6.5%, or 7%, or 7.5%, or 8%, or 8.5%, or 9%, or 9.5%, or 10%, or 11%, or 12$, or 13%, or 14%, or 15%, or 16%, or 17%, or 18%, or 19%, or 20%, or any combination thereof of the pressure of the adjacent body of water at the same elevation.

Note: Power may be transferred to or from a subsea or lower elevation pump or generator using a subsea power cable. Power may be transferred from a power source. Power may be transferred to a power consumer.

Note: Power sources may include, but are not limited to, onshore, or offshore, or any combination thereof power sources. Power consumers may include, but are not limited to, onshore, or offshore, or any combination thereof power consumers. Power sources may include, but are not limited to, power generator, or grid electricity, or power plant, or wind, or wind turbine, or solar, or solar PV, or solar thermal, or steam turbine, or rankine cycle, or power generation cycle, or tidal power, or wave power, or geothermal power, or power recovery, or thermal power, or heat engine power, or hydro power, or density difference power, or salinity gradient power, or osmotic power, or recovered power, or stored power, combustion derived power, or any combination thereof.

Note: Power consumers may include, but are not limited to, industry, or commercial, or residential, or manufacturing, or chemicals, or residential, or municipal, or offshore, or onshore, or aerospace, or transport, or institutional, or data centers, or digital, or vehicle, or any combination thereof power consumer.

Power Generation Embodiments

1. A system for storing and generating power comprising:
    a first storage reservoir configured to store a first fluid;
    a second storage reservoir located at a lower elevation than the first storage reservoir and configured to store a second fluid wherein said second fluid has a higher density than the first fluid;
    a pump; and
    a generator;
wherein the pump, the generator, and the first and the second reservoir are operatively connected such that power is stored by displacing the first fluid in the first storage reservoir by pumping the second fluid in the second storage reservoir to the first storage reservoir and power is generated or discharged by allowing the second fluid in the first storage reservoir to return to the second storage reservoir; and wherein the first fluid is a liquid.

2. The system of embodiment 1 wherein the system is a closed system.

3. The system of embodiment 1 wherein the second storage reservoir comprises a rigid tank.

4. The system of embodiment 1 wherein the first fluid comprises freshwater.

5. The system of embodiment 1 wherein the first fluid comprises treated seawater.

6. The system of embodiment 1 wherein the first fluid has a density within 0.05 kilogram per liter of the density of seawater.

7. The system of embodiment 1 wherein the pressure inside the second reservoir is within 10 percent of the pressure of the adjacent body of water at the same elevation.

8. The system of embodiment 1 wherein the pump is at about the same elevation as the second reservoir.

9. The system of embodiment 1 wherein the generator is at about the same elevation as the second reservoir.

10. The system of embodiment 1 wherein the first fluid is transferred between the first reservoir and second reservoir using a pipe.

11. The system of embodiment 10 wherein said pipe further comprises a valve.

12. The system of embodiment 11 wherein said valve is employed to control the pressure inside the second reservoir;
    wherein said valve is opened to decrease the pressure inside the second reservoir;
    wherein said valve is closed to increase the pressure inside the second reservoir.

13. The system of embodiment 1 wherein the second fluid comprises brine.

14. The system of embodiment 1 wherein the second fluid comprises a solid-liquid mixture.

15. The system of embodiment 1 wherein the second reservoir is located underwater.

16. The system of embodiment 1 further comprising a subsea power cable configured to transfer electricity between the pump and the generator, a power source, and a power consumer.

17. The system of embodiment 1 wherein the second storage reservoir comprises at least one storage unit within it and wherein the system is configured such that the low density fluid and the high density fluid are storable within the same storage unit in the second storage reservoir.

18. The system of embodiment 17 wherein the system is configured such that the low density fluid is located above the high density fluid within the storage unit.

19. The system of embodiment 17 wherein the system is configured such that a fluid-fluid interface separates the low density fluid from the high density fluid in the storage unit.

20. The system of embodiment 17 wherein the system is configured such that a chemocline or chemocline layer separates the low density fluid from the high density fluid.

21. The system of embodiment 17 wherein the system is configured such that a physical divider separates the low density fluid from the high density fluid.

22. The system of embodiment 21 wherein the system is configured such that the physical divider occupies at least 50% of the cross sectional area otherwise occupied by a fluid-fluid interface in the absence of the physical divider.

23. The system of embodiment 21 wherein the system is configured such that an elevation of the physical divider adjusts to follow a change in elevation of the fluid-fluid interface that would be present in the absence of the physical divider.

24. The system of embodiment 21 wherein the system is configured such that the physical divider is floating.

25. The system of embodiment 21 wherein the system is configured such that the density of the physical divider is greater than the density of the low density fluid and less than the density of the high density fluid.

26. The system of embodiment 1 wherein the system is configured such that at least a portion of high density fluid mixes with at least a portion of low density fluid; and
    wherein the system is configured such that at least a portion of high density fluid is removed from the low density fluid by separation.

27. The system of embodiment 1 wherein the system is configured such that the first storage reservoir comprises at least one first reservoir storage unit within it and the second storage reservoir comprises at least one second reservoir storage unit within it and wherein the system is configured such that the high density fluid and low density fluid are stored in the same storage units within the first storage reservoir and the second storage reservoir.

28. The system of embodiment 1 wherein the system is configured such that the first storage reservoir comprises a first and a second storage unit and wherein the system is configured such that the high density fluid is stored within the first storage unit and the low density fluid comprising a liquid is stored in the second storage unit.

29. The system of embodiment 28 wherein the system is configured such that the first and the second storage unit are operably connected such that a gas is transferrable between the first and the second storage unit as a liquid enters a unit and displaces the gas.

30. A system for storing and generating power comprising:
a first storage reservoir configured to store a first fluid;
a second storage reservoir located at a lower elevation than the first storage reservoir and configured to store a second fluid wherein said second fluid has a higher density than the first fluid;
a pump; and a generator;
wherein the pump, the generator, and the first and the second reservoir are operatively connected such that power is stored by displacing the first fluid in the first storage reservoir by pumping the second fluid in the second storage reservoir to the first storage reservoir and power is generated or discharged by allowing the second fluid in the first storage reservoir to return to the second storage reservoir; and
wherein the first fluid comprises water and the second fluid comprises a fluid with a density greater than water.

What is claimed is:

1. A system for storing and generating power comprising:
a first storage reservoir configured to store a first fluid;
a second storage reservoir located at a lower elevation than the first storage reservoir and configured to store a second fluid wherein said second fluid has a higher density than the first fluid;
a pump;
a generator; and
a pressure exchanger to pressure exchange between the second fluid and the first fluid such that the pressure inside the second reservoir is within 10 percent of the pressure of an adjacent body of water at the same elevation;
wherein the pump, the generator, and the first and the second reservoir are operatively connected such that power is stored by displacing the first fluid in the first storage reservoir by pumping the second fluid in the second storage reservoir to the first storage reservoir and power is generated or discharged by allowing the second fluid in the first storage reservoir to return to the second storage reservoir; and
wherein the first fluid is a liquid.

2. The system of claim 1 wherein the system is a closed system.

3. The system of claim 1 wherein the second storage reservoir comprises a rigid tank.

4. The system of claim 1 wherein the first fluid comprises freshwater.

5. The system of claim 1 wherein the first fluid comprises treated seawater.

6. The system of claim 1 wherein the first fluid has a density within 0.05 kilogram per liter of the density of seawater.

7. The system of claim 1 wherein the pump is at about the same elevation as the second reservoir.

8. The system of claim 1 wherein the generator is at about the same elevation as the second reservoir.

9. The system of claim 1 wherein the first fluid is transferred between the first reservoir and second reservoir using a pipe.

10. The system of claim 9 wherein said pipe further comprises a valve.

11. The system of claim 10 wherein said valve is employed to control the pressure inside the second reservoir;
wherein said valve is opened to decrease the pressure inside the second reservoir;
wherein said valve is closed to increase the pressure inside the second reservoir.

12. The system of claim 1 wherein the second fluid comprises brine.

13. The system of claim 1 wherein the second fluid comprises a solid-liquid mixture.

14. The system of claim 1 wherein the second reservoir is located underwater.

15. The system of claim 1 further comprising a subsea power cable configured to transfer electricity between the pump and the generator, a power source, and a power consumer.

16. The system of claim 1 wherein the second storage reservoir comprises at least one storage unit within it and wherein the system is configured such that the first fluid and the second fluid are storable within the same storage unit in the second storage reservoir.

17. The system of claim 16 wherein the system is configured such that the first fluid is located above the second fluid within the storage unit.

18. The system of claim 16 wherein the system is configured such that a fluid-fluid interface separates the first fluid from the second fluid in the storage unit.

19. The system of claim 16 wherein the system is configured such that a chemocline or chemocline layer separates the first fluid from the second fluid.

20. The system of claim 16 wherein the system is configured such that a physical divider separates the first fluid from the second fluid.

21. The system of claim 20 wherein the system is configured such that the physical divider occupies at least 50% of the cross sectional area otherwise occupied by a fluid-fluid interface in the absence of the physical divider.

22. The system of claim 20 wherein the system is configured such that an elevation of the physical divider adjusts to follow a change in elevation of the fluid-fluid interface that would be present in the absence of the physical divider.

23. The system of claim 20 wherein the system is configured such that the physical divider is floating.

24. The system of claim 20 wherein the system is configured such that the density of the physical divider is greater than the density of the first fluid and less than the density of the second fluid.

25. The system of claim 1 wherein the system is configured such that at least a portion of the second fluid mixes with at least a portion of the first fluid; and wherein the system is configured such that at least a portion of the second fluid is removed from the first fluid by separation.

26. The system of claim 1 wherein the system is configured such that the first storage reservoir comprises at least one first reservoir storage unit within it and the second storage reservoir comprises at least one second reservoir storage unit within it and wherein the system is configured such that the second fluid and the first fluid are stored in the same storage units within the first storage reservoir and the second storage reservoir.

27. The system of claim 1 wherein the system is configured such that the first storage reservoir comprises a first and a second storage unit and wherein the system is configured such that the second fluid is stored within the first storage unit and the first fluid comprising a liquid is stored in the second storage unit.

28. The system of claim 27 wherein the system is configured such that the first and the second storage unit are operably connected such that a gas is transferrable between the first and the second storage unit as a liquid enters a unit and displaces the gas.

29. The system of claim 1 wherein the first fluid is ethanol.

30. A system for storing and generating power comprising:
- a first storage reservoir configured to store a first fluid;
- a second storage reservoir located at a lower elevation than the first storage reservoir and configured to store a second fluid wherein said second fluid has a higher density than the first fluid;
- a pump;
- a generator; and
- a pressure exchanger to pressure exchange between the second fluid and the first fluid such that the pressure inside the second reservoir is within 10 percent of the pressure of an adjacent body of water at the same elevation;
- wherein the pump, the generator, and the first and the second reservoir are operatively connected such that power is stored by displacing the first fluid in the first storage reservoir by pumping the second fluid in the second storage reservoir to the first storage reservoir and power is generated or discharged by allowing the second fluid in the first storage reservoir to return to the second storage reservoir; and
- wherein the first fluid comprises water and the second fluid comprises a fluid with a density greater than water.

* * * * *